US008684275B2

(12) United States Patent
Vafai et al.

(10) Patent No.: US 8,684,275 B2
(45) Date of Patent: Apr. 1, 2014

(54) SMART PASSIVE THERMAL DEVICES AND METHODS

(75) Inventors: Kambiz Vafai, Mission Viejo, CA (US); Abdul Rahim Assaad Khaled, Jeddah (SA)

(73) Assignee: Kambix Innovations, LLC, Albuquerque, NM (US)

( * ) Notice: Subject to any disclaimer, the term of this patent is extended or adjusted under 35 U.S.C. 154(b) by 514 days.

(21) Appl. No.: 13/044,029

(22) Filed: Mar. 9, 2011

(65) Prior Publication Data

US 2011/0155364 A1  Jun. 30, 2011

Related U.S. Application Data

(63) Continuation-in-part of application No. 12/793,826, filed on Jun. 4, 2010, now Pat. No. 8,172,156, which is a continuation of application No. 11/184,932, filed on Jul. 20, 2005, now Pat. No. 7,770,809, which is a continuation-in-part of application No. 10/840,303, filed on May 7, 2004, now Pat. No. 7,654,468.

(60) Provisional application No. 60/470,850, filed on May 16, 2003.

(51) Int. Cl.
G05D 23/00 (2006.01)
(52) U.S. Cl.
USPC .............. 236/93 R; 236/99 J; 165/46; 165/81
(58) Field of Classification Search
USPC .... 236/93 R, 93 A, 99 R, 99 B, 99 J; 165/46, 165/81–83
See application file for complete search history.

(56) References Cited

U.S. PATENT DOCUMENTS

| 4,109,707 A | 8/1978 | Wilson et al. |
| 5,130,889 A | 7/1992 | Hamburgen et al. |
| 5,205,348 A * | 4/1993 | Tousignant et al. ............. 165/46 |
| 5,984,257 A | 11/1999 | Baek et al. |

(Continued)

OTHER PUBLICATIONS

Adams, T. M. et al., "Enhancement of liquid forced convection heat transfer in microchannels due to the release of dissolved noncondensables," Int. J. Heat Mass Transfer (1999) 42(19):3563-3573.

(Continued)

Primary Examiner — Marc Norman
(74) Attorney, Agent, or Firm — Kermit D. Lopez; Luis M. Ortiz; Ortiz & Lopez, PLLC

(57) ABSTRACT

Devices and methods for increasing and decreasing cooling capacity as thermal load increases by utilizing bimaterial. For increasing the cooling capacity, the upper plate of a thin film microchannel can be configured from a bimaterial, such that the upper layer possesses a higher linear thermal expansion coefficient than that of the lower layer material. Excessive heating causes the coolant temperature to increase which in turn heats the upper plate. As such, the upper plate bends outward allowing for more coolant to flow within the thin film. For decreasing the cooling capacity, the upper plate can be configured from a bimaterial such that its lower layer has a higher linear thermal expansion coefficient than that of the upper layer material. Excessive heating can cause the coolant temperature to increase, which in turn heats the upper plate. As such, the upper plate can bend inward resulting in less coolant flow within the thin film.

20 Claims, 63 Drawing Sheets

(56) References Cited

U.S. PATENT DOCUMENTS

| | | | |
|---|---|---|---|
| 6,086,443 A | 7/2000 | Shin et al. | |
| 6,377,438 B1 | 4/2002 | Deane et al. | |
| 6,457,515 B1 | 10/2002 | Vafai et al. | |
| 6,708,945 B2 | 3/2004 | Horiuchi et al. | |
| 6,824,689 B2 | 11/2004 | Wang et al. | |
| 7,258,774 B2* | 8/2007 | Chou et al. | 204/450 |
| 7,288,404 B2 | 10/2007 | Vafai et al. | |
| 7,445,027 B2* | 11/2008 | Flachsbart et al. | 137/803 |
| 7,654,468 B2 | 2/2010 | Vafai et al. | |
| 7,770,809 B2 | 8/2010 | Vafai et al. | |
| 8,092,761 B2* | 1/2012 | McAvoy et al. | 422/537 |
| 8,146,650 B2* | 4/2012 | Lohf et al. | 165/11.1 |
| 2004/0262852 A1 | 12/2004 | Vafai et al. | |
| 2005/0104479 A1* | 5/2005 | Xu et al. | 310/334 |
| 2007/0084940 A1 | 4/2007 | Vafai et al. | |
| 2007/0141721 A1 | 6/2007 | Vafai et al. | |
| 2010/0243750 A1 | 9/2010 | Vafai et al. | |
| 2012/0291991 A1* | 11/2012 | Denkenberger | 165/81 |
| 2013/0118711 A1* | 5/2013 | Vafai et al. | 165/104.13 |
| 2013/0156657 A1* | 6/2013 | Saito | 422/502 |

OTHER PUBLICATIONS

Amiri, A. et al., "Analysis of dispersion effects and non-thermal equilibrium, non-Darcian, variable porosity incompressible flow through porous media," *Int. J. Heat Mass Transfer* (1994) 37(6):939-954.

Amon, C. H. et al., "MEMS-enabled thermal management of high-heat-flux devices EDIFICE: embedded droplet impingement for integrated cooling of electronics," *Experimental Thermal and Fluid Science* (2001) 25(5):231-242.

Atmanand, M. A. et al., "A Novel Method of Using a Control Valve for Measurement and Control of Flow," *IEEE Transactions on Instrumentation and Measurement* (1999) 48(6):1224-1226.

Baramov, L. et al., "H∞ Control of Nonperiodic Two-Dimensional Channel Flow," *IEEE Transactions on Control Systems Technology* (2004) 12(1):111-122.

Bhattacharyya, S. et al., "Unsteady Flow and Heat Transfer Between Rotating Coaxial Disks," *Numerical Heat Transfer, Part A: Applications* (1996) 30(5):519-532.

Blottner, F. G., "Finite Difference Methods of Solution of the Boundary-Layer Equations," *AIAA Journal* (1970) 8(2):193-205.

Boresi, A. P. et al., (1978) *Advanced Mechanics of Materials*, Wiley, NY.

Bowers, M. B. et al., "Two-Phase Electronic Cooling Using Mini-Channel and Micro-Channel Heat Sinks: Part 1—Design Criteria and Heat Diffusion Constraints," *J. Electron. Packag.* (1994) 116(4)290-297.

Chang, P.-Y. et al., "Mixed Convection in a Horizontal Square Packed-Sphere Channel Under Axially Uniform Heating Peripherally Uniform Wall Temperature," *Numerical Heat Transfer, Part A* (2004) 45(8):791-809.

Daloglu, A. et al., "Natural Convection in a Periodically Finned Vertical Channel," *Int. Communications in Heat and Mass Transfer* (1999) 26(8):1175-1182.

Debbaut, B., "Non-isothermal and viscoelastic effects in the squeeze flow between infinite plates," *J. Non-Newtonian Fluid Mechanics* (2001) 98(1):15-31.

Desai, C. P. et al., "On the Natural Convection in a Cavity with a Cooled Top Wall and Multiple Protruding Heaters," *J. Electron. Packag.* (1995) 117(1):34-45.

Eastman, J. A. et al., "Anomalously increased effective thermal conductivities of ethylene glycol-based nanofluids containing copper nanoparticles," *Applied Physics Letters* (2001) 78(6)718-720.

Fedorov, A. G. et al., "Three-dimensional conjugate heat transfer in the microchannel heat sink for electronic packaging," *Int. J. Heat Mass Transfer* (2000) 43(3):399-415.

Friis, E. A. et al., "Negative Poisson's ratio polymeric and metallic foams," *J. Materials Science* (1988) 23(12):4406-4414.

Fritz, J. et al., "Translating Biomolecular Recognition into Nanomechanics," *Science* (2000) 288(5464):316-318.

Gunn, D. J., "An analysis of convective dispersion and reaction in the fixed-bed reactor," *Int. J. Heat Mass Transfer* (2004) 47(12-13):2861-2875.

Hadim, A., "Forced Convection in a Porous Channel With Localized Heat Sources," *J. Heat Transfer* (1994) 116(2):465-472.

Hamza, E. A., "Unsteady flow between two disks with heat transfer in the presence of a magnetic field," *Journal of Physics D: Applied Phys.* (1992) 25(10):1425-1431.

Hancu, S. et al., "Numerical modelling and experimental investigation of the fluid flow and contaminant dispersion in a channel," *Int. J. Heat Mass Transfer* (2002) 45(13):2707-2718.

Harms, T. M. et al., "Developing convective heat transfer in deep rectangular microchannels," *Int. J. Heat Fluid Flow* (1999) 20(2):149-157.

Hemida, H. N. et al., "Theoretical analysis of heat transfer in laminar pulsating flow," *Int. J. Heat Mass Transfer* (2002) 45(8):1767-1780.

Huang, P. C., et al., "Flow and heat transfer control over an external surface using a porous block array arrangement," *Int. J. Heat Mass Transfer* (1993) 36(16):4019-4032.

Huang, P. C. et al., "Passive alteration and control of convective heat transfer utilizing alternate porous cavity-block wafers," *Int. J. Heat and Fluid Flow* (1994) 15(1):48-61.

Huang, P. C. et al., "Analysis of Forced Convection Enhancement in a Channel Using Porous Blocks," *Journal of Thermophysics and Heat Transfer* (1994) 8(3):563-573.

Khaled, A.-R. A. et al., "Nonisothermal Characterization of Thin Film Oscillating Bearings," *Numerical Heat Transfer, Part A* (2002) 41(5):451-467.

Khaled, A.-R. A. et al., "Nonisothermal Characterization of Thin-Film Oscillating Bearings in the Presence of Ultrafine Particles," *Numerical Heat Transfer, Part A* (2002) 42(6):549-564.

Khaled, A.-R. A. et al., "Flow and heat transfer inside thin films supported by soft seals in the presence of internal and external pressure pulsations," *Int J. Heat Mass Transfer* (2002) 45(26):5107-5115.

Khaled, A.-R. A. et al., "Cooling Enhancements in Thin Films Supported by Flexible Complex Seals in the Presence of Ultrafine Suspensions," *J. Heat Transfer* (2003) 125:916-925.

Khaled, A.-R. A. et al., "Analysis of flow and heat transfer inside oscillatory squeezed thin films subject to a varying clearance," *Int. J. Heat Mass Transfer* (2003) 46(4):631-641.

Khaled, A.-R. A. et al., "Analysis of oscillatory flow disturbances and thermal characteristics inside fluidic cells due to fluid leakage and wall slip conditions," *J. Biomech.* (2004) 37(5):721-729.

Khaled, A.-R. A. et al., "Control of insulating properties using flexible soft seals," *Int. J. Heat Mass Transfer* (2004) 47(6-7):1297-1304.

Khaled, A.-R. A. et al., "Control of exit flow and thermal conditions using two-layered thin films supported by flexible complex seals," *Int. J. Heat Mass Transfer* (2004) 47:1599-1611.

Khanafer, K. et al., "Buoyancy-driven heat transfer enhancement in a two-dimensional enclosure utilizing nanofluids," *Int. J. Heat Mass Transfer* (2003) 46(19):3639-3653.

Kleiner, M. B. et al., "High Performance Forced Air Cooling Scheme Employing Microchannel Heat Exchangers," *IEEE Transactions on Components, Packaging, and Manufacturing Technology—Part A* (1995) 18(4):795-804.

Kurzweg, U. H., "Enhanced heat conduction in oscillating viscous flows within parallel-plate channels," *J. Fluid Mech.* (1985) 156:291-300.

Kuznetsov, A. V. et al., "Effects of Thermal Dispersion and Turbulence in Forced Convection in a Composite Parallel-Plate Channel: Investigation of Constant Wall Heat Flux and Constant Wall Temperature Cases," *Numerical Heat Transfer, Part A* (2002) 42(4):365-383.

Langlois, W. E., "Isothermal Squeeze Films", *IBM* (1962) San Jose, CA, pp. 1-50.

Lavrik, N. V. et al., "Gold Nano-Structures for Transduction of Biomolecular Interactions into Micrometer Scale Movements," *Biomedical Microdevices* (2001) 3(1):35-44.

Lee, D.-Y. et al., "Comparative analysis of jet impingement and microchannel cooling for high heat flux applications," *Int. J. Heat Mass Transfer* (1999) 42:1555-1568.

(56) References Cited

OTHER PUBLICATIONS

Li, Q. et al., "Convective heat transfer and flow characteristics of Cu-water nanofluid," *Science in China Series E* (2002) 45(4):408-416.

Metzger, T. et al., "Optimal experimental estimation of thermal dispersion coefficients in porous media," *Int. J. Heat Mass Transfer* (2004) 47(14-16):3341-3353.

Missaggia, L. J. et al., "Microchannel Heat Sinks for Two-Dimensional High-Power-Density Diode Laser Arrays," *IEEE J. Quantum Electronics* (1989) 25(9):1988-1992.

Moon S. H. et al., "Investigation of Packaged Miniature Heat Pipe for Notebook PC Cooling," *Int. J. Microcircuits and Electronic Packaging* (2000) 23(4):488-493.

Navier, C. L. M. H., *Mem. Acad. Sci. Inst. France 1* (1823) 414-416.

Norton, R. L., *Machine Design: An Integrated Approach* (1998) Prentice-Hall, NJ.

Petrov, V. A., "Combined radiation and conduction heat transfer in high temperature fiber thermal insulation," *Int. J. Heat Mass Transfer* (1997) 40(9):2241-2247.

Pritchard, W. F. et al., "Effects of Wall Shear Stress and Fluid Recirculation on the Localization of Circulating Monocytes in a Three-Dimensional Flow Model," *J. Biomechanics* (1995) 28(12):1459-1469.

Raiteri, R. et al., "Changes in surface stress at the liquid/solid interface measured with a microcantilever," *Electrochimica Acta* (2000) 46(2-3):157-163.

Samalam, V. K., "Convective Heat Transfer in Microchannels," *J. Electronic Materials* (1989) 18(5):611-617.

Tuckerman, D. B. et al., "High-Performance Heat Sinking for VLSI," *IEEE Electron Device Letters* (1981) EDL-2(5):126-129.

Vafai, K. et al., "Analysis of flow and heat transfer characteristics of an asymmetrical flat plate heat pipe," *Int. J. Heat Mass Transfer* (1992) 35(9):2087-2099.

Vafai, K. et al., "Analysis of Heat Transfer Regulation and Modification Employing Intermittently Emplaced Porous Cavities," *J. Heat Transfer* (1994) 116(3):604-613.

Vafai, K. et al., "Analysis of Asymmetric Disk-Shaped and Flat-Plate Heat Pipes," *J. Heat Transfer* (1995) 17(1):209-218.

Vafai, K. et al., "Analysis of two-layered micro-channel heat sink concept in electronic cooling," *Int. J. Heat Mass Transfer* (1999) 42:2287-2297.

Vafai, K. et al. "Analysis of heat and mass transfer between air and falling film in a cross flow configuration," *Int. J. Heat Mass Transfer* (2004) 47(4):743-755.

Wasp, E. J. et al., *Solid-Liquid Flow Slurry Pipeline Transportation* (1977) Trans. Tech. Pub., 1st Ed., February.

Watanabe, K. et al., "Drag Reduction of Non-Newtonian Fluids in a Circular Pipe with a Highly Water-Repellent Wall," *AIChE Journal* (2001) 47(2):256-262.

Wu, G. et al., "Bioassay of prostate-specific antigen (PSA) using microcantilevers," *Nature Biotechnology* (2001) 19:856-860.

Xuan, Y. et al., "Heat transfer enhancement of nanofluids," *Int. J. Heat Fluid Flow* (2000) 21(1):58-64.

Xuan, Y. et al., "Conceptions for heat transfer correlation of nanofluids," *Int. J. Heat Mass Transfer* (2000) 43(19):3701-3707.

Yilmaz, M., "The Effect of Inlet Flow Baffles on Heat Transfer," *Int. Communications in Heat and Mass Transfer* (2003) 30(8):1169-1178.

Young, T. J. et al., "Convective cooling of a heated obstacle in a channel," *Int. J. Heat Mass Transfer* (1998) 41(20):3131-3148.

Yu, S. et al., "Slip-flow heat transfer in rectangular microchannels," *Int. J. Heat Mass Transfer* (2001) 44(22):4225-4234.

Yuan, Z. X., "Numerical study of periodically turbulent flow and heat transfer in a channel with transverse fin arrays," *Int. J. Numerical Methods for Heat & Fluid Flow* (2000) 10(8):842-861.

Zhu, N. et al., "Numerical and analytical investigation of vapor flow in a disk-shaped heat pipe incorporating secondary flow," *Int. J. Heat Mass Transfer* (1997) 40(12):2887-2900.

Zhu, N. et al., "Analytical modeling of the startup characteristics of asymmetrical flat-plate and disk-shaped heat pipes," *Int. J. Heat Mass Transfer* (1998) 41(17):2619-2637.

\* cited by examiner

▨▨▨ Fixed insulating substrate

▨▨▨ Movable insulating substrate

▨▨▨ Flexible soft seals

☐ Air vents

◯ Soft elastic balloons filed with a fluid

Front View (section A-A)

Side View (section AA-AA)

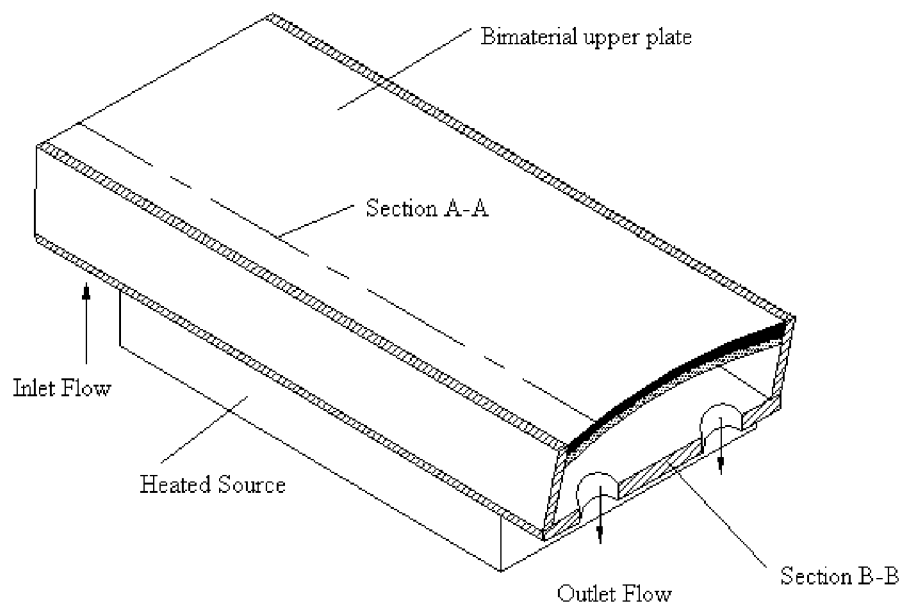
Figure 88B
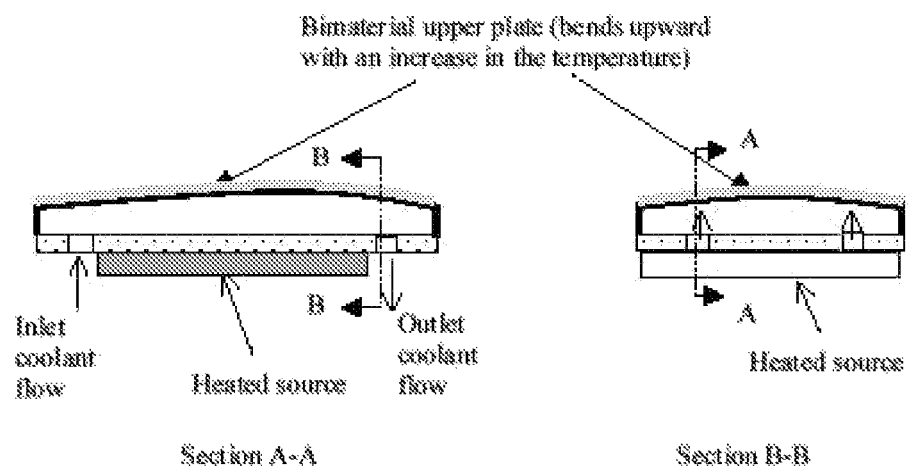

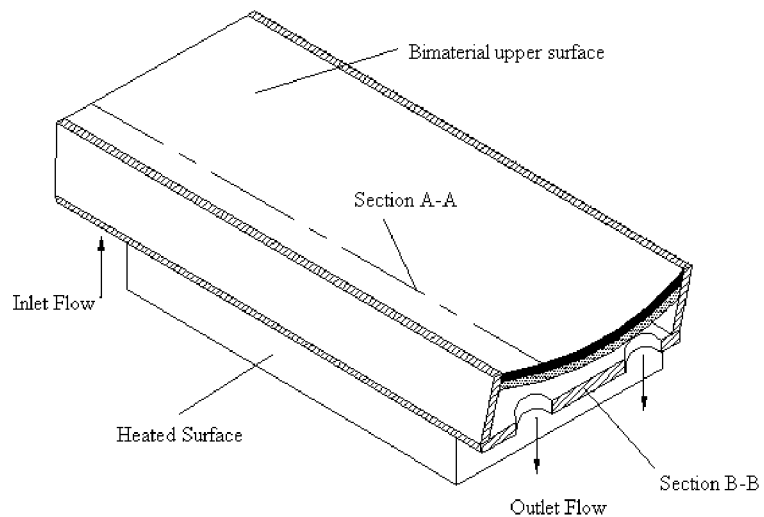
Figure 89B
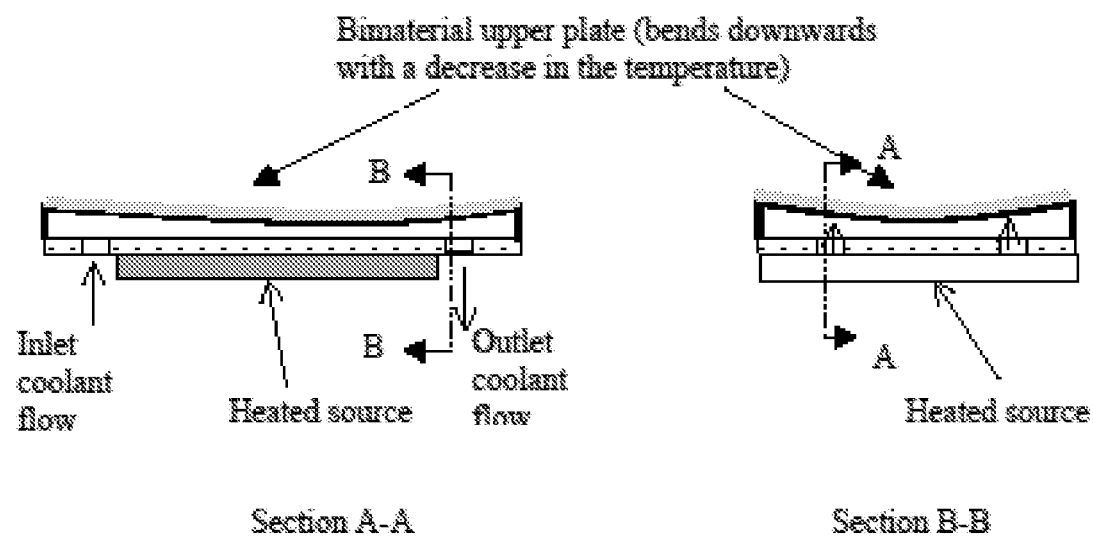

US 8,684,275 B2

SMART PASSIVE THERMAL DEVICES AND METHODS

CROSS-REFERENCE TO RELATED APPLICATIONS

This patent is a Continuation-in-Part of U.S. patent application Ser. No. 12/793,826, entitled "Methods and Devices Comprising Flexible Seals, Flexible Microchannels, or Both for Modulating or Controlling Flow and Heat" filed on Jun. 6, 2010 now U.S. Pat. No. 8,172,156, which in turn is a continuation of U.S. patent application Ser. No. 11/184,932, entitled "Methods and Devices Comprising Flexible Seals, Flexible Microchannels, or Both For Modulating or Controlling Flow and Heat," which was filed on Jul. 20, 2005, issued as U.S. Pat. No. 7,770,809, the disclosure of which is incorporated herein by reference in its entirety. U.S. patent application Ser. No. 11/184,932 in turn is a continuation-in-part of U.S. patent application Ser. No. 10/840,303, filed May 7, 2004, which issued as U.S. Pat. No. 7,654,468, which claims the benefit of U.S. Provisional Patent Application No. 60/470,850 filed 16 May 2003, which are herein incorporated by reference in their entirety.

BACKGROUND OF THE INVENTION

1. Field of the Invention

The present invention generally relates to thin film channels, microfluidic devices, biosensors, electronic cooling, control of fuel flow prior combustion and insulating assemblies.

2. Description of the Related Art

Thin films are used in a variety of devices, including electrical, electronic, chemical, and biological devices, for modulating or controlling flow and heat characteristics in the devices. See e.g. Vafai & Wang (1992) Int. J. Heat Mass Transfer 35:2087-2099, Vafai et al. (1995) ASME J Heat Transfer 117:209-218, Zhu & Vafai (1997) Int. J. Heat Mass Transfer 40:2887-2900, and Moon et al. (2000) Int. J. Microcircuits and Electronic Packaging 23:488-493 for flat heat pipes; Fedorov & Viskanta (2000) Int. J. Heat Mass Transfer 43:399-415, Lee and Vafai (1999) Int. J. Heat Mass Transfer 42:1555-1568, and Vafai & Zhu (1999) Int. J. Heat Mass Transfer 42; 2287-2297 for microchannel heat sinks; Lavrik et al. (2001) Biomedical Microdevices 3(1):35-44, and Xuan & Roetzel (2000) Int. J. Heat Mass Transfer 43:3701-3707 for biosensors and nanodevices.

For many of these applications, modulation and control of the flow and heat characteristics in the devices is desired. Unfortunately, the prior art methods for modulating and controlling the flow and heat are difficult or problematic. For example, a two-phase flow in a microchannel is capable of removing maximum heat fluxes generated by electronic packages, but instability occurs near certain operating conditions. See Bowers & Mudwar (1994) ASME J. Electronic Packaging 116:290-305. Further, the use of porous medium for cooling electronic devices enhances heat transfer via the increase in the effective surface area, but the porous medium results in a substantial increase in the pressure drop inside the thin film. See Huang & Vafai (1993) Int. J. Heat Mass Transfer 36:4019-4032, Huang & Vafai (1994) AIAA J. Thermophysics and Heat Transfer 8:563-573, Huang & Vafai (1994) Int. J. Heat and Fluid Flow 15:48-61, and Hadim (1994) ASME J. Heat Transfer 116:465-472.

Therefore, a need still exists for methods of modulating or controlling heat and flow characteristics in thin films.

SUMMARY OF THE INVENTION

The disclosed embodiments generally relate to thin film channels, microfluidic devices, biosensors, electronic cooling, control of fuel flow prior to combustion, and insulating assemblies.

The disclosed embodiments provide methods and devices for modulating flow and heat in a variety of thermal systems including thin film channels, microfluidics, insulating assemblies, and the like with no need for external cooling or flow controlling devices.

The disclosed embodiments provide devices for modulating flow and heat. Such devices can reduce the temperature as the thermal load increases as related to electronic cooling and cooling of engine applications. Devices are also disclosed herein that reduce the flow rate as the thermal load increases, which are important to internal combustion applications where fuel rate needs to be reduced as the engine gets overheated. Such devices can conserve thermal energy as the temperature increases and to reduce leakage from microfluidics. These devices have applications related to thermal insulations and biosensor devices among others.

It is to be understood that both the foregoing general description and the following detailed description are exemplary and explanatory only and are intended to provide further explanation of the invention as claimed. The accompanying drawings are included to provide a further understanding of the invention and are incorporated in and constitute part of this specification, illustrate several embodiments of the invention and together with the description serve to explain the principles of the disclosed embodiments.

DESCRIPTION OF THE DRAWINGS

This invention is further understood by reference to the drawings wherein.

on the dimensionless exit mean bulk temperature for a single layer flexible microchannel heat sink.

Figure 63:
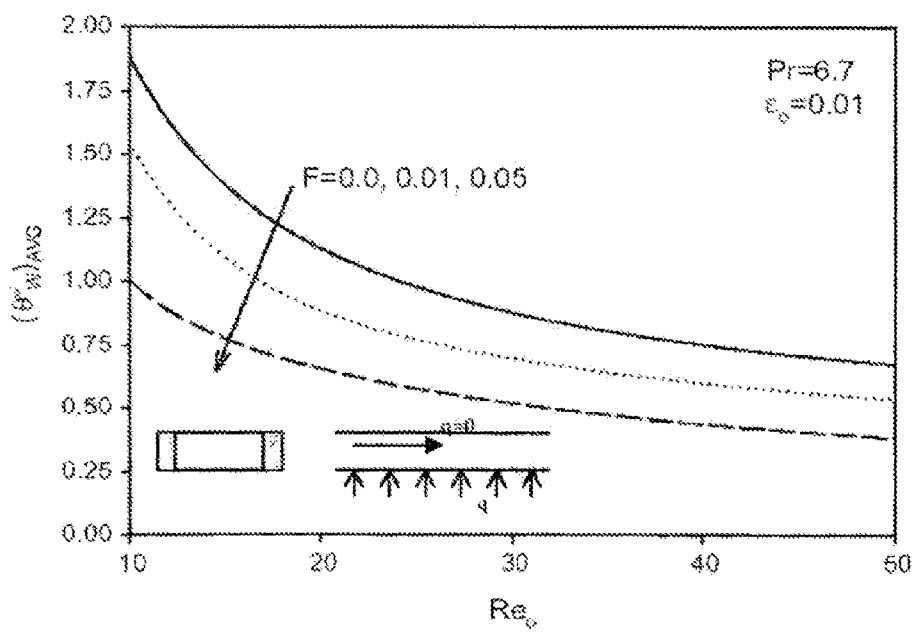

FIG. 63 Effects of the pressure drop $$\left(Re_o = \frac{\rho}{12\mu^2}\frac{\Delta p}{B}H_o^3\right)$$

on the dimensionless average lower plate temperature for a single layer flexible microchannel heat sink.

Figure 64:
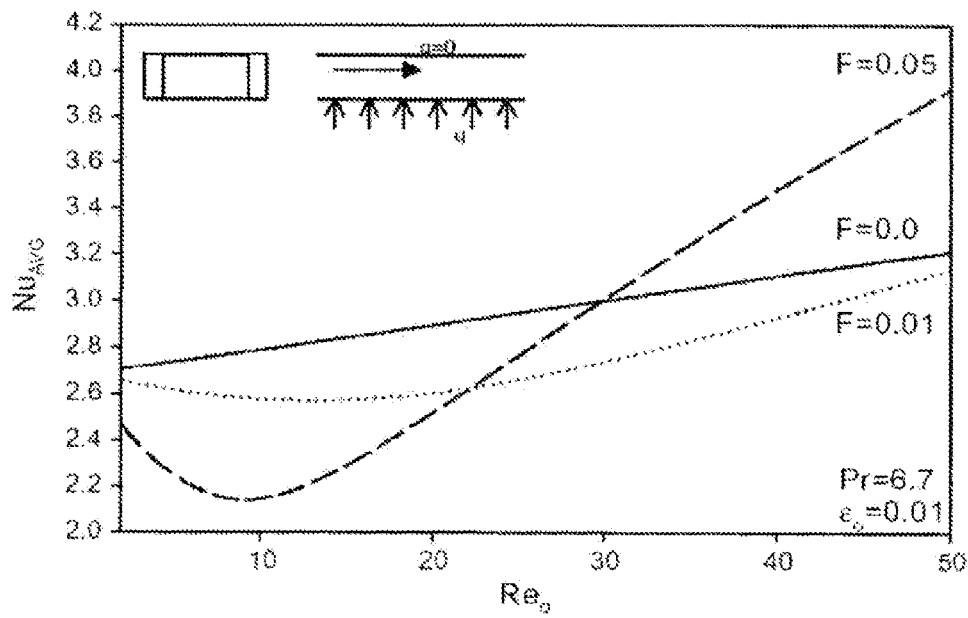

FIG. 64 Effects of the pressure drop $$\left(Re_o = \frac{\rho}{12\mu^2}\frac{\Delta p}{B}H_o^3\right)$$

on the dimensionless average convective heat transfer coefficient for a single layer flexible microchannel heat sink.

Figure 65:
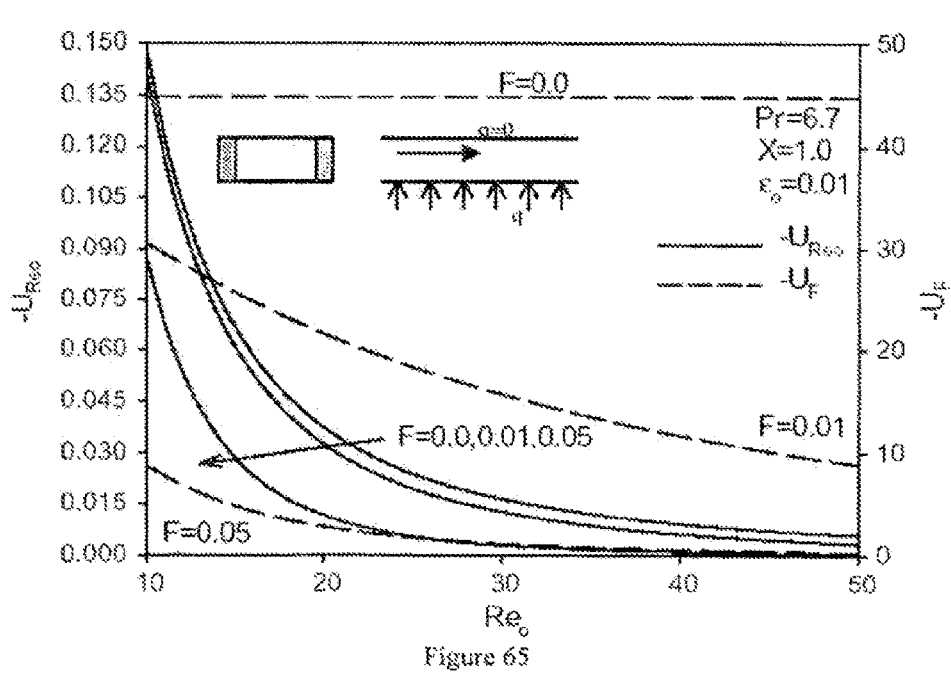

FIG. 65 Effects of the pressure drop $$\left(Re_o = \frac{\rho}{12\mu^2}\frac{\Delta p}{B}H_o^3\right)$$

on $U_{Re_o}$, and $U_F$ for a single layer flexible microchannel heat sink.

Figure 66:
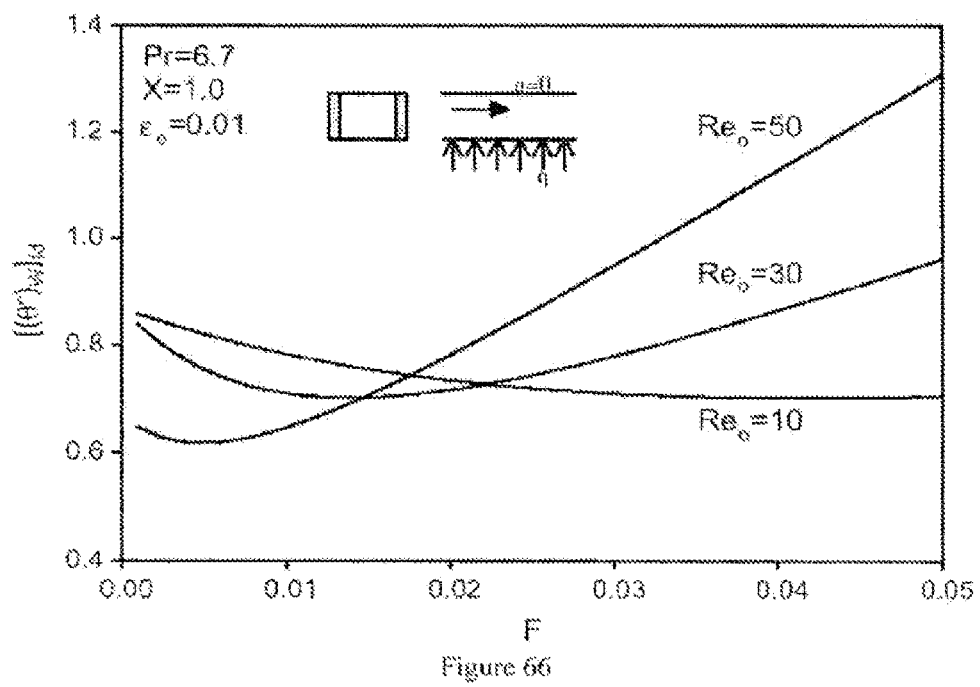

FIG. 66 Effects of the fixation parameter on the fully developed heated plate temperature at the exit for a single layer flexible microchannel heat sink.

Figure 67:
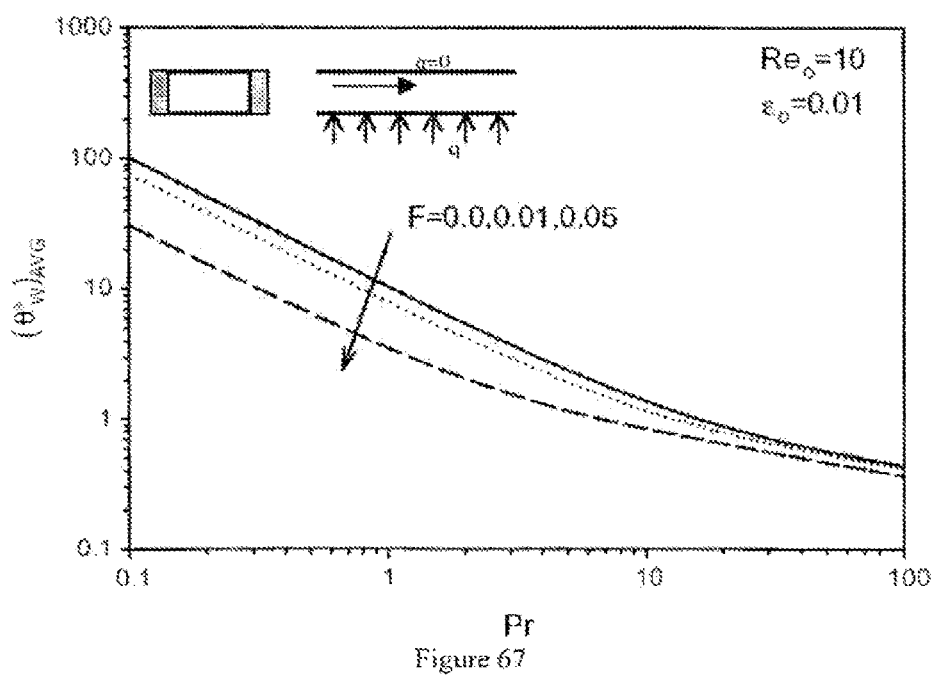

FIG. 67 Effects of Prandtl number on the dimensionless average lower plate temperature for a single layer flexible microchannel heat sink.

Figure 68:
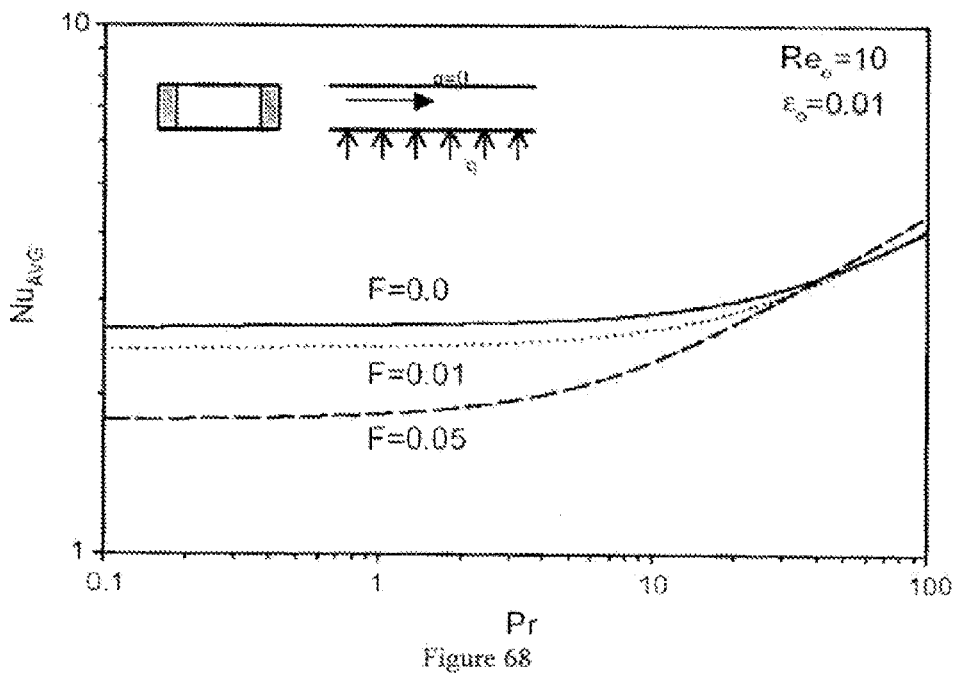

FIG. 68 Effects of Prandtl number on the average convective heat transfer coefficient for a single layer flexible microchannel heat sink.

Figure 69:
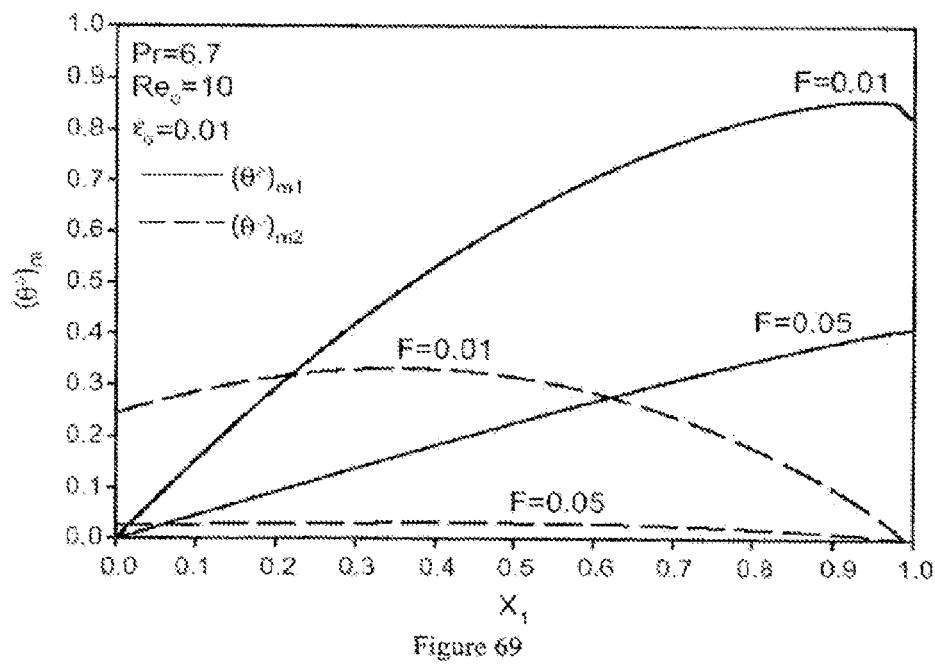
Figure 70:
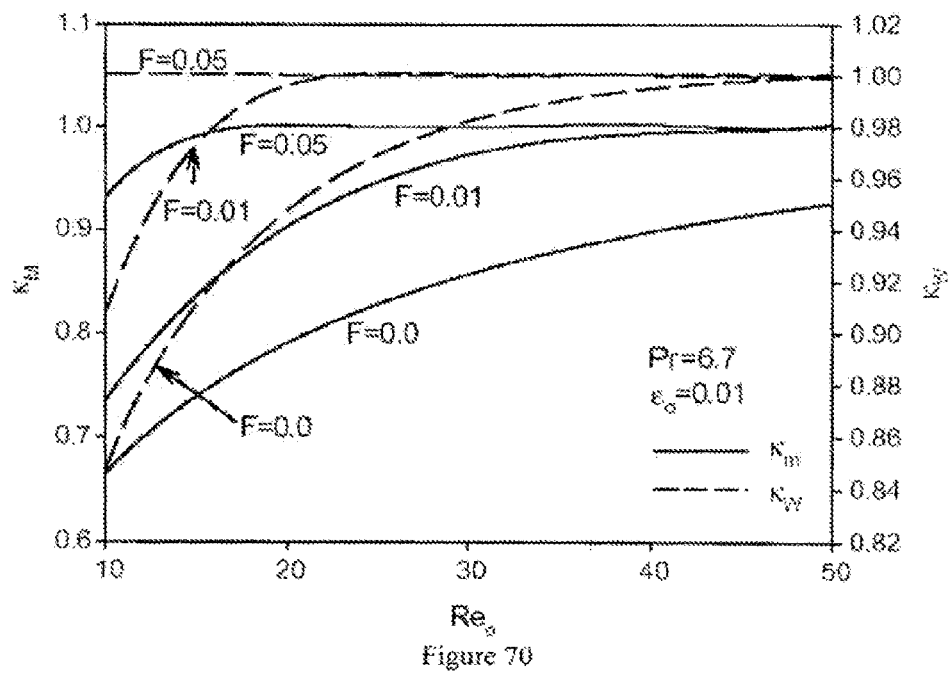

FIG. 69 Effects of the fixation parameter on the mean bulk temperature inside the double layered flexible microchannel heat sink FIG. 70 Effects of the pressure drop $$\left(\text{Re}_o = \frac{\rho}{12\mu^2} \frac{\Delta p}{B} H_o^3\right)$$

on $\kappa_m$ and $\kappa_W$.

Figure 71:
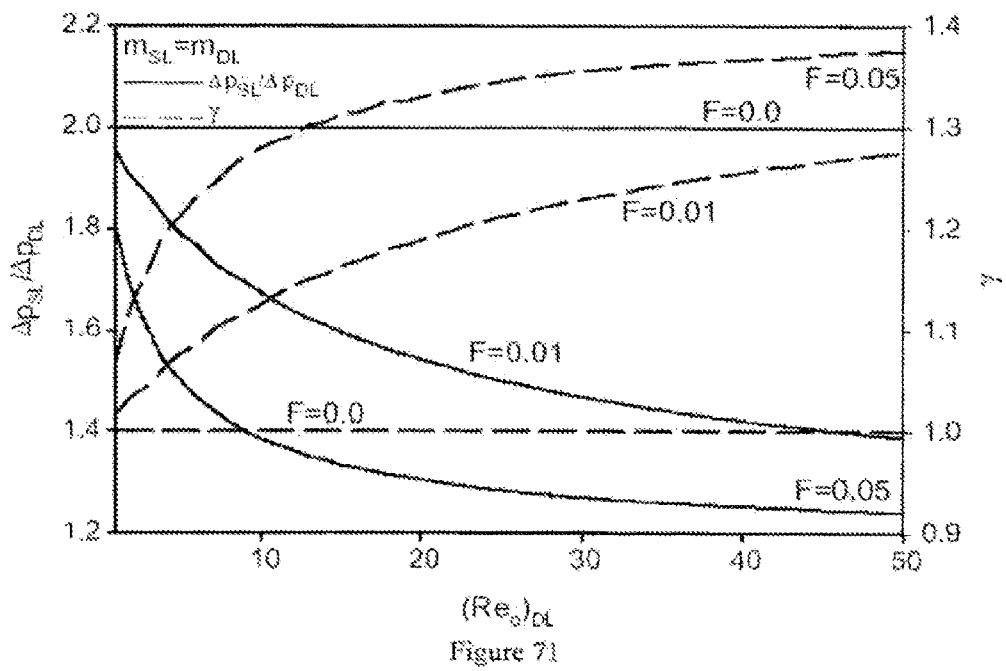

FIG. 71 Effects of the pressure drop $$\left((\text{Re}_o)_{DL} = \frac{\rho}{12\mu^2} \frac{(\Delta p)_{DL}}{B} H_o^3\right)$$

on the pressure drop ratio and the friction force ratio between single and double-layered flexible microchannel heat sinks.

Figure 72:
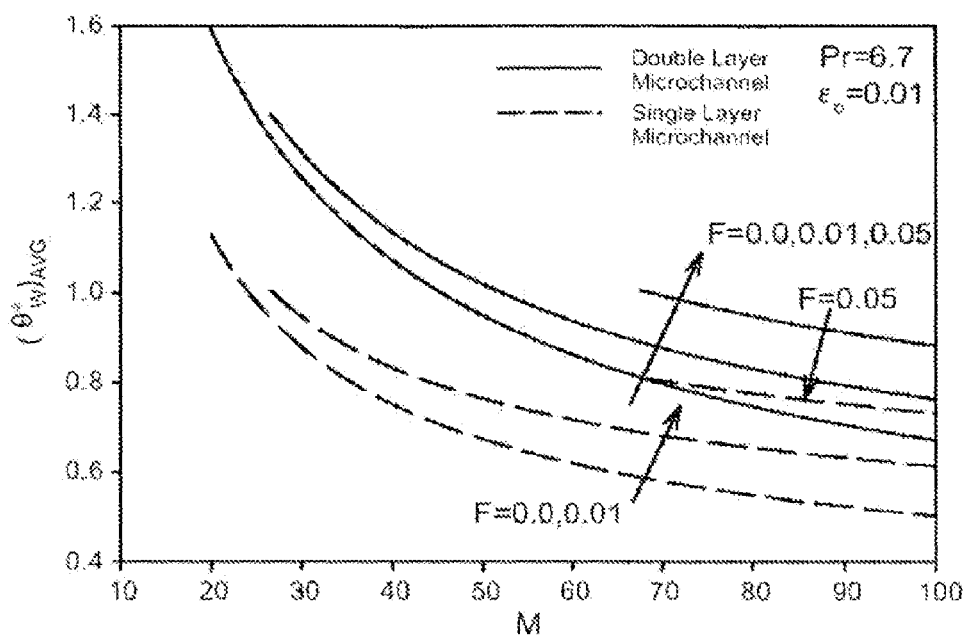

FIG. 72 Effects of the delivered coolant mass flow rate on the average heated plate temperature for both single and double layered flexible microchannel heat sinks.

Figure 73:
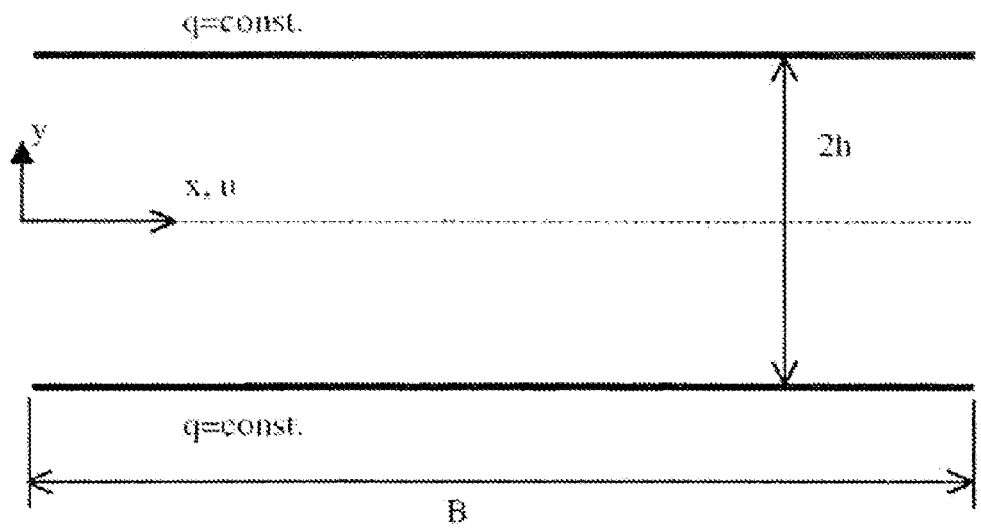

FIG. 73 is a schematic diagram and the coordinate system.

FIG. 74 shows different arrangements for the thermal dispersion region: (a) central arrangement, and (b) boundary arrangement.

Figure 75:
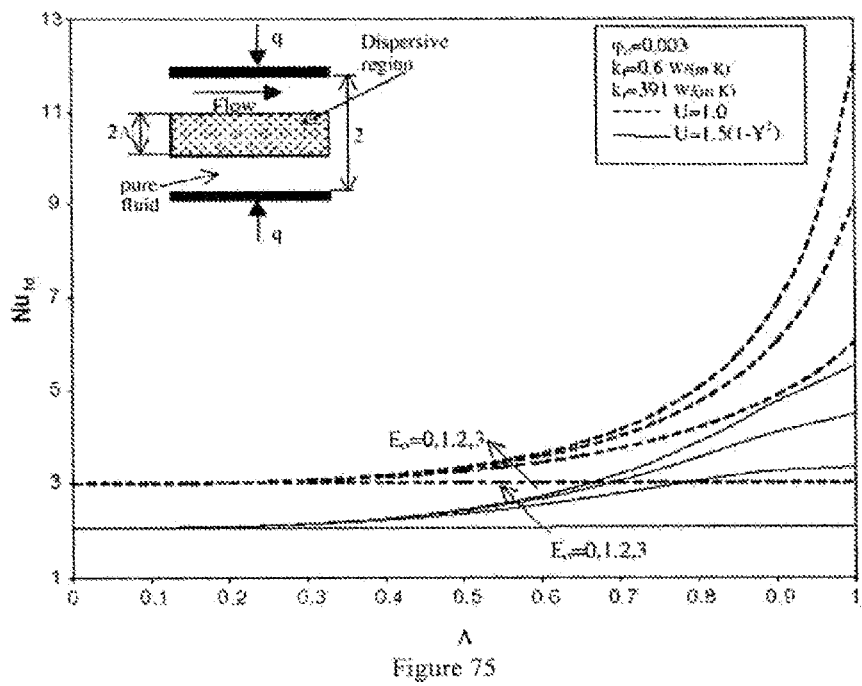

FIG. 75 shows effects of the thermal dispersion parameter $E_o$ and the dimensionless thickness $\Lambda$ on the Nusselt number at thermally fully developed conditions for the central arrangement (the number of the dispersive elements is the same for each arrangement).

Figure 76:
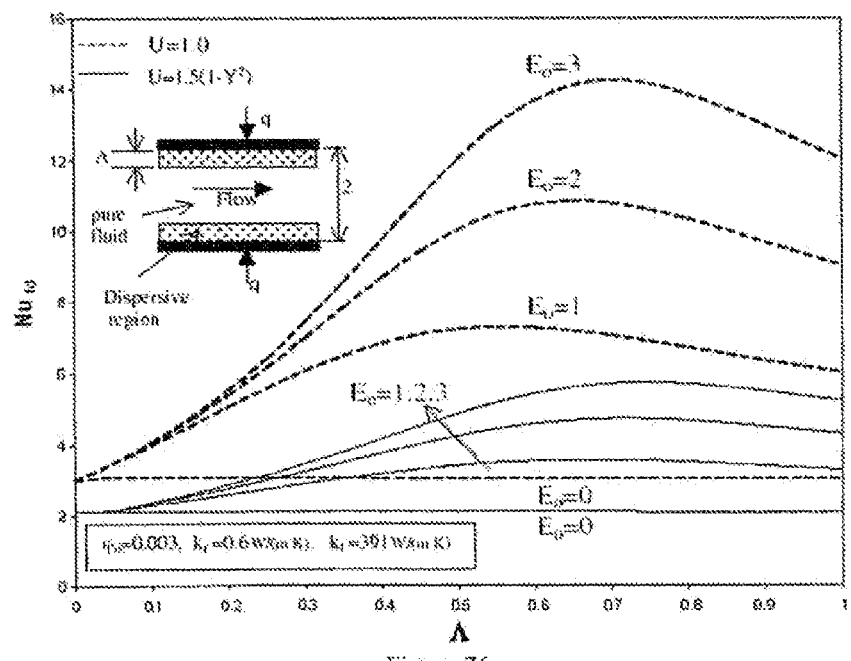

FIG. 76 shows effects of the thermal dispersion parameter $E_o$ and the dimensionless thickness $\Lambda$ on the Nusselt number at thermally fully developed conditions for the boundary arrangement (the number of the dispersive elements is the same for each arrangement).

Figure 77:
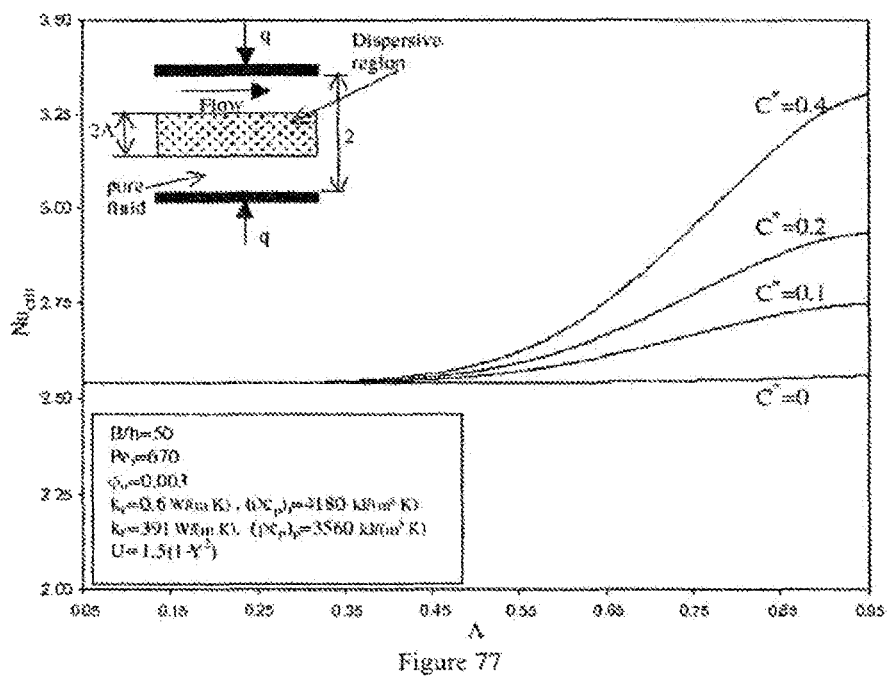

FIG. 77 shows effects of the dispersion coefficient C* and the dimensionless thickness $\Lambda$ on the Nusselt number at the exit for central arrangement (the number of the dispersive elements is the same for each arrangement).

Figure 78:
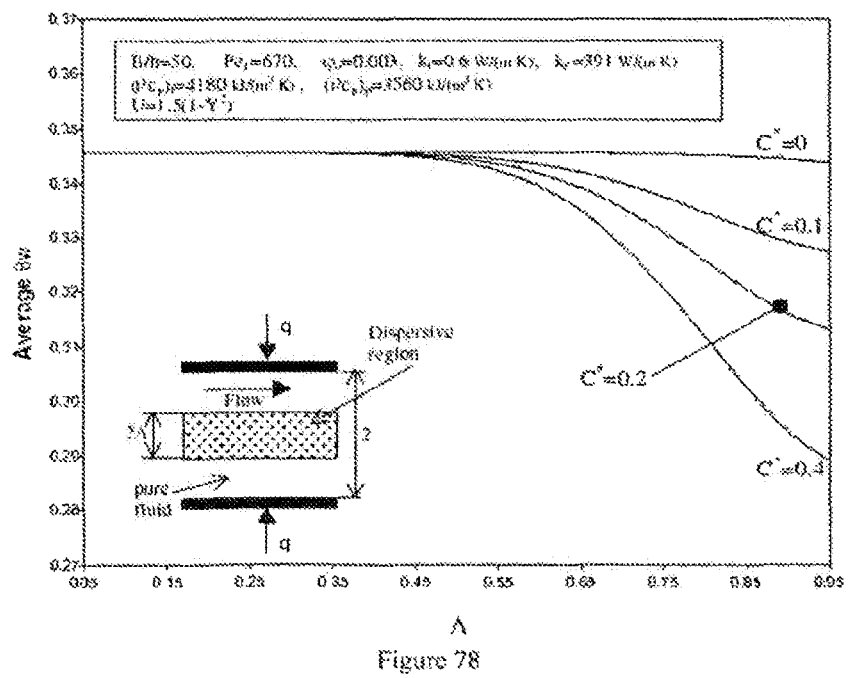

FIG. 78 shows effects of the dispersion coefficient C* and the dimensionless thickness $\Lambda$ on the average dimensionless plate temperature $\theta_W$ for central arrangement (the number of the dispersive elements is the same for each arrangement, $Pe_f=670$).

Figure 79:
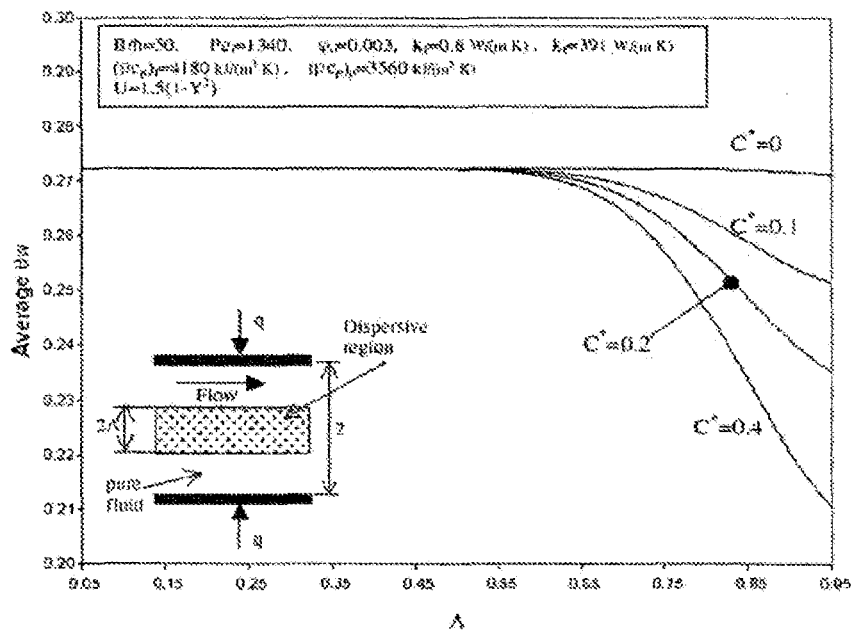

FIG. 79 shows effects of the dispersion coefficient C* and the dimensionless thickness $\Lambda$ on the average dimensionless plate temperature $\theta_W$ for central arrangement (the number of the dispersive elements is the same for each arrangement, $Pe_f=1340$).

Figure 80:
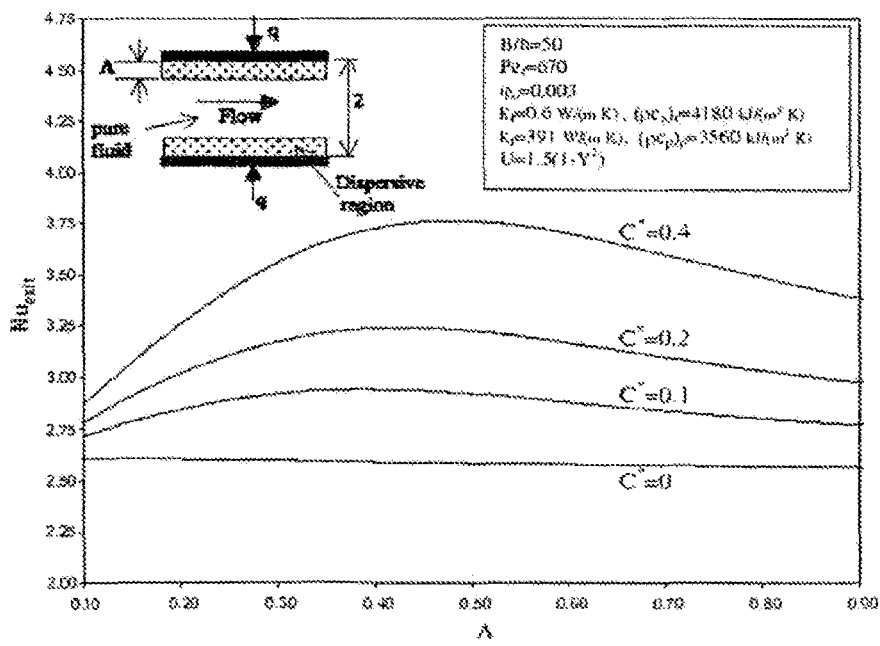

FIG. 80 shows effects of the dispersion coefficient C* and the dimensionless thickness $\Lambda$ on the Nusselt number at the exit for the boundary arrangement (the number of the dispersive elements is the same for each arrangement).

Figure 81:
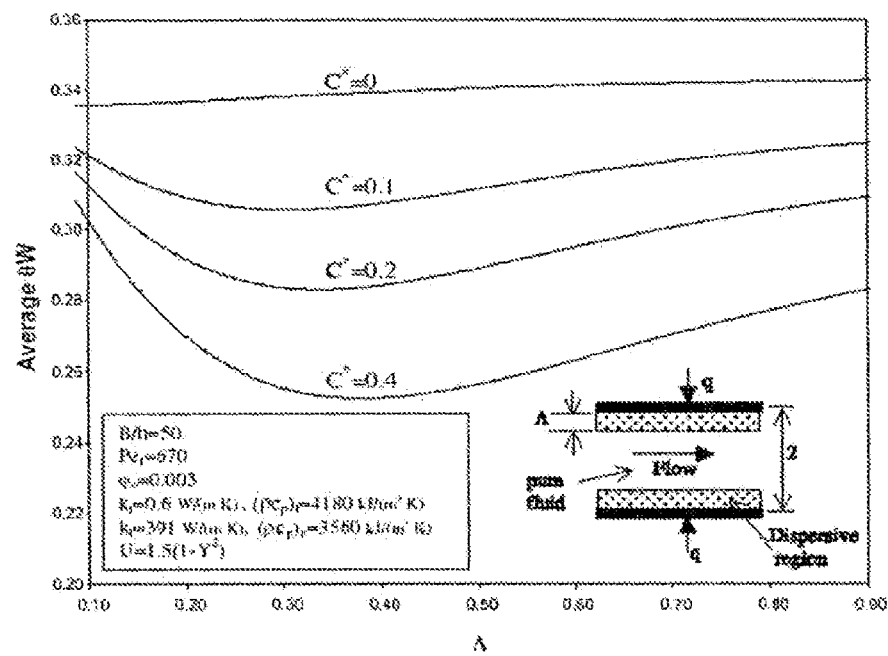

FIG. 81 shows effects of the dispersion coefficient C* and the dimensionless thickness $\Lambda$ on the average dimensionless plate temperature $\theta_W$ for boundary arrangement (the number of the dispersive elements is the same for each arrangement, $Pe_f=670$).

Figure 82:
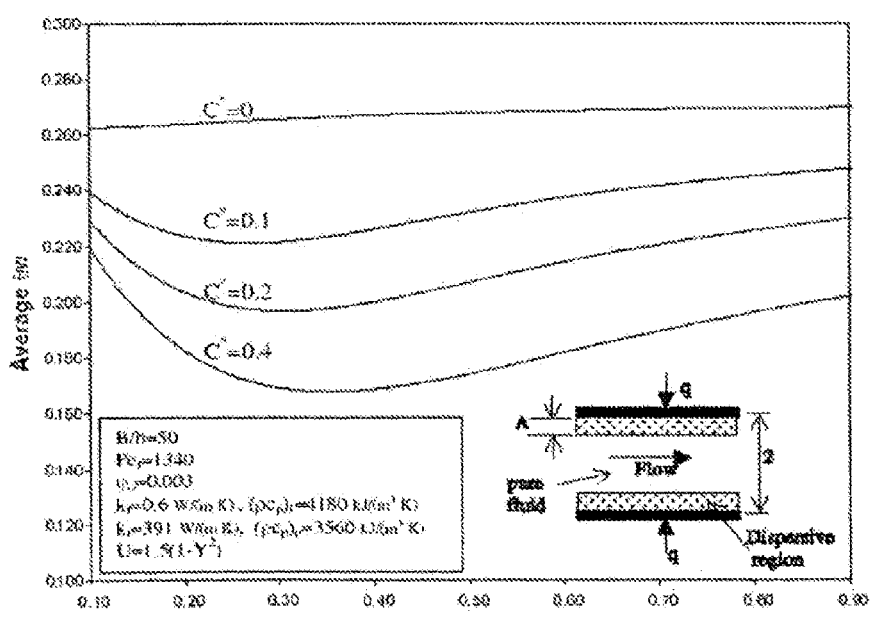

FIG. 82 shows effects of the dispersion coefficient C* and the dimensionless thickness $\Lambda$ on the average dimensionless plate temperature $\theta_W$ for boundary arrangement (the number of the dispersive elements is the same for each arrangement, $Pe_f=1340$).

Figure 83:
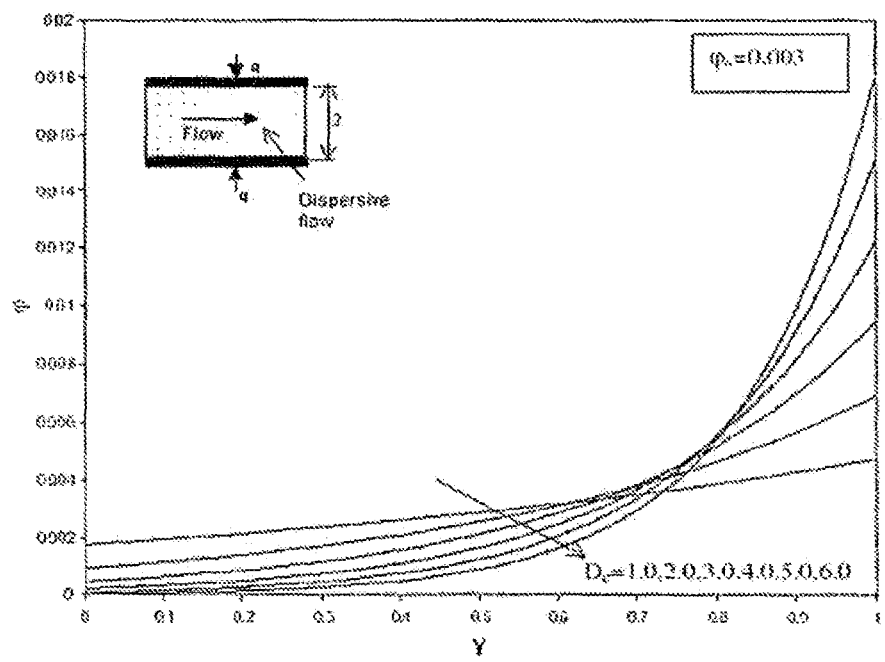

FIG. 83 shows effects of $D_e$ on the volume fraction distribution of the dispersive element (the number of the dispersive elements is the same for each distribution).

Figure 84:
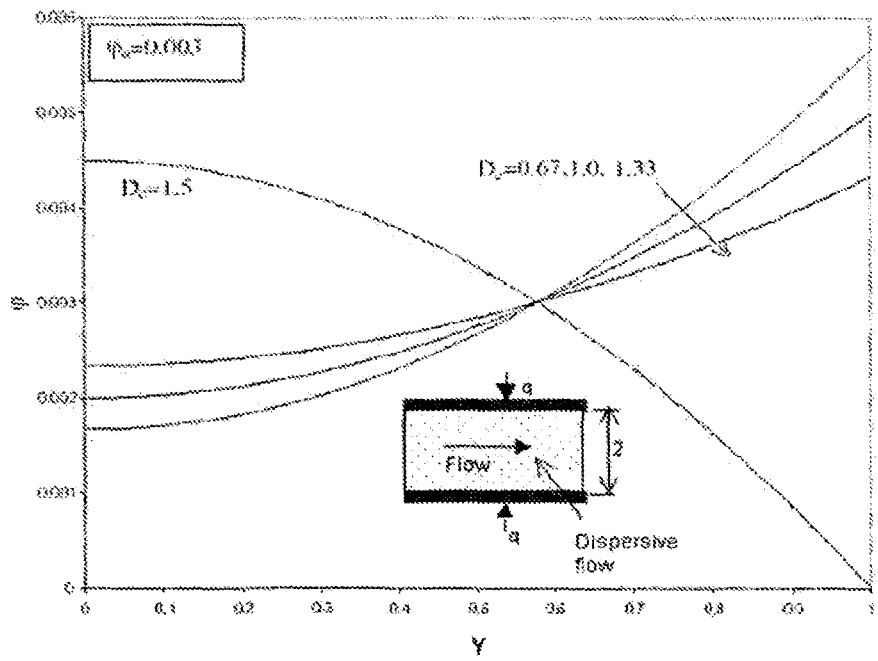

FIG. 84 shows effects of $D_c$ on the volume fraction distribution of the dispersive elements (the number of the dispersive elements is the same for each distribution).

Figure 85:
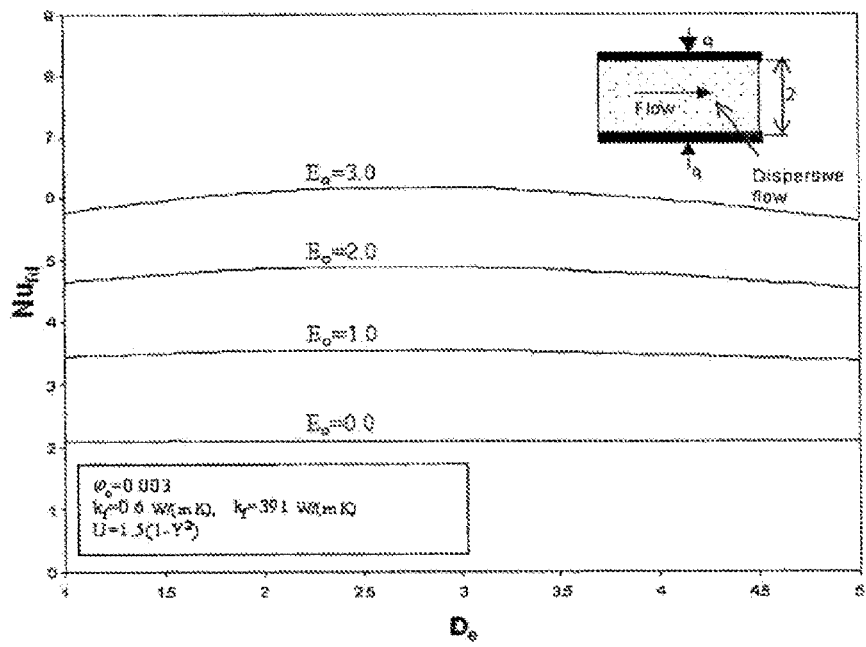

FIG. 85 shows effects of $D_e$ on the fully developed value for the Nusselt number (exponential distribution, the number of the dispersive elements is the same for each distribution).

Figure 86:
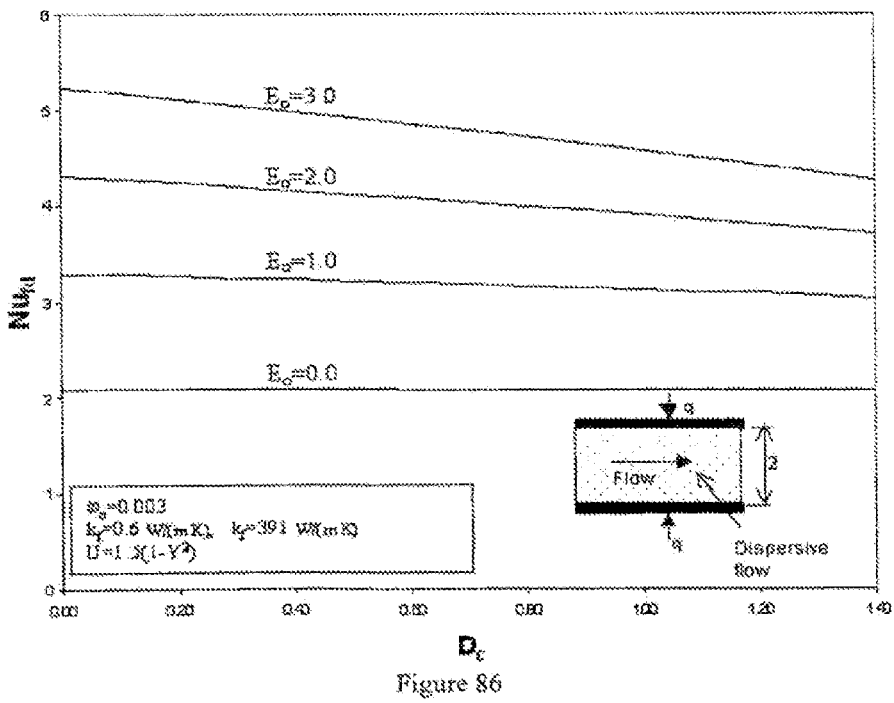

FIG. 86 shows effects of $D_c$ on the fully developed value for the Nusselt number (parabolic distribution, the number of the dispersive elements is the same for each distribution).

Figure 87:
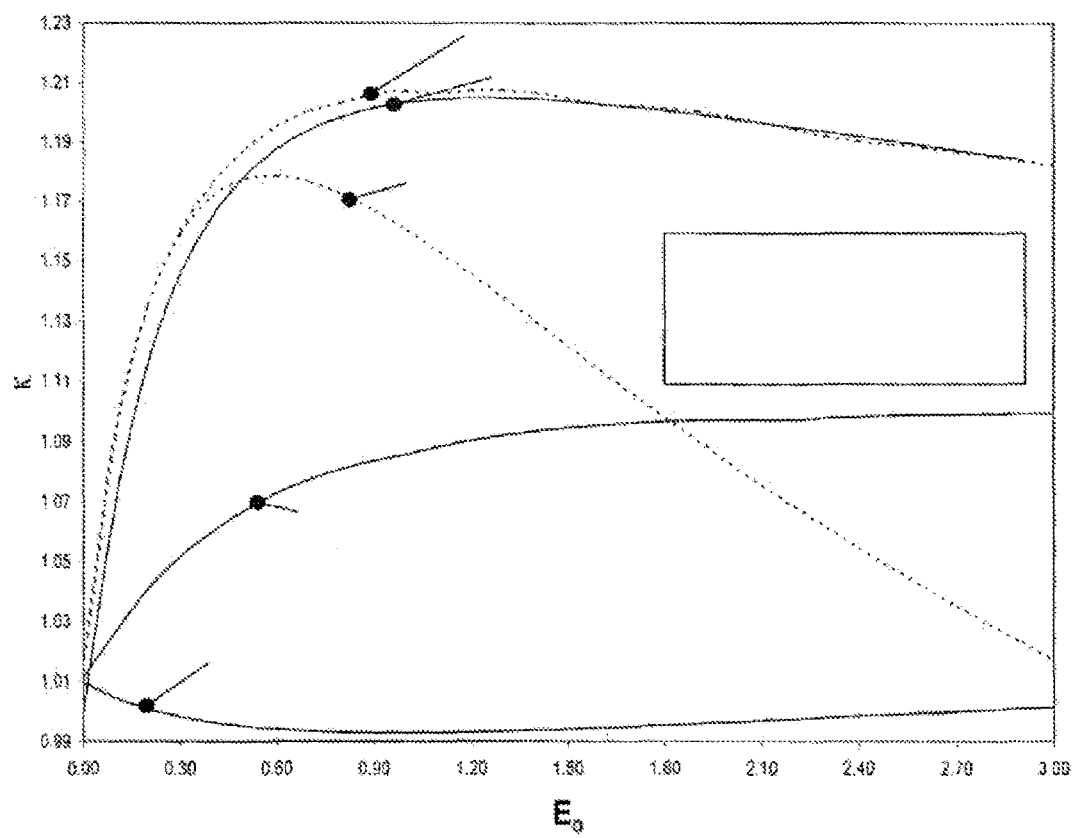

FIG. 87 is a graph that shows that the excess in Nusselt number $\kappa$ is always greater than one for the boundary arrangement while it is greater than one for the exponential distribution when the velocity is uniform.

Figure 88A:
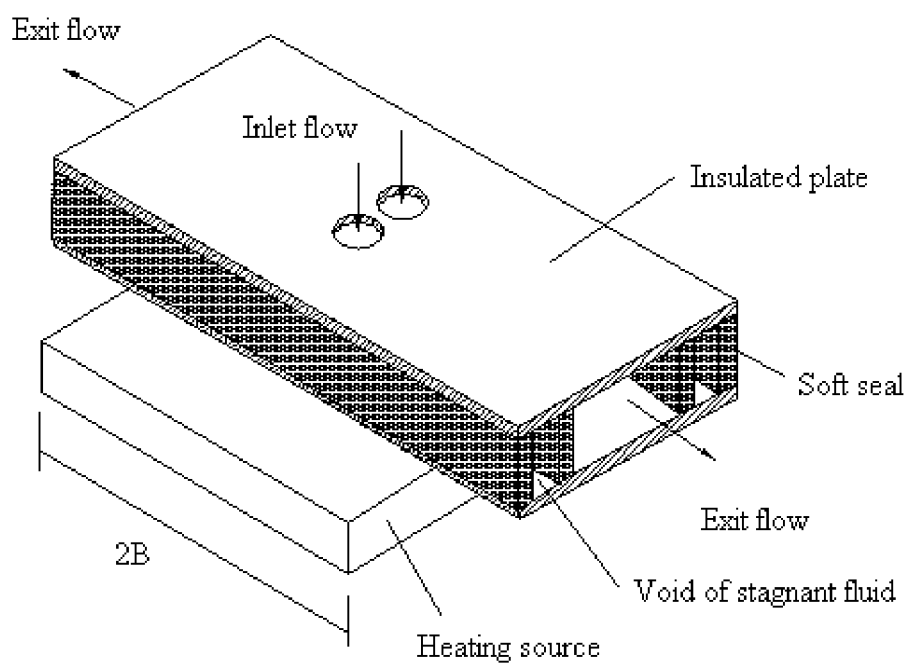

FIG. 88A shows systems with increased cooling capacity as thermal load increases utilizing a flexible complex seal according to the present invention.

FIG. 88B shows systems with increased cooling capacity as thermal load increases utilizing a bimaterial upper substrate.

Figure 89A:
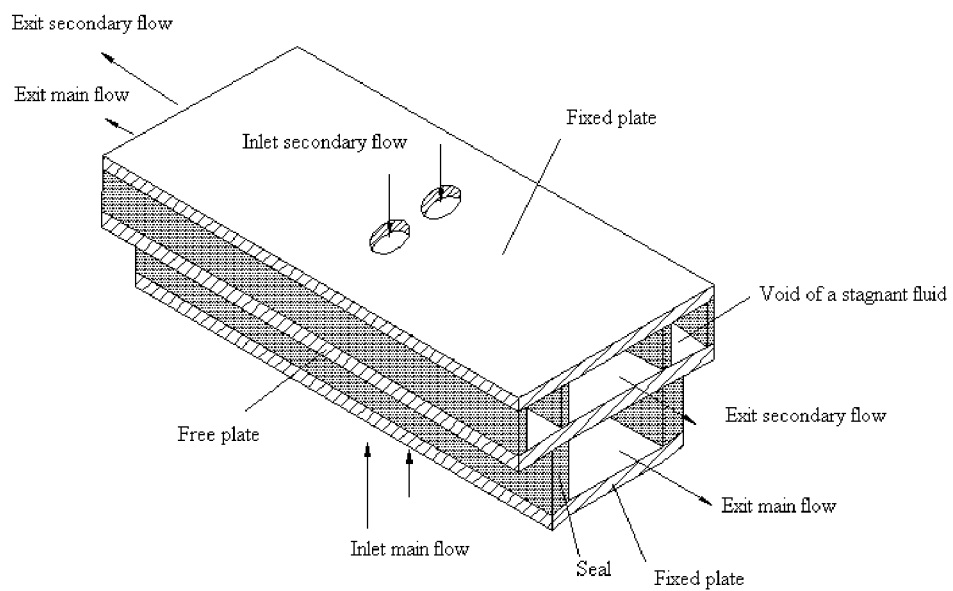

FIG. 89A shows systems with decreased cooling capacity as thermal load increases utilizing flexible complex seals according to the present invention and two layered thin films.

FIG. 89B shows systems with decreased cooling capacity as thermal load increases utilizing a bimaterial upper substrate.

DETAILED DESCRIPTION OF THE INVENTION

The present invention provides methods for modulating or controlling heat and flow characteristics in a variety of devices. In particular, the present invention provides flexible seals for modulating or controlling heat and flow characteristics in devices comprising thin films, such as thin film channels, microchannels, microfluidics and the like. The present invention also provides a method to control heat and flow inside other thermal systems, such as insulating assemblies and fuel flow passages. As used herein, a "flexible seal" refers to a material that can be deformed significantly according to the load acting upon it. Examples of these materials include elastmors, polymers, natural rubber, closed rubber cell foams, and the like. In some embodiments, the present invention provides flexible complex seals for modulating or controlling heat and flow characteristics in devices comprising thin films, such as microchannels and microfluidics. As used herein, a "flexible complex seal" refers to a flexible seal comprising at least one closed cavity of stagnant fluid. In preferred embodiments, the stagnant fluid has at least one point of contact with the heated surface of the device. In preferred embodiments, the stagnant fluid has a large value of the volumetric thermal coefficient. As used herein, a "fluid" refers to a continuous amorphous substance that tends to flow and to conform to the outline of a container, such as a liquid or a gas, and may be used in accordance with the present invention. As used herein, the term "stagnant fluid" refers generally to a fluid that is not circulating or flowing and in preferred embodiments, a flexible seal and/or the surfaces of a device can surround the stagnant fluid such that the average translational velocity of the fluid is zero.

As used herein, "primary fluid" refers to the fluid that the devices of the present invention control or modulate its flow rate or its temperature. As used herein, "secondary fluid" refers to an auxiliary fluid utilized in the present invention to achieve additional control and modulation features for the primary fluid flow rate and temperature. As provided herein, the stagnant fluid in the complex flexible seals can have characteristics that are the same as or different from the characteristics of the primary fluid, the secondary fluid, or both. As used herein, "biofluid" refers to the fluid that contains at least one species of a biological substance that needs to be measured. As provided herein, the primary fluid can be a biofluid.

The flexible seals and flexible complex seals of the present invention are typically found between a first substrate and a second substrate of a thin film or other thermal systems such as the insulating assemblies. As used herein, "substrate" includes plates, which may be inflexible or flexible according to part 6 herein below. In some preferred embodiments, the elastic modulus for the seals of the present invention, the ratio of the applied stress on the seal to the induced strain, range from about $10^3 N/m^2$ to about $10^7 N/m^2$. The seals of the present invention may comprise at least one closed cavity of a fluid such as air or the like in order to minimize their effective elastic modulus. The deformation of the flexible seals can be guided by special guiders to attain maximum or desired deformations. In preferred embodiments, the flexible seals comprise different cross-sectional geometries, such as circular cross-section, rectangular cross-section and the like. As used herein, "thin films" include fluidic devices that have the thickness of their fluidic layers of an order of about a millimeter or less such as, microchannels and microfluidic devices. Thin films comprise at least two substrates, lower and upper substrates, and at least one fluidic layer. As used herein, an "insulating assembly" means an assembly of at least two insulating substrates and at least one fluid layer placed consecutively in series.

The flexible seals and flexible complex seals of the present invention are typically found between a first substrate and a second substrate of a thin film or other thermal systems such as the insulating assemblies. As used herein, "substrate" includes plates, which may be inflexible or flexible according to part 6 herein below. In some preferred embodiments, the elastic modulus for the seals of the present invention, the ratio of the applied stress on the seal to the induced strain, range from about $10^3 N/m^2$ to about $10^7 N/m^2$. The seals of the present invention may comprise at least one closed cavity of a fluid such as air or the like in order to minimize their effective elastic modulus. The deformation of the flexible seals of the disclosed embodiments can be guided by special guiders to attain maximum or desired deformations. In preferred embodiments, the flexible seals comprise different cross-sectional geometries, such as circular cross-section, rectangular cross-section and the like. As used herein, "thin films" include fluidic devices that have the thickness of their fluidic layers of an order of about a millimeter or less such as, microchannels and microfluidic devices. Thin films comprise at least two substrates, lower and upper substrates, and at least one fluidic layer. As used herein, an "insulating assembly" means an assembly of at least two insulating substrates and at least one fluid layer placed consecutively in series.

As disclosed herein, modulating the thermal characteristics of a device may be conducted by modifying the thin film thickness, the thermal load, the flow rate, or a combination thereof. For example, additional cooling can be achieved if the thin film thickness is allowed to increase by an increase in the thermal load, pressure gradient or both which will cause the coolant flow rate to increase. As provided herein, the enhancement in the cooling due to the flexible complex seals used is substantial at larger thermal loads for stagnant liquids while this enhancement is much larger at lower temperatures for stagnant fluids, especially ideal gases. This is because the volumetric thermal expansion coefficient increases for liquids and decreases for gases as the temperature increases. Moreover, the enhancement in the cooling due to flexible seals is substantial at larger pressure gradients for single layered thin films while it is significant for double-layered thin films at lower pressure gradients.

Khaled and Vafai analyzed the enhancement in the heat transfer inside thin films supported by flexible complex seals. See Khaled & Vafai (2003) ASME J. of Heat Transfer 125: 916-925, which is herein incorporated by reference. Specifically, the applied thermal load was considered to vary periodically with time in order to investigate the behavior of expandable thin film systems in the presence of a noise in the applied thermal load. As provided herein, a noticeable enhancement in the cooling capacity can be achieved for large thermal loads especially in cooling of high flux electronic components ($q \approx 700$ kW/m$^2$) since they produce elevated working temperatures. Also, the generated squeezing effects at the mobile and inflexible substrate can be minimized when nanofluids are employed in the coolant flow. As used herein, "nanofluids" are mixtures of a working fluid, such as water, and suspended ultrafine particles in the fluid such as copper, aluminum, or the like with diameters of an order of about the nanometer range. See Eastman et al. (2001) Applied Physics Letters 78: 718-720, which is herein incorporated by reference.

The flexible seals, flexible complex seals, or both of the present invention may be used in two-layered thin films in order to regulate the flow rate of the primary fluid layer such that excessive heating in the secondary fluid layer results in a reduction in the primary fluid flow rate. For example, the flexible seals, flexible complex seals, or both of the present invention may be applied in the internal combustion industry where the fuel flow rate should be reduced as the engine gets overheated. In this example, the primary fluid flow is the fuel flow while the secondary fluid flow can be either flow of combustion products, flow of engine coolant or flow of any other auxiliary fluid. The flexible seals, flexible complex seals, or both of the present invention may be used to modulate or control exit thermal conditions in devices comprising two-layered thin films. For example, the flexible seals, flexible complex seals, or both of the present invention may be used to minimize bimaterial effects of various biosensors, including microcantilever based biosensors, which are sensitive to flow temperatures. See Fritz et al. (2000) Science 288:316-318, which is herein incorporated by reference. In this example, the primary fluid flow is flow of a biofluid while the secondary fluid flow can be either flow of the external surrounding fluid or flow of any auxiliary fluid.

As provided herein, thin films comprising flexible seals, flexible complex seals, or both are modeled and designed in order to alleviate the thermal load or modulate the flow. These systems according to the present invention provide noticeable control of the flow rate, reduce thermal gradients within the primary fluid layer at relatively large external thermal loads, and minimize fluctuation at the mobile and inflexible substrate in the presence of nanofluids.

1. Control of Insulating Properties Using Flexible Seals

As disclosed herein, the present invention provides a method for modulating or controlling the insulating properties of a device, an insulating assembly having insulating substrates separated by fluid layers and flexible seals. The fluid layers were supported by flexible seals in order to allow for volumetric thermal expansion of the primary fluid layers while the secondary fluid layers are vented to the atmosphere such that the secondary fluid pressure remains constant. The volumetric thermal expansion of the primary fluid layers within the insulating assembly were determined taking into consideration the variation in the fluid pressure due to the elastic behavior of the supporting flexible seals. The volumetric thermal expansion of the primary fluid layers was correlated to the increase in the equivalent thermal resistance of the fluid layers. The volumetric thermal expansion of the primary fluid was found to approach its isobaric condition value as the primary fluid layer thickness decreases. Also, the insulating properties were found to be enhanced when the primary fluid had a minimum thermal conductivity and when relatively high temperatures were experienced. The insulating properties deteriorate at large temperatures when the primary fluid has a relatively large thermal conductivity.

The following Table 1 provides the various symbols and meanings used in this section:

TABLE 1

| | |
|---|---|
| $A_S$ | surface area of the intermediate insulating substrate |
| $C_F$ | volumetric thermal expansion efficiency |
| $h_c$ | convective heat transfer coefficent at the upper surface |
| $h_o$ | reference thickness of the primary fluid layer |
| $K^*$ | stiffness of the supporting seal |
| $k_{ins}$ | thermal conductivity of insulating substrates |
| $k_1$ | thermal conductivity of the primary fluid |
| $k_2$ | thermal conductivity of the secondary fluid |
| $m_1$ | mass of the primary fluid |
| $p_{atm}$ | pressure of the surrounding |
| q | heat flux |
| $R_1$ | primary fluid layer fluid constant |
| $R_{th}$ | thermal resistance of the fluid layers |
| $R_{tho}$ | orginal thermal resistance of the fluid layers |
| T | average temperature of the primary fluid layer |
| $T_1$ | temperature at the lower surface of the primary fluid layer |
| $T_o$ | orginal primary fluid temperature |
| $T_e$ | temperature of the upper surface facing of the surroundings |
| $\Delta h_1$ | expansion of the primary fluid layer |
| $\eta_R$ | dimensionless increase in the resistance of the fluid layers |

Figure 1:
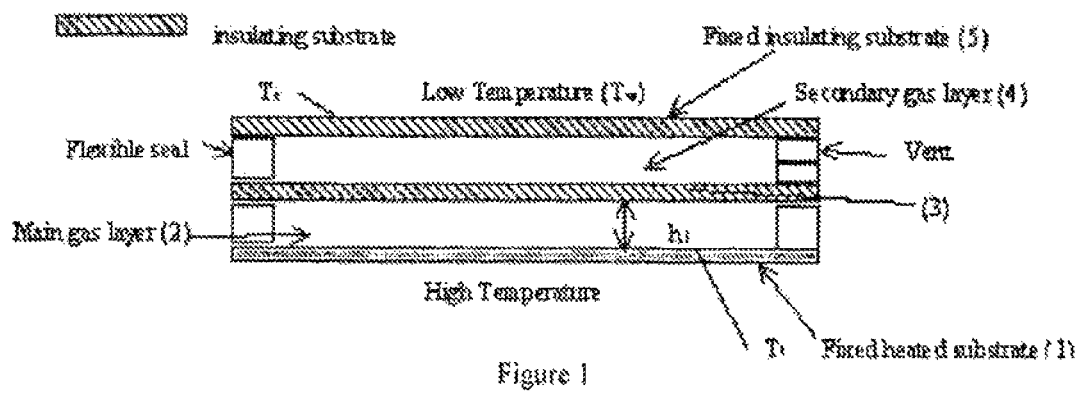
FIG. 1 shows an insulating assembly comprising the flexible seals of the present invention.

Generally, thermal losses increase at large working temperatures. The present invention provides a device that has desirable insulative attributes even at high working temperatures. That is, the present invention better conserves thermal energy especially at high temperatures as compared to similar devices that do not comprise flexible seals. An example of a device of the present invention is shown in FIG. 1. The device shown in FIG. 1 comprises the following from bottom to top: (1) a heated substrate (generally due to contact with or proximity to a heat source), (2) a first layer of fluid that has a very low thermal conductivity such as xenon (the primary fluid layer), (3) a thin layer of an insulating substrate, (4) a secondary fluid layer comprising a second fluid that has a lower thermal conductivity like air (needs to be larger than that of the first layer and is open to the outside environment), and (5) a top insulating substrate. The first and the second fluid layers along with the intermediate insulating substrate are connected together by flexible seals. Both the heated substrate and the upper insulating substrate are fixed (immobile and inflexible substrates) while the intermediate insulating substrate is capable of moving as it is supported by flexible complex seals (mobile and inflexible substrate). In preferred embodiments, the flexible seals are made of a material resistant to melting at high temperatures. In order to avoid melting the seals at high temperatures, ordinary homogenous flexible seals may be replaced with flexible complex seals, a flexible seal comprising at least one closed cavity containing a fluid, such as a gas.

1A. Operational Principle

When the operating temperature (high temperature source) increases, the average fluid temperature of the primary fluid layer increases. Accordingly, the volume of the primary fluid layer expands accompanied by a shrinkage in the secondary fluid layer. As such, an increase in the equivalent thermal resistance of the insulating assembly can be attained as long as the thermal conductivity of the primary fluid layer is smaller than that for the secondary fluid layer. Preferably, the heated substrate has a relatively small thickness and a relatively large thermal conductivity so that the thermal expansion of the primary fluid layer is maximized.

1B. Volumetric Expansion in the Primary Fluid Layer

Forces on elastic materials, such as seals, are usually proportional to the elongation of this material. See R. L. Norton (1998) MACHINE DESIGN: AN INTEGRATED APPROACH Prentice-Hall, N.J., which is herein incorporated by reference. Accordingly, a force balance on the intermediate insulating substrate results as provided in Equation 1 as follows:

$$\frac{m_1 R_1 T}{A_S(h_o + \Delta h_1)} - p_{atm} = \frac{K^*}{A_S}\Delta h_1 \qquad \text{Eq. 1}$$

wherein
T is the average temperature of the primary fluid layer;
$K^*$ is the stiffness of the supporting seals;
$A_s$ is the surface area of the intermediate insulating substrate;
$h_o$ is the reference thickness of the primary fluid layer;
$\Delta h_1$ is the corresponding expansion in the primary fluid layer thickness;
$m_1$ is the mass of the primary fluid; and
$R_1$ is the primary fluid constant The first term on the left hand side of Equation 1 represents the pressure inside the primary fluid layer. The reference thickness $h_o$ corresponds to the thickness of the primary fluid layer when the primary fluid pressure is equal to the atmospheric pressure. Equation 1 can be solved for $\Delta h_1$ and the expansion is found to be:

$$\frac{\Delta h_1}{h_o} = C_1\left(\sqrt{\frac{C_2}{C_1^2} + 1} - 1\right) \qquad \text{Eq. 2}$$

wherein $$C_1 = \frac{(p_{atm}A_S)/(K^*h_o) + 1}{2} \qquad \text{Eq. 3}$$

and $$C_2 = (m_1 R_1 T)/(K^* h_o^2) - (p_{atm}A_S)/(K^* h_o) \qquad \text{Eq. 4}$$

In order to maximize the expansion in the primary fluid layer which in turn results in better insulating properties, i.e. increased effective thermal resistance of the insulating assembly, the parameter $C_2$ needs to be maximized. This can be accomplished by considering minimum values of $K^*h_o$ while the following relationship provided in Equation 5 is preferred to be satisfied:

$$\frac{m_1 R_1 T}{p_{atm} A_S h_o} \gg 1 \qquad \text{Eq. 5}$$

Figure 2:
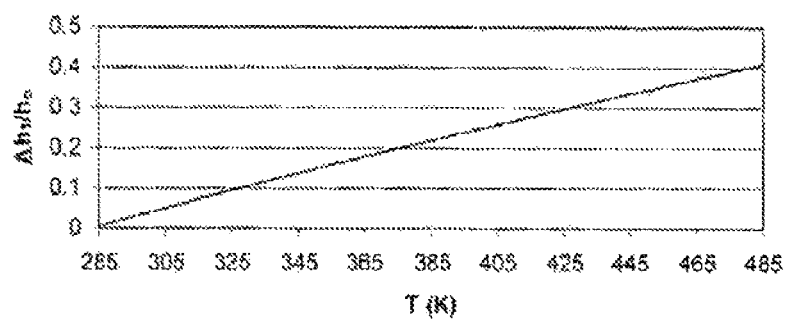
FIG. 2 shows primary fluid layer expansion versus its temperature.

The following parameters were considered for studying the flexible seals of the present invention: $K^*=48000$ N/m, $A_S=0.0036$ m$^2$ and $p_{atm}=0.1$ Mpa. The parameter $m_1 R_1$ was evaluated at the reference condition when the primary fluid pressure was equal to the atmospheric pressure. This condition which causes the expansion to be zero in Equation 1 was assumed to be at $T=T_o=283$ K and $h_o=0.004$ m. This leads to $m_1 R_1 = 5.088 \times 10^{-3}$ J/K. Accordingly, the relation between the volumetric thermal expansion of the primary fluid layer and its average temperature is illustrated in FIG. 2.

Equation 2 reduces to the following linearized model for relatively low volumetric thermal expansion levels $$\left(\frac{\Delta h_1}{h_o} < 0.2\right):$$

$$\frac{\Delta h_1}{h_o} \approx 0.5 \frac{C_2}{C_1} + O(\Delta h_1^2) = \frac{T - T_o}{T_o + \frac{K^* h_o^2}{m_1 R_1}} + O(\Delta h_1^2) \qquad \text{Eq. 6}$$

wherein $T_o$ is the average temperature of the primary fluid layer at the reference condition. The reference condition corresponds to the condition that produces a zero net force on the seals. That is, thermal expansion is zero when the primary fluid layer is kept at $T_o$. At this condition, the primary fluid layer thickness is $h_o$. The relative volumetric thermal expansion, $\Delta h_1 / h_o$, approximated by Equation 6 is similar to that for isobaric expansion with the average primary fluid temperature being increased by the parameter $$\frac{K^* h_o^2}{m_1 R_1}.$$

This parameter is denoted as $\Delta T_o$.

The error associated with Equation 6 is further reduced if $$\frac{m_1 R_1 T_o}{K^* h_o^2} > 1.$$

Figure 3:
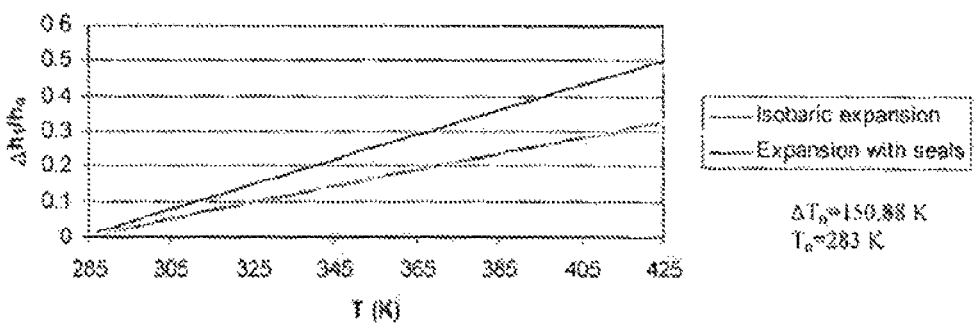
FIG. 3 shows the percentage volumetric thermal expansion for the conditions of isobaric expansion and expansion using a linearized model under linearly varying pressure.

The latter inequality means that the insulating system exhibits relatively large volumetric thermal expansion by having a small increase in the primary fluid pressure due to the elastic behavior of the flexible seal. FIG. 3 illustrates the difference between the relative volumetric expansion expressed by Equation 6 and that obtained when the expansion is at a constant pressure. FIG. 3 shows that isobaric conditions provide favorable volumetric thermal expansion when compared to volumetric thermal expansion under linearly varying pressure as when flexible seals are present.

The efficiency of the volumetric thermal expansion $C_F$ of the primary fluid layer is defined as the ratio of the expansion in the primary fluid layer when the flexible seal is present to the expansion when under constant pressure as expressed in the following Equation 7:

$$C_F = \frac{\Delta h_1}{(\Delta h_1)_{Isobaric}} \qquad \text{Eq. 7}$$

wherein $(\Delta h_1)_{Isobaric}/h_o = (T-T_o)/T_o$. For the linearized model shown in Equation 6, the efficiency $C_F$ will be:

$$C_F \cong \frac{T_o}{T_o + \Delta T_o} \qquad \text{Eq. 8}$$

According to Equation 8, the values of $C_F$ which approaches unity as $\Delta T_o$ decreases are provided for various $\Delta T_o$ in Table 2 as follows:

TABLE 2

| Volumetric thermal expansion efficiency $C_F$ of the primary fluid layer versus $\Delta T_o$ | |
|---|---|
| $\Delta T_o$ (K) | $C_F$ ($T_o = 283$ K) |
| 10 | 0.966 |
| 50 | 0.850 |
| 100 | 0.739 |
| 150.88 | 0.652 |

1C. Equivalent Thermal Resistance of Fluid Layers

The equivalent thermal resistance of the fluid layers during volumetric thermal expansion is given by the following Equation 9:

$$R_{th} = \frac{h_o}{k_1} + \frac{h_o}{k_2} + \Delta h_1 \left(\frac{1}{k_1} - \frac{1}{k_2}\right) \qquad \text{Eq. 9}$$

wherein $k_1$ is the thermal conductivity of the primary fluid; and $k_2$ is the thermal conductivity of the secondary fluid.

Both fluid layers are assumed to have a similar thickness prior to thermal expansion equal to $h_o$. Based on Equation 1 and Equation 3, the increase in the equivalent thermal resistance $\Delta R_{th}$, the third part on the right of Equation 9, was correlated to the relative expansion in the primary fluid layer according to the following Equation 10:

$$\eta_R \equiv \frac{\Delta R_{th}}{R_{tho}} = \frac{\Delta h_1}{h_o} \frac{(k_2 - k_1)}{(k_1 + k_2)} \qquad \text{Eq. 10}$$

wherein $R_{tho}$ is the equivalent thermal resistance of both layers prior to thermal expansion.

The parameter $R_{tho}$ is the sum of the first two terms on the right of Equation 9. When the parameter $\eta_R$ is positive, the thermal resistance of the insulating assembly increases while it decreases as it becomes negative. Therefore, $R_{tho}$ represents the dimensionless increase in the thermal resistance. Various properties of different gases are provided in the following Table 3:

TABLE 3

Various Properties of Proposed Different Gases at T = 373 K and p = 1 atm

| Primary fluid | k (W/mK) | ρ(kg/m³) | R(J/kg K) | $(k_{air} - k)/(k_{air} + k)$ |
|---|---|---|---|---|
| Xenon | 0.0068 | 4.3 | 64.05 | 0.609 |
| Krypton | 0.011 | 2.75 | 99.78 | 0.4359 |
| Helium | 0.181 | 0.13 | 2077 | −0.732 |
| Neon | 0.0556 | 0.66 | 412.1 | −0.33 |
| Argon | 0.0212 | 1.3 | 209 | 0.138 |
| Air | 0.028 | 1.2 | 287 | 0 |

According to Table 3, xenon can be used to enhance the insulating properties while helium is preferable to deteriorate the insulating properties especially at large operating temperatures as can be noticed from the last column in Table 3.

Figure 4:
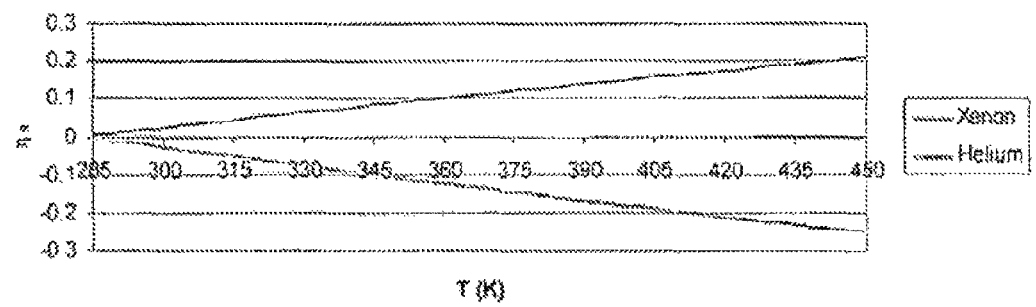
FIG. 4 shows dimesionless change in the equivalent resistance of the fluid layers for two different fluids.

FIG. 4 shows the dimensionless increase in the fluid layers equivalent thermal resistance when the primary fluid layer is charged with xenon or helium while the secondary fluid layer is open to the atmosphere. Charging the primary fluid layer with xenon can provide about a 20 percent increase in the effective thermal resistance of the fluid layers with an increase of the primary fluid layer temperature by about 165 K. However, helium can produce a deterioration in the insulating properties by about 25 percent with about a 165 K increase in the primary fluid layer temperature.

1D. Heat Transfer Analysis

In the following analysis, the temperature at the lower side of the primary fluid layer was assumed to be kept under $T_1$. See FIG. 1. The insulating substrates were assumed to have equal thicknesses and thermal conductivities which were equal to the reference thickness for the primary fluid layer $h_o$ and $k_{ins}$, respectively. Accordingly, the thermal energy balance on the insulating assembly shown in FIG. 1 reveals the following relation for the temperature at the surface of the lower temperature side $T_e$ and the heat transfer q, respectively:

$$T_e = \frac{(T_1 - T_\infty)/h_c}{\left(\frac{1}{h_c} + \frac{2h_o}{k_{ins}} + R_{tho}\left(1 + \frac{\Delta R_{th}}{R_{tho}}\right)\right)} + T_\infty \qquad \text{Eq. 11}$$

$$q = \frac{(T_1 - T_\infty)}{\left(\frac{1}{h_c} + \frac{2h_o}{k_{ins}} + R_{tho}\left(1 + \frac{\Delta R_{th}}{R_{tho}}\right)\right)} \qquad \text{Eq. 12}$$

wherein $h_c$ is the convective heat transfer coefficient at the lower temperature side; and $T_\infty$ is the temperature of environment facing the lower temperature side.

Figure 5:
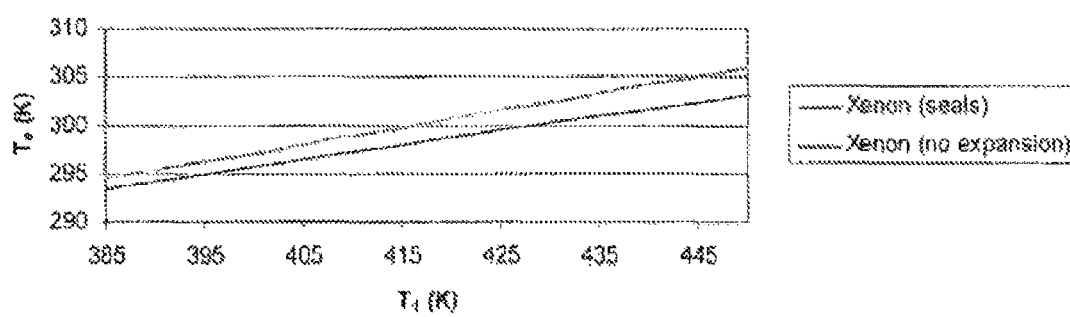
FIG. 5 shows enhanced insulating properties using xenon and an insulating assembly using the flexible seals according to the present invention.
Figure 6:
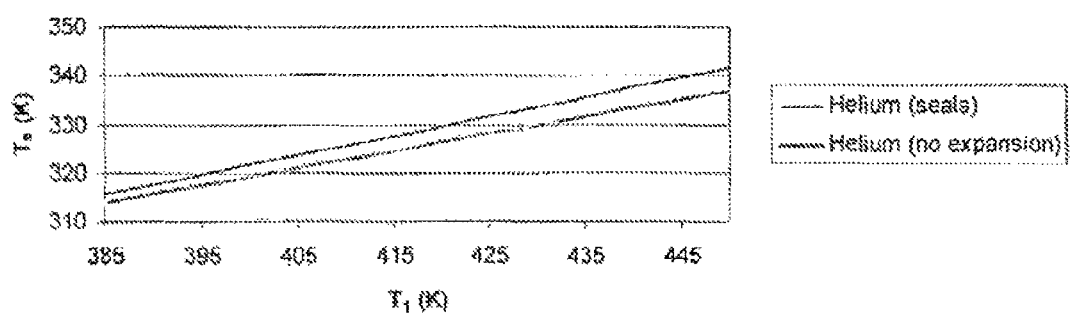
FIG. 6 shows deteriorated insulating properties using helium and an insulating assembly using the flexible seals according to the present invention.

The surface area of the insulating assembly that faces the seal is relatively small. Therefore, the heat transfer through the seal portion is neglected in Equation 11 and Equation 12. For the previous example along with $h_c$=5 W/m²K, $T_\infty$=275 K and $k_{ins}$=0.04 W/mK, the temperature $T_e$ as a function of $T_1$ is illustrated in FIG. 5 and FIG. 6, respectively. These figures also compare the temperature $T_e$ for the case when the thermal expansion is encountered due to the presence of flexible seals with the case where thermal expansion is not present (both fluid layer thicknesses are equal to $h_o$ for all values of $T_1$). FIG. 5 shows that insulating properties are enhanced when xenon and flexible seals are used and that $T_e$ for this case is departing away down from the values corresponding to the case where the thermal expansion is not present. Also, this figure shows that the departure rates compared to the case where the thermal expansion is not present, increase as the temperature levels increase.

FIG. 6 shows that insulating properties are deteriorated when helium and flexible seals are used. As shown in FIG. 6 the departure of $T_e$ for this case from the results corresponding to the case with no thermal expansion is in the direction of an increase in $T_e$. Thus, insulating properties are deteriorated at larger rates when helium and flexible seals are used especially at large operating temperatures. The thermal expansion of the primary fluid layer was computed at its average temperature. As such, an iterative procedure was implemented in generating FIG. 5 and FIG. 6 so that the obtained temperatures produce the employed thermal expansion of the primary fluid layer. Also, the volumetric thermal expansion that were used to develop FIG. 5 and FIG. 6 were evaluated from Equation 2.

Figure 7:
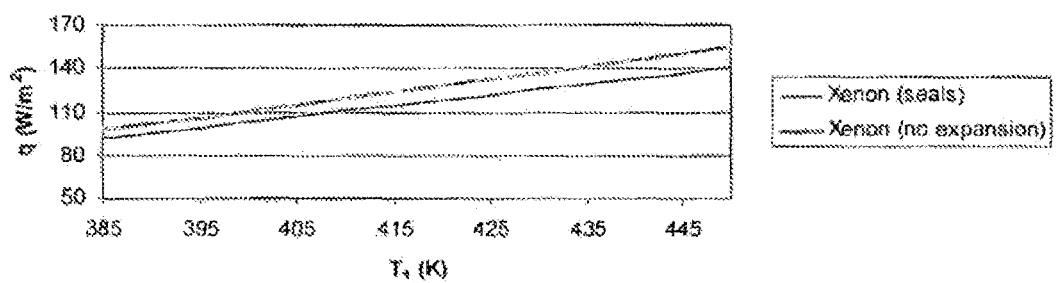
FIG. 7 shows reduction of thermal losses at large operating temperatures using xenon and an insulating assembly using the flexible seals according to the present invention.
Figure 8:
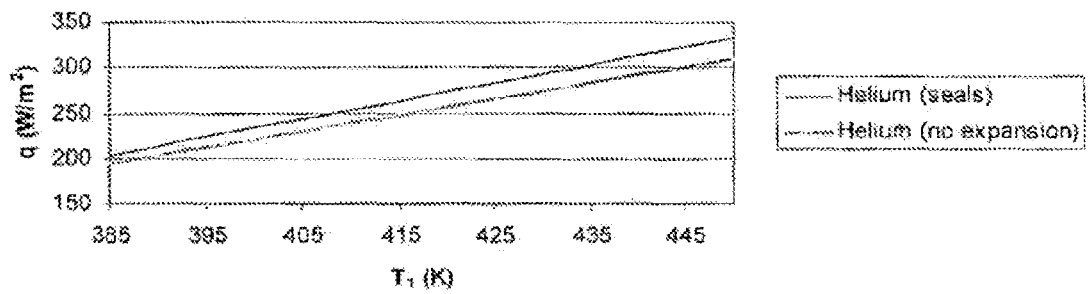
FIG. 8 shows deterioration of thermal losses at large operating temperatures using helium and an insulating assembly using the flexible seals according to the present invention.

FIG. 7 shows a comparison of heat flux of the insulating assembly with xenon as the primary fluid under the following two conditions: (1) in the presence of flexible seals, and (2) when thermal expansion is not present and the thickness of the fluid layers is $h_o$ at all working temperatures. FIG. 7 shows a reduction in the heat flux when flexible seals are introduced. FIG. 7 also shows that the reduction rate in the heat flux increases as the working temperatures increase indicating better insulating characteristics are achieved when flexible seals are used to support the primary fluid layer while the secondary fluid layer is vented. On the other hand, an increase in the heat flux is attained when flexible seals are used to support a fluid layer comprising a fluid with relatively large thermal conductivity, such as helium, as shown in FIG. 8.

1E. Simplified Correlation

For the insulating assembly shown in FIG. 1, heat transfer can be expressed by the following Equation 13a:

$$q = \frac{(T_1 - T_e)}{\left[\sum_{i=1}^{2}\frac{(h_{ins})_i}{(k_{ins})_i} + \left(\frac{h_{o1}}{k_1} + \frac{h_{o2}}{k_2}\right)\right]\left(1 + \frac{(k_2 - k_1)}{(k_2 + h_{o2}k_1/h_{o1})}\left(\frac{\Delta h_1}{h_{o1}}\right)\right)} \qquad \text{Eq. 13a}$$

wherein $\Delta h1/ho1$ can be shown to be equal to the following Equation 13b:

$$\frac{\Delta h_1}{h_{o1}} = \left(\frac{T_o + \Delta T_o}{2\Delta T_o}\right)\left[\sqrt{\frac{4(T_1^* - T_o)\Delta T_o}{(T_o + \Delta T_o)^2} + 1} - 1\right] \qquad \text{Eq. 13b}$$

wherein $h_{o1}$ is the reference primary fluid layer thickness;

$h_{o2}$ is the reference secondary fluid layer thickness;

$(h_{ins})_i$ is the thickness of the ith insulating substrate;

$(k_{ins})_i$ is the thermal conductivity of the ith insulating substrate;

$T_o$ is the primary fluid layer temperature that causes the primary fluid pressure to be equal to the atmospheric pressure; and $T_1^*$ represents the average primary fluid layer temperature.

The parameter $T_1^*$ can be measured experimentally or determined theoretically using an iterative scheme. Equation 13a is based on the assumption that the heat transfer through the flexible seals is negligible when compared to the total heat transferred through the insulating assembly.

The solution of Equation 13a and Equation 13b can be used to produce pertinent engineering correlations. For example, percentage difference between the heat flux including thermal expansion effects and the heat flux at reference condition, $q_{ref}$, where thermal expansion is ignored, and correlated to $T_1$, $T_e$, $T_o$, $k_1$ and $\Delta T_o$. The obtained family of correlations has the following functional form:

$$\frac{(q_{ref} - q)}{q_{ref}} \times 100\% = \qquad \text{Eq. 14}$$
$$[a - b(T_o) - c(\Delta T_o) - d(k_1) + e(T_e T_o \Delta T_o k_1)](T_1 - T_o)^m \left(\frac{T_e}{270}\right)^n$$

where a, b, c, d, e, m, n and the correlation coefficient R2 for different values of ho1 are listed in Table 4 as follows:

TABLE 4

Coefficients of Equation 14 for different $h_{o1}$

| $h_{o1}$(m) | Coefficients | $R^2$ |
|---|---|---|
| 0.004 | a = 0.559, b = 1.08 × 10$^{-3}$, c = 5.14 × 10$^{-4}$, d = 11.572, e = 2.74 × 10$^{-7}$, m = 0.850, n = 0.1.789 | 0.980 |
| 0.006 | a = 0.591, b = 1.17 × 10$^{-3}$, c = 5.26 × 10$^{-4}$, d = 11.399, e = 2.71 × 10$^{-7}$, m = 0..847, n = 1.880 | 0.983 |
| 0.008 | a = 0.610, b = 1.23 × 10$^{-3}$, c = 5.32 × 10$^{-4}$, d = 11.295, e = 2.69 × 10$^{-7}$, m = 0.845, n = 1.934 | 0.984 |

This correlation was obtained over the following range of parameter variations: 310<$T_1$<400 K, 270<$T_o$<290 K, 50<$\Delta T_o$<150 K, 270<$T_e$<300 K, 0.001<$k_1$<0.017 W/m K, $$h_{o2} = h_{o1}, \sum_{i=1}^{2} \frac{(h_{ins})_i}{(k_{ins})_i} = 0.2 \text{ m}^2\text{K/W, and } k_2 = 0.028 \text{ W/mK}.$$

Figure 9A:
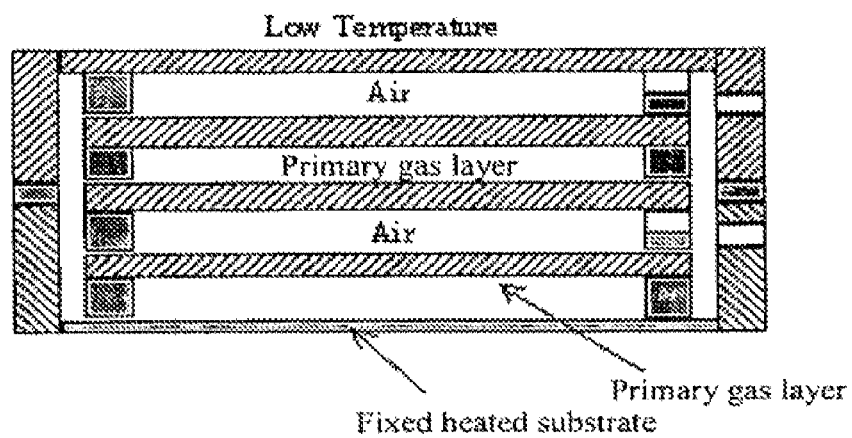
FIG. 9 shows advanced assemblies with enhanced insulating properties comprising the flexible seals according to the present invention.
Figure 9B:
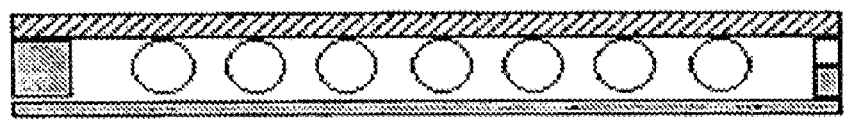
Figure 9C:
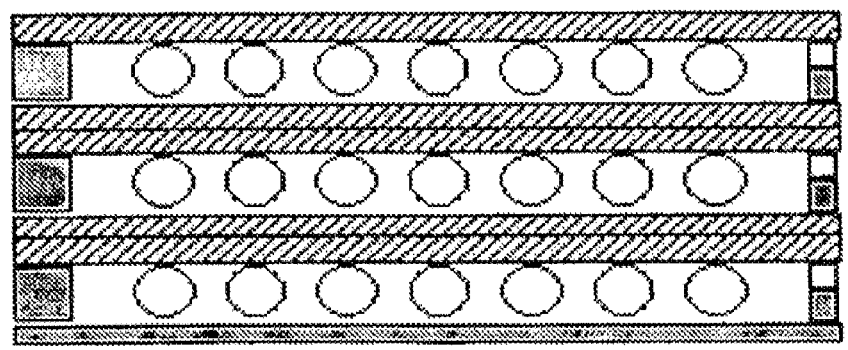

1F. Examples of Insulating Assemblies with Maximum Enhanced Insulating Properties FIG. 9 shows a more advanced insulating assembly comprising an array of primary and secondary fluid layers supported by flexible seals. The secondary fluid layers are vented to the external atmosphere in order to provide maximum volumetric thermal expansion of primary fluid layers. Accordingly, the insulating properties are enhanced for the assembly provided that the primary fluid possesses relatively lower thermal conductivity than the secondary fluid, which is the air. The insulating assembly of FIG. 9A shows the frame of the insulating assembly supported by a flexible seal, thereby allowing for additional volumetric thermal expansion for the primary fluids, thereby resulting in further enhancements of insulating properties, an increase in the effective thermal resistance of the assembly. In an alternative embodiment, soft elastic balloons having minimized stiffness and containing fluids with minimized thermal conductivities within the secondary fluid layer may be used and placed in a vented layer as shown in FIG. 9B and FIG. 9C. In this arrangement the primary fluid layer is eliminated and is suitable for lower heat flux applications. The temperature levels that the flexible seals can sustain before melting governs the degree of enhancements in the insulating properties of the insulating assemblies of the disclosed embodiments. Thus, flexible seals having high melting points are preferably used for insulating assemblies for high temperature applications. The compositions and thus the melting points of the flexible seals of the present invention suitable for desired temperature conditions may be readily selected by one skilled in the art using known methods.

2. Flow and Heat Transfer Inside Thin Films Supported by Flexible Seals in the Presence of Internal and External Pressure Pulsations As provided herein, the effects of both external squeezing and internal pressure pulsations were studied on flow and heat transfer inside non-isothermal and incompressible thin films supported by flexible seals. The laminar governing equations were non-dimensionalized and reduced to simpler forms. The upper substrate (mobile and inflexible substrate) displacement was related to the internal pressure through the elastic behavior of the supporting seals. The following parameters: squeezing number, squeezing frequency, frequency of pulsations, fixation number (for the seal) and the thermal squeezing parameter are the main controlling parameters. Accordingly, their influences on flow and heat transfer inside disturbed thin films were determined and analyzed. As provided herein, an increase in the fixation number results in more cooling and a decrease in the average temperature values of the primary fluid layer. Also, an increase in the squeezing number decreases the turbulence level at the upper substrate. Furthermore, fluctuations in the heat transfer and the fluid temperatures may be maximized at relatively lower frequency of internal pressure pulsations.

The following Table 5 provides the various symbols and meanings used in this section:

TABLE 5

| | |
|---|---|
| B | Thin film length |
| $c_p$ | specific heat of the fluid |
| $d_s$ | effective diameter of the seal |
| E | modulus of elasticity for the seal's material |
| $F_n$ | fixation number |
| H, h, $h_o$ | dimensionless, dimensional and reference thin film thickness |
| $h_c$ | convective heat transfer coefficient |
| k | thermal conductivity of the fluid |
| $Nu_L$, $Nu_U$ | lower and upper substrates Nusselt numbers |
| $P_S$ | thermal squeezing parameter |
| p | fluid pressure |
| q | reference heat flux at the lower substrate for UHF |
| T, $T_1$ | temperature in fluid and the inlet temperature |
| $T_2$ | temperature at the lower and the upper substrates for CWT |
| t | time |
| $V_o$ | reference axial velocity |
| U, u | dimensionless and dimensional axial velocities |
| V, v | dimensionless and dimensional normal velocities |
| X, x | dimensionless and dimensional axial coordinates |
| Y, y | dimensionless and dimensional normal coordinates |
| α | thermal diffusivity for the fluid |
| β, $β_p$ | dimensionless squeezing motion and pressure pulsation amplitudes |
| ε | perturbation parameter |
| γ, $γ_p$ | dimensionless squeezing motion and pressure pulsation frequencies |
| μ | dynamic viscosity of the fluid |
| θ, $θ_m$ | dimensionless temperature and dimensionless mean bulk temperature |
| $θ_W$ | dimensionless temperature at the lower substrate (UHF) |
| ρ | density of the fluid |
| τ | dimensionless time |
| σ | squeezing number |
| ω | reciprocal of a reference time (reference squeezing frequency) |
| η | variable transformation for the dimensionless Y-coordinate |
| Θ | dimensionless heat transfer parameter (CWT) |
| Π | dimensionless pressure |
| $Π_i$, $Π_o$ | dimensionless inlet pressure and dimensionless mean pressure |

In certain thin film applications, external disturbances, such as unbalances in rotating machines or pulsations in external ambient pressures due to many disturbances, can result in an oscillatory motion at the upper substrate boundary. In addition to external disturbances, internal pressure pulsations such as irregularities in the pumping process can produce similar oscillatory motion. Even small disturbances on the substrates of the thin film can have a substantial impact on the cooling process as the thickness of thin films is very small. These disturbances are even more pronounced if the thin film is supported by flexible seals. Accordingly, the dynamics and thermal characterization of thin films will be altered.

The chambers for chemical and biological detection systems such as fluidic cells for chemical or biological microcantilever probes are examples of thin films. See Lavrik et al. (2001) Biomedical Devices 3(12):35-44, which is herein incorporated by reference. Small turbulence levels that can be introduced into these cells by either flow pulsating at the inlet or external noise that may be present at the boundaries which result in a vibrating boundary can produce flow instabilities inside the fluidic cells. These disturbances substantially effect the measurements of biological probes, such as microcantilevers, which are very sensitive to flow conditions.

The flow inside squeezed thin films, such as the flow inside isothermal oscillatory squeezed films with fluid density varying according to the pressure, has been studied. See Langlois (1962) Quarterly of Applied Math. XX:131-150, which is herein incorporated by reference. The heat transfer inside squeezed thin films (not oscillatory type) has been analyzed. See Hamza (1992) J. Phys. D: Appl. Phys. 25:1425-1431, Bhattacharyya et al. (1996) Numerical Heat Transfer, Part A 30:519-532, and Debbaut (2001) J. Non-Newtonian Fluid Mech. 98:15-31, which are herein incorporated by reference. The flow and heat transfer inside incompressible oscillatory squeezed thin films has been analyzed. See Khaled & Vafai (2002) Numerical Heat Transfer Part A 41:451-467, which is herein incorporated by reference. The effects of internal pressure pulsations have been studied on flow and heat transfer inside channels. See Hemida et al. (2002) Int. J. Heat Mass Transfer 45:1767-1780, and Joshi et al. (1985) J. Fluid Mech. 156:291-300, which are herein incorporated by reference.

Unfortunately, the prior art fails to account for the effects of both internal and external pressure pulsations on flow and heat transfer inside thin films, wherein the gap thickness will be a function of both pulsations.

Therefore, as provided herein, the upper substrate of a thin film was considered to be subjected to both external squeezing effects and the internal pressure pulsations. The influence of internal pressure pulsations on the displacement of the upper substrate was determined by the theory of linear elasticity applied to the seal supporting the substrates of an incompressible non-isothermal thin film. The laminar governing equations for flow and heat transfer were properly non-dimensionalized and reduced into simpler equations. The resulting equations were then solved numerically to determine the effects of external squeezing, internal pressure pulsations and the strength of the seal on the turbulence inside the disturbed thin films as well as on thermal characteristics of these thin films.

2A. Problem Formulation

Figure 10A:
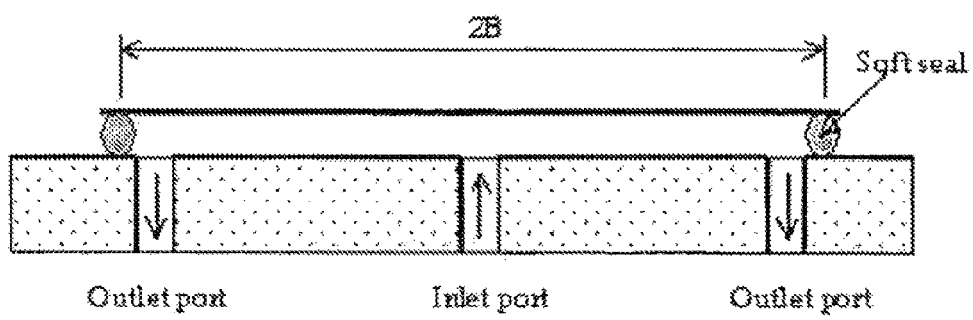
FIG. 10 shows the schematic diagram for a thin film and the coordinate system.
Figure 10B:
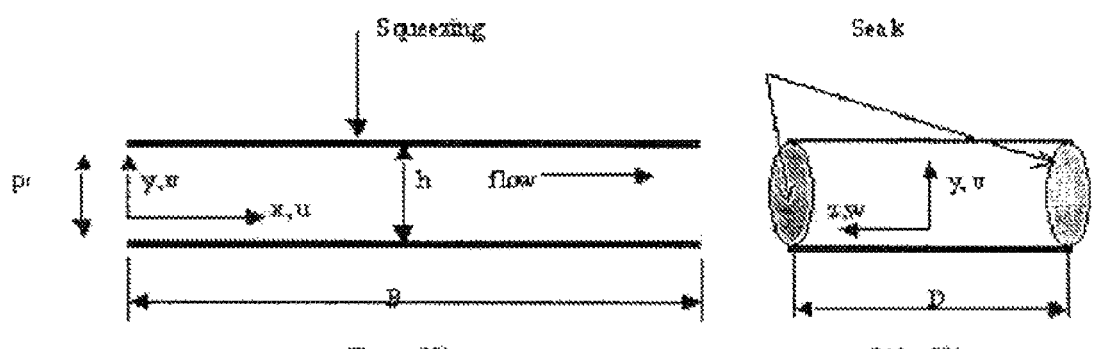

A two dimensional thin film that has a small thickness, h, compared to its length, B, was considered. The x-axis was taken in the direction of the length of the thin film while y-axis was taken along the thickness as shown in FIG. 10. The width of the thin film, D, was assumed to be large enough such that two-dimensional flow inside the thin film can be assumed. The lower substrate of the thin film was fixed (immobile and inflexible substrate) while the vertical motion of the upper substrate (mobile and inflexible substrate) was assumed to have sinusoidal behavior when the thin film gap was not charged with the working fluid. This motion due to only external disturbances is expressed according to the following Equation 15:

$$h = h_o(1 - \beta \cos(\gamma \omega t)) \quad \text{Eq. 15}$$

wherein $\gamma$ is the dimensionless frequency;

$\beta$ is the dimensionless upper substrate motion amplitude; and $\omega$ is a reference frequency.

The fluid was assumed to be Newtonian with constant properties.

The general two-dimensional continuity, momentum and energy equations for the laminar thin film are given as follows:

$$\frac{\partial u}{\partial x} + \frac{\partial v}{\partial y} = 0 \quad \text{Eq. 16}$$

$$\rho\left(\frac{\partial u}{\partial t} + u\frac{\partial u}{\partial x} + v\frac{\partial u}{\partial y}\right) = -\frac{\partial p}{\partial x} + \mu\left(\frac{\partial^2 u}{\partial x^2} + \frac{\partial^2 u}{\partial y^2}\right) \quad \text{Eq. 17}$$

$$\rho\left(\frac{\partial v}{\partial t} + u\frac{\partial v}{\partial x} + v\frac{\partial v}{\partial y}\right) = -\frac{\partial p}{\partial y} + \mu\left(\frac{\partial^2 v}{\partial x^2} + \frac{\partial^2 v}{\partial y^2}\right) \quad \text{Eq. 18}$$

$$\rho c_p\left(\frac{\partial T}{\partial t} + u\frac{\partial T}{\partial x} + v\frac{\partial T}{\partial y}\right) = k\left(\frac{\partial^2 T}{\partial x^2} + \frac{\partial^2 T}{\partial y^2}\right) \quad \text{Eq. 19}$$

wherein

T is the fluid temperature;

$\rho$ is the density;

p is the pressure;

$\mu$ is the dynamic viscosity;

$c_p$ is the specific heat; and k is the thermal conductivity of the fluid.

Equations 16-19 are non-dimensionalized using the following dimensionless variables:

$$X = \frac{x}{B} \quad \text{Eq. 20a}$$

$$Y = \frac{y}{h_o} \quad \text{Eq. 20b}$$

$$\tau = \omega t \quad \text{Eq. 20c}$$

$$U = \frac{u}{(\omega B + V_o)} \quad \text{Eq. 20d}$$

$$V = \frac{v}{h_o \omega} \quad \text{Eq. 20e}$$

$$\Pi = \frac{p - p_e}{\mu\left(\omega + \frac{V_o}{B}\right)\varepsilon^{-2}} \quad \text{Eq. 20f}$$

wherein $T_1$ is the inlet temperature of the fluid; and $V_o$ is a constant representing a reference dimensional velocity.

As provided in the above equations, $\Delta T$ is equal to $T_2 - T_1$ for constant wall temperature conditions (CWT), $T_2$ will be the temperature of both lower and upper substrates, and is equal to $$\frac{qh_o}{k}$$

for uniform wall heat flux conditions (UHF). The variables X, Y, τ, U, V, Π, and θ are the dimensionless forms of x, y, t, u, v, p, and T variables, respectively. The above transformations except for dimensionless temperature have been used in the art along with the perturbation parameter ε, $$\varepsilon = \frac{h_o}{B}.$$

See Langlois (1962) Quarterly of Applied Math. XX:131-150, which is herein incorporated by reference.

Most flows inside thin films are laminar and could be creep flows especially in lubrications and biological applications. Therefore, the low Reynolds numbers flow model was adopted here. The application of this model to Equations 16-19 results in the following reduced non-dimensionalized equations:

$$U = \frac{1}{2}\frac{\partial \Pi}{\partial X}(Y)(Y-H) \qquad \text{Eq. 21}$$

$$\frac{\partial U}{\partial X} + \frac{\sigma}{12}\frac{\partial V}{\partial Y} = 0 \qquad \text{Eq. 22}$$

$$\frac{\partial}{\partial X}\left(H^3 \frac{\partial \Pi}{\partial X}\right) = \sigma \frac{\partial H}{\partial \tau} \qquad \text{Eq. 23}$$

$$P_S\left(\frac{\partial \theta}{\partial \tau} + \frac{12}{\sigma}U\frac{\partial \theta}{\partial X} + V\frac{\partial \theta}{\partial Y}\right) = \varepsilon^2 \frac{\partial^2 \theta}{\partial X^2} + \frac{\partial^2 \theta}{\partial Y^2} \qquad \text{Eq. 24}$$

wherein
σ is the squeezing number; and
$P_S$ is the thermal squeezing parameter.

The squeezing number and the thermal squeezing parameter are defined as:

$$\sigma = \frac{12}{1 + \frac{V_o}{\omega B}} \qquad \text{Eq. 25a}$$

$$P_S = \frac{\rho c_p h_o^2 \omega}{k} \qquad \text{Eq. 25b}$$

The inlet dimensionless pulsating pressure is considered to have the following relation:

$$\Pi_i = \Pi_o(1 + \beta_p \sin(\gamma_p \omega t + \phi_p)) \qquad \text{Eq. 26}$$

wherein
βp is the dimensionless amplitude in the pressure;
$\Pi_i$ is the inlet dimensionless pressure;
$\Pi_o$ is the mean dimensionless pressure;
$\gamma_p$ is the dimensionless frequency of the pressure pulsations parameter; and
$\phi_p$ is a phase shift angle parameter.

Due to both pulsations in internal pressure and external disturbances, the dimensionless film thickness H, (H=h/h$_o$), can be represented by Equation 27 by noting the principle of superposition:

$$H = 1 - \beta \cos(\gamma \omega t) + H_p \qquad \text{Eq. 27}$$

wherein Hp is the dimensionless deformation of the seals resulting from pulsations in the internal pressure.

The lower substrate was assumed to be fixed (immobile and inflexible substrate) and that the upper substrate (mobile and inflexible substrate) of the thin film is rigid such that the magnitude of the deformation in the seals is similar to displacement of the upper substrate (mobile and inflexible substrate). The dimensionless deformation in the seals due to variations in the external pressure is the second term of Equation 27 on the right. The dimensionless frequency γ is allowed to be different than $\gamma_p$.

The dimensionless pressure gradient inside the thin film as a result of the solution to the Reynolds Equation 23 is:

$$\frac{\partial \Pi}{\partial X} = \frac{\sigma}{H^3}\frac{dH}{d\tau}\left(X - \frac{1}{2}\right) - \Pi_o(1 + \beta_p \sin(\gamma_p \tau + \phi_p)) \qquad \text{Eq. 28}$$

The reference velocity $V_o$ that was used to define the dimensionless pressure, axial dimensionless velocity and the squeezing number was taken to be related to the average velocity, $u_m$, inside the thin film at zero β and $\beta_p$ and the dimensionless thickness of the thin film that results from the application of the corresponding inlet mean pressure, $H_m$, through the following relation:

$$V_o = \frac{u_m}{H_m^2} \qquad \text{Eq. 29}$$

The previous scaled reference velocity is only a function of the mean pressure, viscosity and the reference dimensions of the thin film and results in the following relation between the inlet mean dimensionless pressure to the squeezing number:

$$\Pi_o 12 - \sigma \qquad \text{Eq. 30}$$

Accordingly, the dimensionless pressure gradient, the dimensionless pressure and the average dimensionless pressure $\Pi_{AVG}$ inside the thin film were related to the squeezing number through the following equations:

$$\frac{\partial \Pi(X, \tau)}{\partial X} = \frac{\sigma}{H^3}\frac{dH}{d\tau}\left(X - \frac{1}{2}\right) - (12 - \sigma)(1 + \beta_p \sin(\gamma_p \tau + \phi_p)) \qquad \text{Eq. 31}$$

$$\Pi(X, \tau) = \frac{\sigma}{2H^3}\frac{dH}{d\tau}(X^2 - X) - (12 - \sigma)(1 + \beta_p \sin(\gamma_p \tau + \phi_p))(X - 1) \qquad \text{Eq. 32}$$

$$\Pi_{AVG}(\tau) = -\frac{\sigma}{12H^3}\frac{dH}{d\tau} + \frac{(12 - \sigma)}{2}(1 + \beta_p \sin(\gamma_p \tau + \phi_p)) \qquad \text{Eq. 33}$$

The displacement of the upper substrate due internal pressure pulsations was related to the $\Pi_{AVG}$ through the theory of linear elasticity by the following relation:

$$H_p = F_n \Pi_{AVG} \qquad \text{Eq. 34}$$

wherein $F_n$ is equal to:

$$F_n = \frac{\mu(V_o + \omega B)}{E\varepsilon^2 d_s} \qquad \text{Eq. 35}$$

The parameters E and $d_s$ in the previous equation are the modulus of elasticity of the flexible seals of the present invention and a characteristic dimension for the seal, respectively.

The quantity $d_s$ is equal to the effective diameter of the seal's cross section times the ratio of the length of the seals divided by the thin film width. The effective diameter for seals having square cross section is equal to $h_o$. The term $F_n$ will be called the fixation number of the thin film.

The fixation parameter $F_n$ represents a ratio between viscous shear force inside thin films to the elastic forces of the flexible seals. Moreover, Equation 34 is based on the assumption that transient behavior of the seal's deformation is negligible. The values of $F_n$ are about 0.001 to about 0.1 for long thin films supported by flexible seals.

The first set of dimensionless boundary conditions used were for constant wall temperatures (CWT) at both the lower and the upper substrates while the second set used assumed that the lower substrate was at uniform wall heat flux conditions (UHF) and the upper substrate is insulated. As such the dimensionless boundary conditions can be written as:

$$\theta(X, Y, 0) = 0, \theta(0, Y, \tau) = 0, \theta(X, 0, \tau) = 1 \quad \text{Eq. 36}$$
$$\theta(X, H, \tau) = 1, \frac{\partial}{\partial X}\left(\frac{1 - \theta(1, Y, \tau)}{1 - \theta_m(1, \tau)}\right) = 0$$
$$CWT$$

$$\theta(X, Y, 0) = 0, \theta(0, Y, \tau) = 0, \frac{\partial \theta(X, 0, \tau)}{\partial Y} = -1 \quad \text{Eq. 37}$$
$$\frac{\partial \theta(X, H, \tau)}{\partial Y} = 0,$$
$$\frac{\partial \theta(1, Y, \tau)}{\partial X} = \frac{\sigma}{12 U_m}\left(\frac{1}{P_S H} - \frac{\partial \theta(1, Y, \tau)}{\partial \tau}\right)$$
$$UHF$$

The last condition of Equation 36 is based on the assumption that the flow at the exit of the thin film is thermally fully developed. Moreover, the last thermal condition of Equation 37 was derived based on an integral energy balance at the exit of the thin film realizing that the axial conduction is negligible at the exit. The calculated thermal parameters considered were the Nusselt numbers at the lower and upper substrates, and the dimensionless heat transfer from the upper and lower substrates, $\Theta$, for CWT conditions, which are defined according to the following equations:

$$Nu_U(X, \tau) \equiv \frac{h_c h_o}{k} = \frac{1}{1 - \theta_m(X, \tau)} \frac{\partial \theta(X, H, \tau)}{\partial Y} \quad \text{Eq. 38}$$
$$CWT \ Nu_L(X, \tau) \equiv \frac{h_c h_o}{k} = \frac{-1}{1 - \theta_m(X, \tau)} \frac{\partial \theta(X, 0, \tau)}{\partial Y}$$

$$\Theta(X, \tau) = \left(\frac{\partial \theta(X, H, \tau)}{\partial Y} - \frac{\partial \theta(X, 0, \tau)}{\partial Y}\right) \quad \text{Eq. 39}$$
$$UHF \ Nu_1(X, \tau) \equiv \frac{h_c h_o}{k} = \frac{1}{\theta(X, 0, \tau) - \theta_m(X, \tau)}$$

wherein $\theta_m$ and $U_m$ are the dimensionless mean bulk temperature and the dimensionless average velocity at a given section and are defined as follows:

$$\theta_m(X, \tau) = \frac{1}{U_m(X, \tau) H} \int_0^H U(X, Y, \tau) \theta(X, Y, \tau) dY \quad \text{Eqs. 40a, 40b}$$
$$U_m(X, \tau) = \frac{1}{H} \int_0^H U(X, Y, \tau) dY$$

Due to symmetric flow and thermal conditions for CWT, Nusselt numbers at lower and upper substrates were expected to be equal.

2B. Numerical Methods

The dimensionless thickness of the thin film was determined by solving Equations 27, 33, and 34 simultaneously. Accordingly, the velocity field, U and V, was determined from Equations 21 and 22. The reduced energy equation, Equation 24, was then solved using the Alternative Direction Implicit techniques (ADI) known in the art by transferring the problem to one with constant boundaries using the following transformations: $\tau^* = \tau$, $\xi = X$ and $$\eta = \frac{Y}{H}.$$

Iterative solution was employed for the $\xi$-sweep of the energy equation for CWT conditions so that both the energy equation and the exit thermal condition, last condition of Equation 36, are satisfied. The values of 0.008, 0.03, 0.002 were chosen for $\Delta\xi$, $\Delta\eta$ and $\Delta\tau^*$.

2C. Effects of Pressure Pulsations on the Dimensionless Film Thickness

Figure 11:
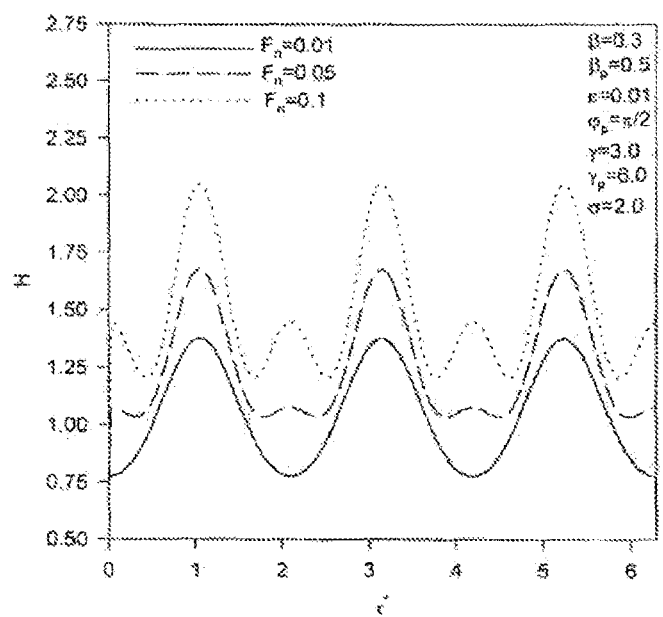
FIG. 11 shows the effects of the fixation parameter on the thin film thickness.
Figure 12:
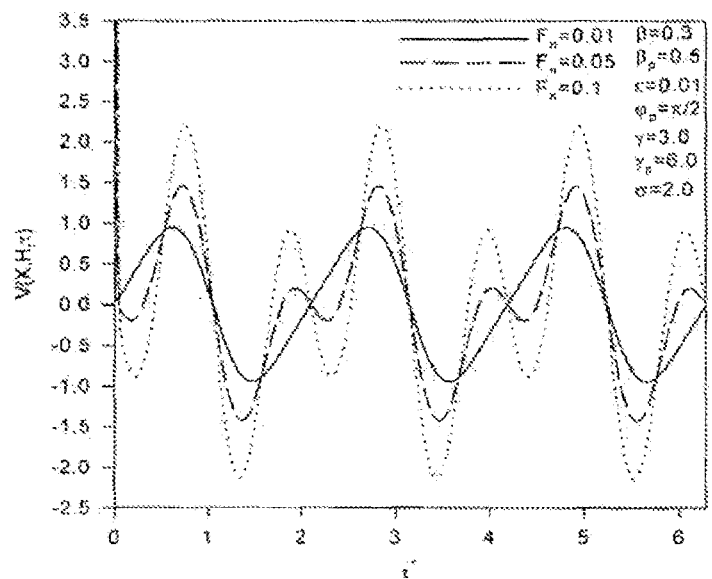
FIG. 12 shows the effects of the fixation parameter on the fluctuation at the upper substrate.

FIG. 11 and FIG. 12 describe the importance of the fixation number $F_n$ on the dimensionless film thickness H and the dimensionless normal velocity at the upper substrate V(X,H, $\tau$), respectively. As $F_n$ increases, H and absolute values of V(X,H,$\tau$) increase. Soft (flexible seals) fixations have large $F_n$ values. Increases in the viscosity and flow velocities or a decrease in the thin film thickness, perturbation parameter and the seal's modulus of elasticity increase the value of $F_n$ as provided by Equation 35.

Figure 13:
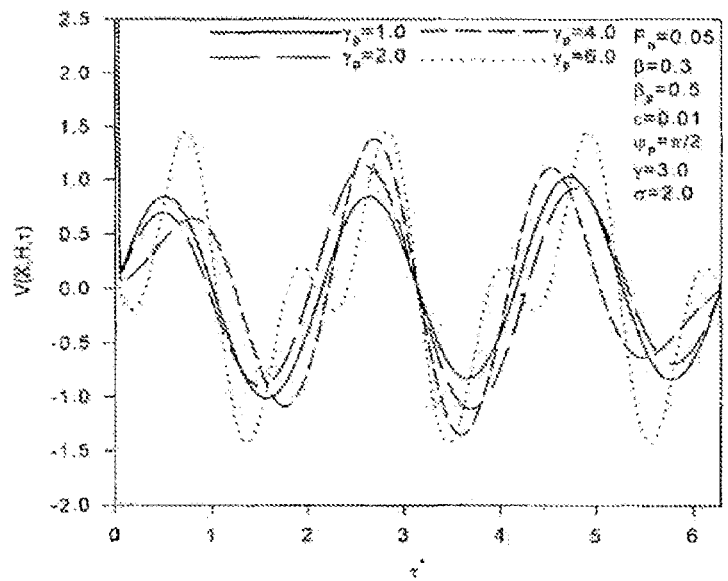
FIG. 13 shows the effects of the frequency of internal pressure pulsations on the fluctation at the upper substrate.

The effects of pressure pulsations on H are clearly seen for large values of $F_n$ as shown in FIG. 11 and FIG. 12. At these values, the frequency of the local maximum or minimum of H is similar to the frequency of the pressure pulsations as seen from FIG. 11. Further, the degree of turbulence at the upper substrate is increased when $F_n$ increases as shown in FIG. 12. The degree of turbulence at the upper substrate refers to the degree of fluctuations at the upper substrate and the number of local maximum and minimum in V(X,H,$\tau$). This is also obvious when the values of $\gamma_p$ increase as shown in FIG. 13. The increase in turbulence level at the upper substrate may produce back flows inside the thin film at large values of $\gamma_p$, which will have an effect on the function of a thin film such as those used as chambers in detection and sensing devices.

For $\sigma=12$ where the time average of the average gage pressure inside the thin film is zero, the variation in H decreases as $F_n$ increases. This effect can be seen from Equation 33 and Equation 34 and will cause reductions in the flow and in the cooling process. However, the mean value of $\Pi_{AVG}$ is always greater than zero for other values of $\sigma$ which causes an increase in the mean value of H as $F_n$ increases resulting in an increase in the mean value of the flow rate inside the thin film.

Figure 14:
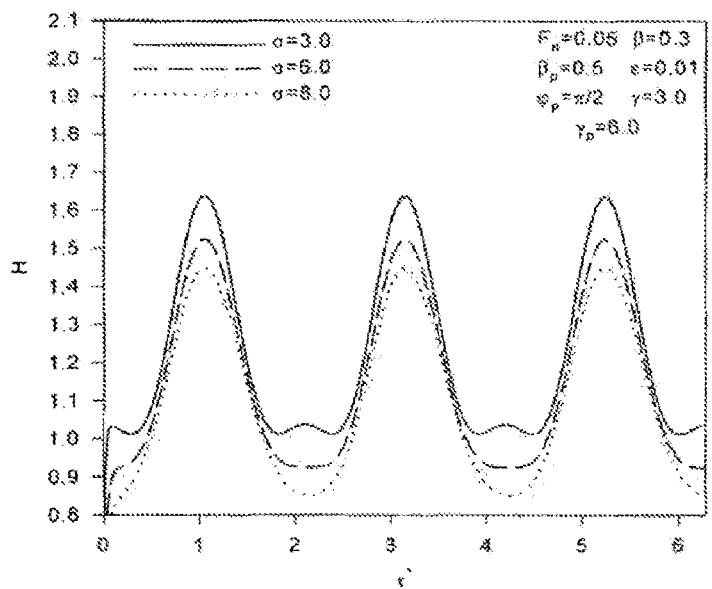
FIG. 14 shows the effects of the squeezing number on the thin film thickness.
Figure 15:
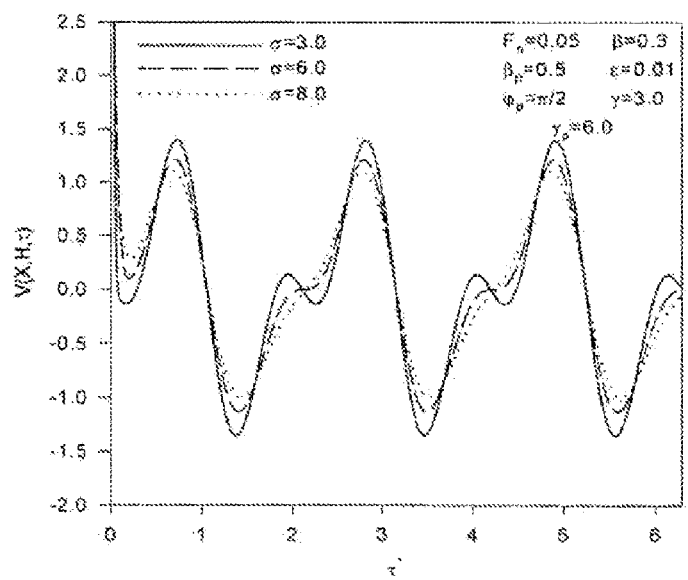
FIG. 15 shows the effects of the squeezing number on the fluctation at the upper substrate.
Figure 16:
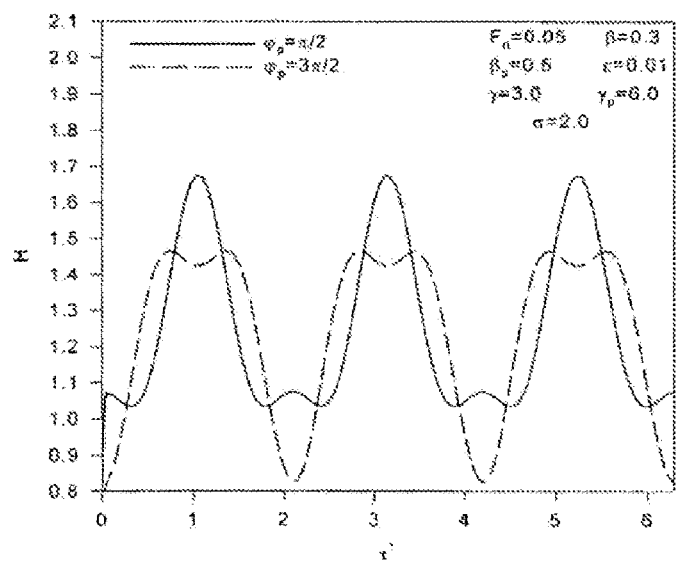
FIG. 16 shows the effects of the phase shift of the internal pressure on the thin film thickness.

FIG. 14 shows the effects of the squeezing number $\sigma$ on H. Small values of $\sigma$ indicates that the thin film is having relatively large inlet flow velocities and therefore large pressure gradients and large values of $\Pi_o$. Accordingly, H increases as $\sigma$ decreases as seen in FIG. 14. Further, the degree of turbulence at the upper substrate increases as $\sigma$ decreases. This is shown in FIG. 15. The changes in the pressure phase shift results in similar changes in the dimensionless thin film thickness phase shift as shown in FIG. 16.

Figure 17:
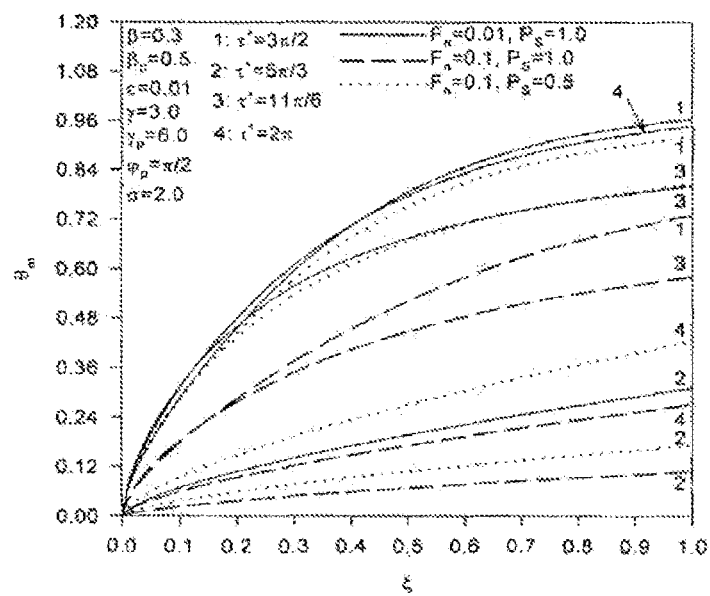
FIG. 17 shows the effects of the thermal squeezing parameter and the fixation parameter on the mean bulk temperature.
Figure 18:
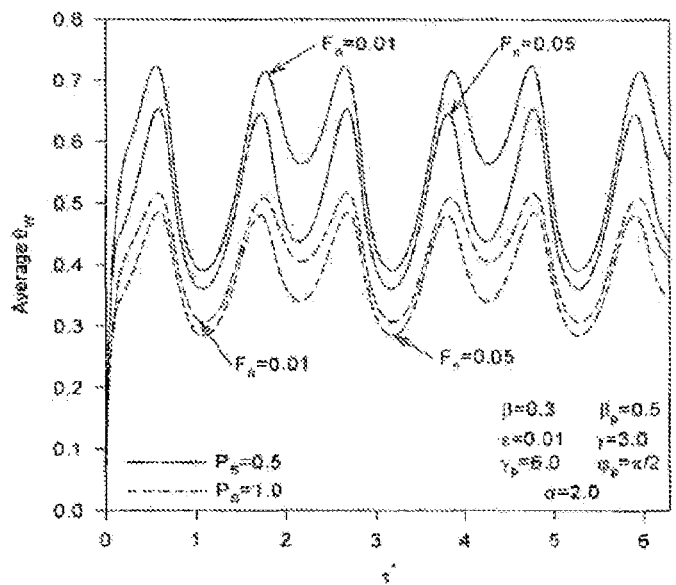
FIG. 18 shows the effects of the thermal squeezing parameter and the fixation parameter on the average lower substrate temperature.

2D. Effects of Pressure Pulsations on Heat Transfer Characteristics of the Thin Film FIG. 17 and FIG. 18 illustrate the effects of $F_n$ and $P_S$ on the dimensionless mean bulk temperature $\theta_m$ and the average lower substrate temperature $\theta_W$, average of $\theta(X,0,\tau)$, for constant wall temperature CWT and uniform heat flux UHF conditions, respectively. As $F_n$ increases when softer flexible seals are used, the induced pressure forces inside the thin film due to internal pressure pulsations will increase the displacement of the upper substrate (mobile and inflexible substrate) as shown before. This enables the thin film to receive larger flow rates since the insulating assemblies in these figures have similar values for the dimensionless pressure at the inlet. Thus, there is more cooling to the substrates results as $F_n$ increases resulting in a decrease in the $\theta_m$ and average $\theta_W$ values and their corresponding fluctuations for CWT and UHF conditions, respectively. The effect of the thermal squeezing parameter $P_S$ on the cooling process is also shown in FIG. 17 and FIG. 18. The cooling at the substrates is enhanced as $P_S$ increases.

Figure 19:
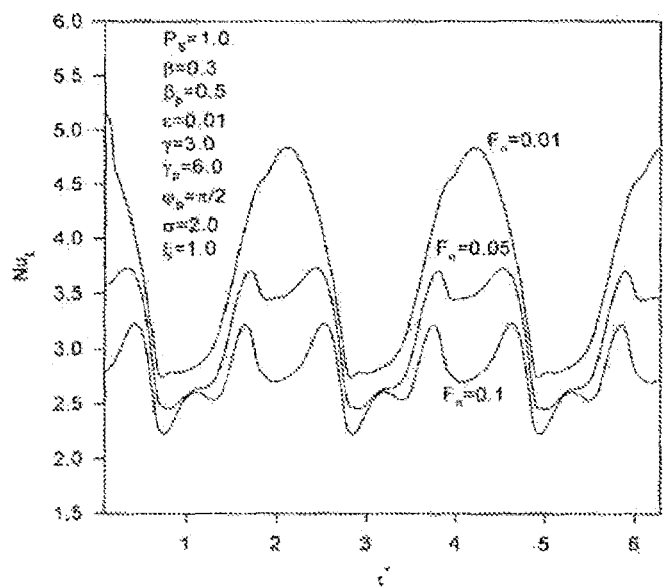
FIG. 19 shows the effects of the fixation parameter on the Nusselt number for constant wall temperature conditions.
Figure 20:
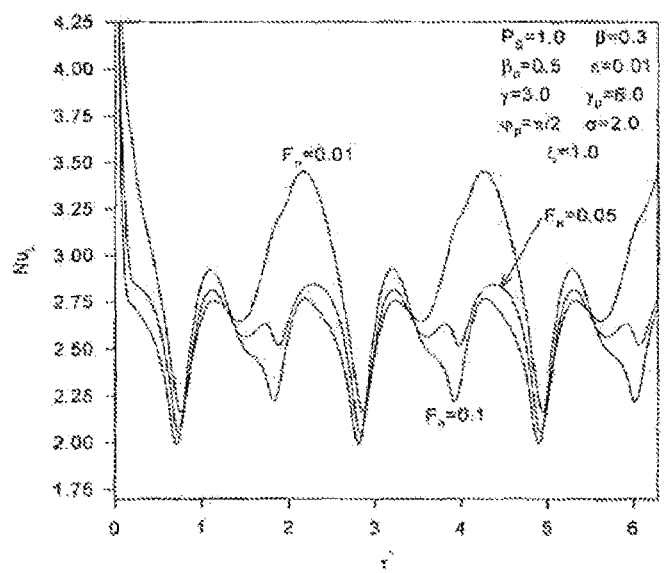
FIG. 20 shows the effects of the fixation parameter on the Nusselt number for uniform wall heat flux conditions.
Figure 21:
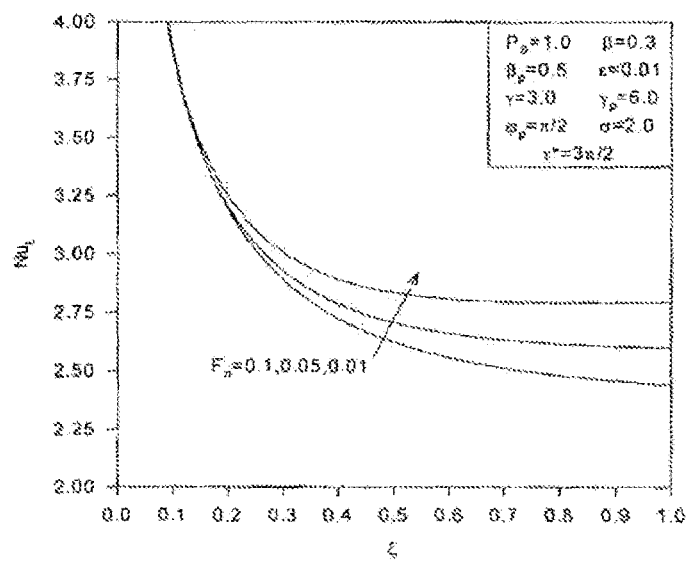
FIG. 21 shows the axial development of the Nusselt number versus the fixation parameter.

FIG. 19 and FIG. 20 show the effects of $F_n$ on the Nusselt number at the lower substrate $Nu_L$ for CWT and UHF conditions, respectively. The irregularity in $Nu_L$ decrease as $F_n$ decreases because the upper substrate will not be affected by the turbulence in the flow if the flexible seals have relatively large modulus of elasticity. In other words, the induced flow due to the upper substrate motion is reduced as $F_n$ decreases resulting in less disturbances to the flow inside the thin film. This can be seen in FIG. 21 for UHF conditions where $Nu_L$ reaches a constant value at low values of $F_n$ after a certain distance from the inlet. The values of $Nu_L$ and the corresponding fluctuations are noticed to decrease as $F_n$ increases.

Figure 22:
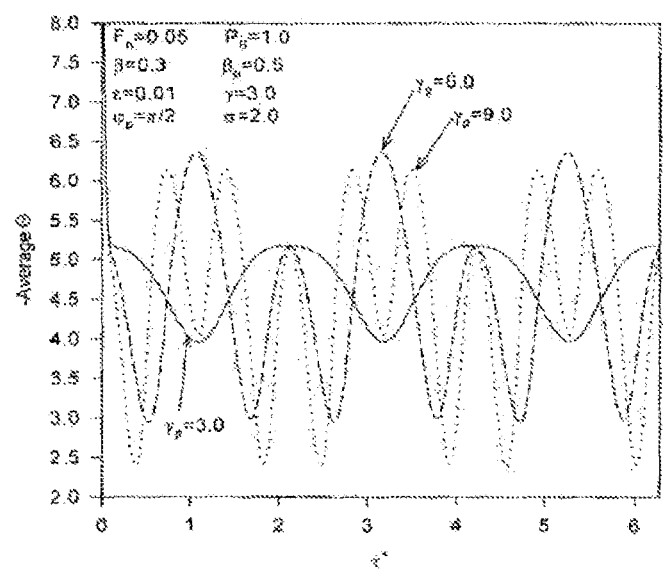
FIG. 22 shows the effects of the frequency of pulsations on the average heat transfer.
Figure 23:
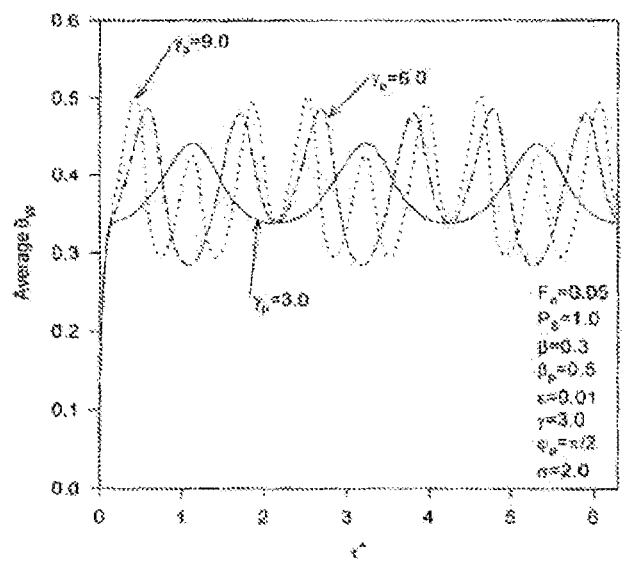
FIG. 23 shows the effects of the frequency of pulsations on the average lower substrate temperature.
Figure 24:
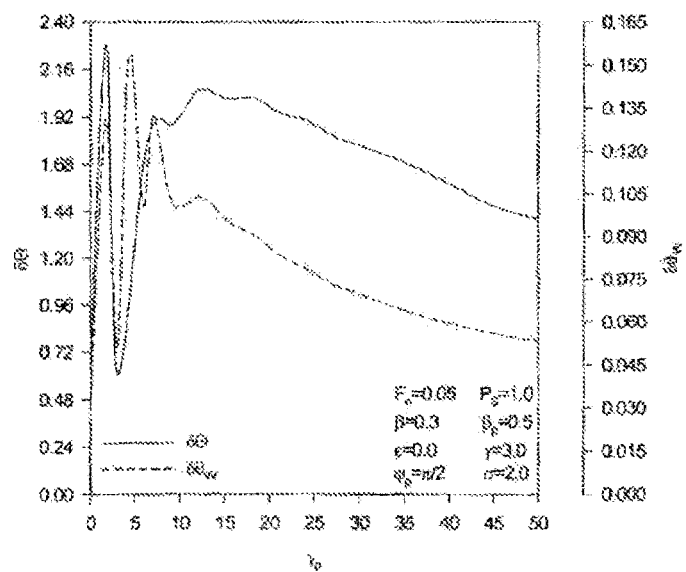
FIG. 24 shows the effects frequency of pulsations on the fluctuation in the average heat transfer and the average lower substrate temperature.

FIG. 22 and FIG. 23 illustrate the effects of dimensionless frequency of the inlet pressure pulsations $\gamma_p$ on the average dimensionless heat transferred from the substrates $\Theta$ and the average $\theta_W$ for CWT and UHF conditions, respectively. The figures show that the mean value of $\Theta$ and $\theta_W$ are unaffected by $\gamma_p$ and that the frequency of the average values of $\Theta$ and $\theta_W$ increase as $\gamma_p$ increases. FIG. 24 describes the effects of $\gamma_p$ on the fluctuation in the average $\Theta$ and $\theta_W$, half the difference between the maximum and the minimum values of the average $\Theta$ and $\theta_W$. The effects of $\gamma_p$ on the fluctuation in the average $\Theta$, $\delta\Theta$, and the fluctuation in the average $\theta_W$, $\delta\theta_W$, are more pronounced at lower values of $\gamma_p$ as shown in FIG. 24.

Flow and heat transfer inside externally oscillatory squeezed thin films supported by flexible seals in the presence of inlet internal pressure pulsations were analyzed. The governing laminar continuity, momentum and energy equations were properly non-dimensionalized and reduced to simpler forms for small Reynolds numbers. The reduced equations were solved by the alternative direction implicit (ADI) method. The turbulence level at the upper substrate increases by increases in both the fixation number and the frequency of the internal pressure pulsations. However, an increase in the squeezing number decreases the turbulence level at the upper substrate. The fluid temperatures and the corresponding fluctuations were found to decrease when the fixation number and the thermal squeezing parameter were increased for both CWT and UHF conditions. Finally, fluctuations in the heat transfer and the fluid temperatures were more pronounced at lower frequency of internal pressure pulsations.

3. Control of Exit Flow and Thermal Conditions Using Two-Layered Thin Films Supported by Flexible Complex Seals Although thin films are characterized by having laminar flows with relatively low Reynolds numbers leading to stable hydrodynamic performance, the thickness of the thin films is small enough such that small disturbances at one of the boundaries may cause a significant squeezing effect at the boundary. See e.g. Langlois (1962) Quarterly of Applied Math. XX:131-150 (flow inside isothermal oscillatory squeezed films with fluid density varying with the pressure), Khaled & Vafai (2002) Numerical Heat Transfer, Part A 41:451-467 and Khaled & Vafai (2003) Int. J. Heat and Mass Transfer 46:631-641 (flow and heat transfer inside incompressible thin films having a prescribed oscillatory squeezing at one of their boundaries), and Khaled & Vafai (2002) Int. J. Heat and Mass Transfer 45:5107-5115 (internal pressure through the elastic behavior of the supporting seal), which are herein incorporated by reference.

Recently, the situation where the squeezing effect at the free substrate is initiated by thermal effects was studied. See Khaled & Vafai (2003) ASME J. Heat Transfer 125:916-925, which is herein incorporated by reference. As provided herein, flexible seals with closed cavities of stagnant fluids having a relatively large volumetric thermal expansion coefficient, flexible complex seal, were studied. Flexible complex seals in a single layer thin film can cause flooding of the coolant when the thermal load of the thin film is increased over its projected capacity. As a result, an enhancement in the cooling process is attained especially if ultrafine suspensions are present in the coolant, a fluid that exhibits high heat transfer performance. Ultrafine suspensions in the fluid such as copper or aluminum particles with diameters of order nanometer are found to enhance the effective thermal conductivity of the fluid. See Eastman et al. (2001) Applied Physics Letters 78: 718-720, which is herein incorporated by reference.

As provided herein, the flow and heat transfer inside an oscillatory disturbed two-layered thin film channel supported by flexible complex seals in the presence of suspended ultrafine particles was studied. Oscillatory generic disturbances were imposed on the two-layered thin film channels supported by flexible complex seals in the presence of suspended ultrafine particles, which correspond to disturbances in the upper substrate temperature and in the inlet pressure of the secondary fluid layer. The governing continuity, momentum and energy equations for both layers were non-dimensionalized and categorized for small Reynolds numbers and negligible axial conduction. The deformation of the supporting seals was linearly related to both the pressure difference across the two layers and the upper substrate's temperature based on the theory of the linear elasticity and the principle of the volumetric thermal expansion of the stagnant fluid filling the closed cavities of the flexible complex seals.

As provided herein, the flow rate and heat transfer in the main thin film channel can be increased by an increase in the softness of the seals, the thermal squeezing parameter, the thermal dispersion effect and the total thickness of two-layered thin film. However, the flow rate and heat transfer in the main thin film channel decrease as the dimensionless thermal expansion coefficient of the seals and the squeezing number of the primary fluid layer increase. Both the increase in thermal dispersion and the thermal squeezing parameter for the secondary fluid layer were found to increase the stability of the intermediate or the mobile and inflexible substrate. Furthermore, the two-layered thin film channel was found to be more stable when the secondary fluid flow was free of pulsations or it had relatively a large pulsating frequency. Finally, the proposed two-layered thin film supported by flexible complex seals, unlike other controlling systems, does not require additional mechanical control or external cooling devices, i.e. is self-regulating for the flow rate and temperature of a primary fluid layer.

The following Table 6 provides the various symbols and meanings used in this section:

TABLE 6

| | |
|---|---|
| B | thin film length |
| $C_F$ | correction factor for the volumetric thermal expansion coefficient |
| $c_p$ | specific heat of the fluid |
| D | width of the thin film |
| E* | softness index of seals supporting the intermediate or mobile and inflexible substrate |
| G | width of closed cavity containing stagnant fluid |
| $H_t$ | dimensionless total thickness of the two-layered thin film |
| $F_T$ | dimensionless coefficient of the thermal expansion for the complex seal |
| H, h, $h_o$ | dimensionless, dimensional and reference thin film thickness |
| $h_c$ | convective heat transfer coefficient |
| K* | effective stiffness of the sealing |
| k | thermal conductivity of the fluid |
| $k_o$ | reference thermal conductivity of the fluid |
| Nu | lower substrate's Nusselt number |
| $P_S$ | thermal squeezing parameter |
| p | fluid pressure |
| $q_o$ | reference heat flux at the lower substrate for UHF |
| T, $T_o$ | temperature in fluid and the inlet temperature |
| t | time |
| $V_o$ | reference axial velocity |
| U, $U_m$ | dimensionless axial and average axial velocities |
| u | dimensional axial velocity |
| V, v | dimensionless and dimensional normal velocities |
| X, x | dimensionless and dimensional axial coordinates |
| Y, y | dimensionless and dimensional normal coordinates |
| α | thermal diffusivity of the fluid |
| $β_q$ | dimensionless amplitude of the thermal load |
| $β_p$ | dimensionless amplitude of the pressure |
| $β_T$ | coefficient of volumetric thermal expansion |
| ε | perturbation parameter |
| $φ_p$ | phase shift angle |
| γ | dimensionless frequency of the thermal load |
| $γ_p$ | dimensionless frequency of the internal pressure |
| μ | dynamic viscosity of the fluid |
| θ, $θ_m$ | dimensionless temperature and dimensionless mean bulk temperature |
| ρ | density of the fluid |
| τ, τ* | dimensionless time |
| σ | squeezing number |
| ω | reciprocal of a reference time (reference squeezing frequency) |
| η | variable transformation for the dimensionless Y-coordinate |
| λ | dimensionless dispersion parameter |
| Π | dimensionless pressure |
| $Π_n$ | dimensionless inlet pressure |
| Λ | reference lateral to normal velocity ratio |
| Subscripts | |
| i | $i^{th}$ layer |
| l | lower substrate |
| P | due to pressure |
| T | due to thermal expansion |
| u | upper substrate |

The present invention provides flexible complex seals. The flexible complex seals may be used in two-layered thin films are utilized in order to regulate the flow rate of the primary fluid layer such that excessive heating in the second layer results in a reduction in the primary fluid flow rate. The flexible complex seals of the present invention may be used in internal combustion applications where the fuel flow rate should be reduced as an engine gets overheated. The flexible complex seals of the present invention may be used to minimize bimaterial effects of many biosensors that are sensitive to heat and flow conditions. See Fritz et al. (2000) Science 288:316-318, which is herein incorporated by reference.

3A. Problem Formulation and Analysis

FIG. 25 shows a two-layered thin film supported by flexible complex seals. The lower layer contains the primary fluid flow passage where the lower substrate is fixed (immobile and inflexible substrate) and the upper substrate is insulated and free to move in the vertical direction (mobile and inflexible substrate). The primary fluid flow is that of a fluid sample, such as the fuel flow or fuel-air mixture prior to combustion or flow of a biofluid in a fluidic cell. The upper layer of the thin film contains a secondary fluid flow parallel or counter to the primary fluid flow direction. This flow can have similar properties as the primary fluid flow. This insulating assembly is suitable for fluidic cell applications since inlet pressure pulsations will be equal across the intermediate substrate, thereby eliminating disturbances at the intermediate substrate. The secondary fluid flow, however, can have different properties than the primary fluid flow. For example, when the secondary fluid flow is initiated from external processes such as flow of combustion residuals or the engine coolant flow.

The heat flux of the upper substrate can be independent of the primary fluid flow or can be the result of external processes utilizing the primary fluid flow as in combustion processes. The latter can be used for controlling the primary fluid flow conditions while the former may model the increase in the ambient temperature in a fluidic cell application, thereby preventing an increase in the average fluid temperature in an ordinary fluidic cell avoiding a malfunctioning of a device such as a biosensor.

The sealing assembly of the upper layer contains flexible complex seals, closed cavities filled with a stagnant fluid having a relatively large volumetric thermal expansion coefficient. The upper layer also contains flexible seals in order to allow the intermediate substrate to move in the normal direction. Any excessive heating at the upper substrate results in an increase in the upper substrate's temperature such that the stagnant fluid becomes warmer and expands. This expansion along with the increase in inlet pressure in the upper layer, if present, causes the intermediate substrate to move downward. Thus, a compression in the film thickness of the lower layer is attained resulting in reduction in mass flow rate within the primary fluid flow compartment. This insulating assembly may be used to control combustion rates since part of the excessive heating and increased pressure due to deteriorated combustion conditions can be utilized to prescribe the heat flux at the upper substrate. Thus, the flow rate of the fuel in the primary fluid layer can be reduced and combustion is controlled.

Figure 25A:
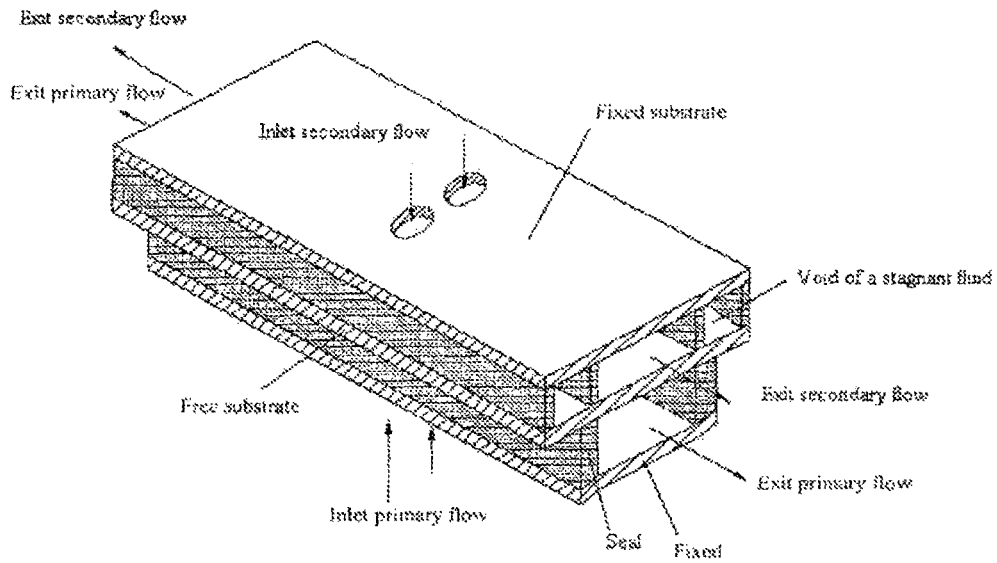
FIG. 25A is a 3D view of a schematic diagram for a two-layered thin film supported by flexible seals and flexible complex seals of the present invention.
Figure 25B:
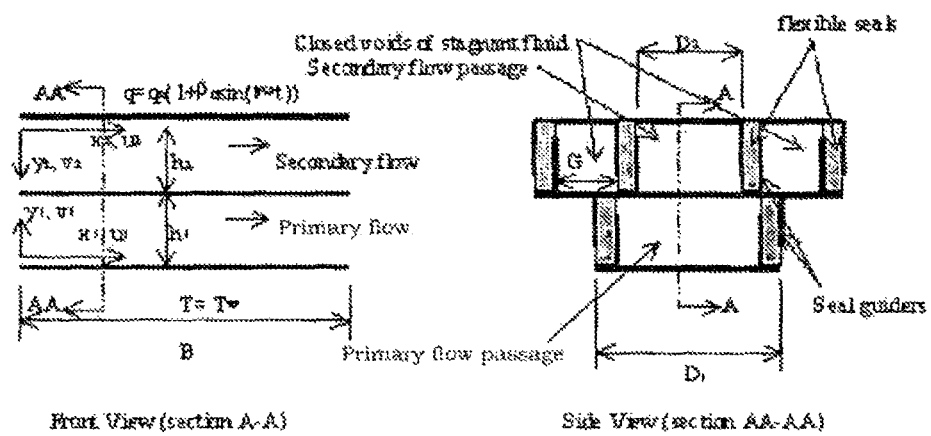
FIG. 25B shows the front and side views including the main boundary conditions of the schematic diagram for a two-layered thin film supported by flexible seals and flexible complex seals of the present invention.

In fluidic cells, excessive heating at the upper substrate causes compression to the primary fluid layer's thickness. Thus, average velocity in the primary fluid layer increases, when operated at constant flow rates, enhancing the convective heat transfer coefficient. This causes the average fluid temperature to approach the lower substrate temperature, thereby reducing the bimaterial effects. When it is operated at a constant pressure or at a constant velocity, the compression of the primary fluid layer due to excessive heating at the upper substrate reduces the flow rate. Thus, the fluid temperatures approach the lower substrate temperature at a shorter distance. As such, bimaterial effects are also reduced. The flexible seals can be placed between guiders as shown in FIG. 25B. The use of guiders for the flexible seals, including flexible complex seals, of the present invention minimizes side expansion and maximizes the transverse thin film thickness expansion.

As provided herein, upper and lower thin films that have small thicknesses $h_1$ and $h_2$, respectively, compared to their length B and their width $D_1$ and $D_2$, respectively, were analyzed. The x-axis for each layer is taken along the axial direction of the thin film while y-axis for each layer is taken along its thickness as shown in FIG. 25B. Further, the film thickness was assumed to be independent of the axial direction. For example, as in symmetric thin films having a fluid injected from the center as shown in FIG. 25A.

Both lower and upper substrates were assumed to be fixed (immobile and inflexible substrates) while the intermediate substrate was free to move only in the normal direction due to the use of flexible complex seals (mobile and inflexible substrate). The generic motion of the intermediate substrate due to both variations of the stagnant fluid temperature in the secondary fluid flow passage and the induced internal pressure pulsations within both primary fluid and secondary fluid flow passages is expressed according to the following Equation 41:

$$H_1 = \frac{h_1}{h_o} = (1 + H_T + H_P) \quad \text{Eq. 41}$$

wherein
$h_o$ is a reference thickness for the primary fluid passage;
$H_1$ is the dimensionless motion of the intermediate substrate;
$H_T$ is the dimensionless motion of the intermediate substrate due to the volumetric thermal expansion of the stagnant fluid; and
$H_p$ is the dimensionless motion of the intermediate substrate due to the deformation in seals as a result of the internal pressure.

The fluid was assumed to be Newtonian having constant average properties except for the thermal conductivity. The general two-dimensional continuity, momentum and energy equations for a laminar thin film are given as follows:

$$\frac{\partial u_i}{\partial x_i} + \frac{\partial v_i}{\partial y_i} = 0 \quad \text{Eq. 42}$$

$$\rho_i\left(\frac{\partial u_i}{\partial t} + u_i\frac{\partial u_i}{\partial x_i} + v_i\frac{\partial u_i}{\partial y_i}\right) = -\frac{\partial p_i}{\partial x_i} + \mu_i\left(\frac{\partial^2 u_i}{\partial x_i^2} + \frac{\partial^2 u_i}{\partial y_i^2}\right) \quad \text{Eq. 43}$$

$$\rho_i\left(\frac{\partial v_i}{\partial t} + u_i\frac{\partial v_i}{\partial x_i} + v_i\frac{\partial v_i}{\partial y_i}\right) = -\frac{\partial p_i}{\partial y_i} + \mu_i\left(\frac{\partial^2 v_i}{\partial x_i^2} + \frac{\partial^2 v_i}{\partial y_i^2}\right) \quad \text{Eq. 44}$$

$$(\rho c_p)_i\left(\frac{\partial T_i}{\partial t} + u_i\frac{\partial T_i}{\partial x_i} + v_i\frac{\partial T_i}{\partial y_i}\right) = \frac{\partial}{\partial x_i}\left(k_i\frac{\partial T_i}{\partial x_i}\right) + \frac{\partial}{\partial y_i}\left(k_i\frac{\partial T_i}{\partial y_i}\right) \quad \text{Eq. 45}$$

wherein
T is the fluid temperature;
u is the dimensional axial velocity;
v is the dimensional normal velocity;
ρ is the average fluid density;
p is pressure;
μ is the average fluid dynamic viscosity;
$c_p$ is the average specific heat of the fluid; and
k is the thermal conductivity of the fluid.

When the fluid contains suspended ultrafine particles, these properties will be for the resulting dilute mixture so long as the diameter of the particles is very small compared to $h_o$. The index "i" is "1" when analyzing the primary fluid layer while it is "2" when analyzing the secondary fluid layer. Equations 42-45 are non-dimensionalized using the following dimensionless variables:

$$X_i = \frac{x_i}{B} \quad \text{Eq. 46a}$$

-continued $$Y_i = \frac{y_i}{h_o} \quad \text{Eq. 46b}$$

$$\tau = \omega t \quad \text{Eq. 46c}$$

$$U_i = \frac{u_i}{(\omega B + V_{oi})} \quad \text{Eq. 46d}$$

$$V_i = \frac{v_i}{h_o \omega} \quad \text{Eq. 46e}$$

$$\Pi_i = \frac{p_i - p_{ei}}{\mu_i\left(\omega + \frac{V_{oi}}{B}\right)\varepsilon^{-2}} \quad \text{Eq. 46f}$$

$$\theta_1 = \frac{T_1 - T_{1o}}{(T_w - T_{1o})} \quad \text{Eq. 46g}$$

$$\theta_2 = \frac{T_2 - T_{2o}}{q_o h_o / k_{2o}} \quad \text{Eq. 46h}$$

wherein
ω is the reference frequency of the disturbance;
$T_{1o}$ is the inlet temperature for the primary fluid flow;
$T_{2o}$ is the inlet temperature for the secondary fluid flow;
$T_w$ is the lower substrate temperature;
$p_e$ is the reference pressure, which represents the exit pressure for both layers;
$q_o$ is the reference heat flux at the upper substrate;
$k_{2o}$ is the stagnant thermal conductivity of the secondary fluid;
$V_{oi}$ is the reference dimensional velocity for the lower layer;
$V_{o2}$ is the reference dimensional velocity for the upper layer; and
ε is the perturbation parameter, $$\varepsilon = \frac{h_o}{B}.$$

The prescribed heat at the upper substrate, $q_u$, as well as the dimensionless inlet pressure, $\Pi_{2n}$, for the secondary fluid flow vary according to the following generic relationships:

$$q_u = q_o(1 + \beta_q \sin(\gamma \omega t)) \quad \text{Eq. 47}$$

$$\Pi_{2n} = \Pi_{2o}(1 + \beta_p \sin(\gamma_p \omega t + \phi_p)) \quad \text{Eq. 48}$$

wherein
$\beta_q$ is the dimensionless amplitude of upper substrate's heat flux;
$\beta_p$ is the dimensionless amplitude for the inlet pressure for the secondary fluid flow;
γ is the dimensionless frequency for the upper substrate heat flux; and
$\gamma_p$ is the dimensionless frequency for the inlet pressure for the secondary fluid layer.

The variables $X_i$, $Y_i$, τ, $U_i$, $V_i$, $\Pi_i$, and $\theta_i$ are the dimensionless forms of $x_i$, $y_i$, t, $u_i$, $v_i$, $p_i$, and $T_i$ variables, respectively.

For the two-layered thin film shown in FIG. 25A, the displacement of the intermediate substrate due to internal pressure variations was related to the difference in the average dimensionless pressure across the intermediate substrate through the theory of the linear elasticity by:

$$H_p = E_1^* \frac{(\Pi_{AVG})_1}{\sigma_1} - E_2^* \frac{(\Pi_{AVG})_2}{\sigma_2} \qquad \text{Eq. 49}$$

wherein $(\Pi_{AVG})_1$ and $(\Pi_{AVG})_2$ are the average dimensionless pressure in the primary fluid and the secondary fluid layers, respectively. The parameter $E_i^*$ will be referred to as the softness index of the supporting seal in layers "1" or "2" and will be denoted as $E^*$ when $E_1^* = E_2^*$. It has the following functional form:

$$E_i^* = \frac{12L^* \mu_i \omega D_i}{K^* \varepsilon^3} \qquad \text{Eq. 50}$$

wherein $K^*$ is the effective stiffness of the seals that support the intermediate substrate. The dimensionless parameter $L^*$ is introduced to account for the elastic contribution of the intermediate substrate in the calculation of the displacement.

As provided herein, the analysis was performed for relatively small thermal load frequencies in order to ascertain that squeezing generated flows are in the laminar regime. For these frequencies, Equation 49 was applicable and the inertia effect of the intermediate substrate was negligible. Moreover, the increase in the thickness due to a pressure increase in the thin film causes a reduction in the stagnant fluid pressure. This action stiffens the insulating assembly. Therefore, the stiffness $K^*$ was considered to be the effective stiffness for the insulating assembly and not for the seal itself. From the practical point of view, the closed cavity width G was taken to be large enough such that a small increase in the stagnant fluid pressure due to the thermal expansion can support the associated increase in the elastic force on the seal.

The dimensionless displacement of the intermediate substrate due to the thermal expansion was related to the dimensionless average temperature of the upper substrate, $(\theta_u)_{AVG}$, by the following linearized model:

$$H_T = -F_T (\theta_u)_{AVG} \qquad \text{Eq. 51}$$

wherein $F_T$ is named the dimensionless thermal expansion parameter and is equal to:

$$F_T = A^* \frac{\beta_T q_o h_o}{k_{2o}} C_F \qquad \text{Eq. 52}$$

The coefficient $A^*$ depends on the closed cavities dimensions and their geometry. The parameter $\beta_T$ is the volumetric thermal expansion coefficient of the stagnant fluid in its approximate form:

$$\beta_T \approx \frac{1}{V_{so}} \frac{(V_s - V_{s1})}{(T_s - T_{2o})} \bigg|_{P_{s1}}$$

evaluated at the pressure $P_{s1}$ corresponding to the stagnant fluid pressure in the closed cavities when the secondary fluid flow temperature was kept at inlet temperature of the secondary fluid layer $T_{2o}$. The closed cavity volumes $V_{so}$, $V_{s1}$ and $V_s$ represent the closed cavity volume at the reference condition ($h_2 = h_p$), the closed cavity volume when the pressure in the closed cavities is $p_{s1}$ and the closed cavity volume at normal operating conditions where the average stagnant fluid temperature is $T_s$, respectively. The factor $C_F$ represents the volumetric thermal expansion correction factor. This factor was introduced in order to account for the increase in the stagnant pressure due to the increase in the elastic force in the seal during the expansion, which tends to decrease the effective volumetric thermal expansion coefficient. It approaches one as the closed cavity width G increases and it can be determined theoretically using methods known in the art.

The parameter $F_T$ is enhanced at elevated temperatures for liquids and at lower temperatures for gases because $\beta_T$ increases for liquids and decreases for gases as the temperature increases. Dimensionless thermal expansion parameter is further enhanced by a decrease in $k_o$, an increase in $q_o$, an increase in $E_i^*$ or an increase in $h_o$. Equation 51 is based on the assumption that the stagnant fluid temperature is similar to the average upper substrate temperature since closed cavity surfaces were considered insulated except for the region facing the upper substrate in order to provide a maximum volumetric thermal expansion to the closed cavities. Moreover, the heat flux on the upper substrate was assumed to be applied to the portion that faces the secondary fluid flow.

The thermal conductivity of the fluid was considered to vary with the flow speed in order to account for thermal dispersion effects when suspended ultrafine particles were present in the secondary fluid flow. Induced squeezing effects at the intermediate substrate due to time variations in the thermal load or inlet pulsative pressures were expected to enhance the heat transfer inside fluid layers due to thermal dispersion effects. To account for this increase, a linear model between the effective thermal conductivity and the fluid speed was utilized as provided by Equation 53. See Xuan & Roetzel (2000) Int. J. Heat and Mass Transfer 43:3701-3707, which is herein incorporated by reference.

$$k_i(X_i, Y_i, \tau) = (k_o)_i (1 + \lambda_i \sqrt{U^2(X_i, Y_i, \tau) + \Lambda_i^2 V^2(X_i, Y_i, \tau)}) = (k_o)_i \phi_i(X_i, Y_i, \tau) \qquad \text{Eq. 53}$$

wherein $\lambda_i$ and $\Lambda_i$ are the dimensionless thermal dispersion coefficient and reference squeezing to lateral velocity ratio which are:

$$\lambda_i = C_i^* (\rho c_p)_{fi} h_o (V_{oi} + \omega B) \qquad \text{Eq. 54a}$$

$$\Lambda_i = \frac{\varepsilon \sigma_i}{12} \qquad \text{Eq. 54b}$$

The coefficient $C^*$ depends on the diameter of the ultrafine particle, its volume fraction and both fluid and the particle properties. The parameter $(\rho c_p)_{fi}$ is the density times the specific heat of the fluid resulting from the mixture of the pure fluid and the ultrafine particles suspensions within the $i^{th}$ layer while $(k_o)_i$ is the stagnant thermal conductivity of the working fluid in the $i^{th}$ layer that contains ultrafine particles. This stagnant thermal conductivity is usually greater than the thermal conductivity of the pure fluid. See Eastman et al. (2001) Applied Physics Letters 78:718-720, which is herein incorporated by reference. All the fluid properties that appear in Equations 42-45 should be replaced by the effective mixture properties which are functions of the pure fluid and the particles and that the diameter of the ultrafine particles are so small that the resulting mixture behaves as a continuum fluid. See Xuan & Roetzel (2000) Int. J. Heat and Mass Transfer 43:3701-3707, which is herein incorporated by reference.

Flows inside thin films are in laminar regime and could be considered creep flows in certain applications as in lubrication and biological applications. Therefore, the low Reynolds numbers flow model was adopted and applied to Equations 42-44 and the results of dimensionalizing the energy equation result in the following reduced non-dimensionalized equations:

$$U_i = \frac{1}{2} \frac{\partial \Pi_i}{\partial X} H_i^2 \left(\frac{Y_i}{H_i}\right)\left(\frac{Y_i}{H_i} - 1\right) \qquad \text{Eq. 55}$$

$$V_i = \frac{dH_i}{d\tau}\left(3\left(\frac{Y_i}{H_i}\right)^2 - 2\left(\frac{Y_i}{H_i}\right)^3\right) \qquad \text{Eq. 56}$$

$$\frac{\partial \Pi_i}{\partial Y_i} = 0 \qquad \text{Eq. 57}$$

$$\frac{\partial}{\partial X_i}\left(H_i^3 \frac{\partial \Pi_i}{\partial X_i}\right) = \sigma_i \frac{\partial H_i}{\partial \tau} \qquad \text{Eq. 58}$$

$$(P_S)_i\left(\frac{\partial \theta_i}{\partial \tau} + \frac{12}{\sigma_i} U_i \frac{\partial \theta_i}{\partial X_i} + V_i \frac{\partial \theta_i}{\partial Y_i}\right) = \frac{\partial}{\partial Y_i}\left(\phi_i \frac{\partial \theta_i}{\partial Y_i}\right) \qquad \text{Eq. 59}$$

The axial diffusion term in the dimensionalized energy equation, Equation 59, is eliminated because it is of order $\epsilon^2$. The parameters $\sigma_i$ and $(P_S)_i$ are called the squeezing number and the thermal squeezing parameter, respectively, and are defined as:

$$\sigma_i = \frac{12}{1 + \frac{V_{oi}}{\omega B}} \qquad \text{Eq. 60a}$$

$$(P_s)_i = \frac{(\rho c_p)_i h_o^2 \omega}{k_i} \qquad \text{Eq. 60b}$$

The dimensionless thickness of the lower layer and the upper layer are defined as:

$$H_1 = \frac{h_1}{h_o} \qquad \text{Eq. 61a}$$

$$H_2 = \frac{h_2}{h_o} \qquad \text{Eq. 61b}$$

The reference thickness $h_o$ can be determined using the force balance across the intermediate substrate due to the flow exit pressures of both layers at static conditions using methods known in the art. The reference thickness $h_o$ can be controlled by either varying flow exit pressures for each layer prior injecting of both flows, by a proper selection to the undistorted thickness of the supporting seals in each layer or by using both, according to methods known in the art. Therefore, the dimensionless thicknesses $H_1$ and $H_2$ are related to each other through the following relation as both lower and upper substrates are fixed (immobile and inflexible substrates):

$$H_1 + H_2 = H_t \qquad \text{Eq. 62}$$

wherein $H_t$ is a constant representing the dimensionless total thickness of the two-layered thin film.

Two conditions will be imposed for the inlet flow rate of the primary fluid layer. In applications that require minimizations of thermal effects due to an increase in heat transfer from the environment such as for fluidic cells of biological and chemical sensing devices, the inlet flow rate for the lower layer is assumed to be constant and referred to as the CIF condition. However, constant inlet pressure was assumed to model flow of fluids in combustion applications such as flow of fuel prior to the mixing section and is referred as the CIP condition. The previously defined reference velocities $V_{o1}$ and $V_{o2}$ represent the velocity in the flow passages at zero values of the parameters $E_1^*$, $E_2^*$ and $F_T$. Accordingly, the inlet dimensionless pressures vary with the squeezing numbers according to following relations for the CIP condition:

$$\Pi_{1n} = 12 - \sigma_1 \qquad \text{Eq. 63}$$

$$\Pi_{2n} = (12 - \sigma_2)(1 + \beta_p \sin(\gamma_p \tau + \varphi_p)) \qquad \text{Eq. 64}$$

Therefore, the solution of the Reynolds equations for the CIP condition will reveal the following relationships for the dimensionless pressure gradient, the dimensionless pressure and the average dimensionless pressure $\Pi_{AVG}$ inside lower and upper layers:

$$\frac{\partial \Pi_1(X_1, \tau)}{\partial X_1} = \frac{\sigma_1}{H_1^3} \frac{dH_1}{d\tau}\left(X_1 - \frac{1}{2}\right) - (12 - \sigma_1) \qquad \text{Eq. 65a}$$

$$\frac{\partial \Pi_2(X_2, \tau)}{\partial X_2} = \qquad \text{Eq. 66}$$
$$\frac{\sigma_2}{H_2^3} \frac{dH_2}{d\tau}\left(X_2 - \frac{1}{2}\right) - (12 - \sigma_2)(1 + \beta_p \sin(\gamma_p \tau + \varphi_p))$$

$$\Pi_1(X_1, \tau) = \frac{\sigma_1}{2H_1^3} \frac{dH_1}{d\tau}(X_1^2 - X_1) - (12 - \sigma_1)(X_1 - 1) \qquad \text{Eq. 67a}$$

$$\Pi_2(X_2, \tau) = \qquad \text{Eq. 68}$$
$$\frac{\sigma_2}{2H_2^3} \frac{dH_2}{d\tau}(X_2^2 - X_2) - (12 - \sigma_2)(X_2 - 1)(1 + \beta_p \sin(\gamma_p \tau + \varphi_p))$$

$$(\Pi_{AVG}(\tau))_1 = -\frac{\sigma_1}{12 H_1^3} \frac{dH_1}{d\tau} + \frac{(12 - \sigma_1)}{2} \qquad \text{Eq. 69a}$$

$$(\Pi_{AVG}(\tau))_2 = -\frac{\sigma_2}{12 H_2^3} \frac{dH_2}{d\tau} + \frac{(12 - \sigma_2)}{2}(1 + \beta_p \sin(\gamma_p \tau + \varphi_p)) \qquad \text{Eq. 70}$$

For the CIF condition, the dimensionless pressure gradient, the dimensionless pressure and the average dimensionless pressure $\Pi_{AVG}$ inside lower layer were changed to the following:

$$\frac{\partial \Pi_1(X_1, \tau)}{\partial X_1} = \frac{\sigma_1}{H_1^3} \frac{dH_1}{d\tau} X_1 - \frac{(12 - \sigma_1)}{H_1^3} \qquad \text{Eq. 65b}$$

$$\Pi_1(X_1, \tau) = \frac{\sigma_1}{2H_1^3} \frac{dH_1}{d\tau}(X_1^2 - 1) - \frac{(12 - \sigma_1)}{H_1^3}(X_1 - 1) \qquad \text{Eq. 67b}$$

$$(\Pi_{AVG}(\tau))_1 = -\frac{\sigma_1}{3 H_1^3} \frac{dH_1}{d\tau} + \frac{(12 - \sigma_1)}{2 H_1^3} \qquad \text{Eq. 69b}$$

3B. Thermal Boundary Conditions

The dimensionless initial and thermal boundary conditions for the previously defined problem were taken as follows:

$$\theta_1(X_1, Y_1, 0) = 0, \quad \theta_1(0, Y_1, \tau) = 0, \qquad \text{Eq. 71}$$
$$\theta_1(X_1, 0, \tau) = 1, \quad \frac{\partial \theta_1(X_1, H_1, \tau)}{\partial Y_1} = 0$$

$$\theta_2(X_2, Y_2, 0) = 0, \quad \theta_2(0, Y_2, \tau) = 0, \qquad \text{Eq. 72}$$
$$\frac{\partial \theta_2(X_2, 0, \tau)}{\partial Y_2} = -(1 + \beta_q \sin(\gamma \tau)), \quad \frac{\partial \theta_2(X_2, H_2, \tau)}{\partial Y_2} = 0$$

Based on physical conditions, the intermediate substrate was taken to be insulated and the Nusselt number at the lower and the upper substrates are defined as:

$$Nu_l(X_1, \tau) \equiv \frac{h_{cl}h_o}{k_1} = -\frac{1}{1-\theta_{1m}}\frac{\partial \theta_1(X_1, 0, \tau)}{\partial Y_1} \quad \text{Eq. 73}$$

$$Nu_u(X_2, \tau) \equiv \frac{h_{cu}h_o}{k_2} =$$
$$\frac{1}{\theta_2(X_2, 0, \tau) - \theta_{2m}(X_2, \tau)} = \frac{1}{\theta_u(X_2, \tau) - \theta_{2m}(X_2, \tau)} \quad \text{Eq. 74}$$

wherein $h_{cl}$ and $h_{cu}$ are the convective heat transfer coefficients for the lower and upper substrates, respectively.

The quantities $\theta_{im}$ and $U_{im}$ are the sectional dimensionless mean bulk temperature and the dimensionless average velocity for the $i^{th}$ layer and are given as:

$$\theta_{im}(X_i, \tau) = \frac{1}{U_{im}(X_i, \tau)H_i}\int_0^{H_i} U_i(X_i, Y_i, \tau)\theta_i(X_i, Y_i, \tau)dY_i \quad \text{Eq. 75}$$

$$U_{im}(X_i, \tau) = \frac{1}{H_i}\int_0^{H_i} U_i(X_i, Y_i, \tau)dY_i$$

wherein $U_{im}$ is the dimensionless average velocity at a given section for the $i^{th}$ layer. For the primary fluid passage, the dimensionless heat flux at a given section is defined as follows:

$$\Theta(X_1, \tau) = -\frac{\partial \theta_1(X_1, 0, \tau)}{\partial Y_1} \quad \text{Eq. 76}$$

3C. Dimensionless Flow Rate Parameter for the Primary Fluid Layer

The obtained dimensionless film thickness for the primary fluid layer $H_1$ can be used to determine the dimensionless flow rate of the fluid in the primary fluid passage at the mid section for the CIP condition. The latter is an important parameter should be controlled and is referred to as $\Psi_{X=0.5}$ where $X=0.5$ denotes the location at $X_1=0.5$. This parameter can be calculated from the following relation:

$$\Psi_{X=0.5} = \frac{Q_{X=0.5}}{(V_{o1} + \omega B)h_o} = \frac{(12-\sigma_1)}{12}H_1^3 \quad \text{Eq. 77}$$

wherein $Q_{X=0.5}$ is the dimensional flow rate at $X=0.5$ in the main thin film.

3D. Numerical Procedure

The procedure for the numerical solution is summarized as follows:

1. Initially, a value for $H_T$ is assumed.
2. The dimensionless thicknesses for the lower and upper layers H1 and H2 are determined by solving Equations 41, 49, 62, 69, and 70 simultaneously, using an explicit formulation. The velocity field, Ui and Vi, is then determined from Equations 55, 56, 65, and 66.
3. Reduced energy equations, Equation 59, are solved by first transferring them to a constant boundary domain using the following transformations: $\tau^*=\tau$, $\xi I=Xi$ and $$\eta_i = \frac{Y_i}{H_i}.$$

Tri-diagonal algorithm was implemented along with a marching scheme. See Blottner (1970) AIAA J. 8:193-205, which is herein incorporated by reference. Backward differencing was chosen for the axial convective and transient terms and central differencing was selected for the derivatives with respect to $\eta_i$. The values of 0.008, 0.03, 0.001 were chosen for $\Delta\xi i$, $\Delta\eta i$ and $\Delta\tau^*$, respectively.

4. HT is updated from Equation 51 and steps (2) to (4) is repeated until:

$$\left|\frac{(H_T)_{new} - (H_T)_{old}}{(H_T)_{new}}\right| < 10^{-6} \quad \text{Eq. 78}$$

5. The solution for the flow and heat transfer inside the two layers is determined.
6. Time is advanced by $\Delta\tau^*$ and steps (1) to (5) are repeated.

Numerical investigations were performed using different mesh sizes and time steps to assess and ascertain grid and time step independent results. Any reduction in the values of $\Delta\xi$, $\Delta\eta$ and $\Delta\tau^*$ below $\Delta\xi=0.008$, $\Delta\eta=0.03$ and $\Delta\tau^*=0.001$ cause less than about 0.2 percent error in the results.

The maximum value of the parameters $P_S$ is chosen to be 1.0. Beyond this value, the error associated with the low Reynolds number model will increase for moderate values of the dimensionless thermal expansion parameter, softness index of the seals, and the Prandtl number. As an example, the order of transient and convective terms in the momentum equations is expected to be less than 5.0 percent that of the diffusive terms for $P_S=1.0$, $Pr=6.7$, $E_1^*=E_2^*=0.3$, $F_T=0.15$, $\beta_q=0.2$ and $\sigma_1=3.0$, $\sigma_2=6.0$. The parameters correspond, for example, to a main thin film filled with water and having $B=D=60$ mm, $h_o=0.3$ mm, $\omega=1.7$ s$^{-1}$, $V_o=0.1$ m/s and $K^*=33000$ N/m.

3E. Discussions of the Results

Ideal gases produce about a 15 percent increase in the closed cavity volume under typical room conditions for a 45° C. temperature difference. Further, about a 60 percent increase in the convective heat transfer coefficient for about a 2 percent volume fraction of copper ultrafine particles has been reported. See Li & Xuan (2002) Science in China (Series E) 45:408-416, which is herein incorporated by reference. Accordingly, the parameters $F_T$ and $\lambda_2$ were varied until comparable changes have been attained in the dimensionless thin film thickness and the Nusselt number.

3F. Softness Index and Thermal Expansion Parameters of the Seal

Figure 26A:
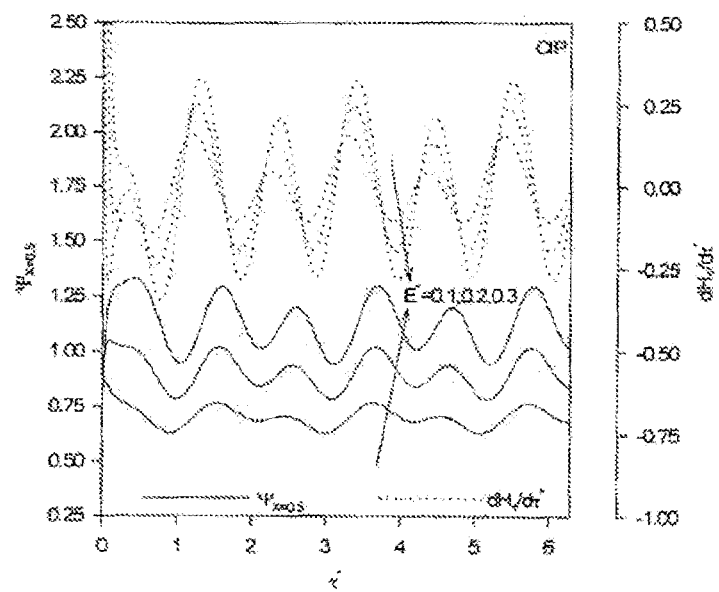
FIG. 26A shows the effects of $E^*$ on $\Psi_{X=0.5}$ and $dH_1/d\tau^*$ ($H_t$=2.0, $E_1^*$=$E_2^*$=$E^*$, $F_T$=0.15, $P_{S1}$=$P_{S2}$=1.0, $\beta_p$=0.3, $\beta_q$=0.2, $\phi_p$=$\pi$/2, $\gamma$=3.0, $\gamma_p$=6.0, $\lambda_1$=$\lambda_2$=0, $\sigma_1$=3.0, $\sigma_2$=6.0).
Figure 26B:
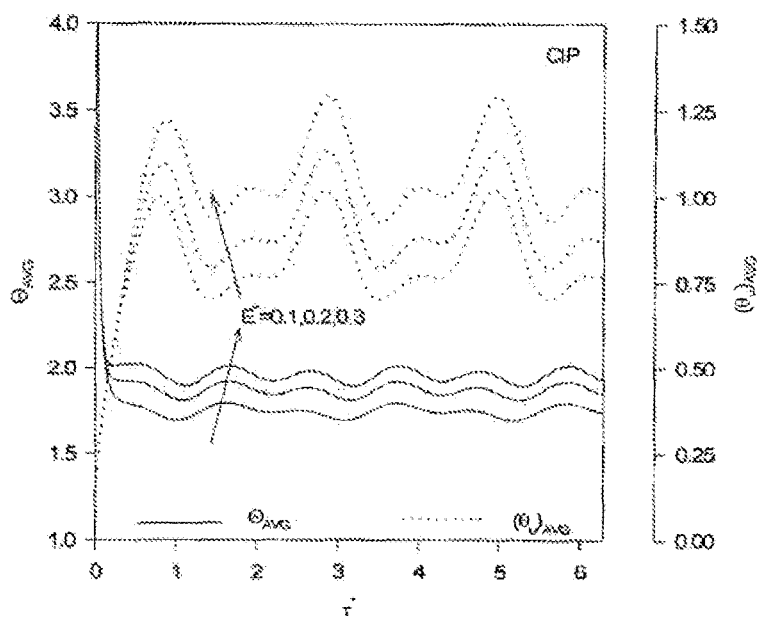
FIG. 26B shows the effects of $E^*$ on $\Theta_{AVG}$ and $(\theta_u)_{AVG}$ ($H_t$=2.0, $E_1^*$=$E_2^*$=$E^*$, $F_T$=0.15, $P_{S1}$=$P_{S2}$=1.0, $\beta_p$=0.3, $\beta_q$=0.2, $\phi_p$=$\pi$/2, $\gamma$=3.0, $\gamma_p$=6.0, $\lambda_1$=$\lambda_2$=0, $\sigma_1$=3.0, $\sigma_2$=6.0).

FIG. 26 illustrates the effects of the softness index of the seals of the present invention on the dynamics and thermal characterizations of a two-layered thin film operating at the CIP condition. The softness index was considered to be equal for both layers, denoted by E* and corresponds to the case when both lower and upper layers fluids are identical. As the softness index E* increases, the dimensionless flow rate parameter for the primary fluid layer $\Psi_{X=0.5}$ increases as described by the solid lines displayed in FIG. 26A. This is expected for cases where the average pressure of the lower layer is greater than that of the upper layer. Meanwhile the disturbance in the primary fluid layer thickness increases as E* increases as depicted by the dotted line shown in FIG. 26B. This phenomenon can be utilized in enhancing the cooling due to thermal dispersion in the secondary fluid flow as proposed by Equation 53. On the other hand, these disturbances may cause malfunctioning of any sensing devices placed in the flow passage since both flow dynamical effects and chemical reactions will be affected. The increase in $\Psi_{X=0.5}$ as E* increases causes an increase in the average dimensionless heat transfer $\Theta_{AVG}$ in the primary fluid layer and an increase in the average upper substrate temperature $(\theta_u)_{AVG}$ as shown in FIG. 26B due to the shrinkage in the upper layer.

Figure 27A:
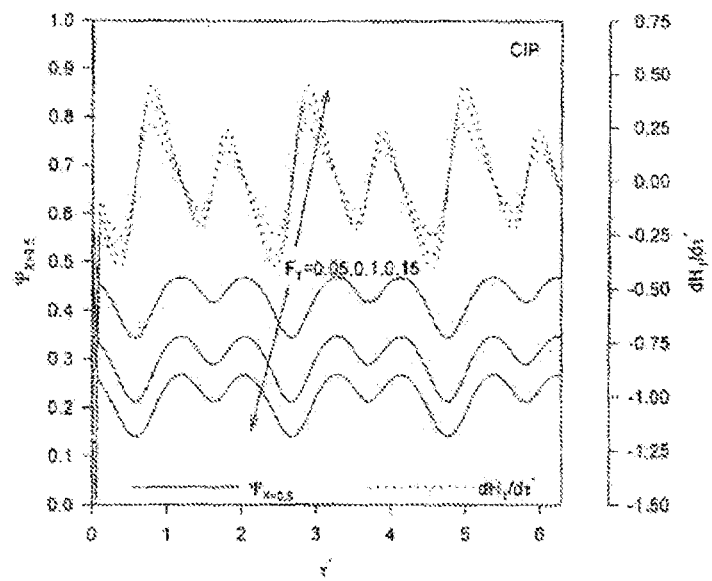
FIG. 27A shows the effects of $F_T$ on $\Psi_{X=0.5}$ and $dH_1/d\tau^*$ ($H_t$=2.0, $E_1^*$=0.3, $E_2^*$=0.003, $P_{S1}$=1.0, $P_{S2}$=0.012, $\beta_p$=0.3, $\beta_q$=0.2, $\phi_p$=$\pi$/2, $\gamma$=3.0, $\gamma_p$=6.0, $\lambda_1$=$\lambda_2$=0, $\sigma_1$=6.0, $\sigma_2$=1.0).
Figure 27B:
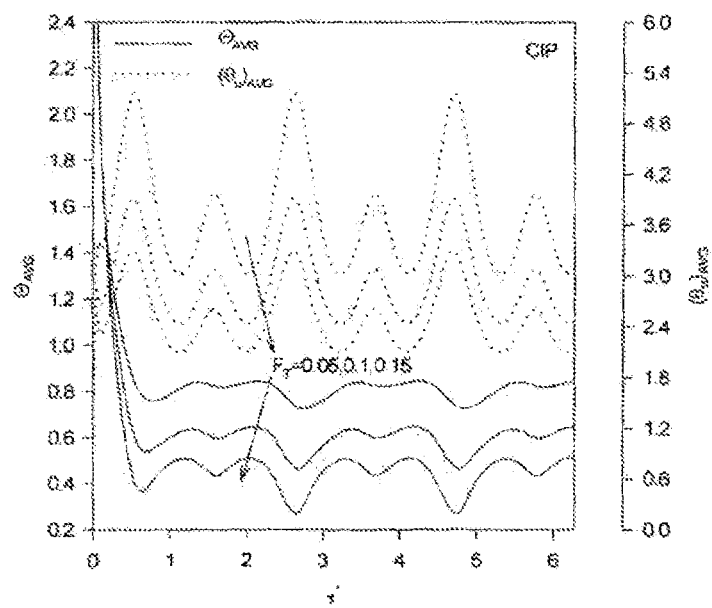
FIG. 27B shows the effects of $F_T$ on $\Theta_{AVG}$ and $(\theta_u)_{AVG}$ ($H_t$=2.0, $E_1^*$=0.3, $E_2^*$=0.003, $P_{S1}$=1.0, $P_{S2}$=0.012, $\beta_p$=0.3, $\beta_q$=0.2, $\phi_p$=$\pi$/2, $\gamma$=3.0, $\gamma_p$=6.0, $\lambda_1$=$\lambda_2$=0, $\sigma_1$=6.0, $\sigma_2$=1.0).
Figure 28:
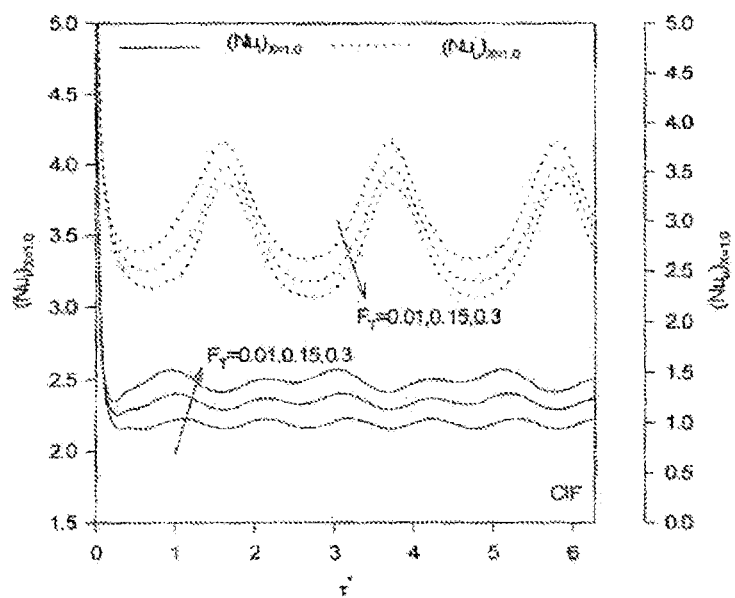
FIG. 28 shows the effects of $F_T$ on Nusselt numbers for primary and secondary flows: (primary flow maintained at a CIF condition, $H_t$=2.0, $E_1^*$=$E_2^*$=$E^*$=0.2, $P_{S1}$=$P_{S2}$=1.0, $\beta_p$=0.3, $\beta_q$=0.2, $\phi_p$=$\pi$/2, $\gamma$=3.0, $\gamma_p$=6.0, $\lambda_1$=$\lambda_2$=0, $\sigma_1$=3.0, $\sigma_2$=6.0).

For the CIP condition, the increase in the dimensionless thermal expansion parameter $F_T$ of the upper flexible complex seals causes a reduction in $\Psi_{X=0.5}$ values and an increase in the disturbance at intermediate substrate. Consequently, the parameters $\Theta_{AVG}$ and $(\theta_u)_{AVG}$ decrease as $F_T$ increases. These observations are shown in FIG. 27, which corresponds to a parametric case with water as the primary fluid while the secondary fluid is taken to be air. For CIF condition, the compression in the primary fluid layer film thickness increases the flow near the lower and intermediate substrates, thereby enhancing the thermal convection as illustrated in FIG. 28. As a result, thermally developed conditions are achieved within shorter distance from the inlet as $F_T$ increases. This alleviates thermal effects such as bimaterial effects in sensors.

3G. Role of the Squeezing and Thermal Squeezing Parameters

Figure 29A:
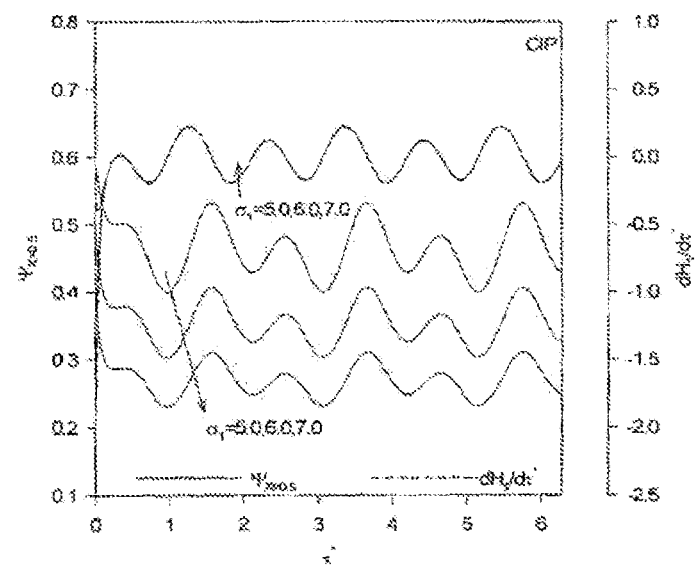
FIG. 29A shows the effects of $\sigma_1$ on $\Psi_{X=0.5}$ and $dH_1/d\tau^*$ ($H_t$=2.0, $E_1^*$=$E_2^*$=$E^*$=0.2, $F_T$=0.15, $P_{S1}$=$P_{S2}$=1.0, $\beta_p$=0.3, $\beta_q$=0.2, $\phi_p$=$\pi$/2, $\gamma$=3.0, $\gamma_p$=6.0, $\lambda_1$=$\lambda_2$=0, $\sigma_2$=6.0).
Figure 29B:
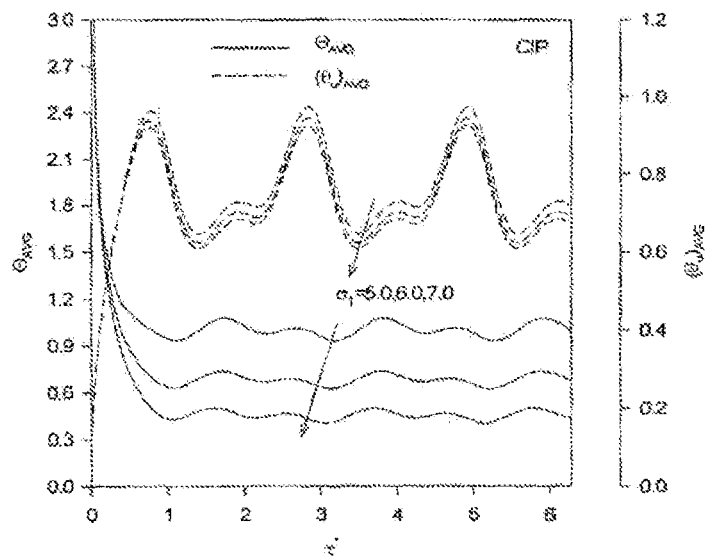
FIG. 29B shows the effects of $\sigma_1$ on $\Theta_{AVG}$ and $(\theta_u)_{AVG}$ ($H_t$=2.0, $E_1^*$=$E_2^*$=$E^*$=0.2, $F_T$=0.15, $P_{S1}$=$P_{S2}$=1.0, $\beta_p$=0.3, $\beta_q$=0.2, $\phi_p$=$\pi$/2, $\gamma$=3.0, $\gamma_p$=6.0, $\lambda_1$=$\lambda_2$=0, $\sigma_2$=6.0).

As the squeezing number for the primary fluid flow passage increases, the net pressure force on the intermediate substrate decreases as dictated by Equation 49. Therefore, the primary fluid layer film thickness decreases causing a reduction in the values of $\Psi_{X=0.5}$, $\Theta_{AVG}$ and $(\theta_u)_{AVG}$ as shown in FIG. 29. The disturbance at the intermediate substrate, variation in $dH_1/d\tau$, decreases slightly as $\sigma_1$ increases as shown in FIG. 29A. This phenomenon is ascribed to the fact that the relief in the thickness of the upper layer tend to minimize the effects of the internal pressure pulsations on the moving substrate. See FIG. 26A.

Figure 30A:
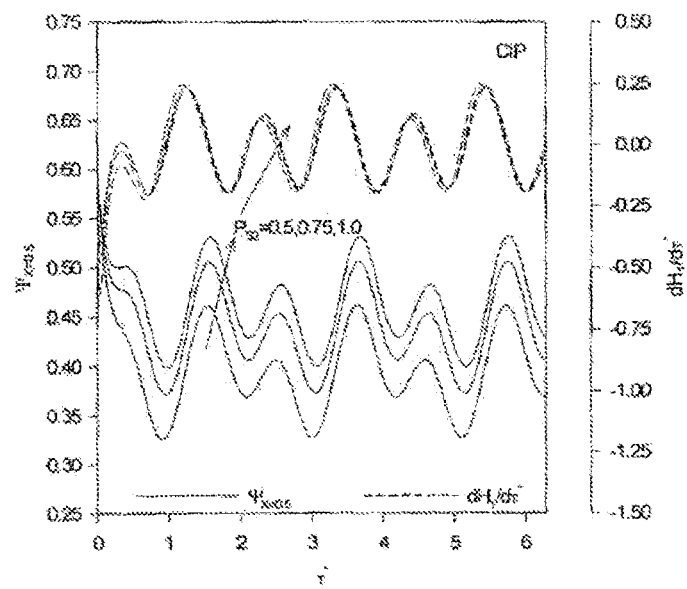
FIG. 30A shows the effects of $P_{S2}$ on $\Psi_{X=0.5}$ and $dH_1/d\tau^*$ ($H_t$=2.0, $E_1^*$=$E_2^*$=$E^*$=0.2, $F_T$=0.15, $P_{S1}$=1.0, $\beta_p$=0.3, $\beta_q$=0.2, $\phi_p$=$\pi$/2, $\gamma$=3.0, $\gamma_p$=6.0, $\lambda_1$=$\lambda_2$=0, $\sigma_1$=5.0, $\sigma_2$=6.0).
Figure 30B:
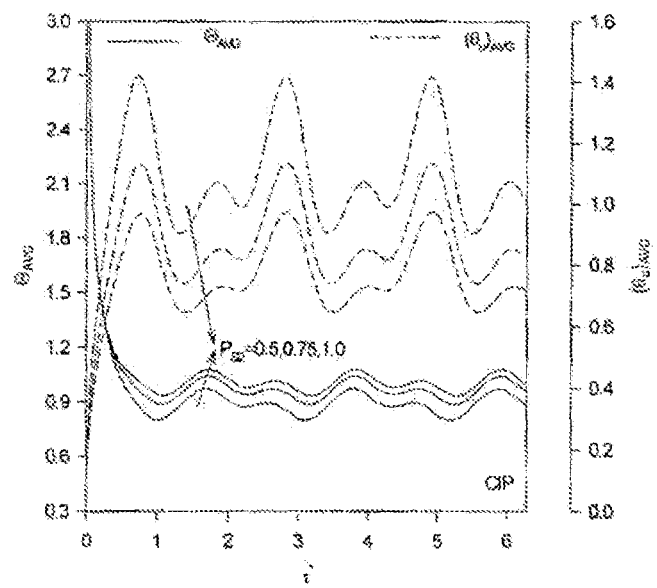
FIG. 30B shows the effects of $P_{S2}$ on $\Theta_{AVG}$ and $(\theta_u)_{AVG}$ ($H_t$=2.0, $E_1^*$=$E_2^*$=$E^*$=0.2, $F_T$=0.15, $P_{S1}$=1.0, $\beta_p$=0.3, $\beta_q$=0.2, $\phi_p$=$\pi$/2, $\gamma$=3.0, $\gamma_p$=6.0, $\lambda_1$=$\lambda_2$=0, $\sigma_1$=5.0, $\sigma_2$=6.0).
Figure 31:
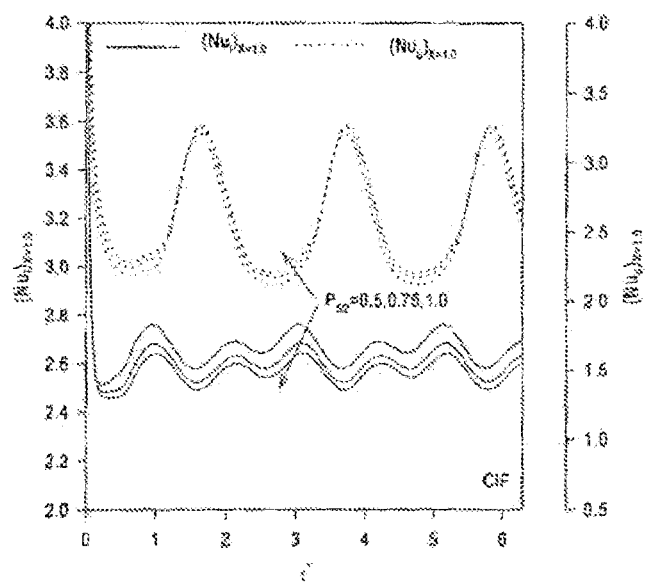
FIG. 31 shows the effects of $P_{S2}$ on Nusselt numbers for primary and secondary flows: (primary flow maintained at a CIF condition, $H_t$=2.0, $E_1^*$=$E_2^*$=0.2, $F_T$=0.15, $P_{S1}$=1.0, $\beta_p$=0.3, $\beta_q$=0.2, $\phi_p$=$\pi$/2, $\gamma$=3.0, $\gamma_p$=6.0, $\lambda_1$=$\lambda_2$=0, $\sigma_1$=5.0, $\sigma_2$=6.0).

The increase in the value of the thermal squeezing parameter $P_{S2}$ of the upper layer causes an enhancement in the upper substrate cooling as shown by reductions in $(\theta_u)_{AVG}$ in FIG. 30B. By introducing salt concentrations or due to the presence of scales, suspensions as a result of corrosion in different components or from incomplete combustion, in the secondary fluid, the value of $P_{S2}$ can be altered, thereby causing an increase in $E_2^*$ which can be kept constant by selecting the upper layer width $D_2$ using methods known in the art. Due to reductions in $(\theta_u)_{AVG}$ as $P_{S2}$ increases, the upper layer film thickness decreases allowing for more flooding in the primary fluid layer. Thus, the average heat transfer in the primary fluid layer increases as $P_{S2}$ increases. See FIG. 30. The variation in $dH_1/d\tau$ decreases slightly as $P_{S2}$ increases due to reductions in $H_T$ noting that the intermediate substrate becomes more stable for the effects that makes it closer to either the upper or lower substrates for a given softness index. The increase in the cooling of the upper layer due to an increase in $P_{S2}$ causes a relief in the primary fluid layer film thickness resulting in a reduction in its Nusselt number. See FIG. 31 for the CIF condition. Accordingly, the main inlet temperature is converted further downstream which may increase noise levels due bimaterial effects of certain sensors.

3H. Role of Thermal Dispersion Due to Ultrafine Suspensions

Figure 32A:
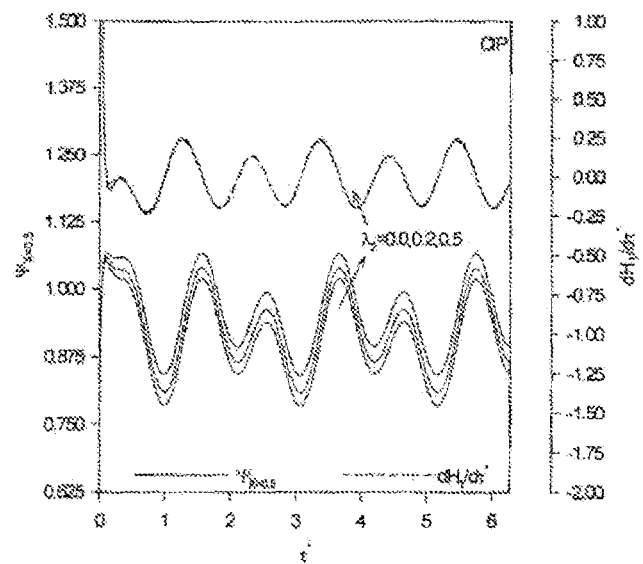
FIG. 32A shows the effects of $\lambda_2$ on $\Psi_{X=0.5}$ and $dH_1/d\tau^*$ (primary flow maintained at a CIP condition, $H_t$=2.0, $E_1^*$=$E_2^*$=$E^*$=0.2, $F_T$=0.15, $P_{S1}$=$P_{S2}$=1.0, $\beta_p$=0.3, $\beta_q$=0.2, $\phi_p$=$\pi$/2, $\gamma$=3.0, $\gamma_p$=6.0, $\lambda_1$=0, $\sigma_1$=3.0, $\sigma_2$=6.0).
Figure 32B:
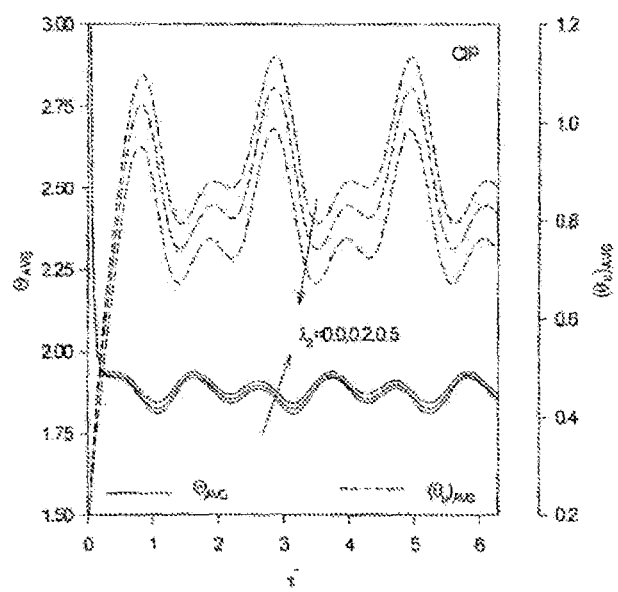
FIG. 32B shows the effects of $\lambda_2$ on $\Theta_{AVG}$ and $(\theta_u)_{AVG}$ (primary flow maintained at a CIP condition, $H_t$=2.0, $E_1^*$=$E_2^*$=$E^*$=0.2, $F_T$=0.15, $P_{S1}$=$P_{S2}$=1.0, $\beta_p$=0.3, $\beta_q$=0.2, $\phi_p$=$\pi$/2, $\gamma$=3.0, $\gamma_p$=6.0, $\lambda_1$=3.0, $\lambda_2$=6.0).
Figure 33A:
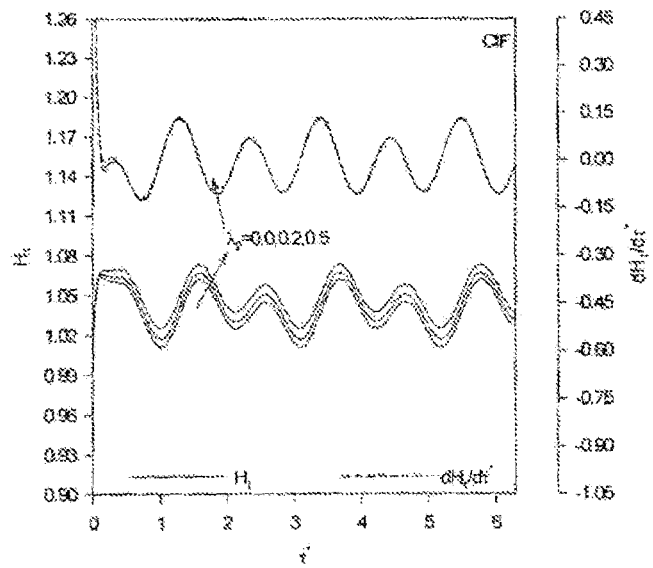
FIG. 33A shows the effects of $\lambda_2$ on $\Psi_{X=0.5}$ and $dH_1/d\tau^*$ (primary flow maintained at a CIF condition, $H_t$=2.0, $E_1^*$=$E_2^*$=$E^*$=0.2, $F_T$=0.15, $P_{S1}$=$P_{S2}$=1.0, $\beta_p$=0.3, $\beta_q$=0.2, $\phi_p$=$\pi$/2, $\gamma$=3.0, $\gamma_p$=6.0, $\lambda_1$=0, $\sigma_1$=3.0, $\sigma_2$=6.0).
Figure 33B:
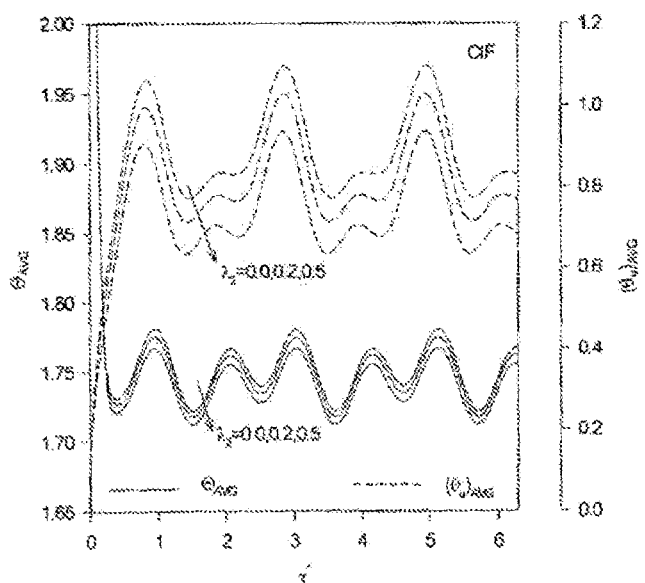
FIG. 33B shows the effects of $\lambda_2$ on $\Theta_{AVG}$ and $(\theta_u)_{AVG}$ (primary flow maintained at a CIF condition, $H_t$=2.0, $E_1^*$=$E_2^*$=$E^*$=0.2, $F_T$=0.15, $P_{S1}$=$P_{S2}$=1.0, $\beta_p$=0.3, $\beta_1$=0.2, $\phi_p$=$\pi$/2, $\gamma$=3.0, $\gamma_p$=6.0, $\lambda_1$=0, $\sigma_1$=3.0, $\sigma_2$=6.0).

Due to their random motions, ultrafine particles tend to increase the heat exchange within the fluid causing the thermal dispersion effect. Therefore, as the dimensionless thermal dispersion parameter $\lambda$ increases, the thermal conductivity increases causing the upper substrate temperature $(\theta_u)_{AVG}$ to decrease. Thus, in turn, the values of $\Psi_{X=0.5}$ and $\Theta_{AVG}$ are increased while variations in $dH_1/d\tau$ are decreased as $\lambda$ increases. See FIG. 32 for the CIP condition. As such, the stability of the intermediate substrate is enhanced in the presence of dispersive flows. For the CIF condition, the relief in the primary fluid layer film thickness due to an increase in $\lambda$, as shown in FIG. 33A, reduces the convective heat transfer coefficient of the primary fluid layer. Thus, a decrease in $\Theta_{AVG}$ is associated as shown in FIG. 33B.

3I. Role of Pulsation Frequency and Total Thickness of the Two Layers

Figure 34:
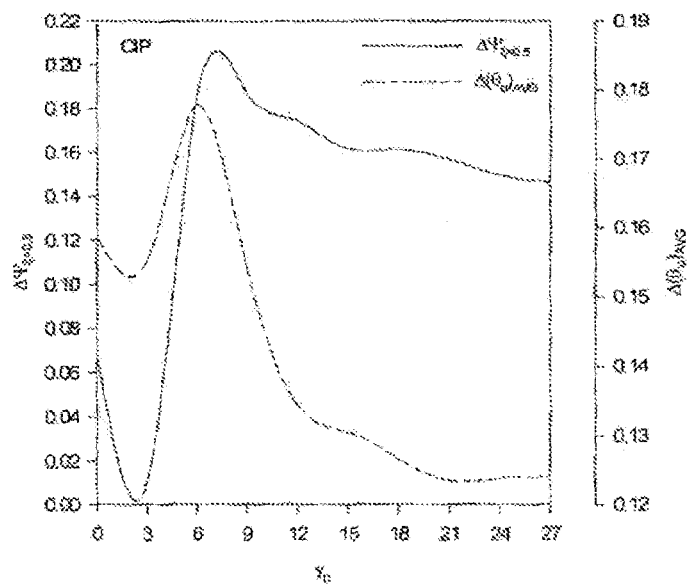
FIG. 34 shows the effects of $\gamma_p$ on $\Delta\Psi_{X=0.5}$ and $\Delta(\theta_u)_{AVG}$ for the CIP condition ($H_t$=2.0, $E_1^*$=$E_2$=$E^*$=0.3, $F_T$=0.3, $P_{S1}$=$P_{S2}$=1.0, $\beta_p$=0.3, $\beta_q$=0.2, $\phi_p$=$\pi$/2, $\gamma$=3.0, $\lambda_1$=$\lambda_2$=0, $\sigma_1$=3.0, $\sigma_2$=6.0).

FIG. 34 shows the effects the frequency of pressure pulsation $\gamma_p$ on fluctuations of $\Psi_{X=0.5}$ and $(\theta_u)_{AVG}$. These fluctuations are defined as:

$$\Delta \Psi_{X=0.5} = \frac{(\Psi_{X=0.5})_{max} - (\Psi_{X=0.5})_{min}}{2} \quad \text{Eq. 79a}$$

$$\Delta \Theta_{AVG} = \frac{(\Theta_{AVG})_{max} - (\Theta_{AVG})_{min}}{2} \quad \text{Eq. 79b}$$

wherein the maximum and minimum values corresponds to the steady periodic values.

Figure 35:
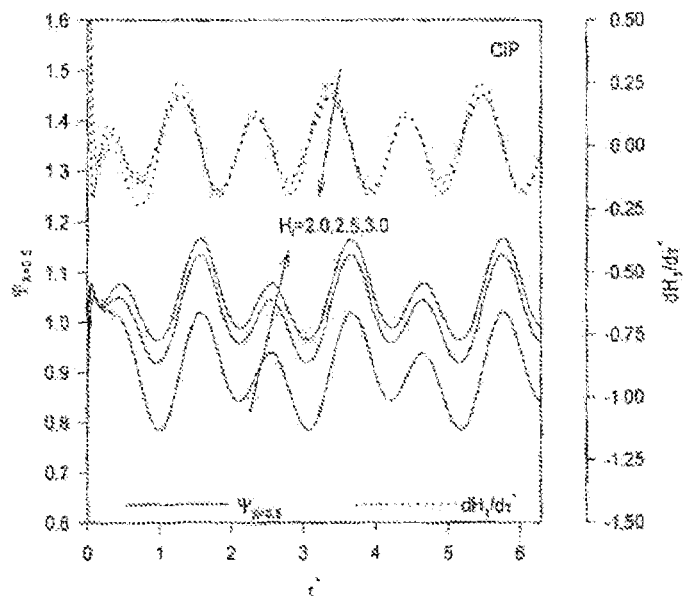
FIG. 35 shows the effects of $H_t$ on $\Psi_{X=0.5}$ and $dH_1/d\tau^*$ (primary flow maintained at a CIP condition, $E_1^*$=$E_2^*$=$E^*$=0.2, $F_T$=0.15, $P_{S1}$=$P_{S2}$=1.0, $\beta_p$=0.3, $\beta_q$=0.2, $\phi_p$=$\pi$/2, $\gamma$=3.0, $\gamma_p$=6.0, $\lambda_1$=$\lambda_2$=0, $\sigma_1$=3.0, $\sigma_2$=6.0).

It should be noted that $\Delta \Psi_{X=0.5}$ and $\Delta \Theta_{AVG}$ are unpredictable at relatively lower frequencies of pulsations and the primary fluid layer becomes more stable for large values of $\gamma_p$. See FIG. 34. FIG. 35 shows that the reduction in the primary fluid layer flow rate decreases as the dimensionless total thickness $H_t$ increases. This is because more cooling is expected to the upper substrate as $H_t$ increases resulting in reducing the volumetric thermal expansion effects of the stagnant fluid. As such, the fluctuating rate at the intermediate substrate is reduced as $H_t$ increases for the selected range as shown in FIG. 35.

4. Cooling Enhancements in Thin Films Supported by Flexible Complex Seals in the Presence of Ultrafine Suspensions As provided herein, flow and heat transfer inside thin films supported by flexible complex seals, flexible seals having closed cavities of a stagnant fluid possessing a large coefficient of volumetric thermal expansion $\beta_T$, were studied in the presence of suspended ultrafine particles and under periodically varying thermal load conditions. The governing continuity, momentum and energy equations are non-dimensionalized and reduced to simpler forms. The deformation of the seal is related to the internal pressure and lower substrate's temperature based on the theory of linear elasticity and a linearized model for thermal expansion. As provided herein, enhancements in the cooling may be achieved by an increase in the volumetric thermal expansion coefficient, thermal load, thermal dispersion effects, and softness of the supporting seals and the thermal capacitance of the coolant fluid. Further, thermal dispersion effects were found to increase the stability of the thin film. The noise in the thermal load was found to affect the amplitude of the thin film thickness, Nusselt number and the lower substrate temperature; however, it had a negligible effect on the mean values.

Thin films are widely used in cooling of many heating sources such as electronic components. These elements are used in thin films in cooling systems such as in flat heat pipes or microchannel heat sinks. See Moon et al. (2000) Int. J. Microcircuits and Electronic Packaging 23:488-493, Fedorov & Viskanta (2000) Int. J. Heat and Mass Transfer 43:399-415, and Zhu & Vafai (1999) Int. J. Heat and Mass Transfer 42:2287-2297, which are herein incorporated by reference. A two phase flow in microchannel is capable of removing maximum heat fluxes generated by electronic packages yet the system may become unstable near certain operating conditions. See Bowers & Mudawar (1994) ASME J. Electronic Packaging 116:290-305, which is herein incorporated by reference. Further, the use of porous medium in cooling of electronic devices was found to enhance heat transfer due to increases in the effective surface area. See Hadim (1994) ASME J. Heat Transfer 116:465-472, which is herein incorporated by reference. However, the porous medium creates a substantial increase in the pressure drop inside the thin film.

As provided herein, additional cooling can be achieved if the thin film thickness is allowed to increase by an increase in the thermal load which will cause the coolant flow rate to increase using flexible complex seals of the present invention, i.e. flexible seals having closed cavities of a stagnant fluid having a large value of the volumetric thermal expansion coefficient $\beta_T$.

In the presence of periodic external thermal loads, the thickness of a thin film supported by a flexible complex seal is expected to be periodic. This is because the stagnant fluid expands during maximum thermal load intervals allowing for a relaxation in the thin film thickness, which causes a flooding of the coolant. On the other hand, the thin film is squeezed during minimum thermal loads intervals due to the contraction in the stagnant fluid in the closed cavities of the flexible complex seals.

One of the advantages of using flexible complex seals is that the increase in the coolant flow rate because of thermal expansion effects produces an additional cooling in the presence of suspended ultrafine particles. See Li & Xuan (2002) Science in China (Series E) 45:408-416, which is herein incorporated by reference. This is because the chaotic movement of the ultrafine particles, the thermal dispersion, increases with the flow where it is modeled in the energy equation by introducing an effective thermal conductivity of the coolant. See Xuan & Roetzel (2000) Int. J. Heat and Mass Transfer 43:3701-3707, which is herein incorporated by reference. Further, large fluctuation rates that can be generated in the flow during severe squeezing conditions tend to increase the chaotic motions of the particles in the fluid, which increases the energy transport in the coolant.

As provided herein, the enhancement in the cooling process inside thin films supported by flexible complex seals in the presence of suspended ultrafine particles was analyzed. The lower substrate of the examined thin film was considered to be under a periodically varying heat flux. The thin film thickness was related to the thermal load and the internal pressure through the volumetric thermal expansion coefficient of the stagnant fluid and the theory of linear elasticity applied to the supporting seals. The governing equations for flow and heat transfer were properly non-dimensionalized and reduced into simpler equations for low Reynolds numbers. The resulting equations were then solved numerically to determine the effects of the thermal load, volumetric thermal expansion coefficient of the stagnant fluid, the softness of the seal, thermal capacitance of the working fluid and the squeezing number on the dynamics and thermal characteristic of the thin films supported by flexible complex thin films. As provided herein, the flexible complex seals of the present invention are useful in enhancing the cooling and can be used for additional purposes such as for diagnosing functions for heating sources so long as they possess large thermal expansion coefficient.

The following Table 7 provides the various symbols and meanings used in this section:

TABLE 7

| | |
|---|---|
| A* | a closed cavity dimension parameter |
| B | thin film length |

TABLE 7-continued

| | |
|---|---|
| $C_F$ | volumetric thermal expansion correction factor |
| C* | coefficient of thermal dispersion |
| $c_p$ | average specific heat of the working fluid or the dilute mixture |
| D | width of the thin film |
| $d_s$ | characteristic parameter of the seal |
| E | effective modulus of elasticity for the sealing assembly |
| G | width of the closed cavity |
| $F_n$ | fixation parameter |
| $F_T$ | dimensionless thermal expansion parameter |
| H, h, $h_o$ | dimensionless, dimensional and reference thin film thicknesses |
| $h_c$ | convective heat transfer coefficient |
| k | thermal conductivity of the working fluid or the dilute mixture |
| $k_o$ | reference thermal conductivity of the fluid |
| $Nu_L$ | lower substrate's Nusselt number |
| $P_S$ | thermal squeezing parameter |
| p | fluid pressure |
| $q_o$ | reference heat flux at the lower substrate |
| T, $T_1$ | temperature in fluid and the inlet temperature |
| t | Time |
| $V_o$ | reference axial velocity |
| U, u | dimensionless and dimensional axial velocities |
| V, v | dimensionless and dimensional normal velocities |
| X, x | dimensionless and dimensional axial coordinates |
| Y, y | dimensionless and dimensional normal coordinates |
| $\beta_q$ | dimensionless amplitude of the thermal load |
| $\beta_T$ | coefficient of volumetric thermal expansion of the stagnant fluid |
| $\epsilon$ | perturbation parameter |
| $\gamma$ | dimensionless frequency |
| $\mu$ | averaged dynamic viscosity of the working fluid or the dilute mixture |
| $\theta$, $\theta_m$ | dimensionless temperature and dimensionless mean bulk temperature |
| $\theta_W$ | dimensionless temperature at the lower substrate |
| $\rho$ | averaged density of the working fluid or the dilute mixture |
| $\upsilon$ | averaged kinematic viscosity of the working fluid or the dilute mixture |
| $\tau, \tau^*$ | dimensionless time |
| $\sigma$ | squeezing number |
| $\omega$ | reciprocal of a reference time (reference squeezing frequency) |
| $\eta$ | variable transformation for the dimensionless Y-coordinate |
| $\lambda$ | dimensionless thermal dispersion parameter |
| $\Pi$ | dimensionless pressure |
| $\Pi_i$ | dimensionless inlet pressure |
| $\Lambda$ | reference lateral to normal velocity ratio |

4A. Problem Formulation

Figure 36A:
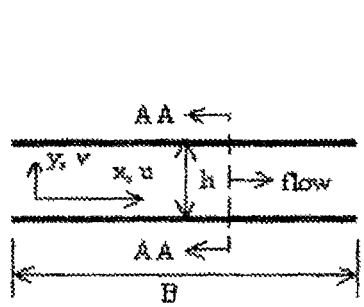
FIG. 36A is a front view of a schematic diagram for a thin film with flexible complex seal according to the present invention and the corresponding coordinate system.
Figure 36B:
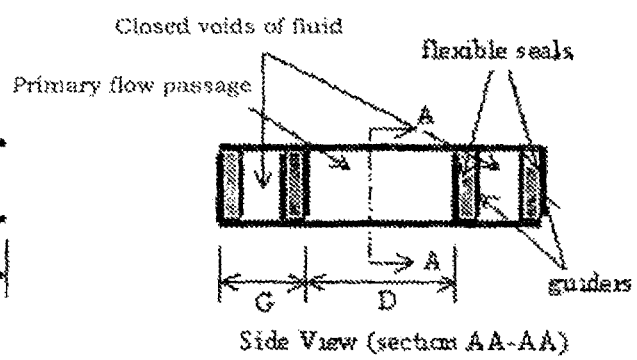
FIG. 36B is a side view of a schematic diagram for a thin film with flexible complex seal according to the present invention and the corresponding coordinate system.

FIG. 36 shows a thin film having a flexible complex seal. The flexible complex seal contains closed cavities filled with a stagnant fluid having relatively a large coefficient of volumetric thermal expansion. Flexible seals are also included in order to allow the thin film to expand. The flexible seals and flexible complex seals of the present invention may comprise a closed cell rubber foam. See Friis et al. (1988) J. Materials Science 23:4406-4414, which is herein incorporated by reference. Any excessive heat increases the temperature of the substrate. Thus, the stagnant fluid becomes warmer and expands. The flexible seals are flexible enough so that the expansion results in an increase in the separation between the lower and the upper substrates. Accordingly, the flow resistance of the working fluid passage decreases causing a flooding of the coolant. As a result, the excessive heating from the source is removed. The flexible seals can be placed between guiders, as shown in FIG. 36B, in order to minimize side expansion of the seals and maximize transverse thin film thickness expansion.

Figure 36C:
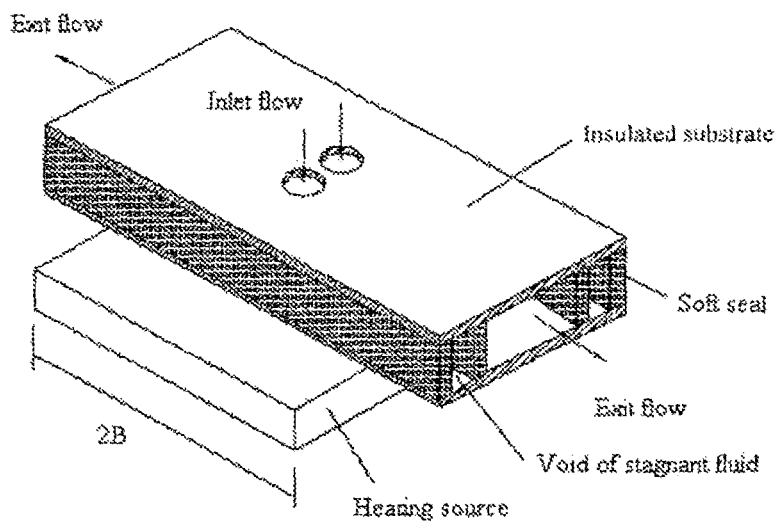
FIG. 36C is a 3D diagram of a schematic diagram for a thin film with flexible complex seal according to the present invention and the corresponding coordinate system.

The analysis is concerned with a thin film that has a small thickness h compared to its length B and its width D. Therefore, a two-dimensional flow is assumed. The x-axis was taken along the axial direction of the thin film while y-axis was taken along its thickness as shown in FIG. 36A. Further, the film thickness was assumed to be independent of the axial coordinate such as in two main cases: symmetric thin films having a fluid injected from the center as shown in FIG. 36C and in multiple passages thin films having alternating coolant flow directions.

The lower substrate of the thin film was assumed to be fixed (immobile and inflexible substrate) and in contact with or adjacent to a heating source while the upper substrate was attached to the lower substrate by flexible complex seals allowing it to expand (mobile and inflexible substrate). The motion of the upper substrate due to both internal variations in the stagnant fluid temperature and the induced internal pressure pulsations as a result of oscillating thermal loads is expressed according to the following relation:

$$H \equiv \frac{h}{h_o} = (1 + H_T + H_p)$$ Eq. 80 wherein h is the thin film thickness;

$h_o$ is a reference film thickness;

H is the dimensionless thin film thickness;

$H_T$ is the dimensionless motion of the upper substrate due to the thermal expansion of the stagnant fluid; and $H_p$ is the dimensionless motion of the upper substrate as a result of the deformation of seals due to the average internal pressure of the working fluid.

The fluid is assumed to be Newtonian having constant average properties except for the thermal conductivity. The general two-dimensional continuity, momentum and energy equations for a laminar flow of the working fluid inside the thin film are given as:

$$\frac{\partial u}{\partial x} + \frac{\partial v}{\partial y} = 0$$ Eq. 81

$$\rho\left(\frac{\partial u}{\partial t} + u\frac{\partial u}{\partial x} + v\frac{\partial u}{\partial y}\right) = -\frac{\partial p}{\partial x} + \mu\left(\frac{\partial^2 u}{\partial x^2} + \frac{\partial^2 u}{\partial y^2}\right)$$ Eq. 82

$$\rho\left(\frac{\partial v}{\partial t} + u\frac{\partial v}{\partial x} + v\frac{\partial v}{\partial y}\right) = -\frac{\partial p}{\partial y} + \mu\left(\frac{\partial^2 v}{\partial x^2} + \frac{\partial^2 v}{\partial y^2}\right)$$ Eq. 83

$$\rho c_p\left(\frac{\partial T}{\partial t} + u\frac{\partial T}{\partial x} + v\frac{\partial T}{\partial y}\right) = \frac{\partial}{\partial x}\left(k\frac{\partial T}{\partial x}\right) + \frac{\partial}{\partial y}\left(k\frac{\partial T}{\partial y}\right)$$ Eq. 84 wherein

T is temperature;

u is the dimensional axial velocity;

v is the dimensional normal velocity;

ρ is the average density;

p is the pressure;

μ is the average dynamic viscosity;

$c_p$ is the average specific heat; and k is the thermal conductivity.

The previous fluid properties are for the pure working fluid in the case where the fluid is free from any suspensions. In the presence of suspended ultrafine particles, the previous properties will be for an approximated new continuum fluid composed from the mixture of the pure fluid and the suspensions. See Xuan & Roetzel (2000) Int. J. Heat and Mass Transfer 43:3701-3707, which is herein incorporated by reference. The new properties of the mixture are related to the fluid and the particle properties through the volume fraction of the suspended particles inside the thin film and the thermal dispersion parameter.

The following dimensionless variables were used to non-dimensionalized Equations 81-84:

$$X = \frac{x}{B}$$ Eq. 85a $$Y = \frac{y}{h_o}$$ Eq. 85b $$\tau = \omega t$$ Eq. 85c $$U = \frac{u}{(\omega B + V_o)}$$ Eq. 85d $$V = \frac{v}{h_o \omega}$$ Eq. 85e $$\Pi = \frac{p - p_e}{\mu\left(\omega + \frac{V_o}{B}\right)\varepsilon^{-2}}$$ Eq. 85f $$\theta = \frac{T - T_1}{(q_o h_o)/k_o}$$ Eq. 85g wherein ω, $T_1$, $p_e$, $q_o$ and $V_o$ are the reference frequency of thermal load, inlet temperature of the fluid, a constant representing the exit pressure, reference heat flux, and a constant representing a reference dimensional velocity, respectively. The term $k_o$ corresponds to the working fluid thermal conductivity in the absence of any suspensions while it is the stagnant thermal conductivity, free from the dispersion term, for the dilute mixture between the fluid and the ultrafine suspensions. The stagnant thermal conductivity has usually an enhanced value when compared to that of the pure fluid for metallic particles. See Eastman et al. (2001) Applied Physics Letters 78:718-720, which is herein incorporated by reference.

The upper substrate is assumed to be insulated to simplify the analysis and that the lower substrate was subjected to a periodically varying wall heat flux $q_L$ condition according to the following relation:

$$q_L = q_o(1 + \beta_q \sin(\gamma \omega t))$$ Eq. 86 wherein $\beta_q$ and γ are the dimensionless amplitude of the lower substrate's heat flux and a dimensionless frequency, respectively. The variables X, Y, τ, U, V, Π, and θ are the dimensionless forms of x, y, t, u, v, p and T variables, respectively. The parameter ε appearing in Equation 85f is the perturbation parameter, $$\varepsilon = \frac{h_o}{B}.$$

For the thin film shown in FIG. 36C, the displacement of the upper substrate due to internal pressure variations is related to the average dimensionless pressure of the working fluid, $\Pi_{AVG}$, through the theory of linear elasticity by the following relation:

$$H_p = F_n \Pi_{AVG}$$ Eq. 87

This is based on the fact that the upper substrate is assumed to be rigid and that the applied force on an elastic material, the flexible seal, is assumed to behave as an elastic material, and is proportional to the elongation of this material. See Norton (1998) Machine Design; An Integrated Approach Prentice-Hall, N.J., which is herein incorporated by reference. The parameter $F_n$ is referred to as the fixation parameter and is a measure of the softness of the seal, flexible seals have large $F_n$ values, and is equal to:

$$F_n = \frac{\mu(V_o + \omega B)}{E\varepsilon^2 d_s} \quad \text{Eq. 88}$$

wherein E and $d_s$ are the effective modulus of elasticity for the complex seal and a characteristic parameter, which depends on the seal's dimensions and the thin film width D, respectively. The quantity $d_s$ is equal to the effective dimension of the seal's cross section times the ratio of the total length of the seal divided by the thin film width D. The seal is considered to have isotropic properties. Further, the effective dimension of the seals times their total length represents the contact area between the seals and the upper or lower substrates when the seals have a rectangular cross section as shown in FIG. 36. Other than this, the effective diameter requires a theoretical determination.

As provided herein, the analysis was performed for relatively small thermal load frequencies in order to ascertain that squeezing generated flows have relatively small Reynolds numbers. For these frequencies, Equation 87 is applicable and the inertia effect of the upper substrate is negligible. Moreover, the increase in the thickness due to a pressure increase in the thin film causes a reduction in the stagnant fluid pressure. This action stiffens the insulating assembly. Therefore, the parameter E is considered to be the effective modulus of elasticity for the insulating assembly not for the seal itself. Practically, the closed cavity width G is assumed to be large enough such that a small increase in the stagnant fluid pressure due to the expansion can support the associated increase in the elastic force on the seal.

The dimensionless displacement of the upper substrate due to thermal expansion is related to the dimensionless average temperature of the lower substrate, $(\theta_W)_{AVG}$, by the following linearized model:

$$H_T = F_T(\theta_W)_{AVG} \quad \text{Eq. 89}$$

wherein $F_T$ is named the dimensionless thermal expansion parameter and is equal to:

$$F_T = A^* \frac{\beta_T q_o h_o}{k_o} C_F \quad \text{Eq. 90}$$

wherein $A^*$ is a constant depending on the closed cavities dimensions and geometry. The parameter $\beta_T$ is the volumetric thermal expansion coefficient of the stagnant fluid in its approximate form: $\beta_T \approx (1/V_{So})[(V_S - V_{S1})/(T_S - T_1)]|_{ps1}$ evaluated at the pressure $p_{s1}$ corresponding to the stagnant fluid pressure at the inlet temperature $T_1$. The quantities $V_{S1}$ and $V_S$ represent the closed cavity volumes at normal operating conditions when the stagnant fluid is at $T_1$ and at the present stagnant fluid temperature $T_S$, respectively. The parameter $V_{So}$ represents the closed cavity volume at the reference condition. The factor $C_F$ represents the volumetric thermal expansion correction factor. This factor was introduced in order to account for the increase in the stagnant pressure due to the increase in the elastic force in the seal during the expansion, which tends to decrease the effective volumetric thermal expansion coefficient. It approaches one as the closed cavity width G increases and may be determined theoretically using methods known in the art.

The parameter $F_T$ is enhanced at elevated temperatures for liquids and at lower temperature for gases because $\beta_T$ increases for liquids and decreases for gases as the stagnant temperature increases. Dimensionless thermal expansion parameter is also enhanced by a decrease in $k_o$, an increase in $q_o$, an increase in $F_n$ or by increases in $h_o$. Equation 89 is based on the assumption that the stagnant fluid temperature is similar to the lower substrate temperature since entire closed cavity surfaces were considered insulated except that facing the lower substrate. Furthermore, the heat flux of the heating source is applied on the portion of the lower substrate that is facing the working fluid. The other portion, which faces the seals, is taken to be isolated from the heating source and the environment to minimize the variation in the lower substrate temperature along the width direction.

In the presence of suspended ultrafine particles in the working fluid, the thermal conductivity of the working fluid composed from the pure fluid and suspensions is expected to vary due to the thermal dispersion. To account for these variations, the following model which is similar to the Xuan & Roetzel ((2000) Int. J. Heat and Mass Transfer 43:3701-3707) model that linearly relates the effective thermal conductivity of the working fluid to the fluid speed is utilized:

$$k(X,Y,\tau) = k_o(1 + \lambda\sqrt{U^2(X,Y,\tau) + \Lambda^2 V^2(X,Y,\tau)}) = k_o\phi(X,Y,\tau) \quad \text{Eq. 91}$$

wherein $\lambda$ and $\Lambda$ are the dimensionless thermal dispersion coefficient and the reference squeezing to lateral velocity ratio which are:

$$\lambda = C^*(\rho c_p)h_o(V_o + \omega B) \quad \text{Eq. 92a}$$

$$\Lambda = \frac{\varepsilon\sigma}{12} \quad \text{Eq. 92b}$$

wherein $C^*$ is the coefficient of the thermal dispersion, which depends on the diameter of the ultrafine particles, its volume fraction (ratio of the particles volume to the total thin film volume), and both fluid and ultrafine particles properties. Ultrafine particles include particles that are extremely small compared with the thickness of the thin film.

The coefficient $C^*$ is expected to increase by an increase in the diameter of the particles, their volume fraction, their surface roughness and the working fluid Prandtl number, $Pr = (\rho c_p \upsilon)/k_o$. On the other hand, the stagnant thermal conductivity $k_o$ increases with an increase in both the volume fraction and the surface area of the particles. A dilute mixture of ultrafine suspensions and water produce no significant change in the pressure drop compared to pure water, which reveals that the viscosity is a weak function of the fluid dispersion for a dilute mixture.

Generally, flows inside thin films are in laminar regime and could be creep flows as in lubrication. Therefore, the low Reynolds numbers (the modified lateral Reynolds number $Re_L = (V_o h_o)\epsilon/\nu$ and the squeezing Reynolds number $Re_s = (h_o^2 \omega)/\upsilon$) flow model was used herein. These insulating assemblies neglect the transient and convective terms in momentum equations, Equations 82 and 83. These terms become incomparable to the pressure gradient and diffusive terms for small squeezing frequencies and reference velocities. Application of these insulating assemblies to Equations 82-84 and the outcome of dimensionalizing the energy equation, Equation 85, result in the following reduced non-dimensionalized equations:

$$U = \frac{1}{2}\frac{\partial \Pi}{\partial X}H^2\left(\frac{Y}{H}\right)\left(\frac{Y}{H}-1\right) \qquad \text{Eq. 93}$$

$$V = \frac{dH}{d\tau}\left(3\left(\frac{Y}{H}\right)^2 - 2\left(\frac{Y}{H}\right)^3\right) \qquad \text{Eq. 94}$$

$$\frac{\partial}{\partial X}\left(H^3\frac{\partial \Pi}{\partial X}\right) = \sigma \frac{\partial H}{\partial \tau} \qquad \text{Eq. 95}$$

$$P_S\left(\frac{\partial \theta}{\partial \tau} + \frac{12}{\sigma}U\frac{\partial \theta}{\partial X} + V\frac{\partial \theta}{\partial Y}\right) = \frac{\partial}{\partial Y}\left(\phi \frac{\partial \theta}{\partial Y}\right) \qquad \text{Eq. 96}$$

Note that Equation 96 is based on the assumption that the axial conduction is negligible when compared to the transverse conduction. The parameters $\sigma$ and $P_S$ are referred to as the squeezing number and the thermal squeezing parameter, respectively, and are defined as:

$$\sigma = \frac{12}{1+\frac{V_o}{\omega B}} \qquad \text{Eq. 97a}$$

$$P_S = \frac{\rho c_p h_o^2 \omega}{k_o} \qquad \text{Eq. 97b}$$

Both inlet and exit dimensionless pressures were assumed constant and the following relationship was obtained between the inlet dimensionless pressure and the squeezing number based on the assumption that the reference velocity $V_o$ represents the average velocity in the thin film at zero values of $F_T$ and $F_n$:

$$\Pi_i = 12 - \sigma \qquad \text{Eq. 98}$$

Accordingly, the dimensionless pressure gradient, the dimensionless pressure and the average dimensionless pressure $\Pi_{AVG}$ inside the thin film are related to the squeezing number through the following equations:

$$\frac{\partial \Pi(X,\tau)}{\partial X} = \frac{\sigma}{H^3}\frac{dH}{d\tau}\left(X-\frac{1}{2}\right) - (12-\sigma) \qquad \text{Eq. 99}$$

$$\Pi(X,\tau) = \frac{\sigma}{2H^3}\frac{dH}{d\tau}(X^2 - X) - (12-\sigma)(X-1) \qquad \text{Eq. 100}$$

$$\Pi_{AVG}(\tau) = -\frac{\sigma}{12H^3}\frac{dH}{d\tau} + \frac{(12-\sigma)}{2} \qquad \text{Eq. 101}$$

The dimensionless thermal boundary conditions for the previously defined problem are taken as follows:

$$\theta(X,Y,0) = 0,\ \theta(0,Y,\tau) = 0, \qquad \text{Eq. 102}$$
$$\frac{\partial \theta(X,0,\tau)}{\partial Y} = -(1+\beta_q \sin(\gamma\tau)),\ \frac{\partial \theta(x,H,\tau)}{\partial Y} = 0$$

Based on the physical conditions, the Nusselt number is defined as:

$$Nu_L(X,\tau) \equiv \frac{h_c h_o}{k} = \frac{1}{\theta(X,0,\tau) - \theta_m(X,\tau)} = \frac{1}{\theta_W(X,\tau) - \theta_m(X,\tau)} \qquad \text{Eq. 103}$$

The parameter $\theta_m$ is the dimensionless mean bulk temperature and is given as:

$$\theta_m(X,\tau) = \frac{1}{U_m(X,\tau)H}\int_0^H U(X,Y,\tau)\theta(X,Y,\tau)dY \qquad \text{Eq. 104}$$

$$U_m(X,\tau) = \frac{1}{H}\int_0^H U(X,Y,\tau)dY$$

wherein $U_m$ is the dimensionless average velocity at a given section.

4B. Numerical Procedure

The procedure for the numerical solution is summarized as follows:

1. Initially, a value for $H_T$ is assumed.
2. At the present time, the dimensionless thickness of the thin film H is determined by solving Equations 80, 87, 88, and 101 simultaneously, using an explicit formulation. The velocity field, U and V, is then determined from Equations 93, 94, and 99.
3. At the present time, the reduced energy equation, Equation 96, is transferred into one with constant boundaries using the following transformations: $\tau^* = \tau$, $\xi = X$ and $$\eta = \frac{Y}{H}.$$

A tri-diagonal solution was implemented along with a marching scheme. See Blottner (1970) AIAA J. 8:193-205, which is herein incorporated by reference. Backward differencing was chosen for the axial convective and transient terms and central differencing was selected for the derivatives with respect to $\eta$. The values of 0.008, 0.03, 0.001 were chosen for $\Delta \xi$, $\Delta \eta$ and $\Delta \tau^*$, respectively.

4. $H_T$ is updated from Equation 89 and steps (2) to (4) is repeated until:

$$\left|\frac{(H_T)_{new} - (H_T)_{old}}{(H_T)_{new}}\right| < 10^{-6} \qquad \text{Eq. 105}$$

5. The converged solution for the flow and heat transfer inside the thin film is determined at the present time.
6. Time is advanced by $\Delta \tau^*$ and steps (1) to (5) are repeated.

Numerical investigations were performed using different mesh sizes and time steps to assess and ascertain grid and time step independent results. Any reduction in the values of $\Delta \xi$, $\Delta \eta$ and $\Delta \tau^*$ below $\Delta \xi = 0.008$, $\Delta \eta = 0.03$ and $\Delta \tau^* = 0.001$ results in less than about a 0.2 percent error in the results.

In the results, the maximum value of the parameters $P_S$ is chosen to be 1.0. Beyond this value, the error associated with the low Reynolds number model will increase for moderate values of the dimensionless thermal expansion parameter, fixation parameter, and the Prandtl number. As an example, the order of transient and convective terms in the momentum equations were found to be less 1.0 percent that of the diffusive terms for $P_s = 1.0$, $Pr = 6.0$, $F_n = 0.05$, $F_T = 0.25$, $\beta_q = 0.1$ and $\sigma = 6.0$. The parameters correspond, for example, to a thin film filled with water and having $B = D = 60$ mm, $h_o = 0.3$ mm, $d_s = 0.5$ mm, $\omega = 2.0$ s$^{-1}$, $V_o = 0.12$ m/s and $E = 2(10^5)$ pa.

4C. Discussions of the Results

Ideal gases produce about a 15 percent increase in the closed cavity volume at room conditions for a 45° C. maximum temperature difference. Further, about a 60 percent increase in the convective heat transfer coefficient for a volume fraction of copper ultrafine particles of about a 2.0 percent has been reported. See Li & Xuan (2002) Science in China (Series E) 45:408-416, which is herein incorporated by reference. Accordingly, the parameters $F_T$ and $\lambda$ were varied until comparable changes have been attained in the dimensionless thin film thickness and the Nusselt number.

4D. Effects of Dimensionless Thermal Expansion Parameter

Figure 37A:
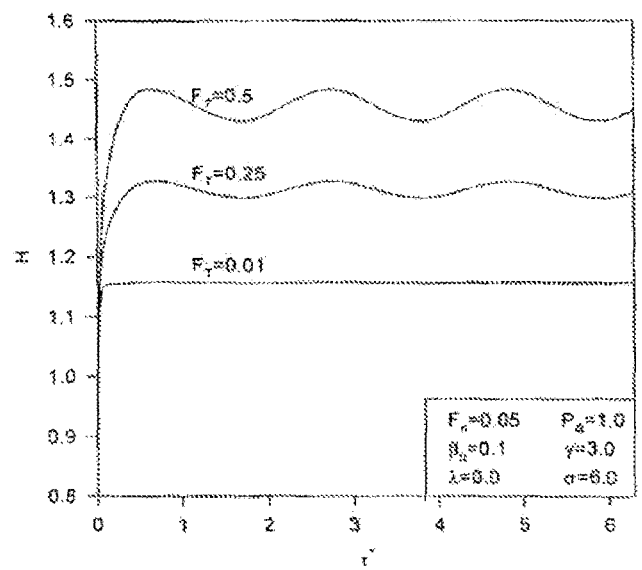
FIG. 37A shows the effects of the dimensionless thermal expansion parameter $F_T$ on dimensionless thin film thickness H.

FIG. 37A illustrates the effects of the dimensionless thermal expansion parameter $F_T$ on the dimensionless thickness H of the thin film. The parameter $F_T$ can be increased either by an increase in the volumetric thermal expansion coefficient of the stagnant fluid or by an increase in dimensional reference temperature $(q_o h_o)/k_o$. Both factors make the flexible complex seal softer. Thus, dimensionless thickness H is increased as $F_T$ increases as shown in FIG. 37A. This allows more coolant to flow causing reductions in the average dimensionless lower substrate's temperature $(\theta_W)_{AVG}$ as clearly seen in FIG. 37B which can provide additional cooling to any heated surface such as surfaces of electronic components.

Figure 37B:
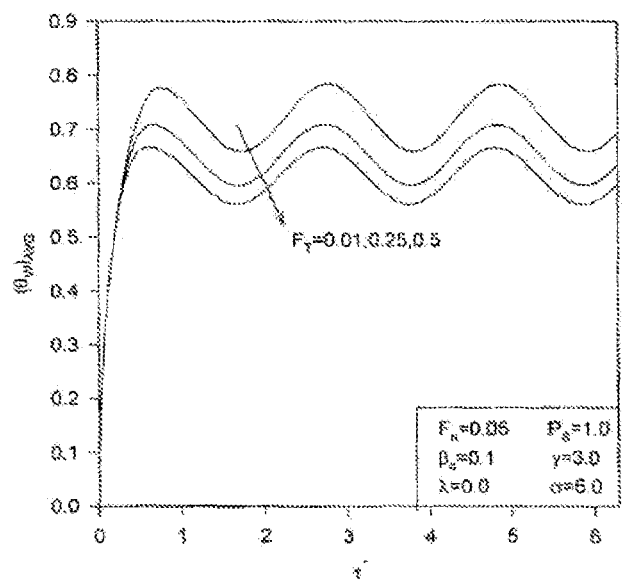
FIG. 37B shows the effects of the dimensionless thermal expansion parameter $F_T$ on dimensionless average lower substrate temperature $(\theta_W)_{AVG}$.
Figure 37C:
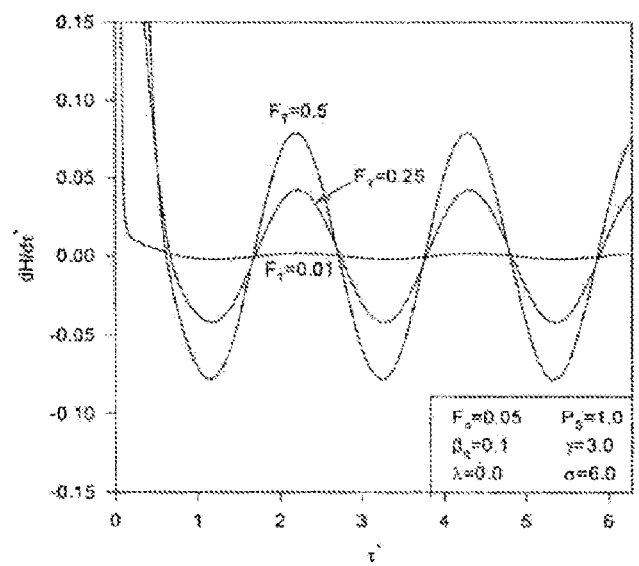
FIG. 37C shows the effects of the dimensionless thermal expansion parameter $F_T$ on $dH/d\tau$.
Figure 37D:
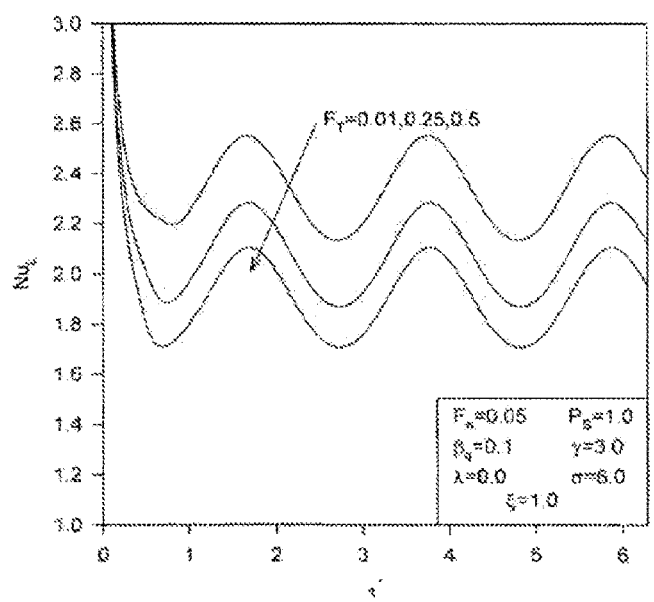
FIG. 37D shows the effects of the dimensionless thermal expansion parameter $F_T$ on exit Nusselt number $Nu_L$.

FIG. 37B also indicates that as thermal load increases, the average lower substrate's temperature increases; however, this increase can be reduced by using a flexible complex seal. This additional cooling may be obtained with no need for external controlling devices, thereby providing extra safety for an electronic component such as a heated surface, when the thermal loads increase over the projected capacity. The fluctuation rate at the upper substrate, |dH/dτ|, is noticed to increase as $F_T$ increases as shown in FIG. 37C, which may be an advantage for the cooling process especially at high levels of fluctuation rates the thermal dispersion will be enhanced in the coolant when suspended ultrafine particles are present. The Nusselt number is decreased as $F_T$ increases as shown in FIG. 37D because it is inversely proportional to H, which is the reason that the percentage decrease in lower substrate temperatures is lower than the percentage increase in the thin film thickness as $F_T$ increases.

4E. Effects of Dimensionless Thermal Dispersion Parameter

Figure 38A:
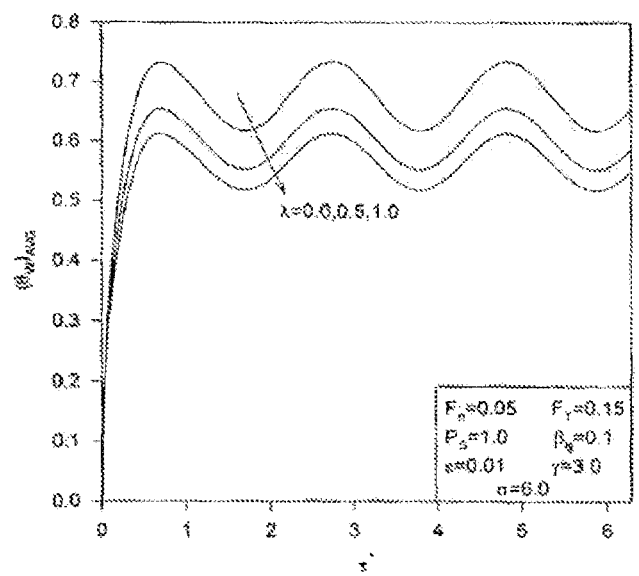
FIG. 38A shows the effects of the dimensionless thermal dispersion parameter $\lambda$ on dimensionless average lower substrate temperature $(\theta_W)_{AVG}$.

FIG. 38A describes the effects of the dimensionless thermal dispersion parameter $\lambda$ of the coolant fluid on the average lower substrate's temperature of the thin film. This parameter can be increased either by increasing the diameter of the ultrafine particles or increasing the roughness of these particles while keeping a fixed volume fraction inside the coolant, thereby ensuring that thermal squeezing parameter remains constant. FIG. 38A shows that the thermal dispersion can provide additional cooling to a heated element, thereby causing an additional reduction in the average dimensionless lower substrate temperature $(\theta_W)_{AVG}$. Part of this cooling is due to the expansion process since it results in flooding of the working fluid, which increases the irregularity, and the random motion of the particles. This causes additional enhancements in the energy exchange rate. Another part for the enhancement in the cooling is attributed to the fact that the noise in the thermal load, especially those having heterogeneous fluctuation rates, produces additional squeezing due to the velocities that appear in Equation 91.

Figure 38B:
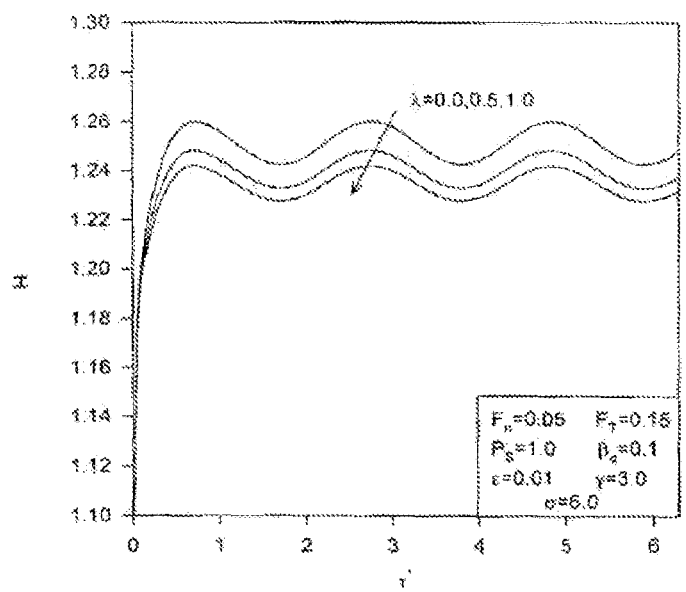
FIG. 38B shows the effects of the dimensionless thermal dispersion parameter $\lambda$ on dimensionless thickness H.

Due to the reduction in the lower substrates temperatures as $\lambda$ increases, the dimensionless thin film thickness decreases as $\lambda$ increases as depicted in FIG. 38B. Additional enhancements in the thermal dispersion effect are expected as both the perturbation parameter and the squeezing number increase as suggested by Equations 91 and 92. Both effects result in a magnification in the fluctuation rates in the flow, which causes additional increases in the cooling process. As provided herein, the perturbation parameter and the fluctuation rates are small and their effects are not noticeable.

Figure 38C:
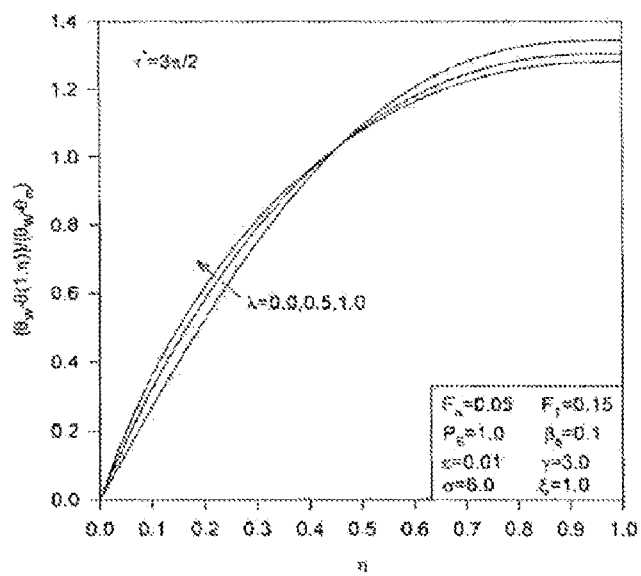
FIG. 38C shows the effects of the dimensionless thermal dispersion parameter $\lambda$ on temperature profile.
Figure 38D:
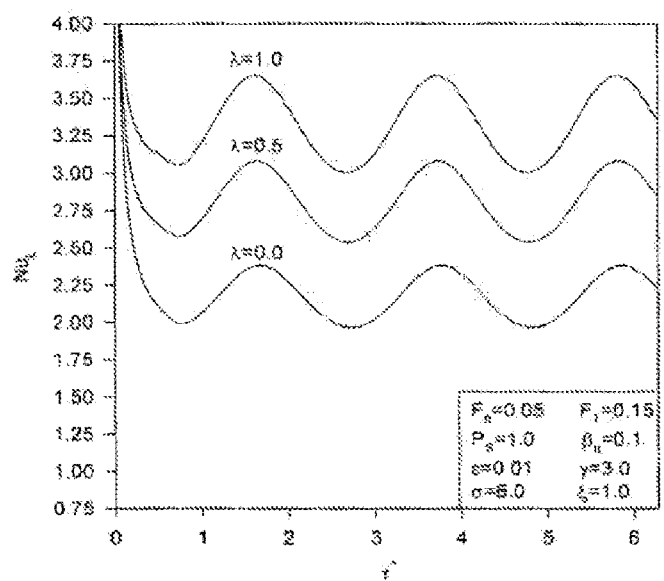
FIG. 38D shows the effects of the dimensionless thermal dispersion parameter $\lambda$ on exit Nusselt number $Nu_L$.
Figure 39:
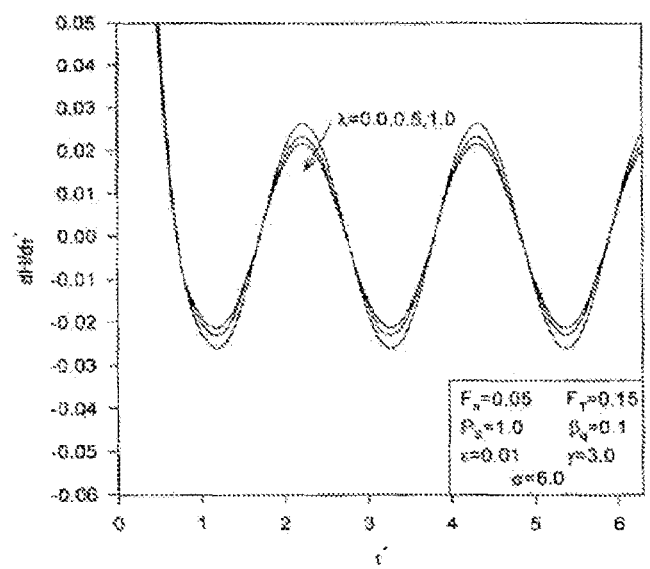
FIG. 39 shows effects of the dimensionless dispersion parameter 2 on the time variation of the dimensionless thin film thickness $dH/d\tau$.

The reduction in thermal resistance across the transverse direction when $\lambda$ increases causes the temperature profiles to be more flattened as $\lambda$ increases as seen in FIG. 38C. Accordingly, the Nusselt number increases as $\lambda$ increases as seen in FIG. 38D. FIG. 39 shows that the fluctuation rate at the upper substrate, |dH/dτ|, decreases as $\lambda$ increases. As a result, ultrafine particle suspensions inside thin films supported by flexible complex seals not only cause enhancements in heat transfer but also make these thin films dynamically more stable. In this insulating assembly, an increase in $\lambda$ between zero and unity cause a reduction in the average lower temperature by dimensionless temperature of about 0.12 and an increase in the Nusselt number by about 50 percent.

4F. Effects of Thermal Squeezing Parameter and the Squeezing Number

Figure 40A:
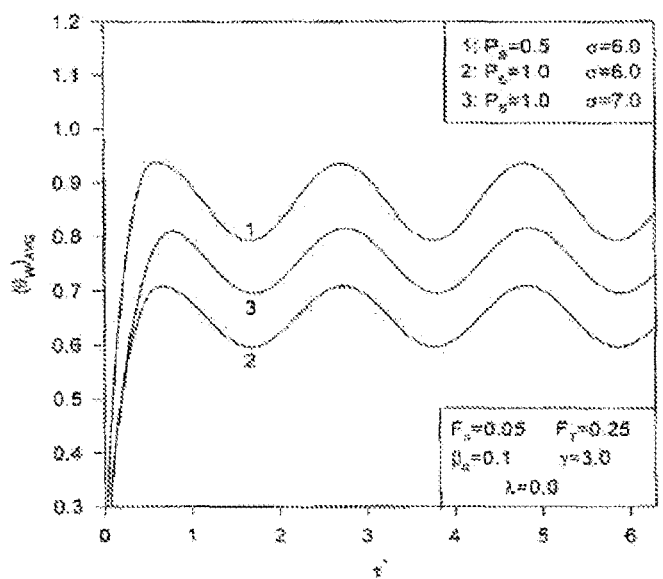
FIG. 40A shows effects of the thermal squeezing parameter $P_S$ and the squeezing number $\sigma$ on dimensionless average lower substrate temperature $(\theta_W)_{AVG}$.
Figure 40B:
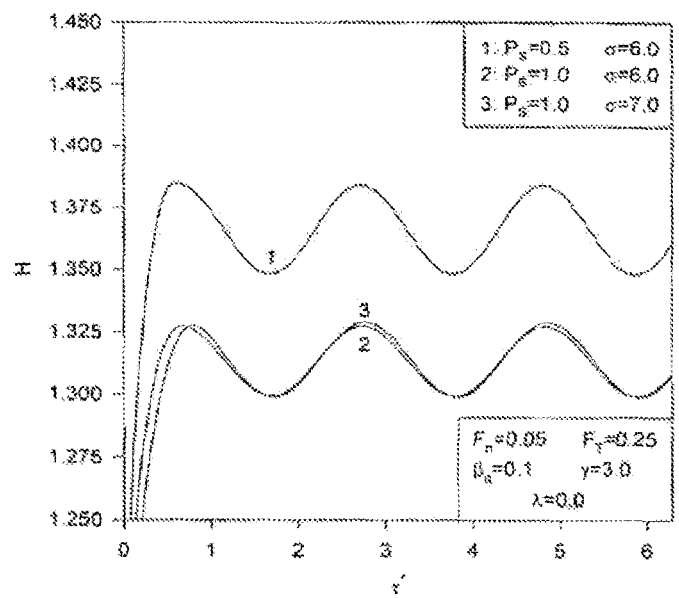
FIG. 40B shows effects of the thermal squeezing parameter $P_S$ and the squeezing number $\sigma$ on dimensionless thin film thickness H.
Figure 40C:
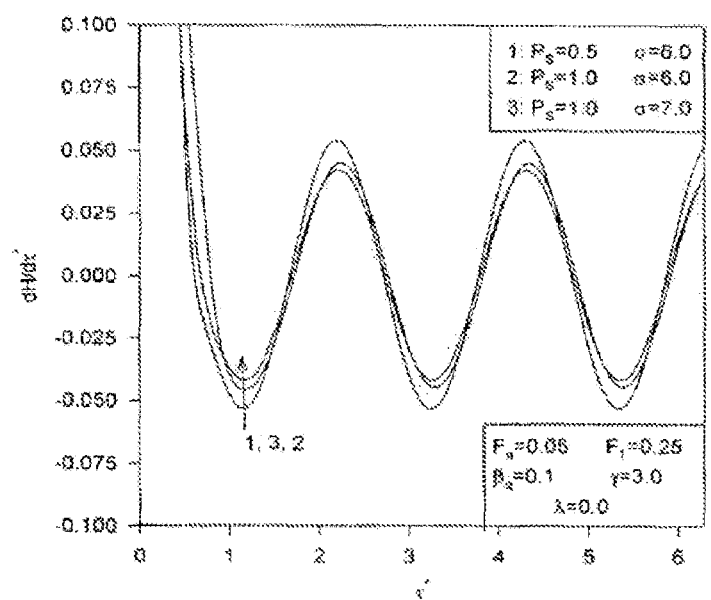
FIG. 40C shows effects of the thermal squeezing parameter $P_S$ and the squeezing number $\sigma$ on $dH/d\tau$.

FIG. 40A shows the effects of the thermal squeezing parameter $P_S$ and the squeezing number σ on the average dimensionless lower substrate temperature $(\theta_W)_{AVG}$. The lower substrate temperature decreases as $P_S$ increases and as σ decreases. Both effects tend to increase thermal convection, which decreases the lower substrate temperature. The increase in $P_S$ results in an increase in the thermal capacitance of the working fluid and a decrease in σ indicates an increase in the reference velocity. Accordingly, the dimensionless thickness H decreases as $P_S$ increases as shown in FIG. 40B. In addition, the pressure force inside the thin film increases as σ decreases, thereby causing an increase in $H_p$ while $H_T$ decreases as σ decreases due to the enhancement in the cooling. As a result, the thin film thickness varies slightly when a decreases as illustrated in FIG. 40B. As seen in FIG. 40C, the fluctuation rate at the upper substrate increases as a increases while it decreases as $P_S$ increases. Also, the fluctuation rate at the upper substrate is shown to be more affected by $P_S$ as compared to σ.

4G. Effects of the Fixation Parameter and the Amplitude of the Thermal Load

Figure 41A:
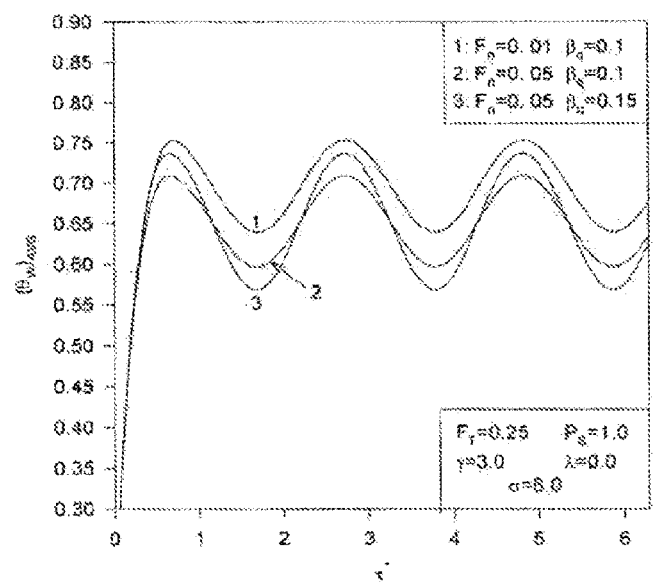
FIG. 41A shows effects of the fixation parameter $F_n$ and the dimensionless thermal load amplitude $\beta_q$ on dimensionless average lower substrate temperature $(\theta_W)_{AVG}$.
Figure 41B:
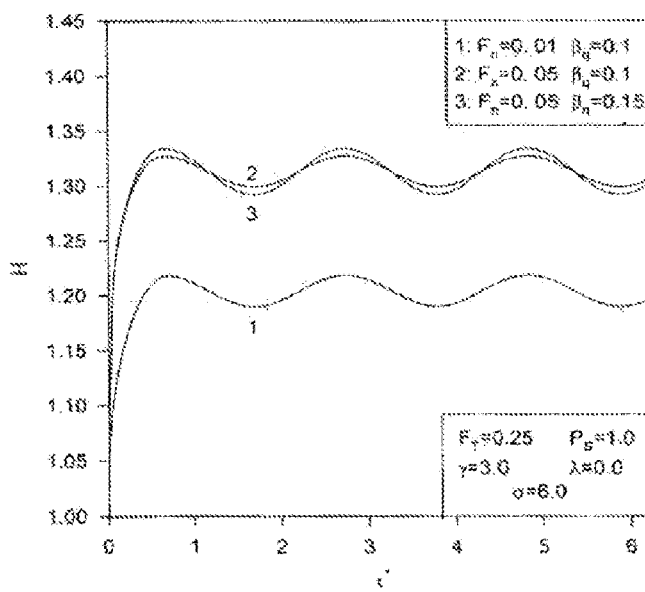
FIG. 41B shows effects of the fixation parameter $F_n$ and the dimensionless thermal load amplitude $\beta_q$ on dimensionless thin film thickness H.

FIG. 41A shows the effects of the fixation parameter $F_n$ and the dimensionless amplitude of the thermal load $\beta_q$ on the average dimensionless lower substrate temperature $(\theta_W)_{AVG}$. Since flexible seals possess large $F_n$ values, H increases and lower substrate temperature decreases as $F_n$ increases as shown in FIG. 41A and FIG. 41B. Further, these figures show that an increase in the amplitude of the heat flux results in an increase in the fluctuation rate at the upper substrate and the lower substrate temperature but their mean (average) values are almost unaffected.

4H. Effects of Dimensionless Thermal Expansion Parameter on Average Pressure

Figure 42:
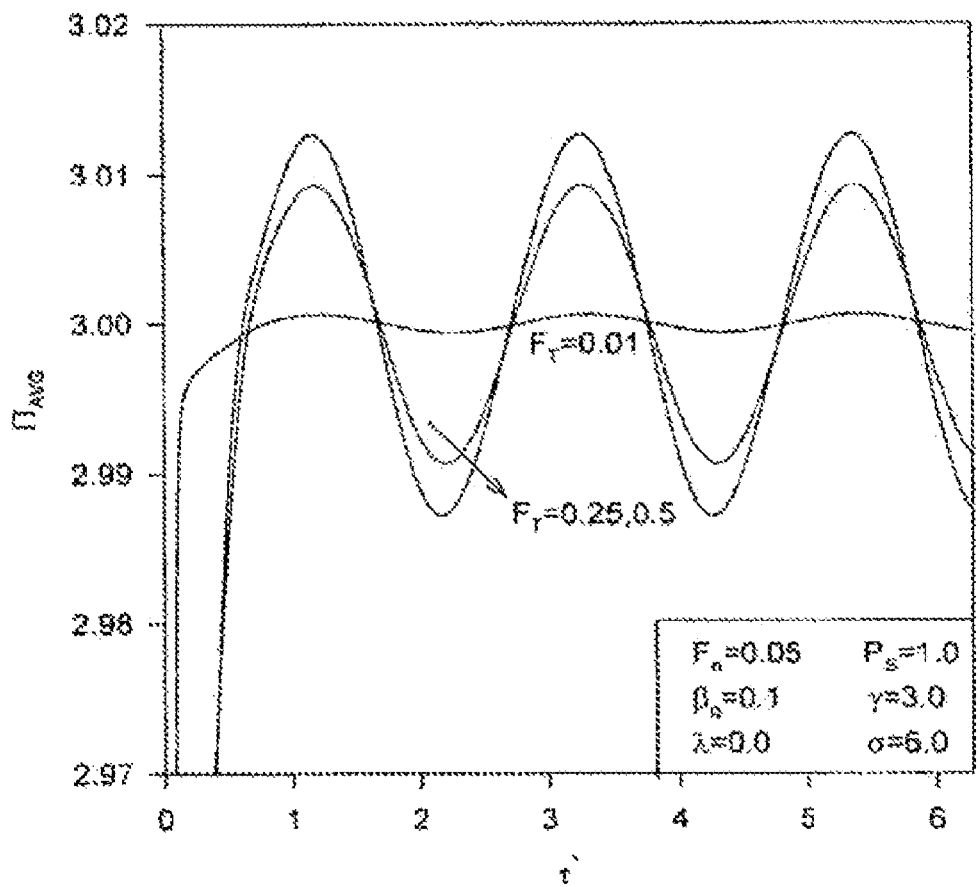
FIG. 42 shows effects of the dimensionless thermal expansion parameter $F_T$ on the average dimensionless pressure inside the thin film $\Pi_{AVG}$.

FIG. 42 shows the effects of $F_T$ on the average dimensionless pressure inside a thin film supported by a flexible complex seal. The periodic behavior of the heat flux results in a periodic variation in the average pressure inside the thin film. The fluctuation in the pressure increases as $F_T$ increases as seen in FIG. 42. Further, the thermal load exceeding the internal pressure by a phase shift approximately equal to $\pi/(2\gamma)$. According to FIG. 42, the induced pressure pulsation can be used as a measurable quantity in order to read, diagnose or for feedback to control the heating source.

5. Oscillatory Flow Disturbances and Thermal Characteristics Inside Fluidic Cells Due to Fluid Leakage and Wall Slip Conditions As provided herein, the effects of both fluid leakage and wall slip conditions were studied analytically and numerically on the fluctuation rate in the flow inside non-isothermal disturbed thin films supported by flexible seals within a fluidic cell. Flow disturbances due to internal pressure pulsations and external squeezing are considered in this work. The main controlling parameters are the dimensionless leakage parameter, softness of the seal, squeezing number, dimensionless slip parameter, the thermal squeezing parameter and the power law index. Accordingly, their influences on the fluctuation rate and heat transfer characteristics inside disturbed thin films were determined. As provided herein, an increase in the dimensionless leakage parameter, softness of the seal-upper substrate assembly and the wall slip parameter result in more cooling and an increase in the fluctuation level in the flow. However, an increase in the squeezing number and the fluid power index decreases decrease flow fluctuations.

Thin films are utilized in various chemical and biological systems such as in biosensing devices. See Lavrik et al. (2001) Biomedical Microdevices 3(1):35-44, which is herein incorporated by reference. These biosensing devices have the advantage to accurately, quickly, and economically screen patients for the presence of various diseases or can be used to detect many bio-warfare agents. Many biosensors in the art comprise at least one microcantilever, wherein detection of a desired agent is based on the deflection of the free end of the microcantilever that is caused by the imposed stresses at least one of its surfaces. See U.S. Pat. No. 7,288,404, issued on 30 Oct. 2007, which is herein incorporated by reference. This surface stress is due to the reaction, interaction, or binding between a given agent in a fluid sample inside the thin film and a second agent, such as a receptor, that reacts, interacts, or binds with the given agent, that is immobilized on the surface of the microcantilever.

Examples of reactions in biomolecular (receptor/analyte) applications, which occur within a fluidic cell, include: antibody-antigen (receptor/analyte) bindings or DNA hybridization of a pair of DNA strands (receptor/analyte) having complementary sequences, and the like. An example of antibody-antigen bindings includes the binding of polyclonal anti-PSA (prostate-specific antigen) antibody and free PSA (fPSA). See Wu et al. (2001) Nature Biotechnology 19:856-860, which is herein incorporated by reference. In many cases, disturbances exist in the flow, which can disturb the deflection of the microcantilever and produce a noise in the measurement. See Fritz et al. (2000) Science 288:316-318, which is herein incorporated by reference.

Part of the noise in the measurement is due to the fact that oscillations in the flow may produce an oscillatory drag force on the microcantilever surface causing it to vibrate. For example, a 100 nm deflection in the microcantilever due to initial flow disturbances in the fluidic cell while the microcantilever deflection due to receptor/analyte binding was of the order of 10 nm has been reported. See Fritz et al. (2000) Science 288:316-318, which is herein incorporated by reference.

Meanwhile, flow oscillations may change the microcantilever temperature causing it to produce an additional noise where the microcantilever is composed of two layers (bimaterial) having different coefficients of thermal expansion. For example, microcantilevers having a 50 nm deflection due to bimetallic effects, which was five times the microcantilever deflection due receptor/analyte binding, has been reported. See Fritz et al. (2000) Science 288:316-318, which is herein incorporated by reference. The rate of receptor/analyte binding changes with the flow velocity has been demonstrated. See Prichard et al. (1995) J. Biomechanics 28:1459-1469, which is herein incorporated by reference. As flow oscillations add extra noise due to surface stresses, minimizations of flow oscillations in fluidic cells are desired and may be achieved according to the present invention.

Flow disturbances can be due to external disturbances or due to internal pressure pulsations when the pumping process is irregular. Even a small change in the internal pressure of the fluidic cell can have a substantial impact since the thickness of the thin film is very small. The impact is more pronounced if flexible seals support the thin film. Accordingly, the dynamics and thermal characterization of thin films will be altered producing a noise in the biosensor measurement, which is proportional to the fluctuation rate in the flow. Another source for flow disturbances is the flow leakage, which can seriously affect the operation of the microcantilever. See Raiteri et al. (2000) Electrochimica Acta 46:157-163, which is herein incorporated by reference.

Flow inside oscillatory disturbed thin films has been studied. See Langlois (1962) Quarterly of Applied Math. XX:131-150, which is herein incorporated by reference. Laminar pulsating flows has been studied as well as effects of internal pressure pulsations on oscillatory squeezed laminar flow and heat transfer inside thin films supported by flexible seals. See Hemida et al. (2002) Int. J. Heat and Mass Transfer 45:1767-1780 and Khaled & Vafai (2002) Int. J. Heat and Mass transfer 45:5107-5115, which are herein incorporated by reference. Unfortunately, the prior art fails to analyze the effects of fluid leakage on pulsating flow and heat transfer inside thin films in the presence of flexible seals. Such an analysis and understanding is important as the effects of fluid leakage contribute to flow disturbances.

Thus, as provided herein the effects of fluid leakage on pulsating flow and heat transfer inside thin films in the presence of flexible seals were analyzed. Further, as provided herein, flow inside disturbed fluidic cells under wall slip conditions with different fluid types is analyzed in order to determine their best operating conditions that cause minimum flow fluctuations. Wall slip conditions can be achieved either when the fluid contains suspensions or when the substrates are coated with water repellent resigns. See Watanabe & Udagawa (2001) AIChE J. 47:256-262, which is herein incorporated by reference. Also, wall slip occurs when the size of the thin film is so small that the Kundsen number, a ratio of the molecular mean free path to the characteristic length of the fluidic cell, is between about $10^{-3}$ to about $10^{-1}$ as for flow of gases in microchannels. See Shipping & Ameel (2001) Int. J. Heat and Mass Transfer 44:4225-4234, which is herein incorporated by reference. Thus, as provided herein flow and heat transfer associated with side leakage, wall slip condition and non-Newtonian effects inside disturbed thin films supported by flexible seals are analytically and numerically examined in order to provide improved fluidic cell designs.

5A. Analysis

Figure 43A:
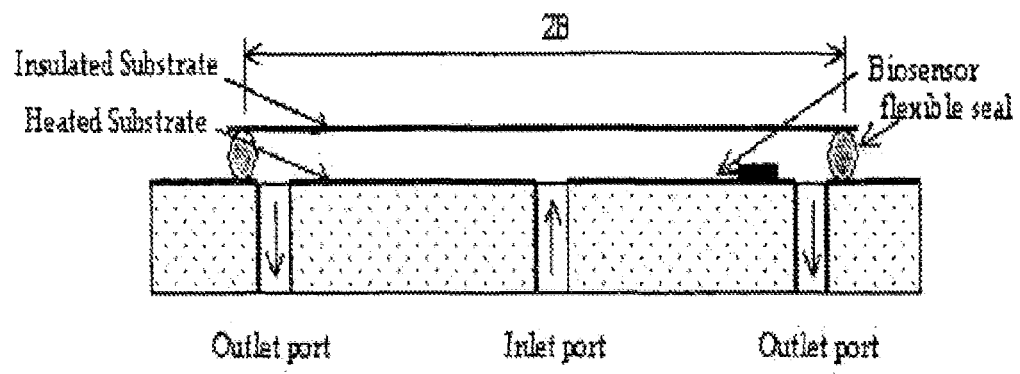
FIG. 43A is a schematic diagram of a symmetrical fluidic cell (it has a uniform variation in the film thickness under disturbed conditions and can be used for multi-detection purposes).
Figure 43B:
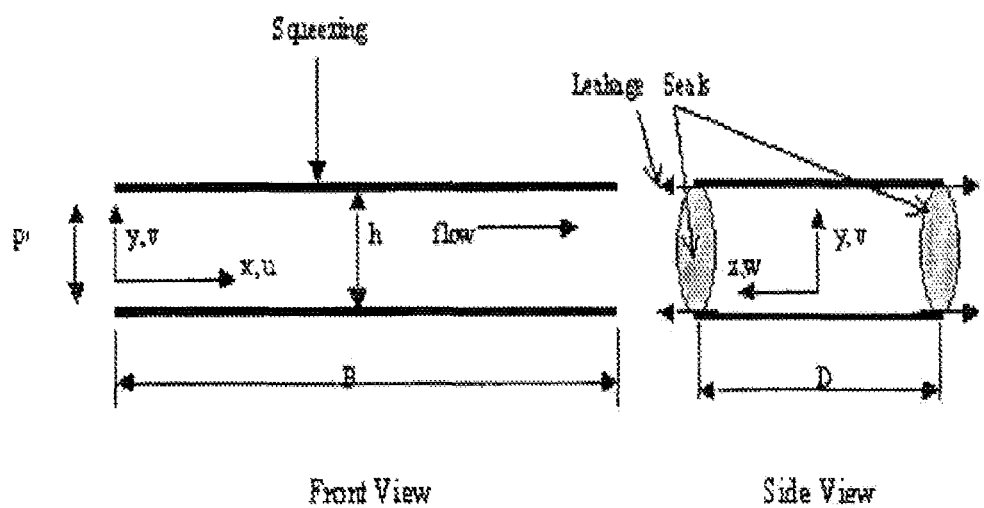
FIG. 43B is a schematic diagram of corresponding coordinate systems with leakage illustration.

A two-dimensional thin film fluidic cell that has a small thickness h compared to its length 2B and its width D was considered. The inlet of this fluidic cell is taken to be at its center forming a symmetrical fluidic cell, as shown in FIG. 43A, in order to assure an almost uniform deformation in the seal along its length under pulsative flows. The analysis was concerned with one half of the fluidic cell shown in FIG. 43B due to the symmetry of the proposed cell. The x-axis is taken along the axial direction starting from the inlet while y-axis and z-axis are taken along its thickness and width, respectively, as shown in FIG. 43B.

5B. Fluid Leakage in the Presence of Internal Pressure Pulsations

The lower substrate of the thin film is assumed to be fixed or immobilized (immobile and inflexible substrate) while the upper substrate is attached to the lower substrate by flexible seals and therefore capable of movement (mobile and inflexible substrate). The average dimensionless motion of the upper substrate H is expressed according to the following relation:

$$H \equiv \frac{h}{h_o} = (1 + H_p) \qquad \text{Eq. 106}$$

wherein h, $h_o$, and $H_p$ are the dimensional average thin film thickness, a reference thin film thickness, and the average dimensionless change in the film thickness due to internal pressure forces, respectively.

The following dimensionless variables will be utilized in the analysis herein:

$$X = \frac{x}{B} \qquad \text{Eq. 107a}$$

$$Y = \frac{y}{h_o} \qquad \text{Eq. 107b}$$

$$Z = \frac{z}{B} \qquad \text{Eq. 107c}$$

$$\tau = \omega t \qquad \text{Eq. 107d}$$

$$U = \frac{u}{(\omega B + V_o)} \qquad \text{Eq. 107e}$$

$$V = \frac{v}{h_o \omega} \qquad \text{Eq. 107f}$$

$$W = \frac{w}{(\omega B + V_o)} \qquad \text{Eq. 107g}$$

$$\Pi = \frac{p - p_e}{\mu\left(\omega + \frac{V_o}{B}\right)\varepsilon^{-2}} \qquad \text{Eq. 107h}$$

$$\theta = \frac{T - T_1}{(q_o h_o)/k} \qquad \text{Eq. 107i}$$

wherein $\omega$, $T_1$, $p_e$, $V_o$, $\mu$, k, and $\varepsilon$ are the reference frequency of internal pulsations, inlet temperature of the fluid, a constant representing the exit pressure, a constant representing a reference dimensional velocity, dynamic viscosity of the fluid, thermal conductivity of the fluid, and the perturbation parameter ($\varepsilon = h_o/B$), respectively. The pressure at the exit and the outside pressure were assumed to be at the exit pressure. The lower substrate is maintained at a uniform wall heat flux condition $q_o$. The variables t, u, v, w, p, and T are the time, axial velocity component, normal velocity component, lateral velocity component, pressure, and the temperature, respectively. The dimensionless variables X, Y, Z, $\tau$, U, V, W, $\Pi$, and $\theta$ are the dimensionless forms of x, y, z, t, u, v, w, p, and T variables, respectively.

The average dimensionless change in the film thickness was related to the average dimensionless pressure inside the thin film fluidic cell $\Pi_{AVG}$ through the theory of linear elasticity and assumes that the change in the pressure force on the upper substrate is linearly proportional to the average change in the thin film thickness by the following relation:

$$H_p = F_n \Pi_{AVG} \qquad \text{Eq. 108}$$

wherein $F_n$ is named, the fixation parameter. A larger $F_n$ value indicates softer seal-upper substrate assembly. See Boresi et al. (1978) Advanced Mechanics of Materials Wiley, NY, which is herein incorporated by reference. The inertia of the upper substrate is negligible because the frequency of pulsations is usually small. The fixation parameter $F_n$ that appears in Equation 108 is equal to:

$$F_n = K^* \frac{\mu(V_o + \omega B)D}{2(B + 0.5D)E\varepsilon^2 h_s} \qquad \text{Eq. 109}$$

wherein E and $h_s$ are the effective modulus of elasticity and the effective dimension of the seal ($h_s = h_o$ for a square seal cross section), respectively. The factor K* reflects the contribution of the elastic behavior of the upper substrate. The parameter $F_n$ becomes apparent when the thin film thickness is very small ($h_o$ less than about 0.15 mm).

Most flows inside thin films possess relatively small Reynolds numbers and could be creep flows as in biological applications, i.e. the modified Reynolds numbers, $Re_L = V_o h_o \varepsilon / \nu$ and $Re_s = h_o^2 \omega / \upsilon$, are less than one. Therefore, the low Reynolds number flow model was adopted. Accordingly, the continuity and momentum equations for the flow inside the fluidic cell filled with a Newtonian fluid were reduced to the following non-dimensionalized equations along with the non-dimensionalized energy equation:

$$U = \frac{1}{2}\frac{\partial \Pi}{\partial X}H^2\left(\frac{Y}{H}\right)\left(\frac{Y}{H} - 1\right) \qquad \text{Eq. 110}$$

$$V = \frac{dH}{d\tau}\left(3\left(\frac{Y}{H}\right)^2 - 2\left(\frac{Y}{H}\right)^3\right) \qquad \text{Eq. 111}$$

$$W = -\frac{1}{2}M_L\Pi\frac{Z}{H}\left(\frac{Y}{H}\right)\left(\frac{Y}{H} - 1\right) \qquad \text{Eq. 112}$$

$$\frac{\partial^2 \Pi}{\partial X^2} - \frac{M_L}{H^3}\Pi = \frac{\sigma}{H^3}\frac{dH}{d\tau} \qquad \text{Eq. 113}$$

$$P_S\left(\frac{\partial \theta}{\partial \tau} + \frac{12}{\sigma}U\frac{\partial \theta}{\partial X} + V\frac{\partial \theta}{\partial Y}\right) = \frac{\partial^2 \theta}{\partial Y^2} \qquad \text{Eq. 114}$$

No slip conditions were assumed at the lower and the upper substrates of the fluidic cell as shown in Equation 110. The parameters $\sigma$ and $P_S$ are called the squeezing number and thermal squeezing parameter, respectively, and are defined as:

$$\sigma = \frac{12}{1 + \frac{V_o}{\omega B}} \qquad \text{Eq. 115a}$$

$$P_S = \frac{\rho c_p h_o^2 \omega}{k} \qquad \text{Eq. 115b}$$

According to Equation 112, the leakage inside the thin film is distributed equally on both sides of the thin film and it is relatively small. Thus, linearization of the lateral pressure gradient was used. As seen in Equation 112, side leakage is proportional to the pressure difference between internal and external (at $P_e$) pressures of the thin film. Equation 113 is the corresponding modified Reynolds equation of the problem. Equation 114 is applicable at the plane of symmetry at Z=0. The parameter $M_L$ in Equation 112 will be named the dimensionless leakage parameter and is related to the total leaked mass $m_L$ through the following relation:

$$m_L = \frac{1}{12}\int_0^1 M_L \Pi \rho D h_o (V_o + \omega B) dX.$$

The inlet pressure due to flow disturbances in the pumping process is considered to have the following relation:

$$\Pi_i = \Pi_o(1 + \beta_v \sin(\gamma \omega t))$$ Eq. 116 wherein $\beta_v$, $\gamma$, $\Pi_i$, and $\Pi_o$ are the dimensionless amplitude in the pressure, dimensionless frequency of the pressure pulsations, inlet dimensionless pressure, and the mean dimensionless inlet pressure, respectively. The solution to Equation 113 is obtained as:

$$\Pi(X, \tau) = \left(\Pi_i + \frac{\sigma}{M_L}\frac{dH}{d\tau}\right)\cosh\left(\sqrt{\frac{M_L}{H^3}}\,X\right) - \frac{\sigma}{M_L}\frac{dH}{d\tau} + \left(\frac{\sigma}{M_L}\frac{dH}{d\tau} - \left[\Pi_i + \frac{\sigma}{M_L}\frac{dH}{d\tau}\right]\cosh\left(\sqrt{\frac{M_L}{H^3}}\right)\right)\frac{\sinh\left(\sqrt{\frac{M_L}{H^3}}\,X\right)}{\sinh\left(\sqrt{\frac{M_L}{H^3}}\right)}$$ Eq. 117

The reference velocity $V_o$ is taken to be the velocity inside the thin film in absence of any disturbance and it is related to $\Pi_o$ according to following relation:

$$\Pi_o = 12 - \sigma$$ Eq. 118

5C. Slip Effects and Non-Newtonian Effects in Presence of External Squeezing The effects of fluid slip at the boundaries and non-Newtonian effects in the presence of an external disturbance were analyzed. The dimensionless oscillation of upper substrate was based on the following generic relationship:

$$H = 1 - \beta \cos(\gamma \tau)$$ Eq. 119 wherein $\beta$ and $\gamma$ are the amplitude of the motion and a selected dimensionless frequency, respectively. The apparent viscosity $\mu$ of a non-Newtonian fluid such as a biofluid at low flow rates can be expressed according to the following power-law formula:

$$\mu = \mu_o \left|\frac{\partial u}{\partial y}\right|^{n-1}$$

where n is a constant representing the power law index. As a result, axial momentum equation for creep flow reduces to the following, $\mu_o$ replaces $\mu$ in Equation 107h:

$$\frac{\partial \Pi}{\partial X} = \left(\frac{V_o + \omega B}{h_o}\right)^{n-1} \frac{\partial}{\partial Y}\left(\left|\frac{\partial U}{\partial Y}\right|^{n-1}\frac{\partial U}{\partial Y}\right)$$ Eq. 120

According to the linear relationship between the wall slip velocity and the shear rate at a solid boundary, the dimensionless boundary conditions for the axial velocity at the substrates are:

$$U(0, \tau) - \frac{\beta_P}{h_o}\frac{\partial U(0, \tau)}{\partial Y} = 0$$

$$U(H, \tau) + \frac{\beta_P}{h_o}\frac{\partial U(H, \tau)}{\partial Y} = 0$$ Eqs. 121a, 121b wherein $\beta_p$ is the dimensional slip parameter. See Navier (1823) Mem. Acad. Sci. Inst. France 1:414-416, which is herein incorporated by reference. By solving Equation 120 and the continuity equation, the modified Reynolds equation is:

$$\frac{\partial}{\partial X}\left[\left(\frac{n}{(2n+1)} + 2\left(\frac{\beta_P}{h_o}\right)\frac{1}{H}\right)\left(\frac{H}{2}\right)^{(2n+1)/n}\left(-\frac{\partial \Pi}{\partial X}\right)^{1/n}\right] = -\frac{\sigma}{24}\frac{dH}{d\tau}\left(\frac{V_o + \omega B}{h_o}\right)^{(2n+1)/n}$$ Eq. 122

For a constant average inlet velocity condition $V_o$ during the oscillations, Equation 120 can be used for determining the velocity field, U and V, for the lower half of the thin film (Y/H<0.5), which are found to be:

$$U(X, Y, \tau) = \frac{[\sigma \beta \gamma \sin(\gamma \tau)X - (12 - \sigma)H(0, \tau)]}{12\left(\frac{n}{2n+1} + 2\left(\frac{\beta_P}{h_o}\right)\frac{1}{H}\right)H} \times \left[\frac{n}{n+1}\left\{\left(1 - 2\left(\frac{Y}{H}\right)\right)^{\frac{(n+1)}{n}} - 1\right\} - 2\left(\frac{\beta_P}{h_o}\right)\frac{1}{H}\right]$$ Eq. 123

$$V(X, Y, \tau) = \frac{\beta \gamma \sin(\gamma \tau)}{\left(\frac{n}{2n+1} + 2\left(\frac{\beta_P}{h_o}\right)\frac{1}{H}\right)} \times \left[\frac{n}{n+1}\left\{\left(\frac{n}{2n+1}\right)\left(\frac{1}{2}\right)\left\{\left(1 - 2\left(\frac{Y}{H}\right)\right)^{\frac{(2n+1)}{n}} - 1\right\} + \frac{Y}{H}\right\} + 2\left(\frac{\beta_P}{h_o}\right)\left(\frac{1}{H}\right)\left(\frac{Y}{H}\right)\right]$$ Eq. 124

Accordingly, the fluid slip velocity at the wall is obtained as:

$$U_{Slip}(X, \tau) = \frac{-2\left(\frac{\beta_P}{h_o}\right)\frac{1}{H}}{12\left(\frac{n}{2n+1} + 2\left(\frac{\beta_P}{h_o}\right)\frac{1}{H}\right)}\frac{[\sigma \beta \gamma \sin(\gamma \tau)X - (12 - \sigma)H(0, \tau)]}{H}$$ Eq. 125

5D. Thermal Boundary Condition

The upper substrate was assumed to be insulated while the lower substrate was maintained at a constant heat flux. Accordingly, the dimensionless thermal boundary and initial conditions are:

$$\theta(X, Y, 0) = 0, \theta(0, Y, \tau) = 0,$$

$$\frac{\partial \theta(X, 0, \tau)}{\partial Y} = -1, \frac{\partial \theta(X, H, \tau)}{\partial Y} = 0$$ Eq. 126

5E. Numerical Methods

The dimensionless average thickness of the thin film for the leakage problem was determined by solving Equations 106 and 108 and the average of Equation 117, simultaneously, using the explicit formulation with respect to time. Accordingly, the velocity field U, V and W was determined. The energy equation, Equation 114, was then solved using the Alternative Direction Implicit (ADI) method known in the art by transferring the problem to one with constant boundaries using the following transformation: $\tau^* = \tau$, $\xi = X$ and $$\eta = \frac{Y}{H}.$$

5F. Results and Discussions

The used dimensionless parameters in the leakage problem were selected according to the following data from the literature: the estimated volume of the fluidic cell, FIG. 43B, is 50 µl and the flow rate of the liquid is 0.5 ml/min. The thin film thickness was taken to be less than about 0.15 mm and the effective modulus of elasticity of the seal was considered to be between $10^5$ pa and $10^6$ pa.

5G. Leakage and Slippage Effects on Flow Dynamics Inside Thin Films

Figure 44A:
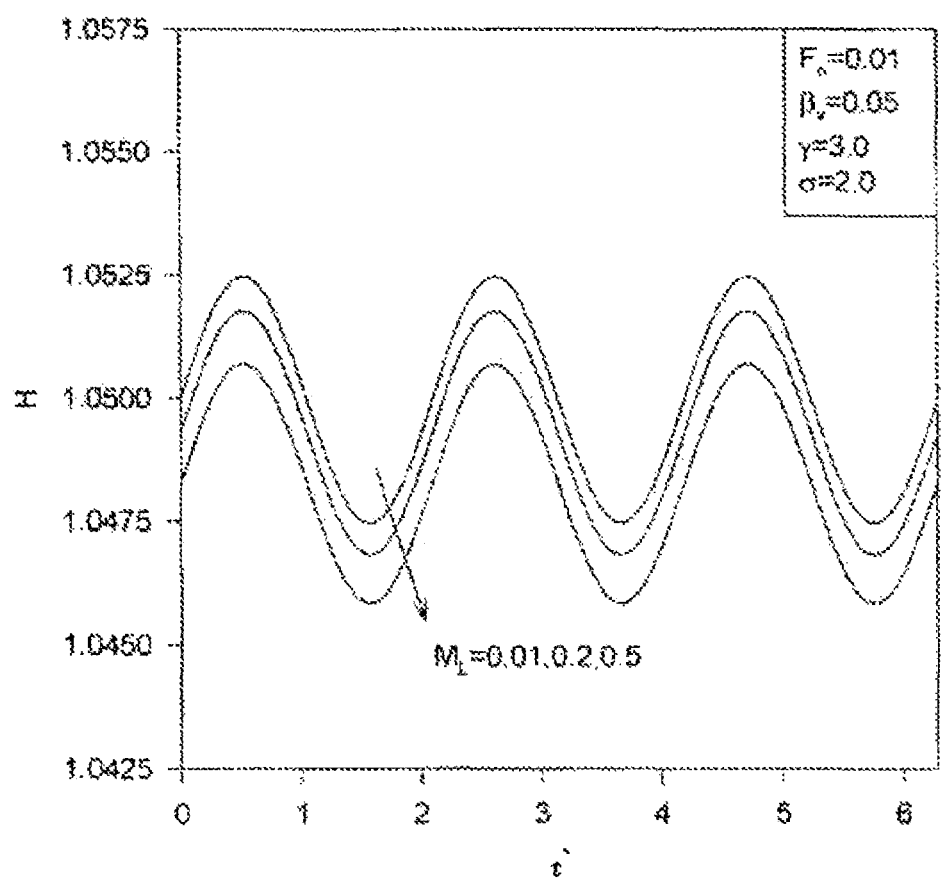
FIG. 44A shows effects of the dimensionless leakage parameter $M_L$ on the dimensionless thin film thickness H, the film thickness decreases with an increase in the leakage.
Figure 44B:
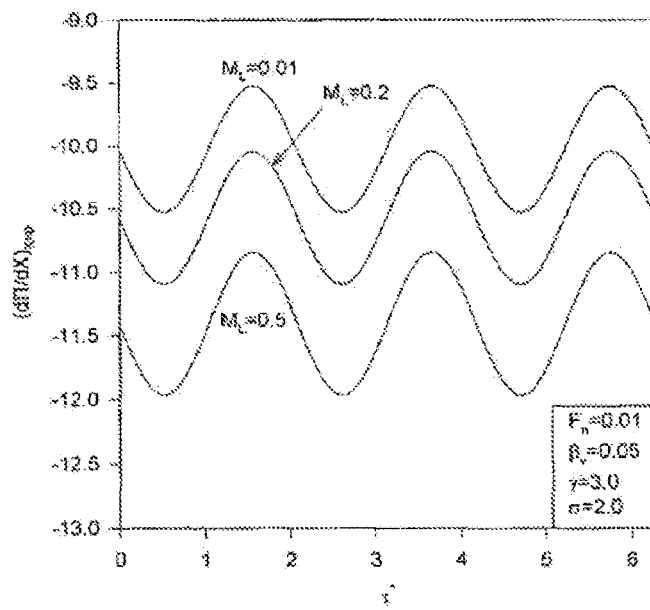
FIG. 44B shows effects of the dimensionless leakage parameter $M_L$ on the inlet pressure gradient.

FIG. 44A shows that the thin film thickness decreases as the dimensionless leakage parameter $M_L$ increases. A relief in the average internal pressure is expected when the leakage rate increases at a constant inlet pressure. This reduced pressure results in a reduction in the force holding the upper substrate and a decrease in the thickness. Accordingly, the absolute values of the inlet pressure gradient increases as the leakage rate increases, thereby causing the inlet flow rate to increase. See FIG. 44B.

According to FIG. 44A, the leakage rate has almost an insignificant effect on the fluctuation rate at the upper substrate, dH/dτ. However, the associated reduction in the film thickness increases fluctuations in axial and normal velocities at the sensor position, which tend to magnify the noise in the sensor measurements especially if the sensor is placed near the disturbed substrate. Induced lateral flow due to leakage may cause a lateral bending or twisting of the sensor, e.g. microcantilever. Both effects tend to reduce the accuracy of the measurement and may damage the microcantilever over a long period of time. The fluctuations due to mass leakage can be minimized if the fluidic cell width D is maximized.

Figure 45:
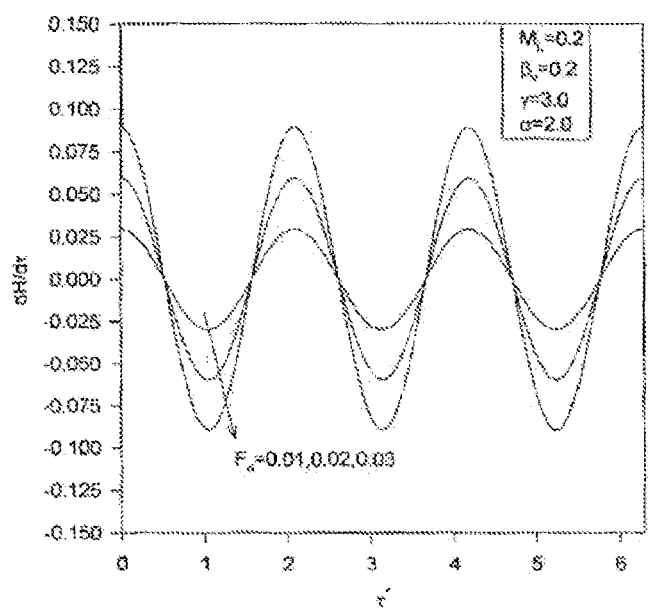
FIG. 45 shows effects of the fixation parameter $F_n$ on the fluctuation rate at the upper substrate $dH/d\tau$. The fluctuation rate increases as the seal becomes softer.
Figure 46:
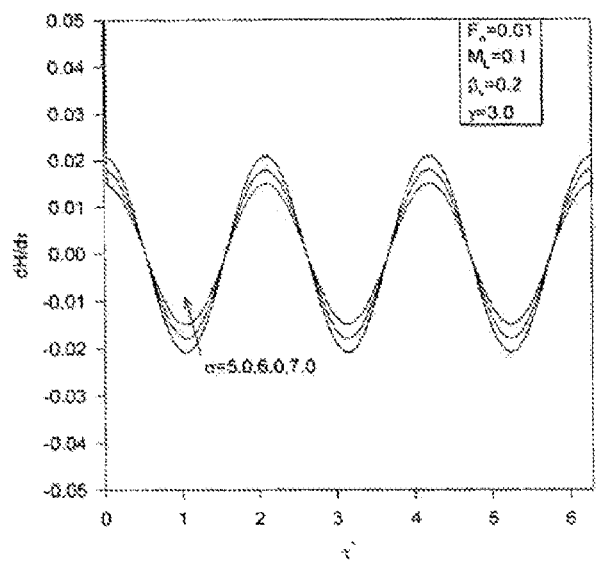
FIG. 46 shows effects of the squeezing number $\sigma$ on the fluctuation rate at the upper substrate $dH/d\tau$. The fluctuation rate decreases as the order of the inlet velocity decreases compared to the axial squeezed velocity due to pressure pulsations.

When the upper substrate assembly employs a flexible seal as for large $F_n$, values, the film thickness will be more sensitive to internal pressure pulsations. As a result, an increase in the fixation parameter $F_n$ causes an increase in the fluctuation rate at the upper substrate and consequently an increase in flow fluctuations is associated. See Equations 110-114 and 117 and FIG. 45. Meanwhile, an increase in the squeezing number 6 results in a reduction in pressure pulsations levels, thereby reducing the fluctuation rate. See FIG. 46. As such, flexible seals and large velocities produce large fluctuations in the flow within the fluidic cell. Similar trends can be extracted for the lateral fluctuations in view of Equation 112. Accordingly, the noise in the measurement with respect to a microcantilever sensor is magnified as the fixation parameter $F_n$ increases especially at large pulsation rates.

Figure 47A:
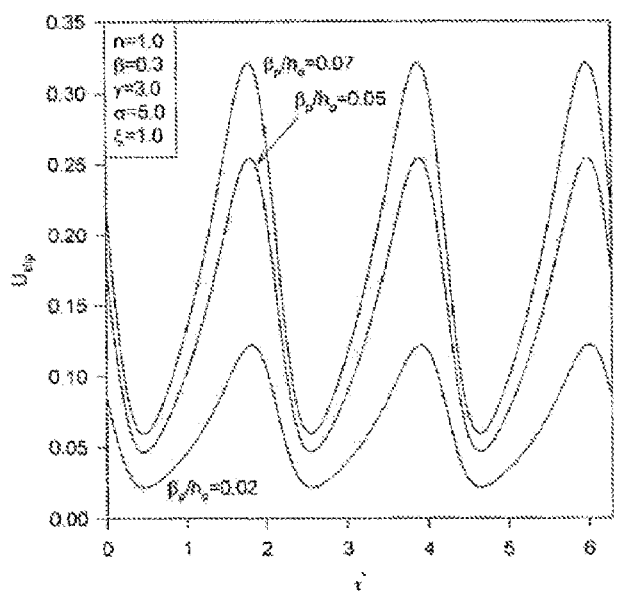
FIG. 47A shows the effects of the dimensionless slip parameter $\beta_P/h_o$ on the dimensionless wall slip velocity $U_{slip}$.
Figure 47B:
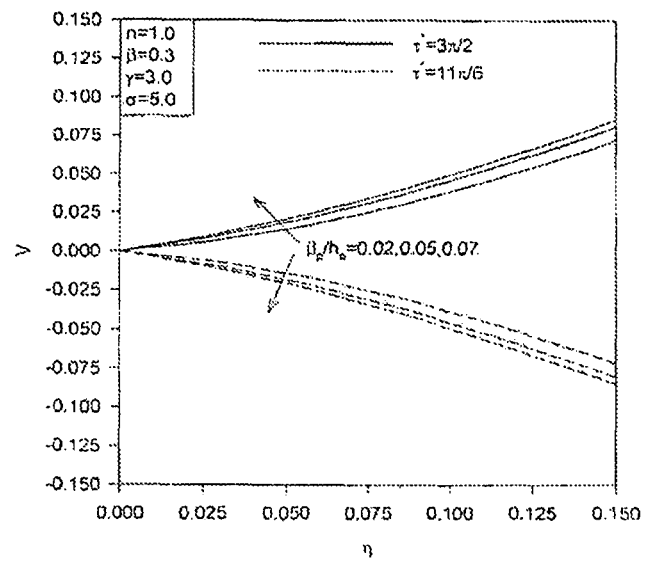
FIG. 47B shows the effects of the dimensionless slip parameter $\beta_P/h_o$ on the dimensionless normal velocity V (the dimensionless time $\tau^*=3\pi/2$ corresponds to the time at which the fluctuation rate at the upper substrate is maximum while $\tau^*=11\pi/6$ corresponds to the time at which the fluctuation rate at the upper substrate is minimum).

The resistance against the flow decreases as the dimensionless wall slip parameter $\beta_F/h_o$ increases. Thus, the wall slip velocity increases as $\beta_F/h_o$ increases. See FIG. 47A. This results in a reduction in the maximum axial velocity since the average flow velocity is kept constant for each case. The maximum slip velocity occurs during the squeezing stages. Due to the increase in the uniformity of the axial velocity profiles as $\beta_F/h_o$ increases, flow fluctuations increase near the fixed substrate (immobile and inflexible substrate). See FIG. 47B. This causes enlargement in the noise with respect to microcantilever measurements.

Figure 48A:
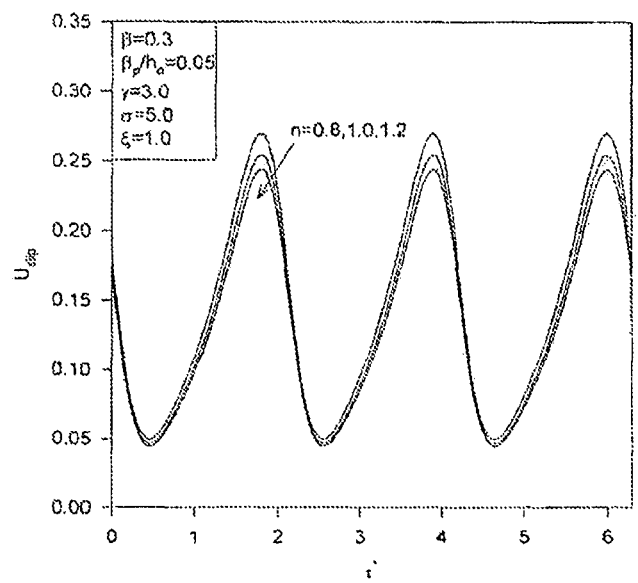
FIG. 48A shows the effects of the power law index n on the dimensionless wall slip velocity $U_{slip}$.
Figure 48B:
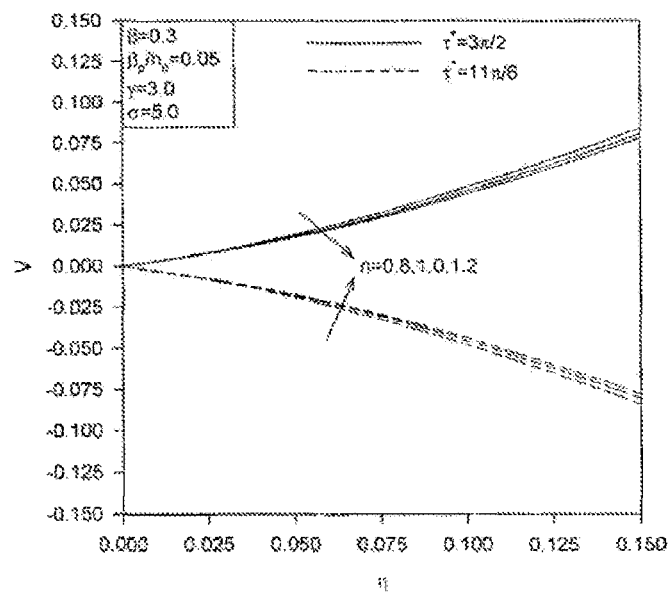
FIG. 48B shows the effects of the power law index n on the dimensionless normal velocity V (the dimensionless time $\tau^*=3\pi/2$ corresponds to the time at which the fluctuation rate at the upper substrate is maximum while $\tau^*=11\pi/6$ corresponds to the time at which the fluctuation rate at the upper substrate is minimum).

Due to the expected increase in wall shear stresses for pseudoplastic (n<1) fluids as the power law index n decreases, the wall slip velocity increases as n decreases. See FIG. 48A. The uniformity of the axial velocity profiles increases as n decreases. However, flow fluctuations increase near the fixed substrate (immobile and inflexible substrate) as n decreases. See FIG. 48B. Consequently, dilute solutions of test samples to be analyzed are preferred over undiluted or viscous samples as they produce minimal flow fluctuations near the undisturbed substrate.

5H. Leakage and Slippage Effects on Thermal Characteristics Inside Thin Films

Figure 49:
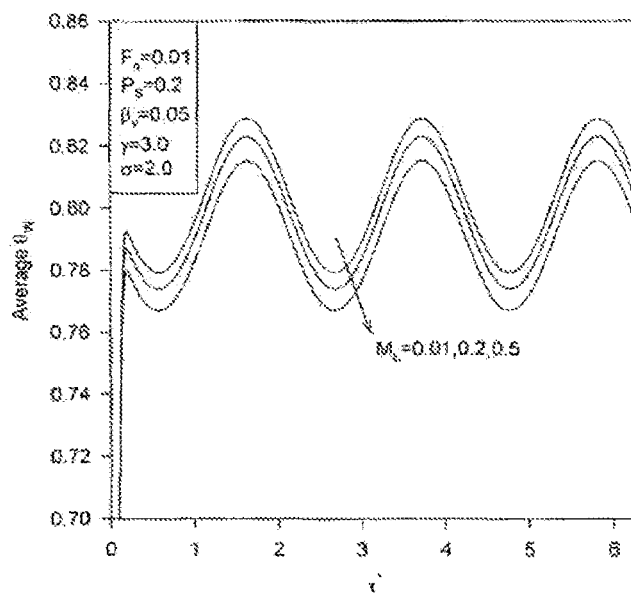
FIG. 49 shows the effects of the dimensionless leakage parameter $M_L$ on the average dimensionless lower substrate temperature $\theta_W$. The cooling increases with an increase in the leakage rate.
Figure 50:
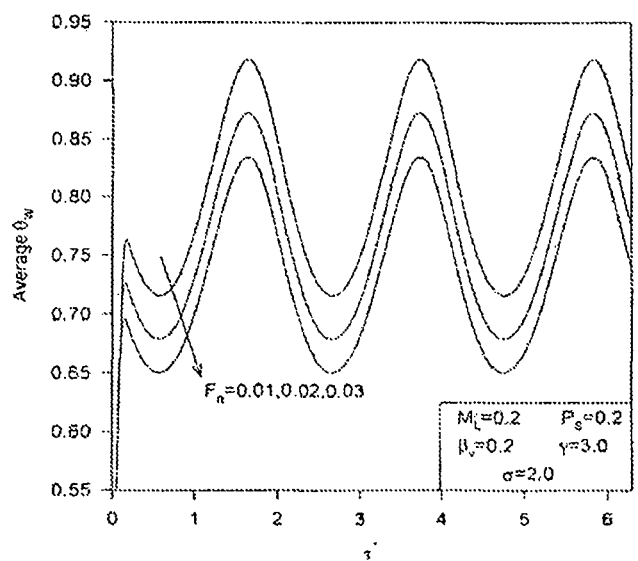
FIG. 50 shows the effects of the fixation parameter $F_n$ on the average dimensionless lower substrate temperature $\theta_W$. The cooling increases as the seal becomes softer.
Figure 51:
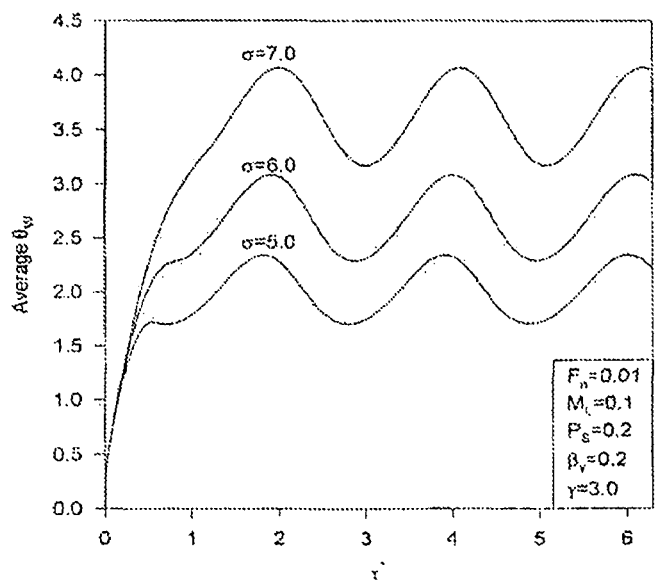
FIG. 51 shows the effects of the squeezing number $\sigma$ on the average dimensionless lower substrate temperature $\theta_W$. The cooling increases as the order of the inlet velocity increases.

The reduction in internal pressures associated with an increase in the leakage rate results in an increase in the inlet flow rate which reduces the average dimensionless lower substrate temperature as seen in FIG. 49. This causes the temperature levels around the microcantilever surface to be closer to the inlet temperature. See Equation 107i. These temperatures may be significantly different from the original microcantilever temperature. Thus, the deflection of the bimaterial microcantilever due to thermal effects may be magnified when leakage is present. Similarly, thermal effects on bimaterial sensors can be magnified by an increase in $F_n$ and a decrease in σ since both effects cause a reduction in the dimensionless average lower substrate temperature. See FIG. 50 and FIG. 51. According to FIG. 49, for the range of $M_L$ used, thermal variations can be neglected when compared to variations in $M_L$.

5I. A Design for a Thin Film Fluidic Cell

Figure 52:
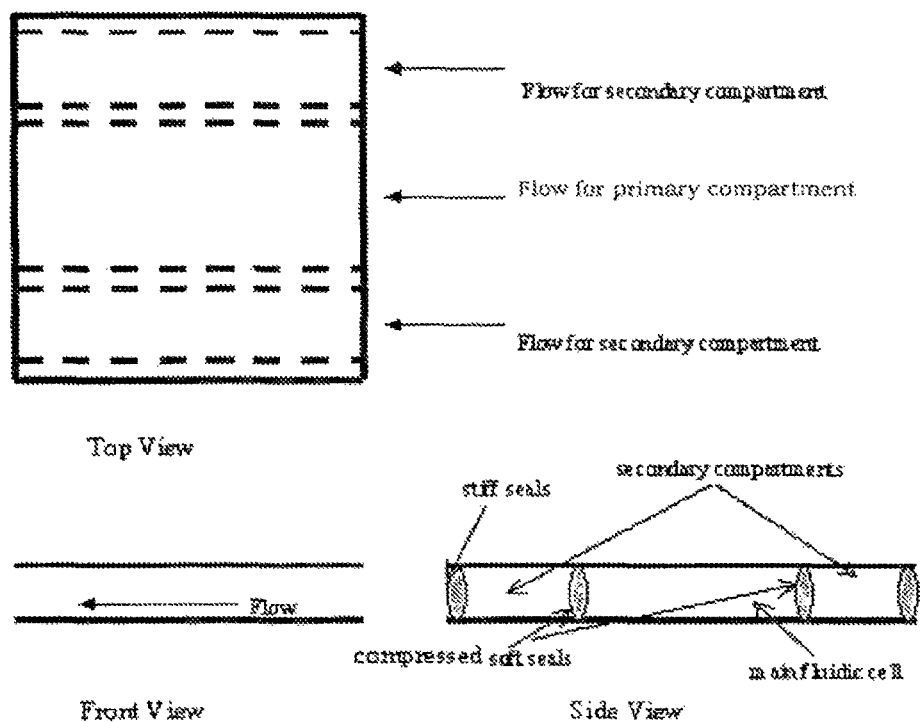
FIG. 52 shows a multi-compartment fluidic cell.

In order to minimize axial, normal and lateral flow disturbances inside thin films, the parameters $F_n$, $m_L$ and β are minimized. Designs of these films as provided herein can satisfy these constraints. For example, the multi-compartment fluidic cell with multiple inlets shown in FIG. 52 will result in reductions in minimizing flow fluctuations associated with internal/external disturbances, leakage and the softening effect of the support and upper substrate assembly because the expected reduced pressure difference between the main cell and the two secondary cells minimizes $m_L$. The width of the secondary compartment is preferably less than half of the width of the main cell, thereby reducing $F_n$. The parameters $F_n$ and $m_L$ can also be reduced if stiff seals are used for the outer most supports while the interior flexible seals are kept under compression as shown in FIG. 52. Thus, β is reduced. The flow inside the secondary compartments can be similar to the primary fluid flow conditions or different.

5J. Conclusions

Flow fluctuations within a fluidic cell and consequently the noise in the measurement due to flow disturbances, may be minimized by considering the following effects:

minimizing the working velocities;
maximizing the thickness of the upper substrate;
maximizing the thin film width if large leakage rate is involved;
minimizing the thin film width in the absence of leakage;
maximizing the perturbation parameter;
utilizing dilute working fluid; and
maximizing the thin film thickness.

The last three effects may increase the microcantilever deflection due to thermal effects. Thus, in preferred embodiments of the present invention, flow oscillations are reduced by employing fluidic cell designs provided herein.

6. Smart Passive Thermal Systems

6A. Systems with Increased Capacity as Thermal Load Increases

Figure 53A:
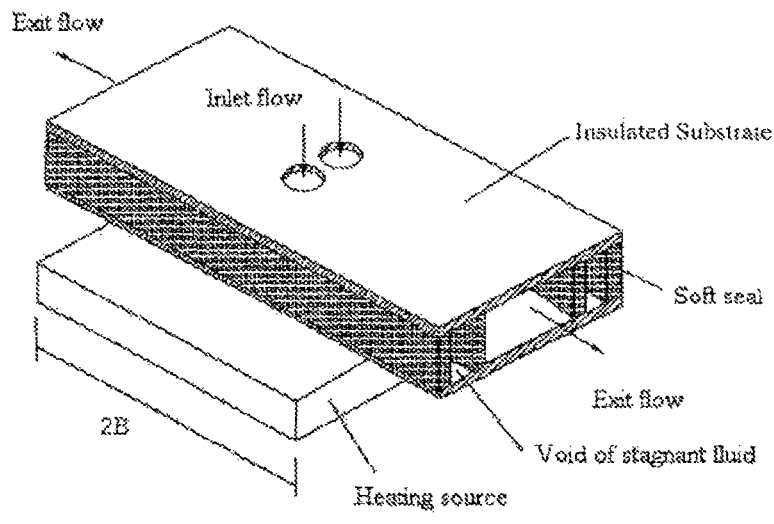
FIG. 53A shows systems with increased cooling capacity as thermal load increases utilizing a flexible complex seal according to the present invention.

FIG. 53A shows a thin film microchannel with its substrates (inflexible) separated by flexible complex seals, containing closed cavities filled with a stagnant fluid, such as a gas, possessing a large volumetric thermal expansion. When the thermal load increases over its projected capacity, the temperature of the coolant increases causing an increase in the temperature of the thin film substrates. As such the closed cavities get overheated and the stagnant fluid starts to expand. This causes the separation between the thin film substrates to increase, which allows for an increase in the coolant flow rate to increase. Accordingly, the excessive heating is removed. However, under very high operating thermal conditions, as in lubrications and very high flux electrical components, the supporting seals may not work properly.

Figure 53B:
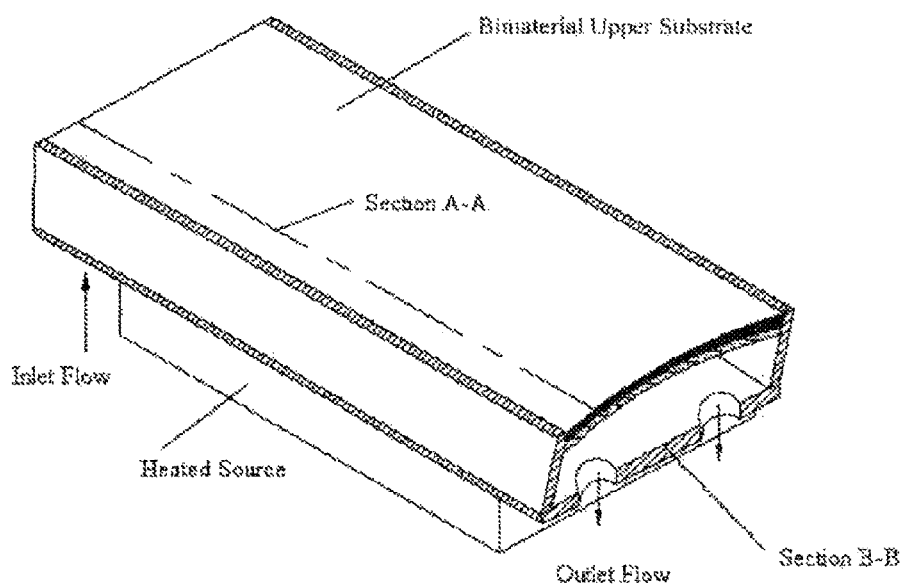
FIG. 53B shows systems with increased cooling capacity as thermal load increases utilizing a bimaterial upper substrate.
Figure 53C:
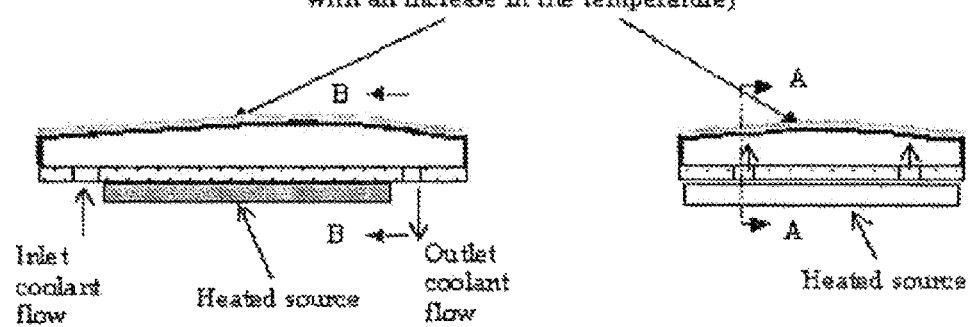
FIG. 53C shows an alternative embodiment with respect to FIGS. 53A and 53B.

Thus, the present invention provides an upper substrate (flexible) assembly that can be bent or flexed in certain direction when exposed to heat. Such an upper substrate assembly is shown in FIG. 53B. In preferred embodiments, the upper substrate assembly is made to be bimaterial such that the upper layer has a higher linear thermal expansion coefficient than that for the lower layer material. Excessive heating causes the coolant temperature to increase, which in turn, heats the upper substrate assembly. As such, the upper substrate bends outward allowing for more coolant to flow inside the thin film. In these embodiments of the present invention, the upper substrate comprises an upper layer and a lower layer, wherein the upper layer comprises a material having a linear expansion coefficient that is higher than that of the material of the lower layer. In some embodiments, the upper substrate comprises two metal layers, such as aluminum or gold for the upper layer and copper or bronze for the bottom layer. This can be applied, for example, when working temperatures exceed about 300° C. and the thin film thickness is smaller than about 50 µm. In some embodiments, the upper substrate comprises a thermoplastic layer, such as fluoropolymers including polytetrafluoroethylene, polyperfluoroalkoxyethylene, perfluoromethylvinylether and the like, and a metal layer, such as copper and bronze, and the like. In some embodiments, the upper substrate comprises two thermoplastic layers wherein the linear expansion coefficient of the upper thermoplastic layer is higher that that of lower thermoplastic layer.

6B. Systems with Decreased Capacity as Thermal Load Increases

Figure 54A:
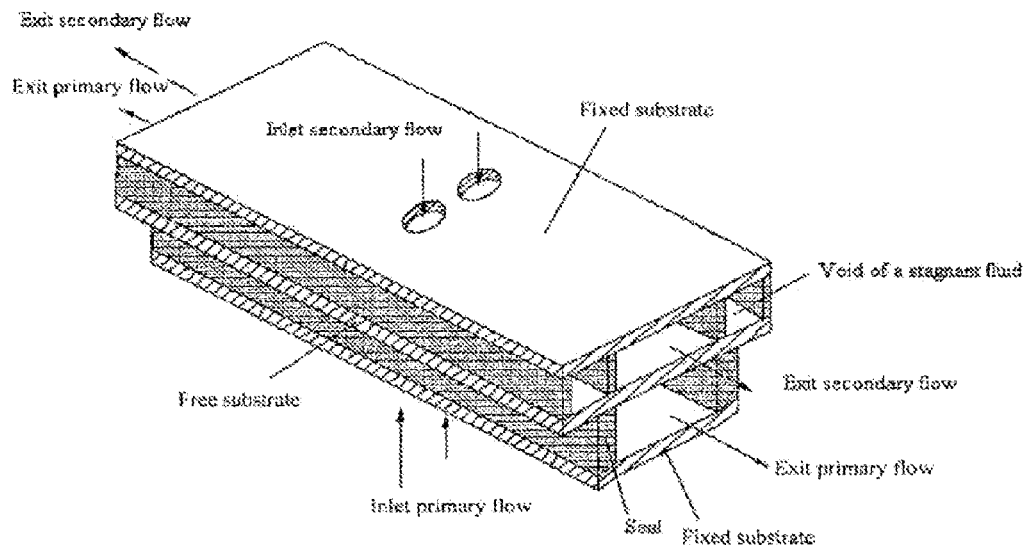
FIG. 54A shows systems with decreased cooling capacity as thermal load increases utilizing flexible complex seals according to the present invention and two layered thin films.

FIG. 54A shows a two layered thin film microchannel. The substrates (inflexible) of upper layer, which is a secondary fluid layer, are separated by flexible complex seals, containing closed cavities filled with a stagnant fluid possessing a large volumetric thermal expansion. The lower layer, which is the primary fluid layer, is only supported by flexible seals. The heated source is connected to the upper substrate. When the thermal load increases over its projected capacity, the temperature of the secondary fluid passing through the secondary fluid layer increases causing an increase in the temperature of the upper substrate of the two-layered thin film. As such the closed cavities get overheated and the stagnant fluid starts to expand. This causes shrinkage to the primary fluid layer, which reduces the flow rate of the primary fluid filling the primary fluid layer. This finds its applications, among others, in internal combustion where fuel flow is needed to be reduced as the engine gets overheated.

Figure 54B:
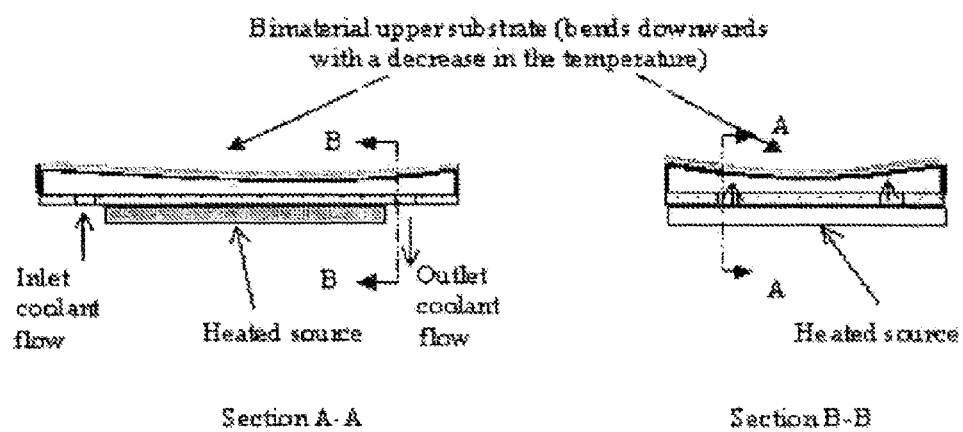
FIG. 54B shows systems with decreased cooling capacity as thermal load increases utilizing a bimaterial upper substrate.
Figure 54C:
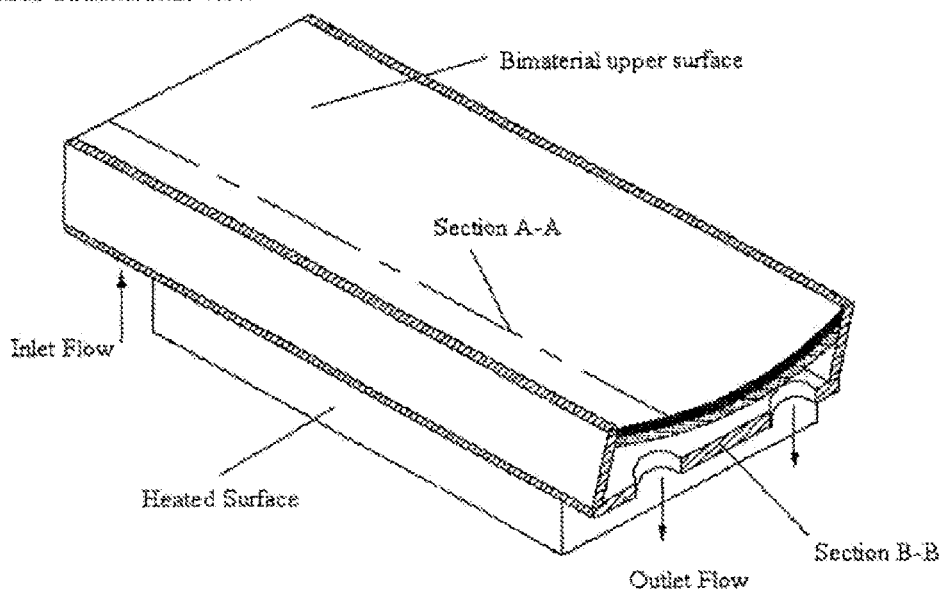
FIG. 54C shows an alternative embodiment with respect to FIGS. 54A and 54B.

However, under very high operating thermal conditions, as in deteriorated combustions, the supporting seals may not work properly. Thus, the present invention provides an upper substrate (flexible) assembly that may be operated under high thermal conditions. Such a design is shown in FIG. 54B. The upper substrate can be made to be bimaterial such that its lower layer has a higher linear thermal expansion coefficient than that for upper layer material. Excessive heating causes the coolant temperature to increase, which in turn, heats the upper substrate. As such, the upper substrate bends inward resulting in less coolant flow rate inside the thin film. In these embodiments of the present invention, the upper substrate comprises an upper layer and a lower layer, wherein the upper layer comprises a material having a linear expansion coefficient that is lower than that of the material of the lower layer. In some embodiments, the upper substrate comprises two metal layers, such as copper or bronze for the upper layer and aluminum or gold for the lower (This can be applied, for example, when working temperatures exceed about 300° C. and the thin film thickness is lower than about 50 µm). In some embodiments, the upper substrate comprises an upper metal layer, such as copper or bronze, and a lower thermoplastic layer such as such as fluoropolymers including polytetrafluoroethylene, polyperfluoroalkoxyethylene, perfluoromethylvinylether, and the like), and a metal layer, such as copper and bronze, and the like. In some embodiments, the upper substrate comprises two thermoplastic layers wherein the linear expansion coefficient of upper thermoplastic layer is lower than that that of the lower thermoplastic layer.

Example 1

Design of Enhancements in Thermal Characteristics of Different Insulating Assemblies Utilizing Expandable Fluid Layers Generally, thermal losses increase at large working temperatures. The present invention provides an insulating assembly having desirable insulative attributes at high working temperatures. That is, its effective thermal resistance increases with an increase in the working temperatures. An example of an insulating assembly of the present invention is shown in FIG. 1 and is composed of the following from bottom to top: (1) a heated substrate, (2) a layer of fluid that has a very low thermal conductivity such as xenon (the primary fluid layer), (3) a thin layer of an insulating substrate, (4) a secondary fluid layer of another fluid that has a lower thermal conductivity like air (needs to be larger than that of the first layer and is open to the outside environment), and (5) a top insulating substrate. The substrates forming the fluid layers along with the intermediate insulating substrate were connected together by flexible seals. The lower substrate was adjacent or in contact with a heat source. Both the lower substrate and the upper insulating substrate were fixed (immobile and inflexible substrates) while the intermediate insulating substrate was free to move as it was supported by flexible seals (mobile and inflexible substrate). In order to avoid melting of the seals at high temperatures, ordinary homogenous flexible seals can be replaced with closed-cell foams comprising small air cavities separated by sealed partitions that can sustain high temperature.

The mathematical modeling for the insulating assembly shown in FIG. 1. The expansion of the primary fluid layer, defined as the change in the primary fluid layer thickness, $\Delta h_1$, divided by the original primary fluid layer thickness, $h_o$, is equal to the following:

$$\frac{\Delta h_1}{h_o} = \left(\frac{T_o + \Delta T_o}{2\Delta T_o}\right)\left[\sqrt{\frac{4(T^* - T_o)\Delta T_o}{(T_o + \Delta T_o)^2} + 1} - 1\right] \qquad \text{Eq. 127}$$

wherein $T_o$ and $T^*$ are the original primary fluid layer temperature and the average primary fluid temperature, respectively. The quantity $\Delta T_o$ is equal to $Kh_o^2/(m_1 R_1)$ where $m_1$, $R_1$, and K are the mass of the primary fluid, the primary fluid constant, and the stiffness of the supporting seals.

In addition, different plausible insulating assemblies which are compact and can provide additional enhancement to the insulating properties utilizing expandable fluid layers.

Figure 55A:
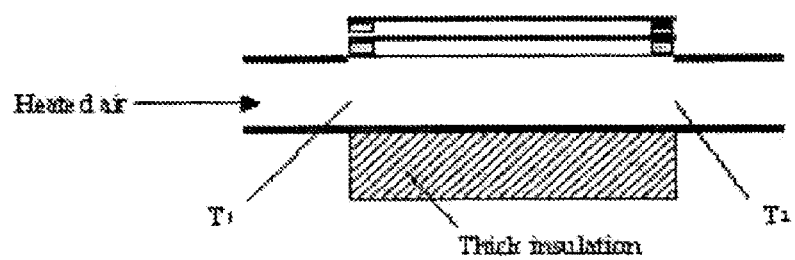
FIG. 55A shows an insulating assembly arrangement for low temperature applications.
Figure 55B:
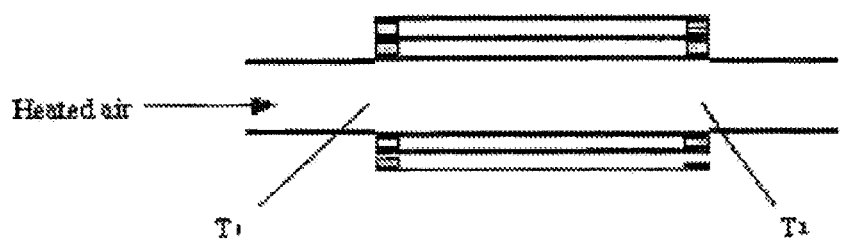
FIG. 55B shows an insulating assembly arrangement for high temperature applications.

An example of these are shown in FIG. 9 where multiple layers of the primary fluid are utilized or balloons filled with the primary fluid are used instead of the primary fluid layers. The enhancement in the insulating properties utilizing different enhanced insulating assemblies shown in FIG. 1 and FIG. 9 may be determined as provided herein using the insulating assemblies shown in FIG. 55A and FIG. 55B. For the setup shown in FIG. 55A, heated air flows inside a channel with one of its substrates subject to standard fibrous insulation while the other substrate is subject to the proposed insulation assembly. In FIG. 55B, both upper and lower substrate of the channel are subject to the proposed insulation assembly. The arrangement of FIG. 55B is preferred over the arrangement of 55A for high temperature applications. The heat transfer through the insulating assembly according to FIG. 55A is:

$$q = \dot{m}_{air}((c_p)_{air}(T_2 - T_1)) \qquad \text{Eq. 128}$$

wherein $\dot{m}_{air}$, $(c_p)_{air}$, $T_1$ and $T_2$ are the mass flow rate of the heated air, specific heat of the air, the inlet mean bulk temperature of the air, and the exit mean bulk temperature of the air, respectively. This value represents twice the heat transferred through each insulating assembly in FIG. 55B.

Figure 56:
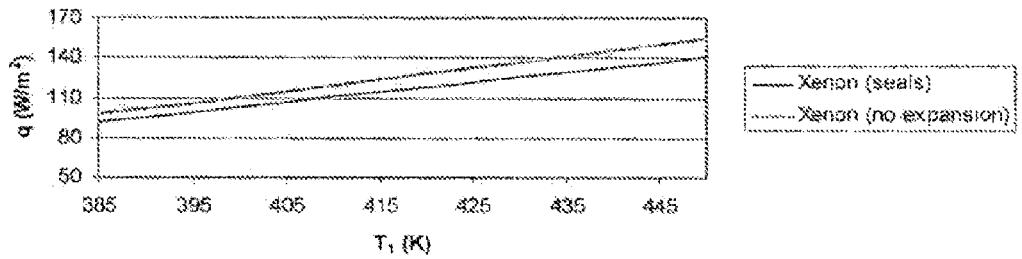
FIG. 56 shows expected sample results for xenon with and without the flexible seals of the present invention.

Experiments may be performed under various inlet air temperatures to investigate the enhancement in the insulating properties. A sample result expected from the experiment is shown in FIG. 56, which shows that the insulating assembly shown in FIG. 1 can provide about 10 percent additional insulating effects at $T_1 = 450$ K when flexible seals of the present invention are utilized. Useful correlations for the percent saving in energy are produced when expandable fluid layers are utilized.

Example 2

Design of Enhancements in Heat Transfer Inside Expandable Thin Film Channel Supported by Flexible Complex Seals FIG. 36 shows a thin film having a flexible complex seal. It is composed of the coolant flow, the working fluid, passage and the sealing assembly. This assembly contains closed cavities filled with a stagnant fluid having a relatively large coefficient of volumetric thermal expansion. The sealing assembly contains also flexible seals in order to allow the thin film to expand. A candidate for the flexible seal is the closed cell rubber foam. See Friis et al. (1988) J. Materials Science 23:4406-4414, which is herein incorporated by reference. Any excessive heat transfer to the thin film increases the temperature of the substrate. Thus, the stagnant fluid becomes warmer and expands. The seals are flexible enough so that the expansion results in an increase in the separation between the lower and the upper substrates. Accordingly, the flow resistance of the working fluid passage decreases, causing a flooding of the coolant. As a result, the excessive heating from the source is removed. Flexible seals can be placed between special guiders as shown in FIG. 1B. As such, side expansion of the seals can be minimized and the transverse thin film thickness expansion is maximized. The prior art provides a theoretical model for flow and heat transfer inside an expandable thin film. See Khaled & Vafai (2003) ASME J. Heat Transfer 125:916-925, which is herein incorporated by reference. The prior art also considers the application of small squeezing Reynolds number. See Khaled & Vafai (2003) ASME J. Heat Transfer 125:916-925, which is herein incorporated by reference. This is present when there is a noise in the thermal load which causes a squeezing effect at the free substrate (mobile and inflexible substrate). As such, a model in order to investigate methods for eliminating the fluctuation rates at the free substrate (mobile and inflexible substrate), thereby eliminating flow fluctuations in the global system.

The motion of the upper substrate shown in FIG. 36 due to both internal variations in the stagnant fluid temperature, due to the applied thermal load and the internal pressure is expressed according to the following relation:

$$H \equiv \frac{h}{h_o} = (1 + H_T + H_p) \qquad \text{Eq. 129}$$

wherein h, $h_o$, and H are the thin film thickness, a reference film thickness, and the dimensionless thin film thickness, respectively. The variables $H_T$ and $H_p$ are the dimensionless motion of the upper substrate due to the thermal expansion of the stagnant fluid and the dimensionless motion of the upper substrate as a result of the deformation of seals due to the average internal pressure of the working fluid, respectively.

The presence of a noise in the thermal load can result in a noise in dimensionless film thickness H which produces fluctuations in the flow rate due to squeezing effects. See Khaled & Vafai (2003) ASME J. Heat Transfer 125:916-925, which is herein incorporated by reference. The flow and heat transfer inside the expandable thin film can be simulated using an iterative procedure that results in solving the momentum and energy equations, Equation 130 and Equation 131, while satisfying Equation 129:

$$\rho \frac{DV}{Dt} = -\nabla p + \mu \nabla^2 V \qquad \text{Eq. 130}$$

$$\rho c_p \frac{DT}{Dt} = \nabla (k \nabla T) \qquad \text{Eq. 131}$$

wherein V, T, and p are the velocity field vector, temperature, and the fluid pressure, respectively, and $\rho$, $\mu$, $c_p$, and k are the primary fluid's density, primary fluid's absolute viscosity, primary fluid's specific heat, and the thermal conductivity of the primary fluid, respectively.

For the thin film shown in FIG. 36C, the displacement of the upper substrate due to internal pressure variations is related to the average pressure of the working fluid, $P_{AVG}$, inside the thin film through the theory of linear elasticity by the following relation:

$$H_p = \frac{DB}{Kh_o}(p_{AVG} - p_e) \qquad \text{Eq. 132}$$

wherein D, B, K, and $p_e$ are the thin film width, thin film length, the effective stiffness of the sealing assembly, and the external pressure, respectively. This is based on the fact that the upper substrate is assumed to be rigid and that the applied force on an elastic material (the flexible seal) is proportional to the elongation of this material. See Norton (1998) Machine Design; An Integrated Approach Prentice-Hall, N.J., which is herein incorporated by reference.

The increase in the thickness due to a pressure increase in the thin film causes a reduction in the stagnant fluid pressure. This action stiffens the sealing assembly. Therefore, the parameter κ is considered to be the effective stiffness for the sealing assembly and not for the seal itself. When the closed cavities are filled with an ideal gas, the effective K can be shown to be approximately equal to the following when the mass of the stagnant fluid is kept constant for the configuration shown in FIG. 36B:

$$K \cong K_{sm}\left[1 + \frac{mRT_1}{K_{sm}h_o^2}\right]$$ Eq. 133 wherein m, R, and $K_{sm}$ are the mass of the ideal fluid in the closed cavities, fluid constant, and the stiffness for the pure seal material, respectively.

When check valves are used to ensure that the pressure does not fall below the initial stagnant pressure, K is expected to approach $K_{sm}$. Practically, the closed cavity width G is assumed to be large enough such that a small increase in the stagnant fluid pressure due to the expansion can support the associated increase in the elastic force of the seal. Moreover, the fixation parameter can be enhanced by replacing segments of the seals at different locations by elastic membranes especially the outermost ones thereby reducing the effective length of the seal.

The dimensionless displacement of the upper substrate due to thermal expansion is related to the difference between the average temperature of the heated substrate, $(T_W)_{AVG}$, and the initial stagnant fluid temperature $T_1$ by the following linearized model:

$$H_T = A^* \beta_T C_F [(T_W)_{AVG} - T_1]$$ Eq. 134 wherein $A^*$ is a constant depending on the closed cavities dimensions and geometry.

The parameter $\beta_T$ is the volumetric thermal expansion coefficient of the stagnant fluid in its approximate form: $\beta_T \approx (1/V_{s1})(V_s - V_{s1})/(T_s - T_1)|_{ps1}$ evaluated at the pressure $p_{s1}$ corresponding to the stagnant fluid pressure at the inlet temperature $T_1$. The quantities $V_{s1}$ and $V_s$ represent the closed cavity volumes at $T_1$ and at the present stagnant fluid temperature $T_s$, respectively. The factor $C_F$ represents the volumetric thermal expansion correction factor. This factor is introduced to account for the increase in the stagnant pressure due to an increase in the elastic force in the seal during the expansion, which tends to decrease the effective volumetric thermal expansion coefficient. It approaches one as the closed cavity width G increases and it needs to be determined theoretically. For ideal gases and assembly shown in FIG. 36B, the parameter $\beta_T$ times $C_F$ can be approximated by the following:

$$\beta_T C_F \cong \frac{1}{T_1(h_o/h_{p_m}) + (K_{sm}h_oh_{p_m})/(mR)}$$ Eq. 135 wherein $h_{pm}$ is the mean value for the dimensional film thickness prior thermal effects.

Figure 57:
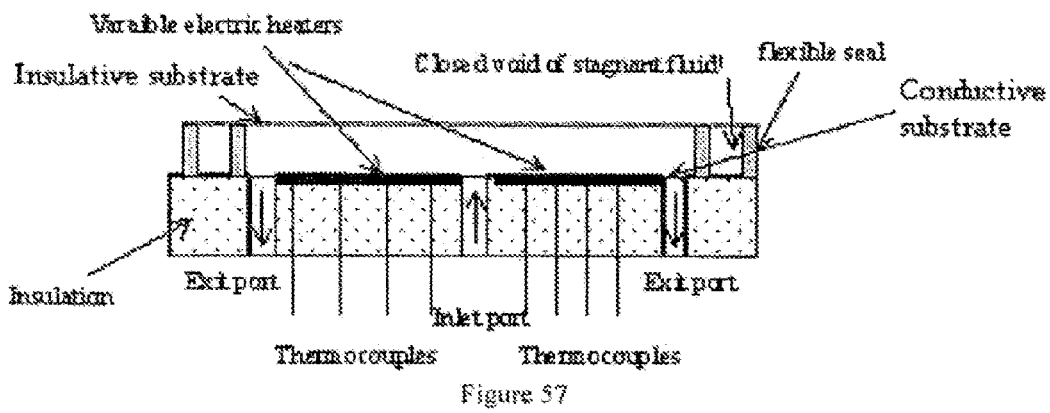
FIG. 57 shows a thin film supported by flexible complex seals of the present invention with one inlet port and two exit ports.

A model for evaluating different thermal loads is shown in FIG. 57 and comprises a thin film supported by flexible complex seal with one inlet port and two exit ports. The lower substrate is heated from below using a heater with a variable capacity. An array of thermocouples are attached beneath the heated substrate which is the lower substrate of the thin film and is made from a conductive material. The lower substrate temperature is measured at different selected points and then averaged for a variety of thermal loads. The upper substrate will be taken as an insulated substrate and the closed cavities are considered to be insulated in all directions except from the region facing the lower substrate such that the average stagnant fluid temperature is about equal to the average lower substrate temperature. Moreover, the lower surface of the lower substrate will be considered to be insulated. The experimental results are then compared with model simulations known in the art. See Khaled & Vafai (2003) ASME J. Heat Transfer 125:916-925, which is herein incorporated by reference.

Example 3

Design of the Control of Flow and Thermal Exit Conditions Using Two-Layered Thin Films Supported by Flexible Complex Seals Two-layered thin films possess enhanced cooling capacity. See Vafai & Zhu (1999) Int. J. Heat and Mass Transfer 42:2287-2297, which is herein incorporated by reference. These two-layered systems also provide a passive control of flow and exit thermal conditions for the main thin film when flexible complex seals are separating the substrates of the two-layered thin film as shown in FIG. 25. This figure shows that the lower layer contains the primary fluid flow passage where its lower substrate is fixed (immobile and inflexible substrate) and its upper substrate is free to move in the vertical direction (mobile and inflexible substrate). The flow in the primary fluid layer can be that of the fuel or fuel-air mixture prior to combustion or flow of a biofluid in a fluidic cell. The upper layer of the thin film contains a secondary fluid flow parallel or counter to the primary fluid flow direction. The fluid for the secondary fluid layer will be chosen such that it will have properties close to the primary fluid flow for fluidic cell applications. This is so that disturbances at the intermediate substrate will be diminished. The secondary fluid flow, however, can have different properties than the primary fluid flow. Such would be the case when the secondary fluid flow is initiated from external processes such as combustion residuals or the engine coolant flow.

The upper layer of the two-layered thin film shown in FIG. 25 is composed of the secondary fluid flow passage and a sealing assembly where its upper substrate is fixed (immobile and inflexible substrate) and subjected to a prescribed heat flux from a heat source. This heat flux can be independent of the primary fluid flow or can be the result of external processes utilizing the primary fluid flow as in combustion processes. The latter can be used for controlling the primary fluid flow conditions while the former may model the increase in the ambient temperature in a fluidic cell application. This can prevent an increase in the average fluid temperature in an ordinary fluidic cell, thereby avoiding a malfunctioning of the biosensor.

The flexible complex seal of the upper layer contains closed cavities filled with a stagnant fluid having a relatively large volumetric thermal expansion coefficient. This sealing assembly also comprises flexible seals in order to allow the intermediate substrate to move in the normal direction. See FIG. 25. Any excessive heating at the upper substrate results in an increase in the upper substrate's temperature resulting in an expansion of the stagnant fluid. This expansion along with the increase in inlet pressure in the upper layer, if present, causes the intermediate substrate to move downward. Thus, a compression in the film thickness of the lower layer is attained resulting in a reduction in mass flow rate within the primary fluid flow compartment. This arrangement is utilized to control the combustion rate.

In fluidic cells, excessive heating at the upper substrate causes compression of the primary fluid layer's thickness. Thus, average velocity within the primary fluid layer increases, when operated at constant flow rates, enhancing the convective heat transfer coefficient. This causes the average fluid temperature to approach the lower substrate temperature, thereby reducing the bimaterial effects. When this cooling assembly is operated at a constant pressure or at a constant velocity, the compression of the primary fluid layer due to excessive heating at the upper substrate reduces the flow rate. Thus, the bulk fluid temperature approaches the lower substrate temperature within a shorter distance. As such, bimaterial effects are also reduced. Flexible seals can be placed between special guiders as shown in FIG. 25B. As such, side expansion of the seals can be minimized and the transverse thin film thickness expansion is maximized.

Both lower and upper substrates were assumed to be fixed (immobile and inflexible substrates) while the intermediate substrate which was separated from the lower and upper substrates was free to move only in the normal direction due to the presence of flexible complex seals (mobile and inflexible substrate). The generic motion of the intermediate substrate due to both variations of the stagnant fluid temperature in the secondary fluid flow passage and the induced internal pressure pulsations within both the primary fluid and secondary fluid flow passages is expressed according to the following relationship:

$$H_1 = \left(1 - A^* \beta_T C_F [(T_u)_{AVG} - T_{1_o}] + \frac{D_1 B_1 (P_{AVG})_1 - D_2 B_2 (P_{AVG})_2}{Kh_o}\right) \quad \text{Eq. 136}$$

wherein $H_1$ ($H_1 = h_1/h_o$), $(T_u)_{AVG}$, and $T_{1_o}$ are the dimensionless displacement of the intermediate substrate, average temperature at the upper substrate, and the initial stagnant fluid temperature, respectively. The subscript "1" indicates the primary fluid layer while "2" indicates the secondary fluid layer. The flow and heat transfer inside the expandable two-layered thin film can be solved using an iterative procedure that results in solving the momentum and energy equations and satisfying Equation 134.

Figure 58:
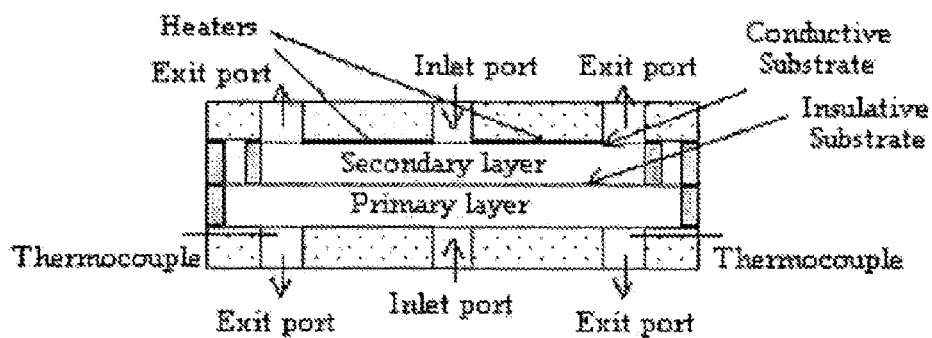
FIG. 58 shows a two-layer thin film supported by flexible complex seals of the present invention with two inlet ports and four exit ports.

FIG. 58 shows a two-layered thin film supported by flexible complex seal with two inlet port and four exit ports. The insulating assembly is heated from the top using a heater with a variable capacity. The primary fluid flow rate is measured experimentally by different methods, such as using a flowmeter, for different thermal loads. The mean bulk temperature at the exit of the primary fluid layer is also measured for different thermal loads. The experimental results are then compared with the model simulations presented herein which considers the applications where Reynolds number is small.

Example 4

Figures 59A, 59B:
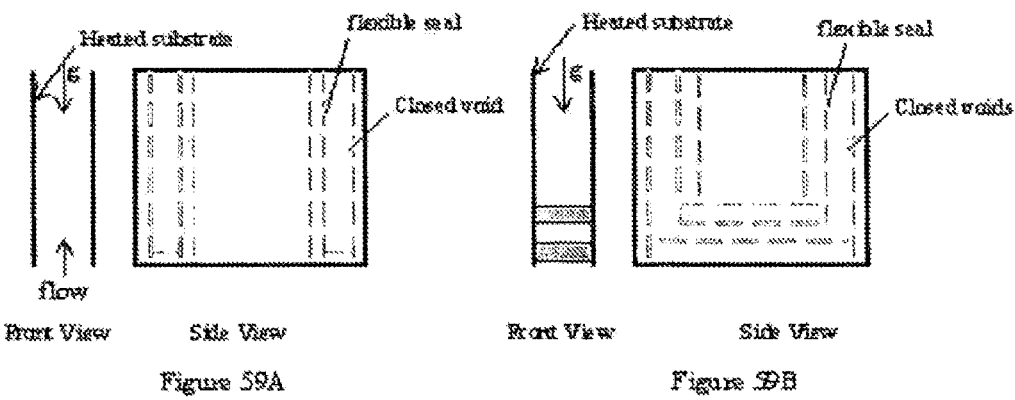
FIG. 59A is a schematic for a vertical channel supported by flexible complex seals.
FIG. 59B is a schematic for an open-ended cell supported by flexible complex seals.

Design of Enhancements in Heat Transfer Inside Expandable Systems Involving Buoyancy Driven Flows Such as Vertical Channels and Open Ended Cells Supported by Flexible Complex Seals Heat transfer and flow induced by either natural or mixed convection inside vertical channels and open ended cells in the presence of flexible complex seals may be analyzed as provided herein. See FIG. 59A and FIG. 59B. The insulating assemblies provided herein may be used in electrical and electronic cooling applications, e.g. placed between two different electronic cards. See Desai et al. (1995) ASME J. Electronic Packaging 117:34-45, and Daloglu & Ayhan (1999) Int. Communication Heat Mass Transfer 6:1175-1182, which are herein incorporated by reference. The heat transfer from these electronic cards can be enhanced if the spacing between these electronic cards is allowed to be expandable according to the temperature as when flexible complex seals are utilized. As such, the flexible seals and flexible complex seals of the present invention may be used in electronic cooling applications in order to enhance the operations of the electronic components and to increase the safety margin for these components.

7. Flexible Microchannel Heat Sink Systems

In this section, single layered (SL) and double layered (DL) flexible microchannel heat sinks are analyzed. The deformation of the supporting seals is related to the average internal pressure by theory of elasticity. It is found that sufficient cooling can be achieved using SL flexible microchannel heat sinks at lower pressure drop values for softer seals. Double layered flexible microchannel heat sinks provide higher rate of cooling over SL flexible microchannel heat sinks at the lower range of pressure drops. Single layered flexible microchannel heat sinks are preferred for large pressure drop applications while DL flexible microchannel heat sinks are preferred for applications involving low pressure drops.

The rapid development of microelectronics has created a need for large integration density of chips in digital devices such as VLSI components. These devices require increased current-voltage handling capabilities leading to large amount of dissipated heat within a small space. Microchannel heat sinks are one of the proposed methods that can be used to remove this excessive heating.

Microchannels have a very high heat transfer coefficient. Early works on microchannel heat sinks had shown that parallel micro passages with 50 μm wide and 302 μm deep had thermal resistances as low as $9 \times 10^{-6}$ K/(W/m$^2$). See Tuckerman & Pease (1981) IEEE Electron Device Lett EDL-2:126-129. This value is substantially lower than the conventional channel sized heat sinks. See Missaggia, L. J., et al. (1989) IEEE J. Quantum Electronics 25:1988-1992; Kleiner, M. B., et al. (1995) IEEE Trans on Components, Packaging and Manufacturing Technology Part A 18:795-804; and Samalam, V. K. (1989) J. Electronics Materials 18:611-617. Microchannel heat sink devices can be used as single layered (SL) micro passage such as those illustrated in the works of Lee and Vafai and Fedorov and Viskanta. See Lee & Vafai (1999) Int. J. Heat and Mass Transfer 42:1555-1568 and Fedorov & Viskanta (2000) Int. J. Heat and Mass Transfer 43:399-415. Double layered (DL) microchannel heat sinks were introduced for the first time in the work of Vafai and Zhu to provide additional cooling capacity for the microchannel and to decrease the axial temperature gradients along the microchannel. See Vafai & Zhu (1999) Int. J. Heat and Mass Transfer 42:2287-2297. Single layered microchannel heat sinks can be either single channel system such as those analyzed in the work of Harms et. al. or multiple channel system. See Harms, T. M., et al. (1999) Int. J. Heat and Fluid Flow 20:149-157 and Lee & Vafai (1999) Int. J. Heat and Mass Transfer 42:1555-1568.

One of the drawbacks of microchannel heat sinks is the increased temperature of the coolant as large amount of heat is carried out by a relatively small amount of coolant. As such, new technologies developed in the works of Vafai and Zhu and Khaled and Vafai provides new solutions for cooling of electronic components utilizing microchannel heat sinks. See Vafai & Zhu (1999) Int. J. Heat and Mass Transfer 42:2287-2297; Khaled & Vafai (2002) Int. J. Heat and Mass Transfer 45:5107-5115; Khaled & Vafai (2003) ASME J. Heat Transfer 125:916-925; and Khaled & Vafai (2004) Int. J. Heat and Mass Transfer 47:1599-1611. The work of Khaled and Vafai is based on utilizing flexible soft seals. The resulting microchannel heat sink system can be referred to as a "flexible microchannel heat sink". See Khaled & Vafai (2002) Int. J. Heat and Mass Transfer 45:5107-5115; Khaled & Vafai (2003) ASME J. Heat Transfer 125:916-925; and Khaled & Vafai (2004) Int. J. Heat and Mass Transfer 47:1599-1611. Khaled and Vafai demonstrated that additional cooling can be achieved if flexible thin films including flexible microchannel heat sinks are utilized. See Khaled & Vafai (2002) Int. J. Heat and Mass Transfer 45:5107-5115. In this work, the expansion of the flexible thin film including flexible microchannel heat sink is directly related to the internal pressure. Khaled and Vafai have demonstrated that significant cooling inside flexible thin films can be achieved if the supporting seals contain closed cavities, which are in contact with the heated surface. See Khaled & Vafai (2003) ASME J. Heat Transfer 125:916-925. They referred to this kind of sealing assembly as "flexible complex seals". Moreover, Khaled and Vafai demonstrated that flexible complex seals along with thin films have important applications in design and control of the flow and thermal characteristics of these types of systems. See Khaled & Vafai (2004) Int. J. Heat and Mass Transfer 47:1599-1611.

In this work, the enhancement in the cooling process inside SL and DL flexible microchannel heat sinks is investigated. The theory of linear elasticity applied to the supporting seals is utilized to relate the average internal pressure to the thickness of the flexible microchannel heat sinks. The resulting equations are then solved numerically and analytically to determine the effects of the pressure drop, softness of the supporting seals, the Prandtl number and the coolant mass flow rate on the thermal characteristics of both SL and DL flexible microchannel heat sinks.

The following Table 8 provides the various symbols and meanings used in this section:

TABLE 8

| | |
|---|---|
| B | microchannel length, m |
| $c_p$ | specific heat of the coolant, J kg$^{-1}$ K$^{-1}$ |
| W | width of the microchannel, m |
| F | fixation parameter defined in Eq. 145 |
| $F_{critical}$ | critical fixation parameter defined in Eq. 155 |
| H | microchannel thickness, m |
| $H_o$ | reference microchannel thickness, m |
| $h_c$ | convective heat transfer coefficient, W m$^{-2}$ K |
| K | effective stiffness of the seal, N m$^{-1}$ |
| k | thermal conductivity of the fluid, W m$^{-1}$ K$^{-1}$ |
| M | dimensionless delivered coolant mass flow rate defined on Eq. 165 |
| m | dimensional delivered coolant mass flow rate, kg m$^{-1}$ s$^{-1}$ |
| Nu | lower plate's Nusselt number defined on Eq. 152 |
| Pr | Prandtl number, $\mu c_p/k$ |
| p | fluid pressure, N m$^{-2}$ |
| q | heat flux at the lower plate, W m$^{-1}$ |
| Re | Reynolds number, $\rho u_m H/\mu$ |
| $(Re)_{critical}$ | critical Reynolds number defined in Eq. 156 |
| $Re_o$ | dimensionless pressure drop, $\rho u_m H_o/\mu$ |
| $(Re_o)_{SL}$ | dimensionless pressure drop for single layered flexible microchannel |
| $(Re_o)_{DL}$ | Dimensionless pressure drop for double layered flexible microchannel |
| T, $T_1$ | temperature in fluid and the inlet temperature, K |
| U | dimensionless axial velocities, $u/u_m$ |
| u | dimensional axial velocities, m s$^{-1}$ |
| $u_m$ | average axial velocity, m s$^{-1}$ |
| $U_F$ | uncertainty in mean bulk temperature with respect to F defined in Eq. 150 |
| $U_{Reo}$ | uncertainty in mean bulk temperature with respect to $Re_o$ defined in Eq. 149 |
| X | dimensionless axial coordinates, x/H |
| x | dimensional axial coordinates, m |
| Y | dimensionless normal coordinates, y/H |
| y | dimensional normal coordinates, m |
| $\epsilon$ | perturbation parameter, H/B |
| $\epsilon_{critical}$ | critical perturbation parameter defined in Eq. 157 |
| $\epsilon_o$ | reference perturbation parameter, $H_o/B$ |

TABLE 8-continued

| | |
|---|---|
| $\gamma$ | friction force ratio defined in Eq. 165 |
| $\kappa_m$ | mean bulk temperature ratio defined in Eq. 161 |
| $\kappa_W$ | heated plate temperature ratio defined in Eq. 162 |
| $\mu$ | dynamic viscosity of the fluid |
| $\theta$ | dimensionless temperature, $(T - T_1)/(qH/k)$ |
| $\theta_m$ | dimensionless mean bulk temperature, $(T_m - T_1)/(qH/k)$ |
| $\theta_W$ | dimensionless temperature at the heated plate, $(T_W - T_1)/(qH/k)$ |
| $\theta^*$ | temperature normalized with reference conditions defined in Eq. 146 |
| $\rho$ | density of the fluid |

7A. Single Layered Flexible Microchannel Heat Sinks

Figure 60A:
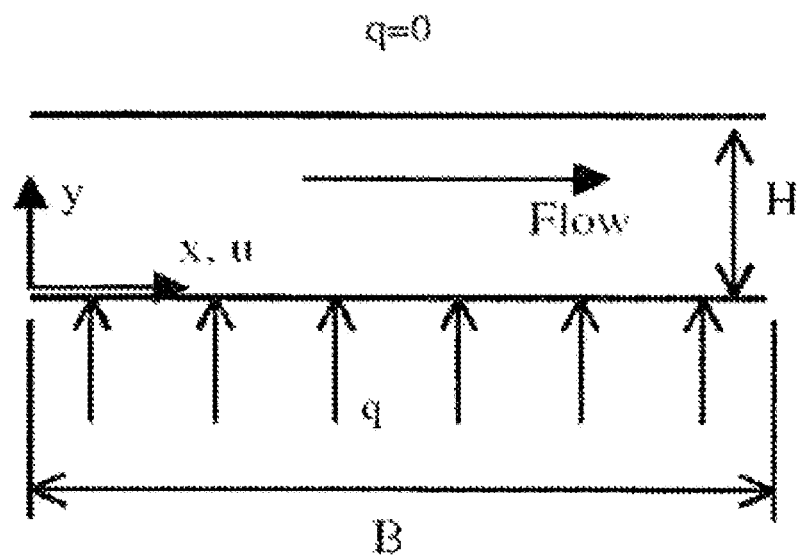
FIG. 60A is a front view of a schematic diagram and the coordinate system for a single layer flexible microchannel heat sink of the present invention.
Figure 60B:
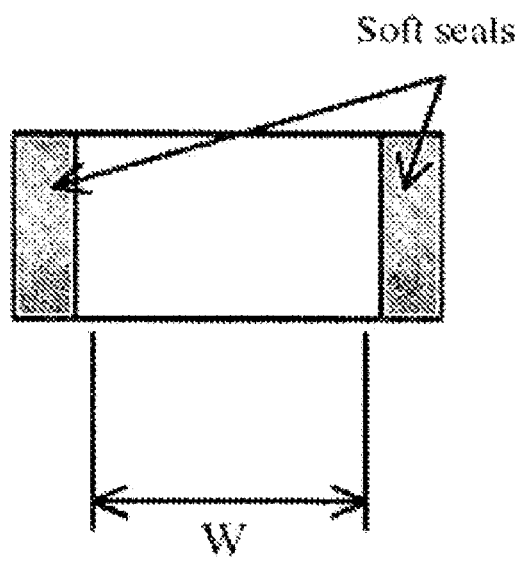
FIG. 60B is a side view of a schematic diagram and the coordinate system for a single layer flexible microchannel heat sink of the present invention.

Consider flow inside a two dimensional microchannel heat sink with a height H and axial length B. The x-axis is aligned along the channel length while the y-axis is in the traverse direction as shown in FIG. 60. The fluid is taken to be Newtonian with constant average properties. Using the following dimensionless variables:

$$X = \frac{x}{B}, Y = \frac{y}{H}, U = \frac{u}{u_m}, \theta = \frac{T - T_1}{qH/k} \qquad \text{Eq. 137}$$

leads to the following dimensionless energy equation:

$$\text{Re} Pr \varepsilon U \frac{\partial \theta}{\partial X} = \frac{\partial^2 \theta}{\partial Y^2} \qquad \text{Eq. 138}$$

wherein q, $T_1$, and Re are the heat flux at the heated plate, the inlet temperature, and the Reynolds number (Re=$\rho u_m H/\mu$), respectively. Pr and $\epsilon$ are the Prandtl number (Pr=$\upsilon/\alpha$) and the perturbation parameter ($\epsilon$=H/B). The mean velocity is related to the pressure drop across the channel, $\Delta p$, through the following relation:

$$u_m = \frac{1}{12\mu} \frac{\Delta p}{B} H^2 \qquad \text{Eq. 139}$$

wherein $\mu$ is the dynamic viscosity of the coolant.

For microchannel heat sinks supported by flexible soft seals, the separation between the microchannel' plates can be expressed according the following assuming that the seals are linear elastic materials:

$$H = H_o + \frac{\Delta p BW}{2K} \qquad \text{Eq. 140}$$

wherein $H_o$, W, and K are a reference thickness of the microchannel heat sink, the width of the microchannel heat sink, and the stiffness of the supporting seal, respectively. As such, the Reynolds number and the perturbation parameter can be expressed according to the following relations:

$$\text{Re}=\text{Re}_o(1+\text{Re}_o F)^3 \qquad \text{Eq. 141}$$

$$\epsilon=\epsilon_o(1+\text{Re}_o F) \qquad \text{Eq. 142}$$

wherein $Re_o$ and $\epsilon_o$ are the Reynolds number and the perturbation parameter evaluated at the reference microchannel thickness and the parameter F is the fixation parameter. These parameters are defined as:

$$\text{Re}_o = \frac{\rho}{12\mu^2}\frac{\Delta p}{B}H_o^3 \qquad \text{Eq. 143}$$

$$\varepsilon_o = \frac{H_o}{B} \qquad \text{Eq. 144}$$

$$F = \frac{6\mu^2 B^2 W}{\rho K H_o^4} \qquad \text{Eq. 145}$$

The parameter $\text{Re}_o$ can be interpreted as the dimensionless pressure drop parameter. The temperature normalized with respect to the reference parameters, $\theta^*$ is defined as follows:

$$\theta' = \frac{T - T_1}{qH_o/k} \qquad \text{Eq. 146}$$

The normalized mean bulk temperature, obtained from the solution of integral form of Eq. 138 is:

$$(\theta^*)_m = \frac{X}{Pr\text{Re}_o\varepsilon_o(1+\text{Re}_o F)^3} \qquad \text{Eq. 147}$$

The uncertainty in $(\theta^*)_m$, $\Delta(\theta^*)_m$, is:

$$U_{(\theta^*)_m} = \Delta(\theta^*)_m = U_{Reo}\Delta\text{Re}_o + U_H\Delta F \qquad \text{Eq. 148}$$

wherein $U_{Reo}$ and $U_F$ are defined as:

$$U_{Reo} = \frac{\partial(\theta')_m}{\partial \text{Re}_o} = -\frac{(1+4\text{Re}_o F)X}{Pr\text{Re}_o^2\varepsilon_o(1+\text{Re}_o F)^4} \qquad \text{Eq. 149}$$

$$U_F = \frac{\partial(\theta')_m}{\partial F} = -\frac{3X}{Pr\varepsilon_o(1+\text{Re}_o F)^4} \qquad \text{Eq. 150}$$

7B. Boundary Conditions

The lower plate is assumed to have a uniform wall heat flux and the upper plate is considered to be insulated. As such the dimensionless boundary conditions can be written as:

$$\theta(0, Y) = 0, \quad \frac{\partial\theta(X, 0)}{\partial Y} = -1, \quad \frac{\partial\theta(X, 1)}{\partial Y} = 0 \qquad \text{Eq. 151}$$

The Nusselt number is defined as:

$$Nu = \frac{h_c H_o}{k} = \frac{1}{(\theta^*)_W - (\theta^*)_m} = \frac{1}{\theta^*(X, 0) - (\theta^*)_m} \qquad \text{Eq. 152}$$

wherein $(\theta^*)_W$ is the heated plate temperature normalized with respect to the reference parameters. Under fully developed thermal conditions, Nusselt number approaches the following value:

$$Nu = \frac{h_c H_o}{k} = \frac{2.69}{1+\text{Re}_o F} = \frac{1}{(\theta^*)_W - (\theta^*)_m} \qquad \text{Eq. 153}$$

wherein $(\theta^*)_W$ is the dimensionless lower plate temperature under fully developed thermal conditions. Thus, it can be expressed according to the following:

$$[(\theta^*)_W]_{fd} = \frac{1+\text{Re}_o F}{2.69} + \frac{X}{Pr\text{Re}_o\varepsilon_o(1+\text{Re}_o F)^3} \qquad \text{Eq. 154}$$

Minimizing this temperature at the exit results in the following value of the fixation parameter:

$$\frac{\partial[(\theta^*)_W]_{fd}}{\partial F} = 0 \Rightarrow F_{critical} = \frac{1.685}{(\text{Re}_o Pr\varepsilon_o)^{1/4}\text{Re}_o} - \frac{1}{\text{Re}_o} \qquad \text{Eq. 155}$$

As such, the corresponding Reynolds number and the perturbation parameters are:

$$(\text{Re})_{critical} = 4.784\left(\frac{\text{Re}_o}{(Pr\varepsilon_o)^3}\right)^{1/4} \qquad \text{Eq. 156}$$

$$(\varepsilon_o)_{critical} = 1.685\left(\frac{\varepsilon_o^3}{\text{Re}_o Pr}\right)^{1/4} \qquad \text{Eq. 157}$$

7C. Double Layered Flexible Microchannel Heat Sinks

Figure 61A:
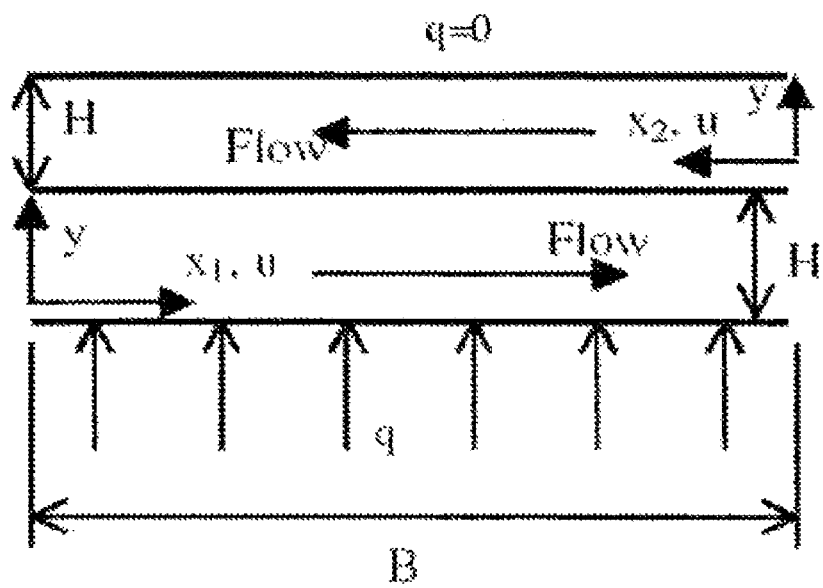
FIG. 61A is a front view of a schematic diagram and the coordinate system for a double layered flexible microchannel heat sink of the present invention
Figure 61B:
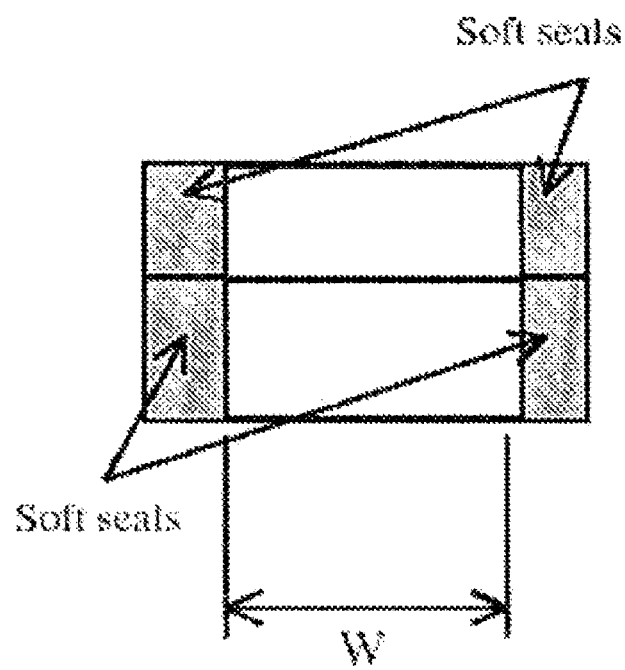
FIG. 61B is a side view of a schematic diagram and the coordinate system for a double layer flexible microchannel heat sink of the present invention.

FIG. 61 shows the proposed two layered (DL) flexible microchannel heat sink with counter flow as proposed by Vafai and Zhu. See Vafai & Zhu (1999) Int. J. Heat and Mass Transfer 42:2287-229. The governing energy equations for both layers are:

$$\text{Re}_o Pr\varepsilon_o(1+\text{Re}_o F)^4 U(Y_1)\frac{\partial\theta_1}{\partial X_1} = \frac{\partial^2\theta_1}{\partial Y_1^2} \qquad \text{Eq. 158}$$

$$\text{Re}_o Pr\varepsilon_o(1+\text{Re}_o F)^4 U(Y_2)\frac{\partial\theta_2}{\partial X_2} = \frac{\partial^2\theta_2}{\partial Y_2^2} \qquad \text{Eq. 159}$$

wherein the subscripts 1 and 2 are for the lower and the upper layers, respectively. The corresponding boundary conditions are:

$$\theta_1(X_1 = 0, Y) = \theta_2(X_2 = 0, Y) = 0, \qquad \text{Eq. 160}$$

$$\frac{\partial\theta_1(X_1, 0)}{\partial Y_1} = -1$$

$$\frac{\partial\theta_1(X_1, 1)}{\partial Y_1} = \frac{\partial\theta_2(X_2 = 1 - X_1, 0)}{\partial Y_2},$$

$$\frac{\partial\theta_2(X_2, 1)}{\partial Y_2} = 0$$

The intermediate plate is taken to be made from a highly conductive material like copper such that temperature variation across this plate is negligible. The following parameters are introduced in order to compare the performance of the DL flexible microchannel heat sink compared to SL flexible microchannel heat sink:

$$\kappa_m = \frac{[\theta_{m1}^*(X_1 = 1)]_{DL}}{[\theta_m^*(X = 1)]_{SL}}, \qquad \text{Eqs. 161, 162}$$

$$\kappa_W = \frac{[(\theta_W^*)_{AVG}]_{DL}}{[(\theta_W^*)_{AVG}]_{SL}}$$

Lower values of the cooling factors $\kappa_m$ and $\kappa_W$ indicate that DL flexible microchannel heat sinks are preferable over SL flexible microchannel heat sinks.

Another factor that will be considered is the ratio of the total friction force in DL flexible microchannel heat sinks to that for SL flexible microchannel heat sinks delivering the same flow rate of coolant. It can be shown that this factor is equal to:

$$\gamma \equiv \frac{(\text{Friction force})_{DL}}{(\text{Friction force})_{SL}} = \frac{2(\Delta p)_{DL} H_{DL}}{(\Delta p)_{SL} H_{SL}} = \frac{2(\text{Re}_o)_{DL}(1+(\text{Re}_o)_{DL} F)}{(\text{Re}_o)_{SL}(1+(\text{Re}_o)_{SL} F)} \quad \text{Eq. 163}$$

wherein $(\text{Re}_o)_{DL}$ and $(\text{Re}_o)_{SL}$ are related through the following:

$$(\text{Re}_o)_{DL}(1+(\text{Re}_o)_{DL} F)^3 = 2(\text{Re}_o)_{SL}(1+(\text{Re}_o)_{SL} F)^3 \quad \text{Eq. 164}$$

As such, the delivered dimensionless mass flow rate by both SL and DL flexible microchannel heat sinks is:

$$M = \frac{m}{\mu} = \frac{(2\rho u_m H)}{\mu} = 2(\text{Re}_o)_{DL}(1+(\text{Re}_o)_{DL} F)^3 \quad \text{Eq. 165}$$

wherein m is the dimensional mass delivered by both flexible microchannel heat sinks.

7D. Numerical Analysis

Equations 137, 158 and 159 were descritized using three points central differencing in the transverse direction while backward differencing was utilized for the temperature gradient in the axial direction. The resulting tri-diagonal system of algebraic equations at $X = \Delta X$ was then solved using the well established Thomas algorithm. See Blottner, F. G. (1970) AIAA J. 8:193-205. The same procedure was repeated for the consecutive X-values until X reached the value of unity. For equations 158 and 159, the temperature distribution at the intermediate plate was initially prescribed. Equations 158 and 159 were solved as described before. The thermal boundary condition at the intermediate plate was then used to correct for intermediate plate temperatures. The procedure was repeated until all the thermal boundary conditions were satisfied.

In most of the cases considered here, the minimum value of Re was taken to be 50 while the maximum Re value was allowed to expand to 2100 for $\text{Re}_o = 50$ and $F = 0.05$. The maximum Re corresponded to a microchannel heat sink that was substantially expanded due to the presence of soft seals. The thickness for the latter limiting case (Re=2100) was found to be 3.5 times the thickness of the former limiting case (Re=50). The maximum fixation parameter was taken to be 0.05. This represented a thin film microchannel heat sink filled with water, having B=60 mm, W=20 mm $h_o$=0.3 mm, and K=1000 N/m.

7E. Results

Figure 62:
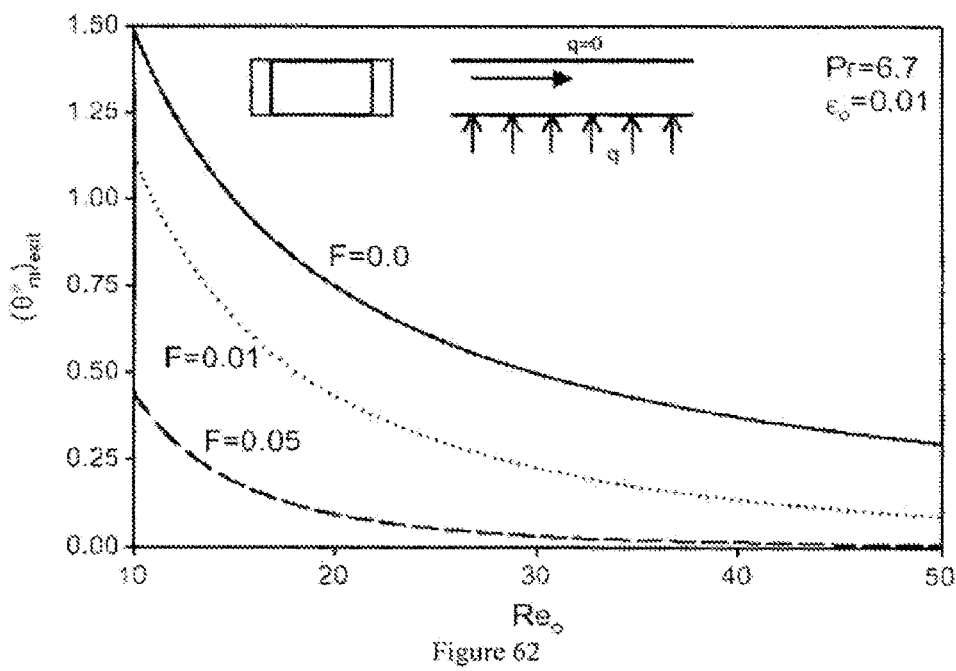
FIG. 62 Effects of the pressure drop $$\left(Re_o = \frac{\rho}{12\mu^2}\frac{\Delta p}{B}H_o^3\right)$$

7E1. Effects of Fixation Parameter and Pressure Drop on the Thermal Behavior of SL Flexible Microchannel Heat Sinks FIGS. 62 and 63 illustrate effects of the fixation parameter F and the dimensionless pressure drop $\text{Re}_o$ on the mean bulk temperature at the exit and the average heated plate temperature for SL flexible microchannel heat sinks, respectively. As the seal become softer, the fixation parameter increases allowing for further expansion of the microchannel at a given dimensionless pressure drop, $\text{Re}_o$. Thus, the mean bulk temperature is further reduced as shown in FIG. 62 and the heated plate is further cooled as shown in FIG. 63 due to an increase in the coolant flow rate. As seen in FIG. 63, relatively low pressure drop is capable of producing efficient cooling compared to that at larger pressure drops for larger F values.

Convective heat transfer coefficient is reduced as F increases at low dimensionless pressure drops as shown in FIG. 64. This is because coolant velocities decrease near the heated plate as F increases. However, for larger pressure drops, flow increases due to both an increase in the pressure drop and the expansion of the microchannel as F increases resulting in an increase in the thermal developing region effects. As such, the convective heat transfer coefficient increases as F increases for larger $\text{Re}_o$ and F values as illustrated in FIG. 64. FIG. 65 shows that the mean bulk temperature becomes less sensitive to the dimensionless pressure drop $\text{Re}_o$ and the fixation parameter F as both F and $\text{Re}_o$ increase.

FIG. 66 demonstrates that flexible microchannel heat sinks operating at lower Reynolds numbers possess lower heated plate temperature at the exit as F increases. This is not seen when these heat sinks are operated at higher Reynolds number values. As such, the enhancement in the cooling process using flexible microchannel heat sinks is not significant at large pressure drops as illustrated in FIG. 63.

7E2. Effects of Fixation Parameter and Prandtl Number on Thermal Behavior of SL Flexible Microchannel Heat Sinks.

FIG. 67 illustrates the effects of the fixation parameter F and Prandtl number Pr on the average heated plate temperature for SL flexible microchannel heat sinks. As seen in FIG. 67, sufficient increase in the cooling effect can be achieved by increasing F as Pr decreases. This is mainly due to an increase in the coolant flow rate as F increases. On the other hand, convective heat transfer coefficient is reduced as F increases at low Pr values as shown in FIG. 68. This is because coolant velocities decrease near the heated plate as F increases. As seen in FIG. 68 for large Pr values, thermal developing region effects increase causing the convective heat transfer coefficient to increase as F increases.

7E3. Effects of Fixation Parameter and Pressure Drop on Thermal Behavior of DL Flexible Microchannel Heat Sinks.

FIG. 69 describes the axial behavior of the mean bulk temperature for two different DL flexible microchannel heat sinks having different fixation parameters. Additional cooling is achieved by introducing the secondary layer which can be seen in FIG. 69 for the case with F=0.01. This plot shows that the maximum coolant temperature occurs before the exit unlike SL flexible microchannel heat sinks where this temperature occurs at the exit. As F increases, convection increases in the main layer while conduction to the upper layer decreases. This is due to an increase in the convective heat transfer and an increase in the expansion of the main layer. As such, the increase in the cooling capacity of DL flexible microchannel heat sinks becomes insignificant at both large values of the pressure drop and the fixation parameter. This fact is clearly seen in FIG. 70 where the heated plate temperature for DL flexible microchannel heat sinks are almost the same as that for the SL flexible microchannel heat sinks with F=0.05 for a wide range of $\text{Re}_o$. Note that $\kappa_m$ is the ratio of the mean bulk temperature at the exit for DL flexible microchannel to that for SL flexible microchannel heat sink. The parameter $\kappa_W$ is the ratio of the average heated plate temperature for DL flexible microchannel to that for SL flexible microchannel heat sink.

7E4. Comparisons Between SL and DL Flexible Microchannel Heat Sinks Delivering the Same Coolant Flow Rates.

FIG. 71 shows the effect of the fixation parameter F and the dimensionless pressure drop for DL flexible microchannel heat sinks on the pressure drop and friction force ratios between SL and DL flexible microchannel heat sinks. These microchannel heat sinks are considered to deliver the same coolant flow rate. As F increases, the pressure drop in SL flexible microchannel heat sinks required to deliver the same flow rate as for the DL flexible microchannel heat sinks decreases. This value is further decreased as the pressure drop in DL flexible microchannel heat sink increases. Meanwhile, as F increases, the ratio of the friction force encountered in the proposed DL flexible microchannel heat sink to that associated with the SL flexible microchannel heat sink increases. This indicates that SL flexible microchannel heat sinks delivering the same flow rate as for DL microchannel heat sinks having the same F value encounter fewer friction losses.

FIG. 72 demonstrates that SL flexible microchannel heat sinks can provide better cooling attributes compared to DL flexible microchannel heat sinks delivering the same coolant flow rate and having the same F values. However; note that rigid DL microchannel heat sinks provides better cooling than rigid SL microchannel heat sinks when operated at the same pressure drop as shown in FIG. 70. It should be noted that FIG. 72 shows that microchannel heat sinks with stiffer seals provide additional cooling over those with softer seals delivering the same flow rate. This is because the former are thinner and have larger velocities than the latter microchannel heat sinks. As such, convective heat transfer for rigid microchannels will be higher than that for flexible microchannel heat sinks delivering the same flow rate.

7F. Conclusions

Heat transfer inside SL and DL flexible microchannel heat sinks have been analyzed in this work. The deformation of the supporting seals was related to the average internal pressure by theory of linear elasticity. Increases in the fixation parameter and the dimensionless pressure drop were found to cause enhancements in the cooling process. These enhancements are significant at lower pressure drop values. Moreover, DL flexible microchannel heat sinks were found to provide additional cooling which were significant at lower values of pressure drop for stiff seals. It is preferred to utilize SL flexible microchannel sinks over DL microchannel heat sinks for large pressure drop applications. However, at lower flow rates the DL flexible microchannel heat sink is preferred to be used over SL flexible microchannel heat sinks especially when stiff sealing material is utilized.

8. Heat Transfer Enhancement Through Control of Thermal Dispersion Effects

Heat transfer enhancements are investigated inside channels by controlling thermal dispersion effects inside the fluid. Different distributions for the dispersive elements such as nanoparticles or flexible hairy fins extending from the channel plates are considered. Energy equations for different fluid regions are dimensionalized and solved analytically and numerically. The boundary arrangement and the exponential distribution for the dispersive elements are found to produce enhancements in heat transfer compared to the case with a uniform distribution for the dispersive elements. The presence of the dispersive elements in the core region does not affect the heat transfer rate. Moreover, the maximum Nusselt number for analyzed distributions of the dispersive elements are found to be 21% higher than that with uniformly distributed dispersive elements for a uniform flow. On the other hand, the parabolic velocity profile is found to produce a maximum Nusselt number that is 12% higher than that with uniformly distributed dispersive elements for the boundary arrangement. The distribution of the dispersive elements that maximizes the heat transfer is governed by the flow and thermal conditions plus the properties of the dispersive elements. Results in this work point towards preparation of super nanofluids or super dispersive media with enhanced cooling characteristics.

In some embodiments, the super dispersive media comprises at least one nanoparticle which may be metallic or carbon based and includes nanotubes and flexible nanostrings known in the art. In preferred embodiments, the devices of the present invention comprise a coolant and super dispersive media in the microchannels, preferably the super dispersive media comprises at least one metallic nanoparticle, at least one carbon nanoparticle, at least one nanotube, at least one flexible nanostring, or a combination thereof.

In some embodiments, the super dispersive media is non-uniformly distributed in the volumetric space of the microchannel. In some embodiments, the super dispersive media is minimally distributed in the volumetric space of microchannel regions having least transverse convection heat transfer. In other words, the concentration of the super dispersive media is minimal in the volumetric space of microchannel regions having least transverse convection heat transfer. In some embodiments, the super dispersive media is maximum in the volumetric space of microchannel regions having maximum transverse convection heat transfer.

The following Table 9 provides the various symbols and meanings used in this section:

TABLE 9

| | |
|---|---|
| B | channel length |
| C* | dispersive coefficient (dependent on the dispersive elements properties) |
| $c_p$ | average specific heat |
| $E_o$ | thermal dispersion parameter |
| h | Half channel height |
| $h_c$ | convective heat transfer coefficient |
| k | thermal conductivity |
| $k_o$ | effective static thermal conductivity of the nanofluid |
| Nu | Nusselt number |
| $Nu_{fd}$ | Nusselt number at fully developed condition |
| $P_e$ | Peclet number |
| q | heat flux at the channel walls |
| T, $T_1$ | fluid's temperature and the inlet temperature |
| U, u | dimensionless and dimensional axial velocities |
| X, x | dimensionless and dimensional axial coordinates |
| Y, y | dimensionless and dimensional normal coordinates |
| $\theta, \theta_m$ | dimensionless temperature and dimensionless mean bulk temperature |
| $\theta_W$ | dimensionless temperature of the channel plates |
| $\rho$ | density |
| f | pure fluid |
| nf | nanofluid |
| p | Particle |

The heat flux of VLSI microelectronic components can reach up to 1000 kW/m². As such, many methods are proposed to eliminate excess of heating associated with the operation of these components. One of these methods is to utilize two-layered microchannels. See Vafai & Zhu (1999) Int. J. Heat Mass Transfer 42:2287-2297. Two phase flow are utilized for cooling which was found to be capable of removing maximum heat fluxes generated by electronic packages yet the system may become unstable near certain operating conditions. See Bowers & Mudawar (1994) ASME J. Electronic Packaging 116:290-305. The use of porous blocks inside channels was found to be efficient in eliminating the excess of heat. See Vafai & Huang (1994) ASME J. Heat Transfer 116:604-613; Huang & Vafai (1994) AIAA J. Thermophysics and Heat Transfer 8:563-573; and Hadim, A. (1994) ASME J. Heat Transfer 116:465-472. However, the porous medium creates a substantial increase in the pressure drop inside the cooling device. Recently, Khaled and Vafai demonstrated that expandable systems can provide an efficient method for enhancing the cooling rate. See Khaled & Vafai (2003) ASME J. Heat Transfer 125:916-925. The performance of expandable systems and other cooling systems can be further improved when nanofluids are used as their coolants. See Khaled & Vafai (2003) ASME J. Heat Transfer 125:916-925; Khaled & Vafai (2002) Numerical Heat Transfer, Part A, 42:549-564; Khanafer, K., et al. (2003) Int. J. Heat Mass Transfer 46:3639-3653; and Vafai & Khaled (2004) Int. J. Heat Mass Transfer 47:743-755.

Nanofluids are mixtures of a pure fluid with a small volume of suspensions of ultrafine particles such as copper nanoparticles or nanotubes. They were found to possess a large effective thermal conductivity. For example, the effective thermal conductivity of nanofluids could reach 1.5 times that of the pure fluid when the volume fraction of the copper nanoparticles is 0.003. See Eastman, J. A., et al. (2001) Applied Physics Letters 78:718-720. This enhancement is expected to be further enhanced as the flow speed increases resulting in an increase in the mixing effects associated with the Brownian motion of the nanoparticles. This mixing effect is referred in literature as the thermal dispersion effect. See Xuan & Roetzel (2000) Int. J. Heat Mass Transfer 43:3701-3707. Other aspects of dispersion effects can be found in some of the recent works. See Chang, P. Y., et al. (2004) Numerical Heat Transfer, 45:791-809; Hancu, S., et al. (2002) Int. J. Heat Mass Transfer 45:2707-2718; Kuznetsov, A. V., et al. (2002) Numerical Heat Transfer 42:365-383; Gunn, D. J. (2004) Int. J. Heat Mass Transfer 48:2861-2875; and Metzger, T., et al. (2004) Int. J. Heat Mass Transfer 47:3341-3353. Li and Xuan (Li & Xuan (2002) Science in China (Series E) 45:408-416) reported an increase of 60% in the convective heat transfer inside a channel filled with a nanofluid, having 3% volume fraction for copper nanoparticles, compared to its operation with the pure fluid. This significant increase indicates that thermal dispersion is the main mechanism for heat transfer inside convective flows. The challenge is to find new ways to improve the performance of the cooling systems.

In this work, a method for enhancing the heat transfer characteristics through the use of nanofluids with proper thermal dispersion properties is proposed and analyzed. This can be accomplished by having a proper distribution for the ultrafine particles. Physically, the distribution of the ultrafine particles can be controlled using different methods: (i) having nanoparticles with different sizes or physical properties, (ii) applying appropriate magnetic forces along with using magnetized nanoparticles, (iii) applying appropriate centrifugal forces, and (iv) applying appropriate electrostatic forces along with using electrically charged nanoparticles. Different distribution for the nanoparticles can be obtained using any combination of the above methods.

For example, denser nanoparticles such as copper nanoparticles or those with a larger size tend to suspend at lower altitudes in coolants. However, nanoparticles with lower density such as carbon nanoparticles or those having a lower size tend to swim at higher altitudes within denser liquids such as aqueous solutions and liquid metals. As such, non-homogenous thermal dispersion properties can be attained. Centrifugal effects tend to produce concentrated thermal dispersion properties near at least one of the boundaries. On the other hand, non-homogenous thermal dispersion properties inside the coolant can be obtained by attaching to the plates of the cooling device flexible thin fins like hair with appropriate lengths. The Brownian motion of the suspended hairy medium will increase the thermal dispersion properties mainly near the plates of the cooling device and it can be used with a proper suspension system to obtain any required thermal dispersion properties.

Heat transfer enhancements are analyzed inside a channel filled with a coolant having different thermal dispersion properties. Different arrangements for the nanoparticles or the dispersive elements are considered in this work. The nanoparticles or the dispersive elements are considered to be uniformly distributed near the center of the channel for one of the arrangements. In another arrangement, they are uniformly distributed near the channel plates. Exponential or parabolic distributions for the dispersive elements are also analyzed in this work. The energy equations for the corresponding fluid regions are non-dimensionalized. Solutions for the Nusselt number and the temperature are obtained analytically for special cases and numerically for general cases. They are utilized to determine the appropriate distribution for the dispersive elements that will result in the maximum heat transfer with the same total number of nanoparticles or the dispersive elements.

8A. Problem Formulation

Consider a flow inside a two dimensional channel with a height $2h$ and a length B. The x-axis is aligned along the centerline of the channel while the y-axis is in the traverse direction as shown in FIG. 73. The fluid which could be a pure fluid or a nanofluid is taken to be Newtonian with constant average properties except for the thermal conductivity to account for thermal dispersion effects. The energy equation is:

$$\rho c_p u \frac{\partial T}{\partial x} = \frac{\partial}{\partial y}\left(k \frac{\partial T}{\partial y}\right) \qquad \text{Eq. 166}$$

wherein T, $\rho$, $c_p$, and k are the temperature, effective fluid density, fluid specific heat, and thermal conductivity, respectively. The velocity field u in the channel is taken to be fully developed. The volume of the dispersive elements is very small such that the velocity profile is parabolic.

$$\frac{u}{u_m} = \frac{3}{2}\left(1 - \left(\frac{y}{h}\right)^2\right) \qquad \text{Eq. 167}$$

wherein $u_m$ is the mean flow speed.

For nanofluids or in the thermally dispersed region, the parameter $\rho c_p$ will be $(\rho c_p)_{nf}$ and it is equal to:

$$(\rho c_p)_{nf} = (1-\phi)(\rho c_p)_f + \phi(\rho c_p)_p \qquad \text{Eq. 168}$$

wherein the subscript nf, f, and p denote the nanofluid or the dispersive region, pure fluid, and the particles, respectively. The parameter $\phi$ is the nanoparticles or the dispersive elements volume fraction which represents the ratio of the nanoparticles or the dispersive elements volume to the total volume. A nanofluid composed of pure water and copper nanoparticles suspensions with 2% volume fraction has a value of $(\rho c_p)_{nf}$ equal to 99% that for the pure water which is almost the same as the thermal capacity of the pure fluid.

The ultrafine suspensions such as nanoparticles, nanotubes or any dispersive elements in the fluid plays an important role in heat transfer inside the channel as their Brownian motions tend to increase fluid mixing. This enhances the heat transfer. The correlations presented in the work of Li and Xuan (Li & Xuan (2002) Science in China (Series E) 45:408-416) for Nusselt numbers in laminar or turbulent flows show that the heat transfer is enhanced in the presence of nanoparticles and it increases as the nanoparticles volume fraction, the diameter of the nanoparticles or the flow speed increase. Xuan and Roetzel (Xuan & Roetzel (2000) Int. J. Heat Mass Transfer 43:3701-3707) suggest (consistent with the dispersion model given in Amiri and Vafai (Amiri & Vafai (1994) Int. J. Heat Mass Transfer 37:939-954)) the following linearalized model for the effective thermal conductivity of the nanofluid:

$$k = k_o + C^* (\rho c_p)_{nf} \phi h u \qquad \text{Eq. 169}$$

wherein $C^*$ is a constant depending on the diameter of the nanoparticle and its surface geometry.

Physically, Equation 169 is a first approximation for the thermal conductivity of the nanofluid that linearly relates it to thermal capacitance of the flowing nanoparticles or flowing dispersive elements. The constant $k_o$ represents the effective thermal conductivity of the nanofluid or the dispersive region under stagnant conditions, at u=0. This constant can be predicted for nanofluids from the formula suggested by Wasp (Wasp, F. J. (1977) Solid-Liquid Slurry Pipeline Transportation, Trans. Tech. Berlin) which has the following form:

$$\frac{k_o}{k_f} = \frac{k_p + 2k_f - 2\varphi(k_f - k_p)}{k_p + 2k_f + 2\varphi(k_f - k_p)} \qquad \text{Eq. 170}$$

wherein $k_p$ and $k_f$ are the thermal conductivity of the nanoparticles and the pure fluid, respectively.

According to Equation 170, a two percent volume fraction of ultrafine copper particles produces 8 percent increase in $k_o$ when compared to the thermal conductivity of the pure fluid. On the other hand, the experimental results illustrated in the work of Li and Xuan (Li & Xuan (2002) Science in China (Series E) 45:408-416) shows that the presence of suspended copper nanoparticles with 2 percent volume fraction produced about 60% increase in the convective heat transfer coefficient compared to pure fluid. See Table 10 as follows:

TABLE 10

Variations of $(\rho c_p)_{nf}/(\rho c_p)_f$ and $k_o/k_f$ for various ultrafine copper particles volume ratios

| φ (percent) | $(\rho c_p)_{nf}/(\rho c_p)_f$ | $k_o/k_f$ |
|---|---|---|
| 0 | 1 | 1 |
| 1 | 0.998 | 1.040 |
| 2 | 0.996 | 1.083 |
| 3 | 0.995 | 1.127 |
| 4 | 0.993 | 1.173 |
| 5 | 0.991 | 1.221 |

This indicates that thermal dispersion is the main mechanism for enhancing heat transfer inside channels filled with nanofluids under convective conditions. Non-dimensionalizing Equation 166 with the following dimensionless variables:

$$X = \frac{x}{h}, \qquad \text{Eq. 171}$$
$$Y = \frac{y}{h},$$
$$U = \frac{u}{u_m},$$
$$\theta = \frac{T - T_1}{qh/k_f}$$

leads to the following dimensionless energy equation:

$$P_e U \frac{\partial \theta}{\partial X} = \frac{\partial}{\partial Y}\left(\frac{k}{k_f} \frac{\partial \theta}{\partial Y}\right) \qquad \text{Eq. 172}$$

wherein q, $T_1$, and Pe are the heat flux at the channel's plates, the inlet temperature, and the Peclet number $(P_e=(\rho c_p u_m h)/k_f)$, respectively. It is assumed that the heat flux is constant and equal at both plates.

For simplicity, the term $k/k_f$ will be rearranged in the following form:

$$\frac{k}{k_f} = \frac{k_o}{k_f} + \lambda \frac{(\rho c_p)_{nf}}{(\rho c_p)_f} \varphi U_{nf}, \lambda = C^* Pe_f \qquad \text{Eq. 173}$$

wherein $Pe_f=(\rho c_p)_f u_m h/k_f$.

A portion of the fluid's volume are considered in part of this work to be subjected to thermal dispersion effects due the suspensions of nanoparticles or any dispersive elements while the other portion contains only the pure fluid. The most obvious way to obtain specific distributions for thermal dispersive elements is to have conductive hairy fins extending from the channel plates or from a carefully designed fixed or flexible structure placed in the channel. The volume of this structure is small enough such that the parabolic assumption for the velocity profile is still valid. Also, non-homogenous thermal dispersion properties can be achieved by having nanoparticles with different densities or different sizes. Heavier nanoparticles or dispersive elements tend to swim closer to the lower plate due to gravitational forces while lighter nanoparticles or dispersive elements tend to swim closer to the upper force due to buoyancy forces. The dispersive elements such as nanoparticles can be further concentrated near the channel's plates by having these particles magnetized along with applying appropriate magnetic fields. As such, the difference in the thermal dispersive properties of the nanofluid can be achieved. Appropriate thermal dispersive properties can be obtained by utilizing the different methods discussed in the introduction section.

The dimensionless energy equation for the part involving thermal dispersion is $$(P_e)_f \left(\frac{(\rho c_p)_{nf}}{(\rho c_p)_f}\right) U_{nf} \frac{\partial \theta_{nf}}{\partial X} = \frac{\partial}{\partial Y}\left(\left(\frac{k_o}{k_f} + \lambda \frac{(\rho c_p)_{nf}}{(\rho c_p)_f} \varphi U_{nf}\right) \frac{\partial \theta_{nf}}{\partial Y}\right) \qquad \text{Eq. 174}$$

while the energy equation for the volume containing the pure fluid is:

$$(P_e)_f U_f \frac{\partial \theta_f}{\partial X} = \frac{\partial^2 \theta_f}{\partial Y^2} \qquad \text{Eq. 175}$$

Figure 74A:
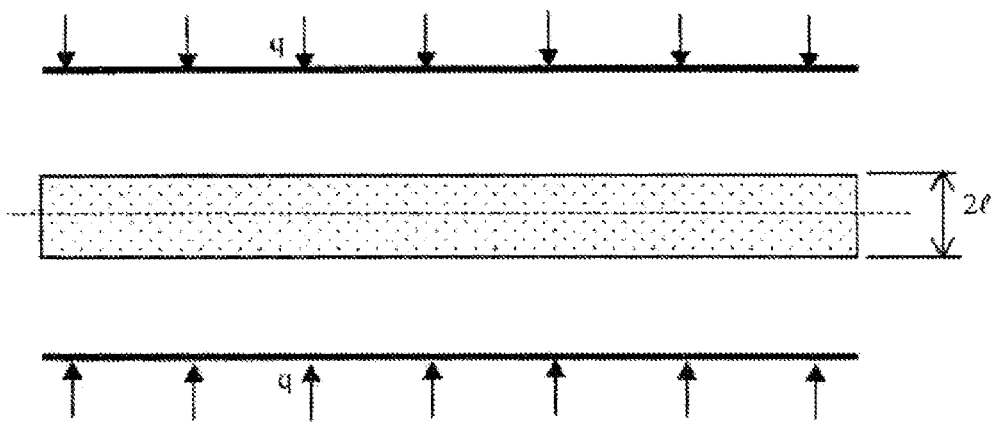
Figure 74B:
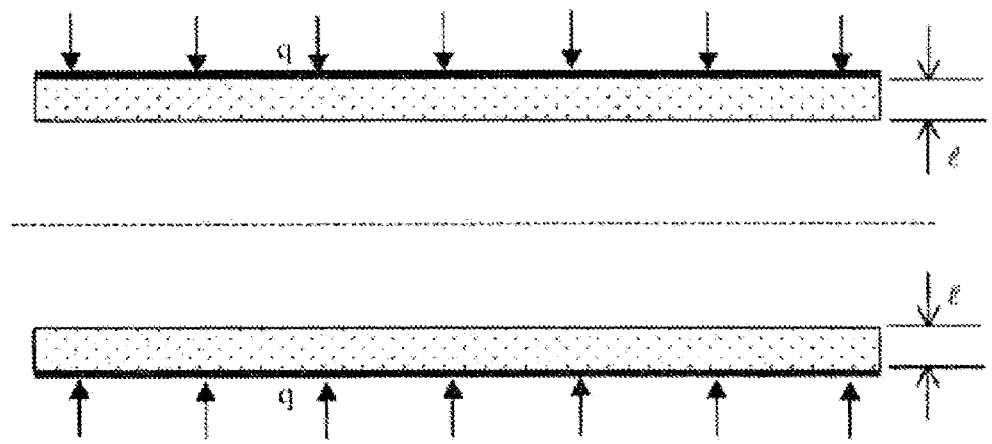

Different distributions for the nanoparticles of the dispersive elements will be analyzed in this work. In one of these distributions, the region that is active with thermal dispersion effects is considered to be a rectangular region of height $2l$ around the channel's centerline as shown in FIG. 74A. Another distribution considers the region comprising thermal dispersion effects to be present only at the two identical rectangular regions of height l attached to the channel's plates as shown in FIG. 74B.

The boundary conditions for the central arrangement are:

$$\frac{d\theta_{nf}(X, 0)}{dY} = 0 \quad \text{Eq. 176a}$$

$$\left(\frac{k_o}{k_f} + \lambda\frac{(\rho c_p)_{nf}}{(\rho c_p)_f}\varphi U(\Lambda)\right)\frac{d\theta_{nf}(X, \Lambda)}{dY} = \frac{d\theta_f(X, \Lambda)}{dY}, \quad \text{Eq. 176b}$$

$$\theta_f(X, \Lambda) = \theta_{nf}(X, \Lambda) \quad \text{Eq. 176c}$$

$$\frac{d\theta_f(X, 1)}{dY} = 1 \quad \text{Eq. 176d}$$

while the boundary conditions for the second arrangement (boundary arrangement) are:

$$\frac{d\theta_f(X, 0)}{dY} = 0 \quad \text{Eq. 177a}$$

$$\left(\frac{k_o}{k_f} + \lambda\frac{(\rho c_p)_{nf}}{(\rho c_p)_f}\varphi U(1-\Lambda)\right)\frac{d\theta_{nf}(X, 1-\Lambda)}{dY} = \frac{d\theta_f(X, 1-\Lambda)}{dY}, \quad \text{Eq. 177b}$$

$$\theta_f(X, 1-\Lambda) = \theta_{nf}(X, 1-\Lambda) \quad \text{Eq. 177c}$$

$$\left(\frac{k_o}{k_f} + \lambda\frac{(\rho c_p)_{nf}}{(\rho c_p)_f}\varphi U(1)\right)\frac{d\theta_f(X, 1)}{dY} = 1 \quad \text{Eq. 177d}$$

wherein $\Lambda = l/h$. Other distributions for the dispersive elements will be considered later such as the parabolic distribution and the exponential distribution.

For thermal fully developed conditions, axial gradient of the temperature reaches a constant value equal to $dT/dx$. That is, the heat flux is equal to:

$$q = \frac{dT}{dx}\left((1-\varphi_{cf})(\rho c_p)_f(u_m)_f + \varphi_{cf}(\rho c_p)_{nf}(u_m)_{nf}\right)h \quad \text{Eq. 178}$$

wherein $\phi_{cf}$ is the ratio of the volume comprising thermal dispersion effects to the total channel volume. $(u_m)_f$ is the average velocity in the fluid phase while $(u_m)_{nf}$ is the average velocity in the nanofluid or the region containing the thermal dispersive elements.

As such, Equation 174 and Equation 175 reduce to:

$$AU_{nf} = \frac{\partial}{\partial Y}\left((K+E\varphi U)\frac{\partial\theta_{nf}}{\partial Y}\right) \quad \text{Eq. 179}$$

$$GU_f = \frac{\partial^2\theta_f}{\partial Y^2} \quad \text{Eq. 180}$$

$$A = Pe_f\left(\frac{(\rho c_p)_{nf}}{(\rho c_p)_f}\right)\frac{d\theta_{nf}}{dX}, \quad K = k_o/k_f,$$

$$E = \lambda\frac{(\rho c_p)_{nf}}{(\rho c_p)_f}\varphi \text{ and } G = (P_e)_f\frac{d\theta_f}{\partial X}.$$

wherein

Since $(\rho c_p)_{nf}$ does not vary significantly when the volume fraction of the ultrafine particles or the dispersive elements is less than 4% as used in the literature, A and G are almost equal to unity $$\left(Pe_f\frac{d\theta}{dX} = \left(\frac{\rho c_p u_m h}{k}\right)\frac{d(Tk/(qh))}{d(x/h)} = \frac{\rho c_p u_m h}{q}\frac{dT}{dx} = 1.0\right).$$

8B. Analytical Solutions

Consider a uniform flow inside the channel such that $U=1$. Equation 179 and Equation 180 reduce to:

$$\frac{\partial^2\theta_{nf}}{\partial Y^2} = \frac{1}{(K+E)} \quad \text{Eq. 181a}$$

$$\frac{\partial^2\theta_f}{\partial Y^2} = 1 \quad \text{Eq. 181b}$$

The solution to Equation 181a and Equation 181b for the central arrangement of the dispersive elements is Equation 182a:

$$\frac{\theta_W(X) - \theta_{nf}(X, Y)}{\theta_W(X) - \theta_m(X)} \cong \frac{1.5(\Lambda^2 - Y^2) + 1.5(K+E)(1-\Lambda^2)}{\Lambda^3 - (K+E)(\Lambda^3 - 1.5\Lambda^2 + 0.5) +},$$

$$1.5(K+E)(1-\Lambda^2)$$

$$0 < Y < \Lambda$$

and Equation 182b:

$$\frac{\theta_W(X) - \theta_f(X, Y)}{\theta_W(X) - \theta_m(X)} \cong \frac{1.5(1-Y^2)(K+E)}{\Lambda^3 - (K+E)(\Lambda^3 - 1.5\Lambda^2 + 0.5) +},$$

$$1.5(K+E)(1-\Lambda^2)$$

$$0 < Y < 1$$

wherein $\theta_W$ is the plate temperature at a given section X. The parameter $\theta_m$ is the mean bulk temperature. It is defined as:

$$\theta_m(X) = \int_0^1 U(Y)\theta(X, Y)dY \quad \text{Eq. 183}$$

As such, the fully developed value for the Nusselt number is:

$$Nu_{fd} = \frac{h_c h}{k_f} = \frac{1}{\theta_W(X) - \theta_m(X)} = \quad \text{Eq. 184}$$

$$\frac{1}{\theta_f(X, 1) - \theta_m(X)} \cong \frac{3(K+E)}{\Lambda^3 - (K+E)(\Lambda^3 - 1.5\Lambda^2 + 0.5) +}$$

$$1.5(K+E)(1-\Lambda^2)$$

wherein $h_c$ is the convective heat transfer coefficient at the channel's plate.

For the second type of arrangements for the thermal dispersion region. The solution for Equation 181a and Equation 181b is Equation 185a:

$$\frac{\theta_W(X) - \theta_f(X, Y)}{\theta_W(X) - \theta_m(X)} \cong \frac{1.5(1 + (1-\Lambda^2)(K+E)(1-Y^2) - (1-\Lambda)^2)}{K - (K-1)(\Lambda^3 - 3\Lambda^2 + 3\Lambda) + E(1-\Lambda)^3},$$

-continued $$0 < Y < \Lambda$$

and Equation 185b:

$$\frac{\theta_W(X) - \theta_{nf}(X,Y)}{\theta_W(X) - \theta_m(X)} \cong \frac{1.5(1 - Y^2)}{K - (K-1)(\Lambda^3 - 3\Lambda^2 + 3\Lambda) + E(1-\Lambda)^3},$$

$$\Lambda < Y < 1$$

The corresponding fully developed value for Nusselt number for this case is:

$$Nu_{fd} = \frac{h_c h}{k_f} = \frac{1}{\theta_W(X) - \theta_m(X)} = \frac{1}{\theta_{nf}(X,1) - \theta_m(X)} \cong \frac{3(K+E)}{K - (K-1)(\Lambda^3 - 3\Lambda^2 + 3\Lambda) + E(1-\Lambda)^3} \quad \text{Eq. 186}$$

8C. Volume Fraction of the Dispersive Elements

The total number of dispersive elements is considered to be fixed for each distribution. As such, the volume fraction of the dispersive element for the central or the boundary arrangements is related to their thickness according to the following relation:

$$\varphi = \frac{\varphi_o h}{\ell} = \frac{\varphi_o}{\Lambda} \quad \text{Eq. 187}$$

wherein $\varphi_o$ is the volume fraction of the dispersive elements when they are uniformly filling the whole channel volume. Utilizing Equation 187, the parameter E utilized in Equation 179 and Equation 180 can be expressed according to the following:

$$E = E_o\left(\frac{h}{\ell}\right) = \frac{E_o}{\Lambda} \quad \text{Eq. 188}$$

wherein $E_o$ is named as the thermal dispersion parameter.

8D. Other Spatial Distribution for the Dispersive Elements

Practically, it is difficult to have the dispersive elements concentrated in a region while the other region is a pure fluid. As such, two other distributions for the dispersive elements are considered in this work. They are the exponential and the parabolic distributions as illustrated in the following:

$$\varphi = \varphi_o\left(1 + D_c\left(\frac{1}{3} - \left(\frac{y}{h}\right)^2\right)\right) \quad \text{Eq. 189}$$

$$\varphi = \frac{\varphi_o D_e}{e^{D_e} - 1} e^{D_e Y} \quad \text{Eq. 190}$$

Note that the average volume fraction for each distribution is $\varphi_o$ irrespective to values of $D_e$ and $D_p$. One of the objectives of our work is to obtain the values of $D_c$ and $D_e$ and $\Lambda$ that produces maximum heat transfer inside the channel.

The excess in Nusselt number K is defined as the ratio of the maximum Nusselt number that can be obtained by having a certain volume fraction distribution ($Nu_{nd}$) to the Nusselt number corresponding to a uniform distribution of the dispersive elements ($Nu_{ud}$). It is expressed as follows:

$$\kappa = \frac{Nu_{nd}}{Nu_{ud}} \quad \text{Eq. 191}$$

It can be shown that Equation 191 exhibits a local maximum or minimum value at specific thermal dispersion parameter $(E_o^*)_{critical}$ for the boundary arrangement. This is related to the dimensionless thickness of the dispersive region through the following relation:

$$\frac{(E_o^*)_{critical}}{K\Lambda} = -1 + \sqrt{\frac{(K(\Lambda^3 - 3\Lambda^2 + 3) + (1-\Lambda)(\Lambda - 2))}{(1-\Lambda)^3}} \quad \text{Eq. 192}$$

8E. Numerical Methods

Equation 174 and Equation 175 were descritized using three points central differencing in the Y direction while backward differencing was utilized for the temperature gradient in the X-direction. The resulting tri-diagonal system of algebraic equations at $X=\Delta X$ was then solved using the well established Thomas algorithm. See Blottner, F. G. (1970) AIAA J. 8:193-205. The same procedure was repeated for the consecutive X-values until X reached the value of B/h. Equation 179 and Equation 180 were also descritized using three points central differencing and solved using Thomas algorithm.

8F. Thermal Dispersion Effects for the Central and Boundary Arrangements

FIG. 75 shows the variation of the fully developed Nusselt number with the thermal dispersion parameter $E_o$ and the dimensionless thickness of the thermally dispersed region $\Lambda$ for the central arrangement. For lower values of $\Lambda$, the Nusselt number does not change due to concentrations of the thermal dispersive elements around the center of the channel. However, as the thickness of the dispersive region increases, it will have a profound effect on the Nusselt number. The motion of nanoparticles or the dispersive elements within the core flow of the channel produces a negligible change in the heat transfer characteristics as shown in FIG. 75. The Nusselt number increases as $\Lambda$ increases to a maximum value and then starts to decrease when the dispersive elements are concentrated according to the boundary arrangement. See FIG. 76. The arrangement shown in FIG. 76 illustrates that a specific distribution for the same dispersive elements can enhance the heat transfer. This distribution is a function of $E_o$ and the velocity profile as shown in FIG. 76. In this figure, the thermal dispersive region thickness $\Lambda$ that produces the optimum enhancement in the Nusselt number is shown to increase as the $E_o$ increases. As such, flow and thermal conditions along with the properties of the dispersive elements such as their sizes and their surface geometry determine the distribution of the dispersive elements that result in a maximum enhancement in the heat transfer.

8G. Thermal Dispersion Effects for the Central and Boundary Arrangements at Thermally Developing Conditions FIG. 77 illustrates the effects of the dispersion coefficient C* on the Nusselt number at the exit for various thicknesses of the thermally dispersed region $\Lambda$ arranged with the central configuration. These values are for a thermally developing condition as the minimum Nusselt number in this figure is greater than the corresponding value at thermally developed conditions illustrated in FIG. 75. This figure shows that when Λ is below 0.35, heat transfer is almost unaffected by thermal dispersion. As can be seen, the average plate temperature shown in FIG. 78 ($Pe_f$=670) is almost unchanged when Λ is below 0.37 while it is below 0.5 in FIG. 79 ($Pe_f$=1340) for the central arrangement. Similarly, the maximum Nusselt number or the minimum average plate temperatures at lower $Pe_f$ values occur at higher values of Λ compared to those at higher $Pe_f$ values for different boundary arrangements as can be noticed from FIG. 76, FIG. 80, FIG. 81 and FIG. 82. This is because temperature gradients near the core flow increase as $Pe_f$ decreases thus thermal dispersion effects are increased.

8G. Thermal Dispersion Effects on the Excess in the Nusselt Number at Thermally Fully Developed Conditions FIG. 83 and FIG. 84 illustrate various proposed volume fraction distributions for the same nanoparticles. As shown in FIG. 85, the Nusselt number reaches a maximum value when $E_o$>0 for the exponential distribution of the dispersive elements while the parabolic distribution produces no maxima in the Nusselt number. The excess in Nusselt number κ is always greater than one for the boundary arrangement while it is greater than one for the exponential distribution when the velocity is uniform as shown in FIG. 87. The excess in Nusselt number increases as $E_o$ increases and reaches a constant value equal to 1.12 for the parabolic velocity profile along with the boundary arrangement for the dispersive elements while it is 1.21 for the uniform velocity profile. This indicates that almost 12% increase in the heat transfer can be achieved in highly dispersive media when the dispersive elements are concentrated near the boundary for the parabolic velocity profile. The exponential distribution produced a maximum excess in the Nusselt number equal to 1.18 for uniform velocity profile. The latter results can be used to model Darcian flow inside a channel filled with a porous medium having a uniform porosity and comprising dispersive elements exponentially distributed along the center line of the channel. These figures illustrate the importance of flow conditions and the distribution of the dispersive elements on the degree of enhancement in heat transfer.

9. Smart Passive Thermal Systems

9A. Systems with Increased Capacity as Thermal Load Increases

FIG. 88A illustrates a schematic diagram of a thin film microchannel with its plates separated by soft seals containing closed chambers filled with a stagnant gas possessing a large volumetric thermal expansion. When the thermal load increases over its projected capacity, the temperature of the coolant increases causing an increase in the temperature of the thin film plates. As such the closed chambers get overheated and the stagnant gas starts to expand. This causes the separation between the thin film plates to increase which allows for an increase in the coolant flow rate to increase. Accordingly, the excessive heating is removed. However, under very high operating thermal conditions as in lubrications and very high flux electrical components, the supporting seals may not work.

At very high operating thermal conditions, the device as shown in FIG. 88B can be utilized. The upper plate is made of bimaterial such that the upper layer has a higher linear thermal expansion coefficient than that for the lower layer material. Excessive heating causes the coolant temperature to increase which in turn, heats the upper plate. As such, the upper plate bends outward allowing for more coolant to flow inside the thin film. The upper and lower layers of upper plate can be aluminum and copper respectively for relatively large temperatures and very small thin film thickness. The upper and lower layers of upper plate can also be made of thermoplastic material and copper respectively. Both the upper and lower layers of upper plate can be of thermoplastic materials with the linear expansion coefficient of upper layer thermoplastic material being higher than that of lower layer thermoplastic material.

9B. Systems with Decreased Capacity as Thermal Load Increases

FIG. 89A shows a two layered thin film microchannel. The plates of upper layer which is a secondary layer are separated by soft seals containing closed chambers filled with a stagnant gas possessing a large volumetric thermal expansion. The lower layer which is the main layer is only supported by soft seals. The heated source is connected to the upper plate. When the thermal load increases over its projected capacity, the temperature of the secondary fluid passing through the secondary layer increases causing an increase in the temperature of the upper plate of the two layered thin film. As such the closed chambers get overheated and the stagnant gas starts to expand. This causes shrinkage to the main layer which reduces the flow rate of the main fluid filling the main layer. This finds its applications, among others, in internal combustion where fuel flow is needed to be reduced as the engine gets overheated. However, under very high operating thermal conditions as in deteriorated combustions, the supporting seals may not work properly.

FIG. 89B shows the device with decreased cooling capacity at very high operating thermal conditions. The upper plate is made of bimaterial such that its lower layer has a higher linear thermal expansion coefficient than that for upper layer material. Excessive heating causes the coolant temperature to increase which in turn, heats the upper plate. As such, the upper plate bends inward resulting in less coolant flow inside the thin film. The upper and lower layers of the upper plate can be copper and aluminum respectively, for relatively large temperatures and very small thin film thickness. The upper and lower layers of upper plate can also be made of copper and thermoplastic material respectively. Both the upper and lower layers of upper plate can be made of thermoplastic materials with the linear expansion coefficient of upper layer thermoplastic material being lower than that of lower layer thermoplastic material.

10. Conclusion

Enhancements in heat transfer can be investigated inside channels filled with a fluid having different thermal dispersive properties. Different distributions for dispersive elements such as nanoparticles or flexible hairy tubes extending from the channel plates are considered. The dispersive elements are considered to be uniformly distributed in the central region, near the boundaries, having an exponential distribution and having a parabolic distribution.

The boundary arrangement and the exponential distribution of the dispersive elements have been shown to produce substantial enhancements in heat transfer compared to the case when the dispersive elements are uniformly distributed. The presence of the dispersive elements in a core region does not produce any significant change in the heat transfer. The maximum excess in Nusselt number has been found to be 1.21 utilizing the boundary arrangement for the volume fraction with uniform flow while the parabolic velocity profile produced a maximum excess in Nusselt number equal to 1.12. The volume fraction distribution that maximizes the heat transfer is generally governed by the flow and thermal conditions as well as the properties of dispersive elements. This demonstrates that super nanofluids or super dispersive media can be prepared by controlling the thermal dispersion properties inside the fluid.

Based on the foregoing, it can be appreciated that an apparatus or device be configured, which includes a first substrate and a second substrate, the first substrate having a face in contact with a coolant and another face in contact with at least one hot medium. The second substrate can possess a bimaterial having an upper layer in contact with at least one cold medium and a lower layer in contact with the coolant. The faces of the first substrate and the lower layer of the second substrate in contact with the coolant can be opposed to each other. Additionally, the material of upper layer can possess a higher linear thermal expansion coefficient than that of the material of lower layer so that the second substrate bends outward relative to the first substrate allowing for more coolant to flow under very high operating thermal conditions.

In other embodiments, a third substrate and a fourth substrate can be provided, with the third substrate having a face in contact with a coolant and another face in contact with at least one cold medium. The fourth substrate can include a face in contact with a coolant and another face in contact with at least one cold medium. The faces of the third and fourth substrates can be contact with the coolant and can be joined to the first substrate from one end and the second substrate from the other end. In another embodiment, a fifth substrate and a sixth substrate can be provided, wherein the fifth substrate has a face in contact with a coolant and another face in contact with at least one cold medium. The sixth substrate can include a face in contact with a coolant and another face in contact with at least one cold medium. Additionally, the fifth and sixth substrates can be in contact with the coolant and can be joined to the first substrate from one end and the second substrate from the other end. Also, the faces of the first, second third fourth, fifth and sixth substrates can oppose the coolant to form an enclosure containing the coolant.

In still other embodiments, the first substrate can be configured to contain at least one opening near one end and another at least one opening near the opposing end, or the second substrate contains at least one opening near one end and another at least one opening near the opposing end. Additionally, at least one opening can comprise an inlet port for the coolant, and at least one opening can comprise an exit port for the coolant.

Additionally, in some embodiments, under very high operating thermal conditions, excessive heating of the first substrate can cause the coolant temperature to increase, which in turn can heat the second substrate. In other embodiments, the upper layer can comprise aluminum. In still other embodiments, the upper layer can comprise a thermoplastic material and the lower layer comprises copper.

It can be further appreciated, based on the foregoing, that a method can be implemented, which includes the steps of, for example, providing a first substrate and a second substrate, the first substrate having a face in contact with a coolant and another face in contact with at least one hot medium; configuring the second substrate to comprise a bimaterial having an upper layer in contact with at least one cold medium and having a lower layer in contact with the coolant; arranging the faces of the first substrate and the lower layer of the second substrate in contact with the coolant in opposition to each other; and configuring a material of the upper layer to comprise a higher linear thermal expansion coefficient than that of the material of lower layer so that the second substrate bends outward relative to the first substrate allowing for more coolant to flow under very high operating thermal conditions.

To the extent necessary to understand or complete the disclosure herein, all publications, patents, and patent applications mentioned herein are expressly incorporated by reference therein to the same extent as though each were individually so incorporated.

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. An apparatus, comprising:
   a first substrate and a second substrate, the first substrate having a face in contact with a coolant and another face in contact with at least one hot medium;
   the second substrate comprising a bimaterial having an upper layer in contact with at least one cold medium and having a lower layer in contact with the coolant;
   the faces of the first substrate and the lower layer of the second substrate in contact with the coolant are opposing each other; and
   the material of upper layer having a higher linear thermal expansion coefficient than that of the material of the lower layer so that the second substrate bends outward relative to the first substrate allowing for more coolant to flow under very high operating thermal conditions.

2. The apparatus of claim 1 further comprising a third substrate and a fourth substrate, the third substrate having a face in contact with a coolant and another face in contact with at least one cold medium, the fourth substrate having a face in contact with a coolant and another face in contact with at least one cold medium.

3. The apparatus of claim 2 wherein the faces of the third and fourth substrates are in contact with the coolant and are joined to the first substrate from one end and the second substrate from the other end.

4. The apparatus of claim 3 further comprising a fifth substrate and a sixth substrate, the fifth substrate having a face in contact with a coolant and another face in contact with at least one cold medium, the sixth substrate having a face in contact with a coolant and another face in contact with at least one cold medium.

5. The apparatus of claim 4 wherein the fifth and sixth substrates are in contact with the coolant and are joined to the first substrate from one end and the second substrate from the other end.

6. The apparatus of claim 5 wherein the faces of the first, second, third, fourth, fifth, and sixth substrates oppose the coolant to form an enclosure containing the coolant.

7. The apparatus of claim 6 wherein:
   the first substrate contains at least one opening near one end and another at least one opening near the opposing end, or the second substrate contains at least one opening near one end and another at least one opening near the opposing end;
   at least one opening comprises an inlet port for the coolant; and
   at least one opening comprises an exit port for the coolant.

8. The apparatus of claim 1 wherein under very high operating thermal conditions, excessive heating of the first substrate causes the coolant temperature to increase which in turn heats the second substrate.

9. The apparatus of claim 1 wherein the upper layer comprises aluminum.

10. The apparatus of claim 1 wherein the upper layer comprises a thermoplastic material and the lower layer comprises copper.

11. An apparatus, comprising:
a first substrate and a second substrate, wherein the first substrate comprises a face in contact with a coolant and another face in contact with at least one hot medium;
the second substrate comprising a bimaterial having an upper layer in contact with at least one cold medium and a lower layer in contact with the coolant;
the faces of the first substrate and the lower layer of the second substrate in contact with the coolant opposed to each other; and
the material of a lower layer having a higher linear thermal expansion coefficient than that of the material of the upper layer so that the second substrate bends inward relative to the first substrate resulting in less coolant flow under very high operating thermal conditions.

12. The apparatus of claim 11 further comprising a third substrate and a fourth substrate, the third substrate having a face in contact with a coolant and another face in contact with at least one cold medium, the fourth substrate having a face in contact with a coolant and another face in contact with at least one cold medium.

13. The apparatus of claim 12 wherein the faces of the third and fourth substrates are in contact with the coolant and are joined to the first substrate from one end and the second substrate from the other end.

14. The apparatus of claim 13 further comprising a fifth substrate and a sixth substrate, the fifth substrate having a face in contact with a coolant and another face in contact with at least one cold medium, the sixth substrate having a face in contact with a coolant and another face in contact with at least one cold medium.

15. The apparatus of claim 14 wherein the fifth and sixth substrates are in contact with the coolant and are joined to the first substrate from one end and the second substrate from the other end.

16. The apparatus of claim 15 wherein the faces of the first, second, third, fourth, fifth, and sixth substrates oppose the coolant to form an enclosure containing the coolant.

17. The apparatus of claim 16 wherein:
the first substrate contains at least one opening near one end and another at least one opening near the opposing end, or the second substrate contains at least one opening near one end and another at least one opening near the opposing end;
at least one opening comprises an inlet port for the coolant; and
at least one opening comprises an exit port for the coolant.

18. The apparatus of claim 11 wherein under very high operating thermal conditions, excessive heating of the first substrate causes the coolant temperature to increase which in turn heats the second substrate.

19. The apparatus of claim 11 wherein under very high operating thermal conditions, excessive heating of the first substrate causes a temperature of the coolant to increase which in turn heats the second substrate.

20. An method, comprising:
providing a first substrate and a second substrate, the first substrate having a face in contact with a coolant and another face in contact with at least one hot medium;
configuring the second substrate to comprise a bimaterial having an upper layer in contact with at least one cold medium and having a lower layer in contact with the coolant;
arranging the faces of the first substrate and the lower layer of the second substrate in contact with the coolant in opposition to each other; and
configuring a material of the upper layer to comprise a higher linear thermal expansion coefficient than that of the material of a lower layer so that the second substrate bends outward relative to the first substrate allowing for more coolant to flow under very high operating thermal conditions.

* * * * *